United States Patent
Nakazawa et al.

(10) Patent No.: US 10,615,455 B2
(45) Date of Patent: *Apr. 7, 2020

(54) NON-AQUEOUS ELECTROLYTIC SOLUTION AND NON-AQUEOUS ELECTROLYTE SECONDARY BATTERY USING THE SAME

(71) Applicant: Mitsubishi Chemical Corporation, Chiyoda-ku (JP)

(72) Inventors: Eiji Nakazawa, Inashiki-gun (JP); Youichi Oohashi, Inashiki-gun (JP); Atsushi Watarai, Inashiki-gun (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 317 days.

This patent is subject to a terminal disclaimer.

(21) Appl. No.: 15/438,088

(22) Filed: Feb. 21, 2017

(65) Prior Publication Data

US 2017/0162906 A1 Jun. 8, 2017

Related U.S. Application Data

(63) Continuation of application No. PCT/JP2015/073584, filed on Aug. 21, 2015.

(30) Foreign Application Priority Data

| Aug. 22, 2014 | (JP) | 2014-169660 |
| Aug. 29, 2014 | (JP) | 2014-176614 |
| Sep. 1, 2014 | (JP) | 2014-177370 |

(51) Int. Cl.
| *H01M 10/0567* | (2010.01) |
| *H01M 4/587* | (2010.01) |
| *H01M 4/505* | (2010.01) |
| *H01M 4/525* | (2010.01) |
| *H01M 10/0525* | (2010.01) |
| *H01M 10/0569* | (2010.01) |

(52) U.S. Cl.
CPC ....... *H01M 10/0567* (2013.01); *H01M 4/505* (2013.01); *H01M 4/525* (2013.01); *H01M 4/587* (2013.01); *H01M 10/0525* (2013.01); *H01M 10/0569* (2013.01); *H01M 2300/004* (2013.01); *H01M 2300/0025* (2013.01)

(58) Field of Classification Search
CPC ......... H01M 10/0567; H01M 10/0569; H01M 10/0525; H01M 4/587; H01M 4/505; H01M 4/525; H01M 2300/0025; H01M 2300/004

See application file for complete search history.

(56) References Cited

U.S. PATENT DOCUMENTS

| 2002/0009652 A1 | 1/2002 | Ueda et al. |
| 2012/0088160 A1 | 4/2012 | Zhang et al. |
| 2014/0186721 A1 | 7/2014 | Zhang et al. |
| 2014/0272606 A1 | 9/2014 | Chu et al. |
| 2015/0364794 A1* | 12/2015 | Nakazawa ........ H01M 10/0567 429/200 |

FOREIGN PATENT DOCUMENTS

| CN | 103199302 A | 7/2013 |
| CN | 103594727 A1 | 2/2014 |
| EP | 2128923 | * 12/2009 |
| JP | 7-192757 | 7/1995 |
| JP | 2000-348705 | 12/2000 |
| JP | 2000-348765 | * 12/2000 |
| JP | 2001-345119 | 12/2001 |
| JP | 2002-358999 | 12/2002 |
| JP | 2002-358999 A | 12/2002 |
| JP | 2008-171589 A | 7/2008 |
| JP | 2010-212228 A | 9/2010 |
| JP | 2010-282906 | 12/2010 |
| JP | 2011-233245 | 11/2011 |
| JP | 2013-206843 | 10/2013 |
| JP | 2014-63733 | 4/2014 |

(Continued)

OTHER PUBLICATIONS

Extended European Search Report dated Jul. 17, 2017 in European Patent Application No. 15834526.4.
Young-Hyun Cho, et al. "Allyl-substituted triazines as additives for enhancing the thermal stability of Li-ion batteries", Journal of Power Sources, XP027450479, vol. 196, No. 3, 2011, pp. 1483-1487.
International Search Report dated Nov. 17, 2015 in PCT/JP2015/073584, filed on Aug. 21, 2015 (with English Translation).
European Office Action dated Jul. 24, 2018 in Patent Application No. 15 834 526.4, 4 pages.

(Continued)

*Primary Examiner* — Laura Weiner
(74) *Attorney, Agent, or Firm* — Oblon, McClelland, Maier & Neustadt, L.L.P.

(57) ABSTRACT

An object of the present invention 1 is to provide a non-aqueous electrolyte secondary battery having excellent general performance balance between durability performance and properties, such as a capacity, a resistance, and output characteristics. The present invention 1 is directed to a non-aqueous electrolytic solution for use in a non-aqueous electrolyte secondary battery which comprises: a positive electrode being capable of having occluded therein and releasing metal ions; a negative electrode being capable of having occluded therein and releasing metal ions, and comprising a negative electrode active material containing metal particles capable of forming an alloy together with Li and graphite particles; and a non-aqueous electrolytic solution comprising a non-aqueous solvent and an electrolyte dissolved in the non-aqueous solvent, wherein the non-aqueous electrolytic solution contains a compound represented by the general formula (A), and a non-aqueous electrolyte secondary battery using the non-aqueous electrolytic solution.

13 Claims, No Drawings

(56) References Cited

FOREIGN PATENT DOCUMENTS

JP          2014-67583 A      4/2014
JP          2014-194930 A     10/2014

OTHER PUBLICATIONS

Extended European Search Report dated May 13, 2019 in Patent Application No. 19156498.8, 9 pages.
Japanese Office Action dated Apr. 2, 2019 in Patent Application No. 2015-163789 (with English translation), citing documents AO-AQ therein, 5 pages.
Japanese Office Action dated Apr. 2, 2019 in Patent Application No. 2015-163790 (with English translation), citing documents AO and AP therein, 7 pages.
Japanese Office Action dated Aug. 6, 2019, in Patent Application No. 2015-163789, citing document AO therein, 5 pp. (with unedited computer generated English translation).

* cited by examiner

NON-AQUEOUS ELECTROLYTIC SOLUTION AND NON-AQUEOUS ELECTROLYTE SECONDARY BATTERY USING THE SAME

FIELD OF THE INVENTION

The present invention 1 relates to a non-aqueous electrolytic solution and a non-aqueous electrolyte secondary battery using the same.

BACKGROUND ART

As mobile electronic devices, such as a cell phone and a laptop personal computer, have rapidly progressed, demands are made on the batteries used as a main power source or a backup power source for the electronic devices, wherein the batteries should be increased in capacity. As such demands are increasing, non-aqueous electrolyte secondary batteries, such as a lithium-ion secondary battery, having a high energy density, as compared to a nickel-cadmium battery and a nickel-hydrogen battery, have attracted attention.

As a representative example of an electrolytic solution for a lithium-ion secondary battery, there can be mentioned a non-aqueous electrolytic solution obtained by dissolving an electrolyte, such as $LiPF_6$, $LiBF_4$, $LiN(CF_3SO_2)_2$, or $LiCF_3(CF_2)_3SO_3$, in a mixed solvent of a high-permittivity solvent, such as ethylene carbonate or propylene carbonate, and a low-viscosity solvent, such as dimethyl carbonate, diethyl carbonate, or ethylmethyl carbonate.

As a negative electrode active material for the lithium-ion secondary battery, a carbonaceous material capable of having occluded therein and releasing lithium ions is mainly used. Representative examples of the carbonaceous materials include natural graphite, artificial graphite, and amorphous carbon. A metal or alloy negative electrode using, for example, silicon or tin, intended to further increase the capacity has been known. As a positive electrode active material, a transition metal composite oxide capable of having occluded therein and releasing lithium ions is mainly used. Representative examples of transition metals used for the transition metal composite oxide include cobalt, nickel, manganese, and iron.

In the non-aqueous electrolyte secondary battery using the above-mentioned non-aqueous electrolytic solution, the reactivity varies depending on the composition of the non-aqueous electrolytic solution used, and therefore the battery characteristics considerably change according to the non-aqueous electrolytic solution used in the battery. For improving the non-aqueous electrolyte secondary battery in battery characteristics, such as load characteristics, cycle characteristics, and storage characteristics, and enhancing the safety of the battery upon being overcharged, various studies have been made on the non-aqueous solvents and electrolytes used in the non-aqueous electrolytic solution.

In patent document 1, with respect to a lithium secondary battery comprising a positive electrode using a lithium-transition metal oxide, such as lithium cobalt oxide, as an active material, a negative electrode using graphite, and a non-aqueous electrolytic solution, studies are made on the suppression of self-discharge during the storage at a high temperature by adding a compound having a specific isocyanuric acid skeleton to the electrolytic solution.

In patent document 2, with respect to a lithium secondary battery comprising a positive electrode using a lithium-transition metal oxide, such as lithium cobalt oxide, as an active material, a negative electrode using natural graphite, and a non-aqueous electrolytic solution, studies are made on the improvement of the load characteristics of the battery after being stored at a high temperature by adding a compound having a specific isocyanuric acid skeleton to the electrolytic solution.

In patent document 3, with respect to a lithium secondary battery comprising a positive electrode using a lithium-transition metal oxide, such as a lithium-nickel-manganese-cobalt composite oxide, as an active material, a composite negative electrode comprised of $SiO_x$ and graphite, and a non-aqueous electrolytic solution, studies are made on the improvement of the cycle characteristics by adding vinylene carbonate and fluoroethylene carbonate to the electrolytic solution.

PRIOR ART REFERENCES

Patent Documents

Patent document 1: Japanese Unexamined Patent Publication No. Hei 7-192757
Patent document 2: Japanese Unexamined Patent Publication No. 2000-348765
Patent document 3: Japanese Unexamined Patent Publication No. 2011-233245

SUMMARY OF THE INVENTION

Problems to be Solved by the Invention

However, recently, there are further increasing demands for the lithium non-aqueous electrolyte secondary battery having improved characteristics, and the battery is demanded to have a high level of all performances, including high-temperature storage characteristics, energy density, output characteristics, life, and high-rate charge-discharge characteristics, but such a battery has not been achieved. A problem is encountered in that there is a trade-off relationship between durability properties, such as high-temperature storage characteristics, and properties, such as a capacity and a resistance, causing a conventional lithium non-aqueous electrolyte secondary battery to have a poor general performance balance.

When the electrolytic solution containing an isocyanate compound, such as triallyl isocyanurate or tricarboxyethyl isocyanurate, described in patent documents 1 and 2 is used, the battery characteristics are improved; however, these patent documents do not clearly describe the effect obtained when using metal particles capable of forming an alloy together with Li and graphite as a negative electrode active material.

When the electrolytic solution containing vinylene carbonate and fluoroethylene carbonate described in patent document 3 is used, the battery using $SiO_x$ and graphite as a negative electrode active material is improved in the cycle characteristics. However, a reductive decomposition reaction of the electrolytic solution on the surface of $SiO_x$ cannot be completely suppressed, making it difficult to achieve satisfactory cycle characteristics.

Means for Solving the Problems

In view of the above-mentioned problems, the present invention 1 has been made. That is, an object of the present invention 1 is to provide a non-aqueous electrolyte secondary battery having excellent general performance balance between durability performance and properties, such as a capacity, a resistance, and output characteristics.

The inventors of the present invention 1 have conducted extensive and intensive studies. As a result, they have found that the above problems can be solved by using an electrolytic solution containing a specific compound, and the present invention 1 has been completed.

The gist of the present invention 1 is as follows.

(a) A non-aqueous electrolytic solution for use in a non-aqueous electrolyte secondary battery which comprises:

a positive electrode being capable of having occluded therein and releasing metal ions;

a negative electrode being capable of having occluded therein and releasing metal ions, and comprising a negative electrode active material containing metal particles capable of forming an alloy together with Li and graphite particles; and a non-aqueous electrolytic solution comprising a non-aqueous solvent and an electrolyte dissolved in the non-aqueous solvent, wherein the non-aqueous electrolytic solution contains a compound represented by the following general formula (A):

[Chemical formula 1]

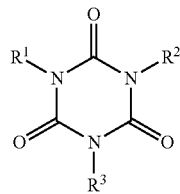

(A)

wherein $R^1$ to $R^3$ are the same or different, and each is an organic group having 1 to 20 carbon atoms and optionally having a substituent, with the proviso that at least one of $R^1$ to $R^3$ has a carbon-carbon unsaturated bond or a cyano group.

(b) The non-aqueous electrolytic solution according to item (a) above, wherein, in the general formula (A), $R^1$ to $R^3$ are the same or different, and each is an organic group having 1 to 10 carbon atoms and optionally having a substituent.

(c) The non-aqueous electrolytic solution according to item (a) or (b) above, wherein, in the general formula (A), at least one of $R^1$ to $R^3$ is an organic group having a carbon-carbon unsaturated bond.

(d) The non-aqueous electrolytic solution according to item (c) above, wherein the organic group having a carbon-carbon unsaturated bond is a group selected from the group consisting of an allyl group and a methallyl group.

(e) The non-aqueous electrolytic solution according to any one of items (a) to (d) above, wherein the amount of the added compound represented by the general formula (A) is 0.01 to 10.0% by mass, based on the mass of the non-aqueous electrolytic solution.

(f) The non-aqueous electrolytic solution according to any one of items (a) to (e) above, which contains at least one compound selected from a cyclic carbonate having a carbon-carbon unsaturated bond and a cyclic carbonate having a fluorine atom.

(g) The non-aqueous electrolytic solution according to any one of items (a) to (f) above, wherein the metal particles capable of forming an alloy together with Li are at least one metal selected from the group consisting of Si, Sn, As, Sb, Al, Zn, and W or a metal compound thereof.

(h) The non-aqueous electrolytic solution according to any one of items (a) to (g) above, wherein the metal particles capable of forming an alloy together with Li are Si or a Si metal oxide.

(i) The non-aqueous electrolytic solution according to any one of items (a) to (h) above, wherein the negative electrode active material containing the metal particles capable of forming an alloy together with Li and the graphite particles is a composite and/or a mixture of a metal and/or a metal compound and the graphite particles.

(j) The non-aqueous electrolytic solution according to any one of items (a) to (i) above, wherein the amount of the contained metal particles capable of forming an alloy together with Li is 0.1 to 25% by mass, based on the total mass of the metal particles capable of forming an alloy together with Li and the graphite particles.

(k) The non-aqueous electrolytic solution according to any one of items (a) to (j) above, wherein the amount of the contained metal particles capable of forming an alloy together with Li is 0.1 to 20% by mass, based on the total mass of the metal particles capable of forming an alloy together with Li and the graphite particles.

(l) The non-aqueous electrolytic solution according to any one of items (a) to (k) above, wherein the amount of the contained metal particles capable of forming an alloy together with Li is 0.1 to 15% by mass, based on the total mass of the metal particles capable of forming an alloy together with Li and the graphite particles.

(m) The non-aqueous electrolytic solution according to any one of items (a) to (l) above, wherein the amount of the contained metal particles capable of forming an alloy together with Li is 0.1 to 10% by mass, based on the total mass of the metal particles capable of forming an alloy together with Li and the graphite particles.

(n) A non-aqueous electrolyte secondary battery which comprises: a positive electrode being capable of having occluded therein and releasing metal ions; a negative electrode being capable of having occluded therein and releasing metal ions, and comprising a negative electrode active material containing metal particles capable of forming an alloy together with Li and graphite particles; and a non-aqueous electrolytic solution comprising a non-aqueous solvent and an electrolyte dissolved in the non-aqueous solvent, wherein the non-aqueous electrolyte secondary battery contains the non-aqueous electrolytic solution according to any one of items (a) to (m) above.

Effects of the Invention

By the present invention 1, there can be provided a lithium non-aqueous electrolyte secondary battery having excellent general performance balance between durability and properties, such as a capacity, a resistance, and output characteristics.

Complete elucidation of the action and principle of the fact that the non-aqueous electrolyte secondary battery produced using the non-aqueous electrolytic solution of the present invention 1 and the non-aqueous electrolyte secondary battery of the present invention 1 are a secondary battery having excellent general performance balance has not yet been made, but the action and principle are considered as follows. The action and principle in the present invention 1 are not limited to those described below.

The alloy active material is very large in the theoretical capacity per weight or volume of the negative electrode active material, as compared to the carbon negative electrode currently used, and therefore has attracted attention as a next-generation negative electrode. The alloy active material, however, extremely largely changes in volume (100 to 300%) as the active material has occluded and releases lithium ions, and the change in volume of the active material causes problems, such as cutting off of the path of electronic conduction in the electrode, and deterioration of the electrode prepared from the composition or the active material, e.g., reduction in size of the particles. As the charging and discharging operations are repeatedly performed, the particles are reduced in size, so that a newly generated surface (dangling bond) which is highly active is exposed. The exposed surface is reacted with the electrolytic solution to change the surface of the active material in properties, leading to a problem in that the active material capacity is lowered and a difference in charge depth is caused between the positive electrode and the negative electrode, so that only poor cycle characteristics can be obtained. For solving the problem, in the present invention 1, the non-aqueous electrolytic solution containing a compound represented by the formula (A) is used. The compound represented by the formula (A) is trifunctional, and therefore is reacted on the negative electrode to form a crosslinking film. Consequently, a reduction reaction of the surface of the alloy with the electrolytic solution is suppressed, so that battery characteristics, such as cycle characteristics and storage characteristics, are improved.

For solving the above-mentioned problems, in the present invention 1, there is used a non-aqueous electrolytic solution for use in a non-aqueous electrolyte secondary battery comprising a positive electrode and a negative electrode each being capable of having occluded therein and releasing metal ions, wherein the non-aqueous electrolytic solution contains an electrolyte and a non-aqueous solvent as well as a compound represented by the general formula (A) below, and wherein the negative electrode has a negative electrode active material containing metal particles capable of forming an alloy together with Li and graphite particles. As a result, it has been found that not only high-temperature storage characteristics but also various properties, such as cycle gas suppression, cycle characteristics, load characteristics, and battery expansion, are improved, and the present invention 1 has been completed.

MODE FOR CARRYING OUT THE INVENTION

Hereinbelow, an embodiment of the present invention 1 will be described, but the present invention 1 is not limited to the embodiment described below, and can be arbitrarily changed or modified within the scope of the present invention 1.

In the present specification, the units "% by weight", "ppm by weight", and "part(s) by weight" have, respectively, the same meanings as those of "% by mass", "ppm by mass", and "part(s) by mass". Further, the unit simply indicated by "ppm" means "ppm by weight".

1. Non-Aqueous Electrolytic Solution 1-1. Non-Aqueous Electrolytic Solution of the Present Invention 1

The non-aqueous electrolytic solution of the present invention 1 is characterized by containing a compound represented by the general formula (A) shown below.

1-1-1. Compound Represented by the General Formula (A)

[Chemical formula 2]

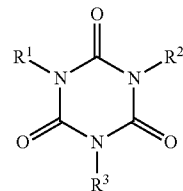

In the formula (A), $R^1$ to $R^3$ are the same or different, and each is an organic group having 1 to 20 carbon atoms and optionally having a substituent, with the proviso that at least one of $R^1$ to $R^3$ has a carbon-carbon unsaturated bond or a cyano group. It is preferred that, in the formula (A), $R^1$ to $R^3$ are the same or different, and each is an organic group having 1 to 10 carbon atoms and optionally having a substituent. It is more preferred that, in the formula (A), at least one of $R^1$ to $R^3$ is an organic group having a carbon-carbon unsaturated bond.

Here, the organic group indicates a functional group comprised of an atom selected from the group consisting of a carbon atom, a hydrogen atom, a nitrogen atom, an oxygen atom, a silicon atom, a sulfur atom, and a halogen atom.

Specific examples of organic groups optionally having a substituent include an alkyl group having 1 to 20 carbon atoms, an alkenyl group, an alkynyl group, an aryl group, a cyano group, an acryl group, a methacryl group, a vinylsulfonyl group, and a vinylsulfo group.

Examples of the substituents include a halogen atom and an alkylene group. Further, for example, an unsaturated bond may be contained in part of an alkylene group. Among halogen atoms, a fluorine atom is preferred.

Specific examples of alkyl groups optionally having a substituent include linear or branched alkyl groups, such as a methyl group, an ethyl group, a n-propyl group, an i-propyl group, a n-butyl group, a sec-butyl group, and a tert-butyl group, and cyclic alkyl groups, such as a cyclopropyl group, a cyclopentyl group, and a cyclohexyl group.

Specific examples of alkenyl groups optionally having a substituent include a vinyl group, an allyl group, a methallyl group, and a 1-propenyl group. Specific examples of alkynyl groups optionally having a substituent include an ethynyl group, a propargyl group, and a 1-propynyl group. Specific examples of aryl groups optionally having a substituent include a phenyl group, a tolyl group, a benzyl group, and a phenethyl group.

Of these, preferred examples include an alkyl group optionally having a substituent, an alkenyl group, an alkynyl group, an acryl group, a methacryl group, an aryl group, a cyano group, a vinylsulfonyl group, and a vinylsulfo group.

Further preferred examples include an alkyl group optionally having a substituent, an alkenyl group, an alkynyl group, an acryl group, a methacryl group, and a cyano group.

Especially preferred examples include an alkyl group optionally having a substituent, an alkenyl group, an acryl group, a methacryl group, and a cyano group.

Most preferred examples include an alkyl group optionally having a substituent, an allyl group, and a methallyl group. Especially, preferred is an allyl group or a methallyl group which is an organic group having an unsubstituted carbon-carbon unsaturated bond. From the viewpoint of the film forming ability, an allyl group is preferred.

With respect to the compound used in the present invention 1, a compound represented by the general formula (A)

is used. As specific examples, there can be mentioned compounds of the structures shown below.
[Chemical formula 3-1]
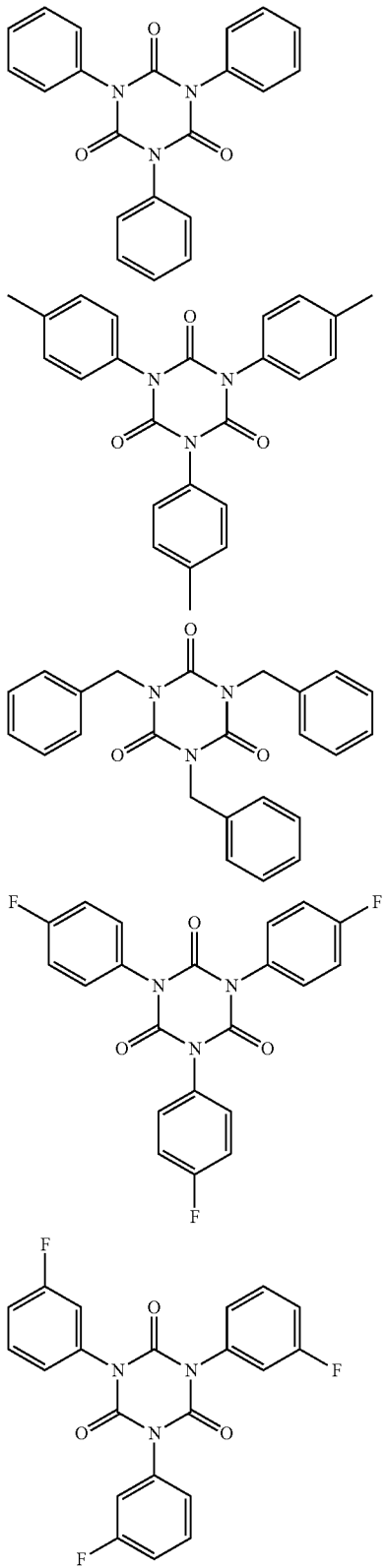
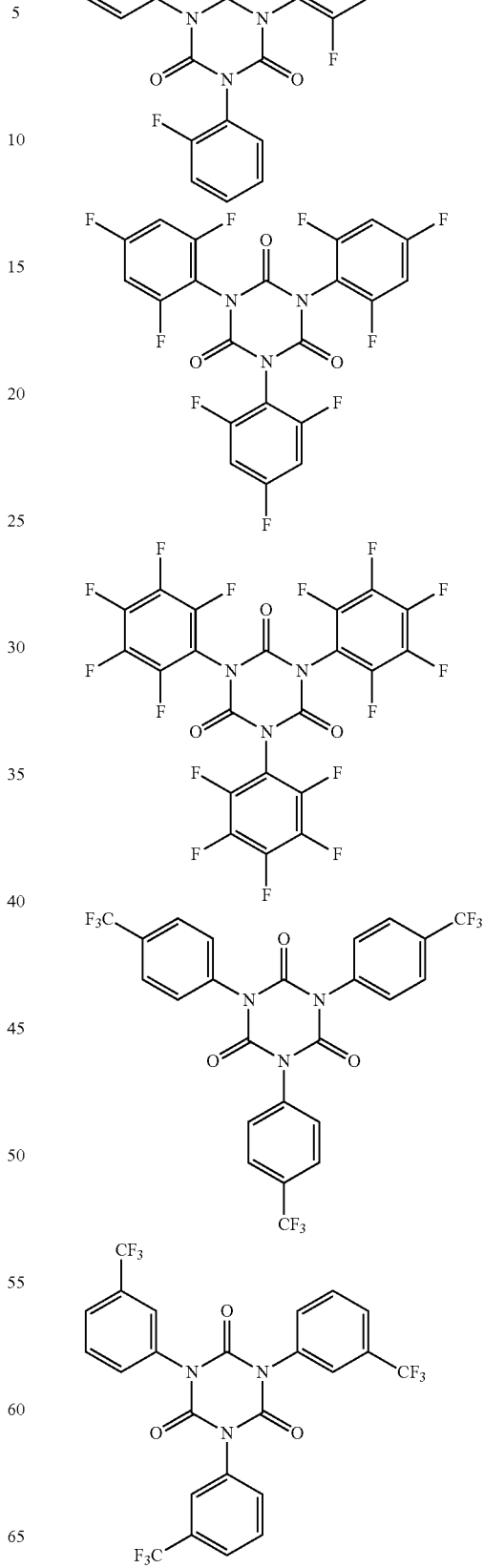

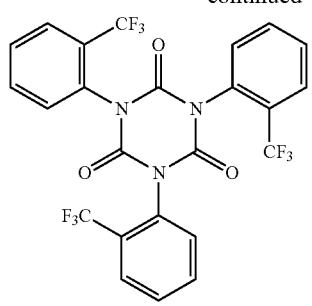
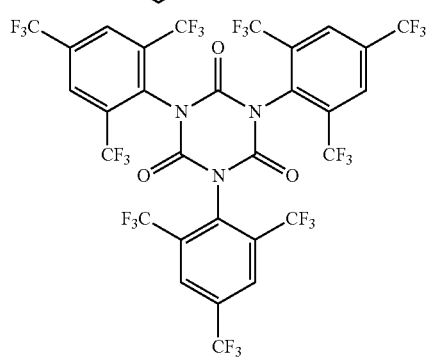
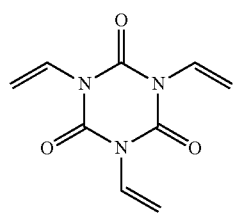
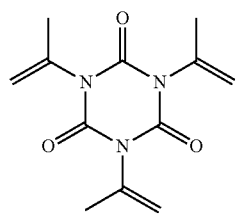
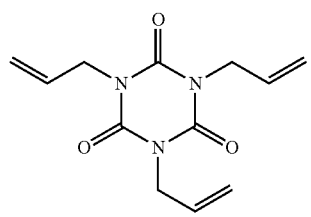
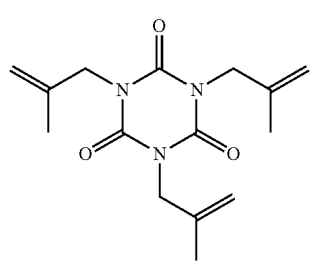
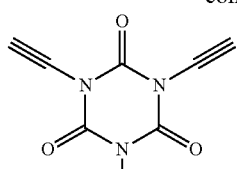
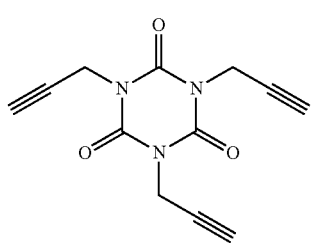
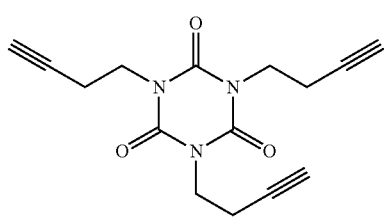
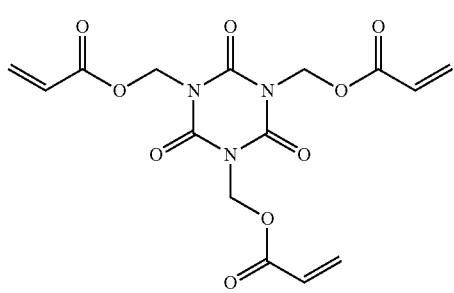
[Chemical formula 3-2]
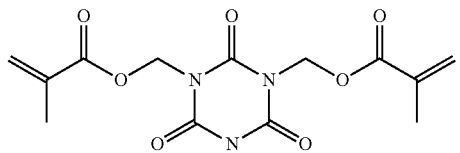
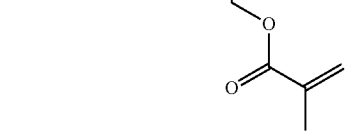
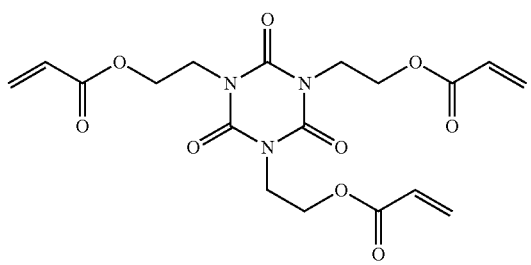

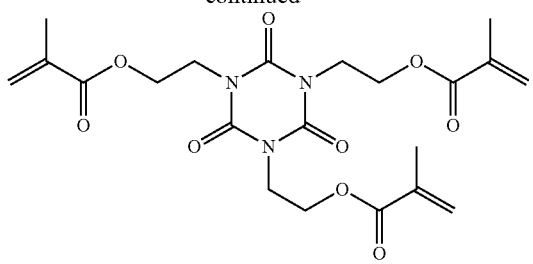
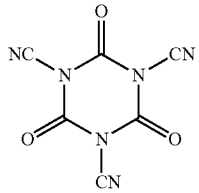
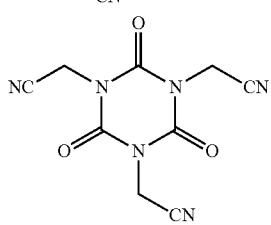
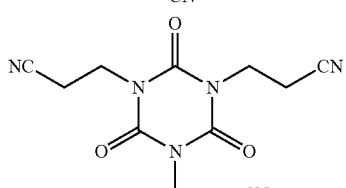
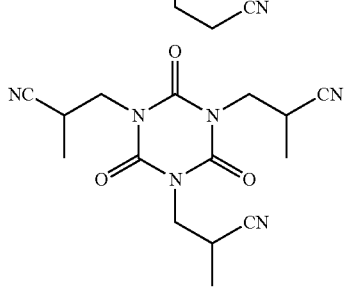
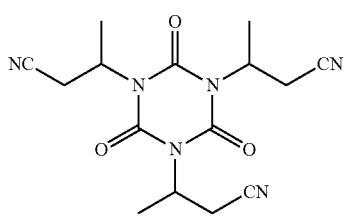
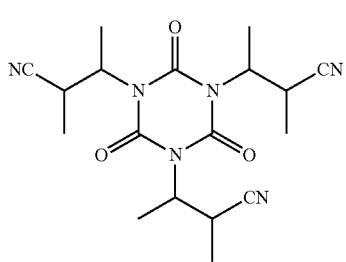
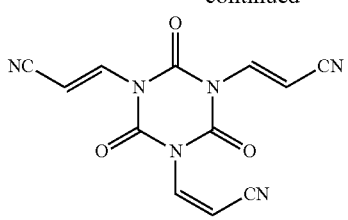
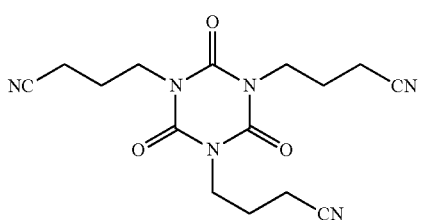
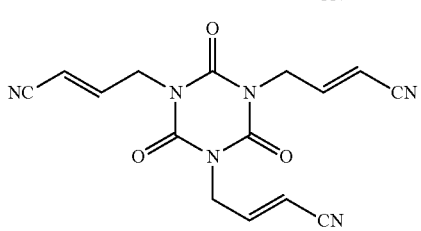
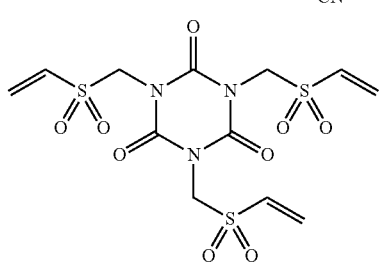
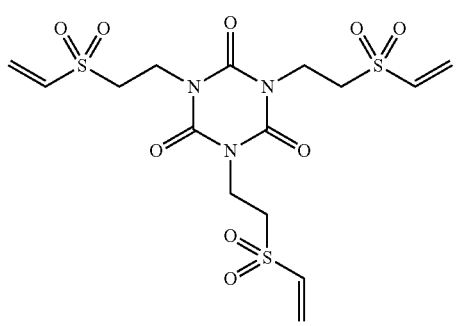
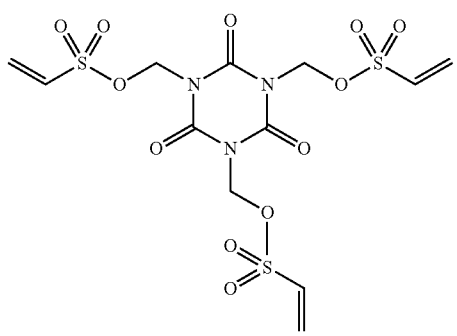

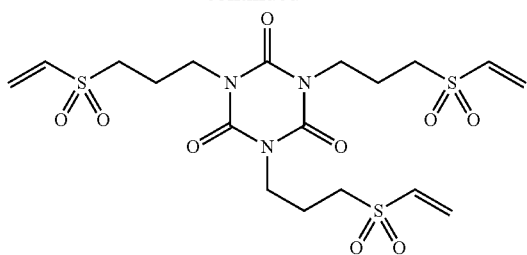
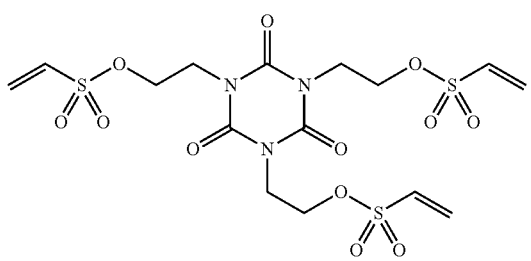
[Chemical formula 3-3]
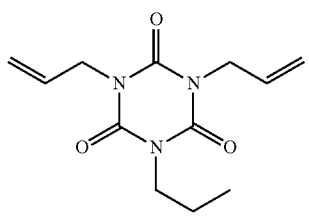
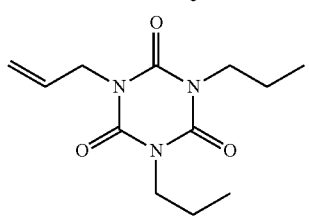
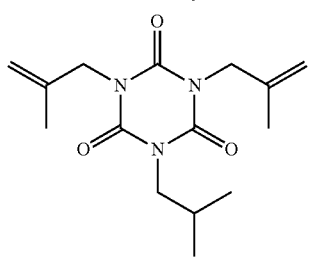
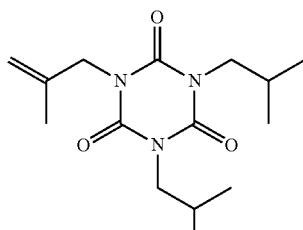
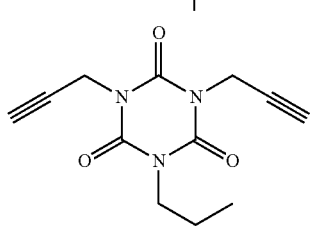
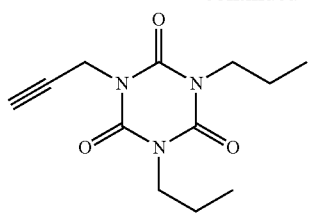
As preferred examples, there can be mentioned compounds of the structures shown below.
[Chemical formula 4-1]
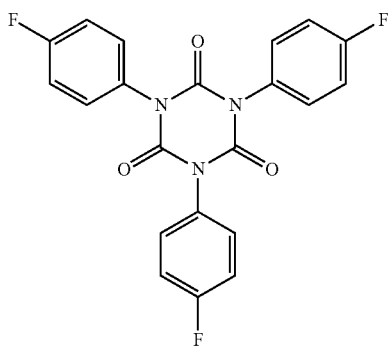
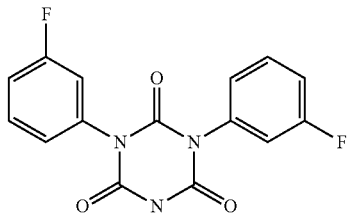
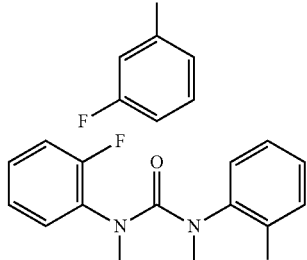
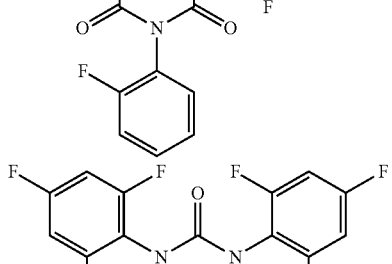
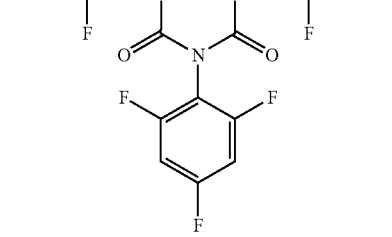

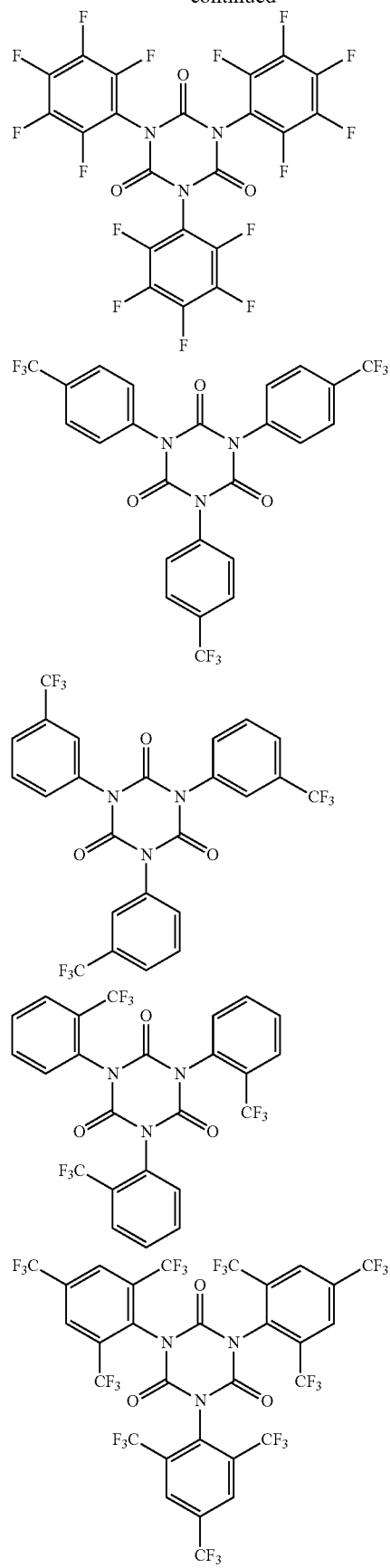
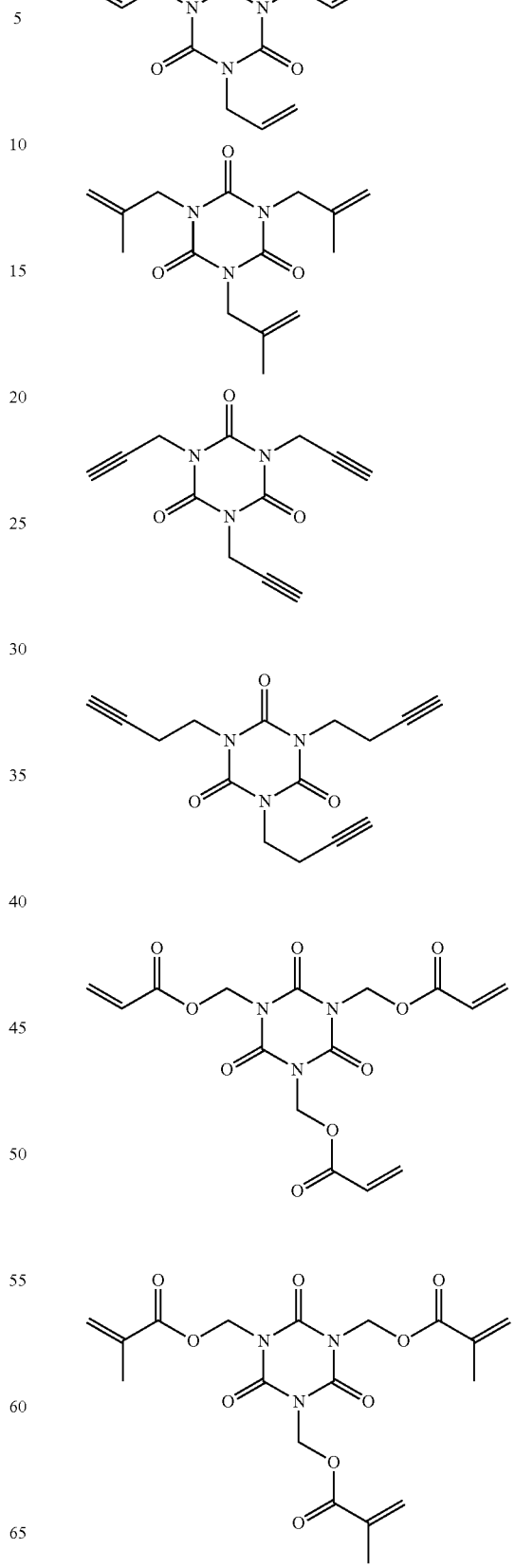

-continued
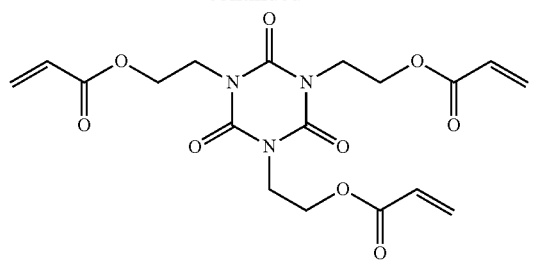
[Chemical formula 4-2]
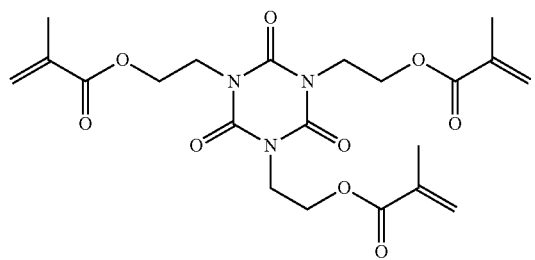
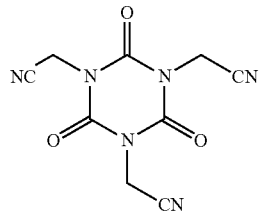
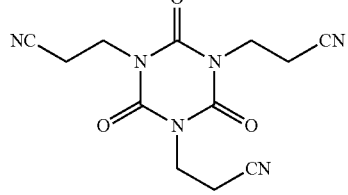
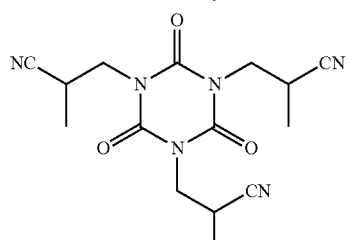
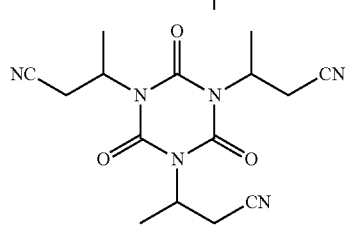
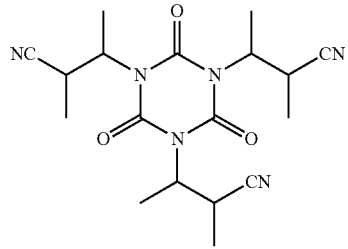
-continued
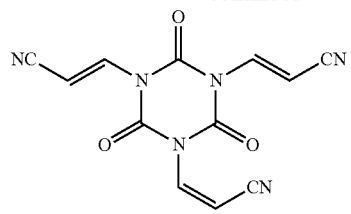
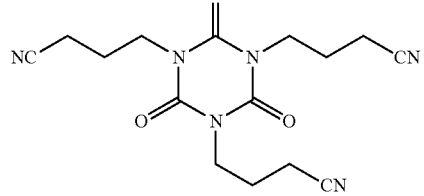
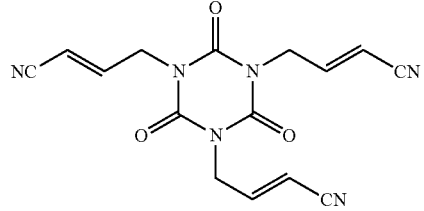
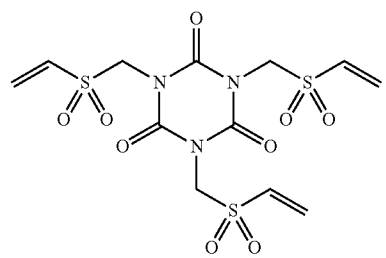
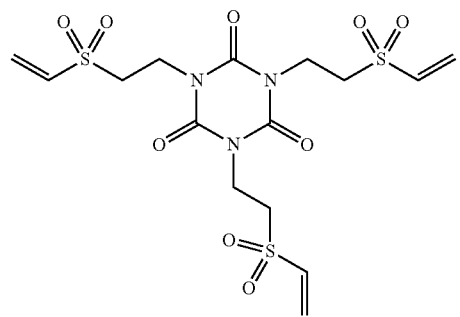
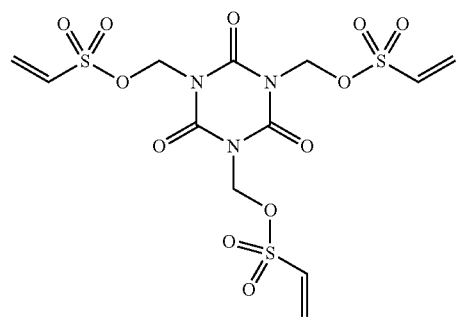

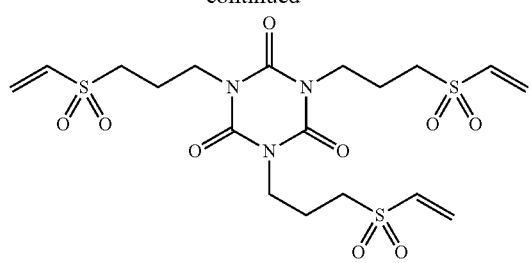
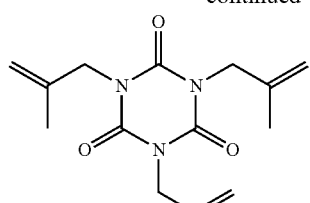
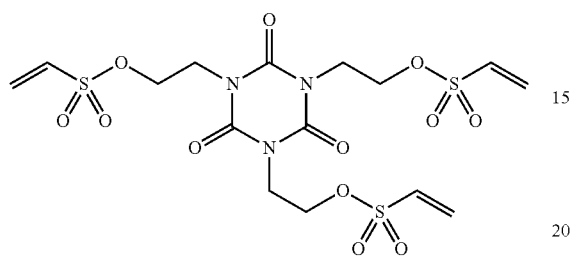
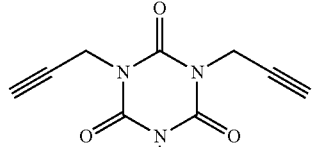
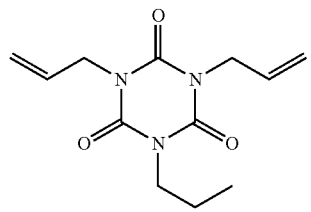
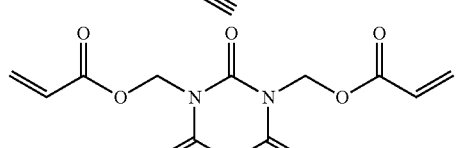
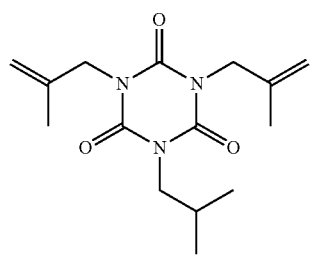
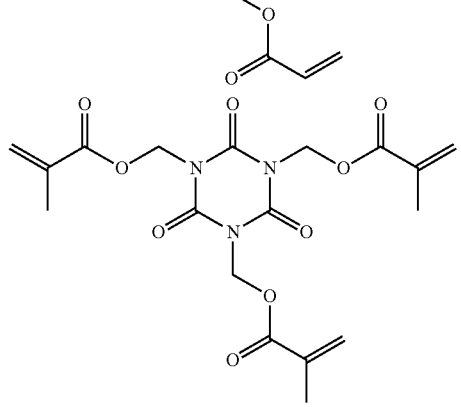
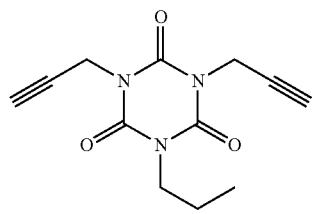
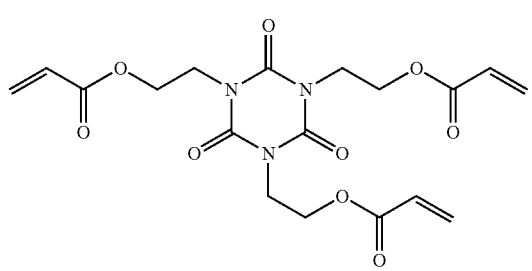
As further preferred examples, there can be mentioned compounds of the structures shown below.
[Chemical formula 5]
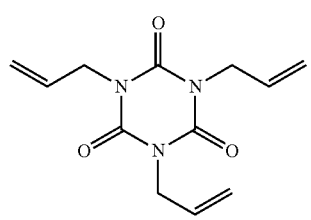
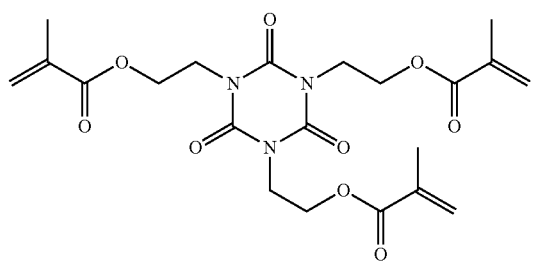

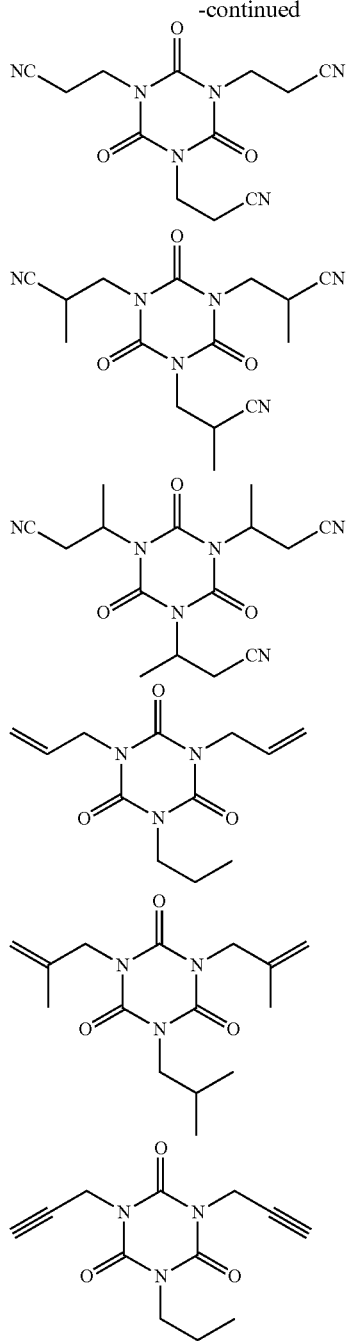
As especially preferred examples, there can be mentioned compounds of the structures shown below.
[Chemical formula 6]
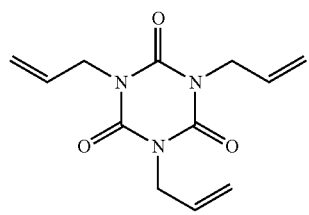
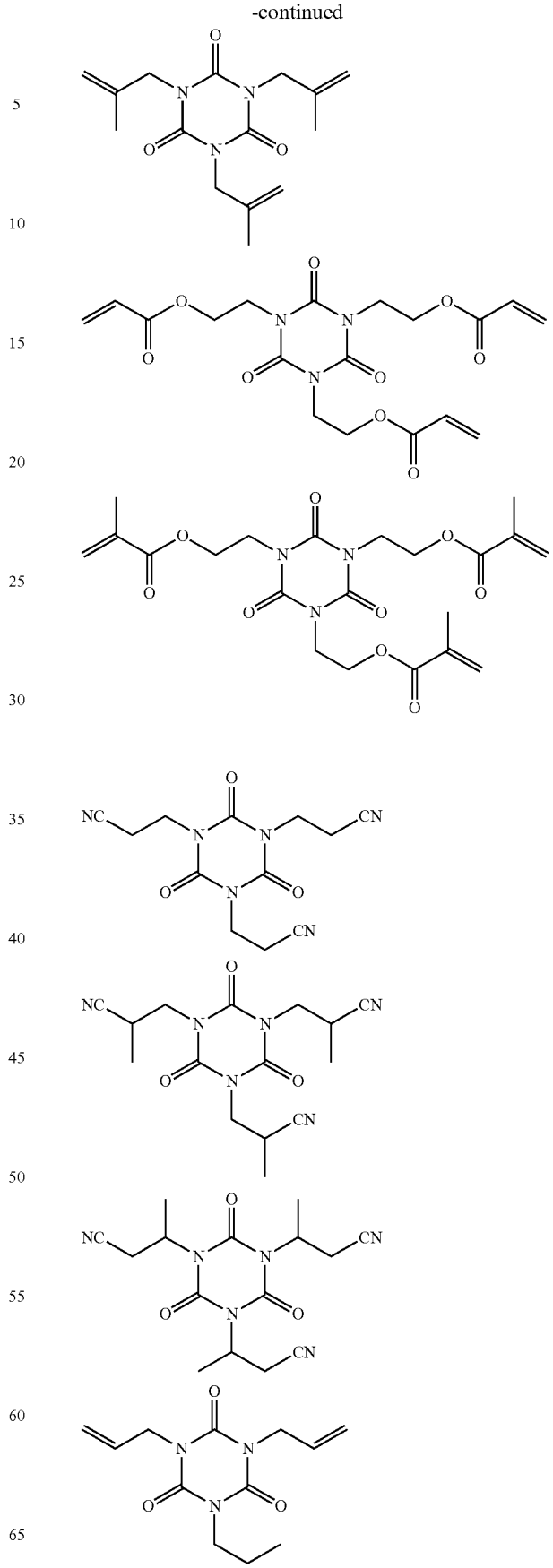

-continued

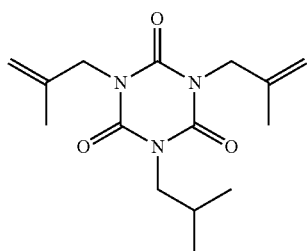

As most preferred examples, there can be mentioned compounds of the structures shown below.

[Chemical formula 7]

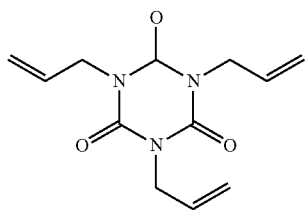

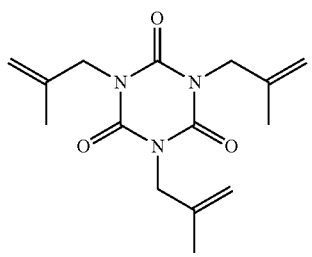

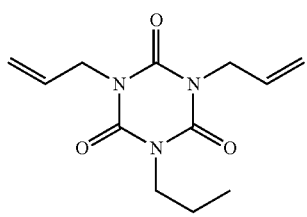

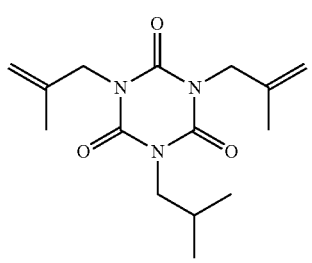

Among the most preferred compounds, from the viewpoint of the film forming ability, preferred is a compound of the structure shown below.

[Chemical formula 8]

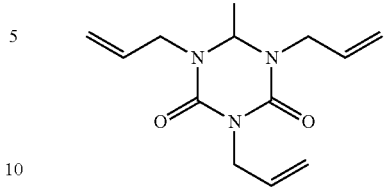

With respect to the method for producing the compound represented by the general formula (A), there is no particular limitation, and the compound can be produced by a known method arbitrarily selected.

With respect to the amount of the compound represented by the general formula (A) incorporated into the non-aqueous electrolytic solution of the present invention 1, there is no particular limitation, and the amount of the compound is arbitrary as long as the effects of the present invention 1 are not markedly sacrificed. However, the concentration of the compound in the non-aqueous electrolytic solution of the present invention 1 is generally 0.001% by mass or more, preferably 0.01% by mass or more, more preferably 0.1% by mass or more, and is generally 10% by mass or less, preferably 5% by mass or less, more preferably 3% by mass or less, further preferably 2% by mass or less, especially preferably 1% by mass or less, most preferably 0.5% by mass or less. When the concentration of the compound represented by the general formula (A) is in the above range, inhibition of an electrode reaction caused due to excessive covering of the surface of the negative electrode with the reduction product is prevented. Further, an action at the electrode interface more advantageously proceeds, making it possible to achieve optimum battery characteristics.

With respect to the compound represented by the general formula (A), which is contained in the non-aqueous electrolytic solution and actually used in producing a non-aqueous electrolyte secondary battery, when the battery is disassembled and the non-aqueous electrolytic solution is withdrawn from the disassembled battery, it is likely that the amount of the compound contained in the withdrawn non-aqueous electrolytic solution is markedly reduced. Therefore, when the compound represented by the general formula (A) can be detected even in a very small amount from the non-aqueous electrolytic solution withdrawn from the battery, such a non-aqueous electrolytic solution is included in the present invention 1. Further, with respect to the compound represented by the general formula (A), which is actually used as a non-aqueous electrolytic solution in producing a non-aqueous electrolyte secondary battery, even when the compound represented by the general formula (A) is contained only in a very small amount in the non-aqueous electrolytic solution withdrawn from the disassembled battery, it is likely that the compound is detected on the positive electrode, negative electrode, or separator, which are other members constituting the non-aqueous electrolyte secondary battery. Therefore, when the compound represented by the general formula (A) is detected from the positive electrode, negative electrode, or separator, it can be assumed that the total amount of the compound detected has been originally contained in the non-aqueous electrolytic solution. Under this assumption, it is preferred that the compound represented by the general formula (A) is contained in an amount in the above-mentioned range.

1-1-2. Cyclic Carbonate Having a Carbon-Carbon Unsaturated Bond

In the non-aqueous electrolytic solution of the present invention 1, it is preferred that the compound represented by the general formula (A) and a cyclic carbonate having a carbon-carbon unsaturated bond (hereinafter, frequently referred to as "unsaturated cyclic carbonate") are used in combination. With respect to the unsaturated cyclic carbonate, there is no particular limitation as long as it is a cyclic carbonate having a carbon-carbon double bond or a carbon-carbon triple bond, and an arbitrary unsaturated carbonate can be used. A cyclic carbonate having an aromatic ring is included in the unsaturated cyclic carbonate.

Examples of unsaturated cyclic carbonates include vinylene carbonates, ethylene carbonates substituted with a substituent having an aromatic ring, a carbon-carbon double bond, or a carbon-carbon triple bond, phenyl carbonates, vinyl carbonates, allyl carbonates, and catechol carbonates.

Examples of vinylene carbonates include vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate, 4-fluorovinylene carbonate, 4-fluoro-5-methylvinylene carbonate, 4-fluoro-5-phenylvinylene carbonate, 4-fluoro-5-vinylvinylene carbonate, and 4-allyl-5-fluorovinylene carbonate.

Specific examples of ethylene carbonates substituted with a substituent having an aromatic ring, a carbon-carbon double bond, or a carbon-carbon triple bond include vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, and 4-methyl-5-allylethylene carbonate.

Of these, preferred examples of unsaturated cyclic carbonates particularly used in combination with the compound represented by the general formula (A) include vinylene carbonate, methylvinylene carbonate, 4,5-dimethylvinylene carbonate, vinylvinylene carbonate, 4,5-vinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, and 4-vinyl-5-ethynylethylene carbonate. Especially preferred are vinylene carbonate, vinylethylene carbonate, and ethynylethylene carbonate because they form a further stable interface protecting film.

With respect to the molecular weight of the unsaturated cyclic carbonate, there is no particular limitation, and the molecular weight of the unsaturated cyclic carbonate is arbitrary as long as the effects of the present invention 1 are not markedly sacrificed. The molecular weight of the unsaturated cyclic carbonate is preferably 80 to 250. When the molecular weight of the unsaturated cyclic carbonate is in the above range, dissolution of the unsaturated cyclic carbonate in the non-aqueous electrolytic solution can be easily secured, so that the effects of the present invention 1 are likely to be satisfactorily exhibited. The molecular weight of the unsaturated cyclic carbonate is more preferably 85 or more, and is more preferably 150 or less.

With respect to the method for producing the unsaturated cyclic carbonate, there is no particular limitation, and the unsaturated cyclic carbonate can be produced by a known method arbitrarily selected.

The unsaturated cyclic carbonates may be used individually, or two or more types of the unsaturated cyclic carbonates may be used in an arbitrary combination and in an arbitrary ratio. Further, with respect to the amount of the unsaturated cyclic carbonate incorporated, there is no particular limitation, and the amount of the unsaturated cyclic carbonate is arbitrary as long as the effects of the present invention 1 are not markedly sacrificed. The amount of the unsaturated cyclic carbonate incorporated, based on the mass of the non-aqueous electrolytic solution (100% by mass), is preferably 0.001% by mass or more, more preferably 0.01% by mass or more, further preferably 0.1% by mass or more, and is preferably 5% by mass or less, more preferably 4% by mass or less, further preferably 3% by mass or less, especially preferably 2% by mass or less. When the amount of the unsaturated cyclic carbonate is in the above range, the non-aqueous electrolyte secondary battery is likely to exhibit a satisfactory improvement effect for the cycle characteristics, and further it is easy to avoid a problem in that, for example, the high-temperature storage characteristics become poor to increase the amount of gas generated, lowering the discharge capacity maintaining ratio.

1-1-3. Cyclic Carbonate Having a Fluorine Atom

In the non-aqueous electrolytic solution of the present invention 1, the compound represented by the general formula (A) and a cyclic carbonate having a fluorine atom may be used in combination. Examples of cyclic carbonates having a fluorine atom include fluorination products of a cyclic carbonate having an alkylene group having 2 to 6 carbon atoms and derivatives thereof, such as a fluorination product of ethylene carbonate and derivatives thereof. Examples of derivatives of a fluorination product of ethylene carbonate include fluorination products of ethylene carbonate substituted with an alkyl group (e.g., an alkyl group having 1 to 4 carbon atoms). Of these, ethylene carbonate having 1 to 8 fluorine atoms and derivatives thereof are preferred.

Specific examples of the cyclic carbonates having a fluorine atom include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate.

Of these, at least one member selected from the group consisting of monofluoroethylene carbonate, 4,4-difluoroethylene carbonate, and 4,5-difluoroethylene carbonate is more preferred from the viewpoint of giving high ionic conductivity and advantageously forming an interface protecting film.

The cyclic carbonate compounds having a fluorine atom may be used individually, or two or more types of the cyclic carbonate compounds having a fluorine atom may be used in an arbitrary combination and in an arbitrary ratio.

The cyclic carbonate compounds having a fluorine atom may be used individually, or two or more types of the cyclic carbonate compounds having a fluorine atom may be used in an arbitrary combination and in an arbitrary ratio. With respect to the amount of the fluorinated cyclic carbonate incorporated into the non-aqueous electrolytic solution of the present invention 1, there is no particular limitation, and the amount of the fluorinated cyclic carbonate incorporated is arbitrary as long as the effects of the present invention 1 are not markedly sacrificed. However, the amount of the fluorinated cyclic carbonate contained, based on the mass of the non-aqueous electrolytic solution of the present invention 1, is generally 0.01% by mass or more, preferably 0.05% by mass or more, more preferably 0.1% by mass or more, and is generally 50% by mass or less, preferably 30% by mass or less, more preferably 20% by mass or less, further preferably 10% by mass or less, especially preferably 5% by mass or less, most preferably 3% by mass or less.

1-2. Electrolyte

<Lithium Salt>

With respect to the electrolyte in the non-aqueous electrolytic solution of the present invention 1, generally, a lithium salt is used. With respect to the lithium salt, there is no particular limitation as long as it is known to be used in this application, and an arbitrary lithium salt can be used. As specific examples of lithium salts, there can be mentioned the following lithium salts.

Examples include inorganic lithium salts, such as $LiPF_6$, $LiBF_4$, $LiClO_4$, $LiAlF_4$, $LiSbF_6$, $LiTaF_6$, and $LiWF_7$;

lithium tungstates, such as $LiWOF_5$;

lithium carboxylates, such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

lithium sulfonates, such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$;

lithium imide salts, such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, and $LiN(CF_3SO_2)(C_4F_9SO_2)$;

lithium methide salts, such as $LiC(FSO_2)_3$, $LiC(CF_3SO_2)_3$, and $LiC(C_2F_5SO_2)_3$;

lithium oxalatoborates, such as lithium difluorooxalatoborate and lithium bis(oxalato)borate;

lithium oxalatophosphates, such as lithium tetrafluorooxalatophosphate, lithium difluorobis(oxalato)phosphate, and lithium tris(oxalato)phosphate; and fluorine-containing organolithium salts, such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$.

Of these, especially preferred are $LiPF_6$, $LiBF_4$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$ from the viewpoint of the improvement effect for, for example, output characteristics, high-rate charge-discharge characteristics, high-temperature storage characteristics, and cycle characteristics.

These lithium salts may be used individually or in combination. Preferred examples of combinations of two or more lithium salts used include a combination of $LiPF_6$ and $LiBF_4$, a combination of $LiPF_6$ and $LiN(FSO_2)_2$, and a combination of $LiPF_6$ and $FSO_3Li$, and these combinations exhibit an effect of improving the load characteristics and cycle characteristics.

In this case, with respect to the amount of the $LiBF_4$ or $FSO_3Li$ incorporated, based on the mass of the non-aqueous electrolytic solution (100% by mass), there is no particular limitation, and the amount of the $LiBF_4$ or $FSO_3Li$ incorporated is arbitrary as long as the effects of the present invention 1 are not markedly sacrificed. However, the amount of the $LiBF_4$ or $FSO_3Li$ incorporated, based on the mass of the non-aqueous electrolytic solution of the present invention 1, is generally 0.01% by mass or more, preferably 0.1% by mass or more, and is generally 30% by mass or less, preferably 20% by mass or less.

Further, other examples of the combinations include combinations of an inorganic lithium salt and an organolithium salt, and these combinations exhibit an effect of suppressing the deterioration due to high-temperature storage. With respect to the organolithium salt, preferred are $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$. In this case, the amount of the organolithium salt, based on the mass of the non-aqueous electrolytic solution (100% by mass), is preferably 0.1% by mass or more, especially preferably 0.5% by mass or more, and is preferably 30% by mass or less, especially preferably 20% by mass or less.

With respect to the concentration of the lithium salt in the non-aqueous electrolytic solution, there is no particular limitation as long as the effects of the present invention 1 are not sacrificed. However, from the viewpoint of achieving the electrolytic solution having electrical conductivity in an advantageous range so as to surely obtain excellent battery performance, the total molar concentration of the lithium salt in the non-aqueous electrolytic solution is preferably 0.3 mol/L or more, more preferably 0.4 mol/L or more, further preferably 0.5 mol/L or more, and is preferably 3 mol/L or less, more preferably 2.5 mol/L or less, further preferably 2.0 mol/L or less.

When the total molar concentration of the lithium salt is in the above range, the electrolytic solution has satisfactory electrical conductivity, making it possible to prevent a lowering of the electrical conductivity due to an increase of the viscosity and to prevent deterioration of the battery performance due to the lowering of the electrical conductivity.

1-3. Non-Aqueous Solvent

With respect to the non-aqueous solvent in the present invention 1, there is no particular limitation, and a known organic solvent can be used. Examples of such organic solvents include cyclic carbonates having no fluorine atom, linear carbonates, cyclic and linear carboxylates, ether compounds, and sulfone compounds.

<Cyclic Carbonate Having No Fluorine Atom>

Examples of cyclic carbonates having no fluorine atom include cyclic carbonates having an alkylene group having 2 to 4 carbon atoms.

Specific examples of cyclic carbonates having no fluorine atom and having an alkylene group having 2 to 4 carbon atoms include ethylene carbonate, propylene carbonate, and butylene carbonate. Of these, especially preferred are ethylene carbonate and propylene carbonate from the viewpoint of the improvement of the battery characteristics due to the improvement of the degree of dissociation of lithium ions.

The cyclic carbonates having no fluorine atom may be used individually, or two or more types of the cyclic carbonates having no fluorine atom may be used in an arbitrary combination and in an arbitrary ratio.

With respect to the amount of the incorporated cyclic carbonate having no fluorine atom, there is no particular limitation, and the amount of the cyclic carbonate is arbitrary as long as the effects of the present invention 1 are not markedly sacrificed. However, when one type of the cyclic carbonate having no fluorine atom is solely used, the amount of the incorporated cyclic carbonate having no fluorine atom, based on the volume of the non-aqueous solvent (100% by volume), is 5% by volume or more, more preferably 10% by volume or more. When the amount of the cyclic carbonate having no fluorine atom is in the above range, a lowering of the electrical conductivity caused due to a lowering of the permittivity of the non-aqueous electrolytic solution is avoided, making it easy to achieve a non-aqueous electrolyte secondary battery having large-current discharge characteristics in an advantageous range, stability to the negative electrode in an advantageous range, or cycle characteristics in an advantageous range. Further, the amount of the incorporated cyclic carbonate having no fluorine atom is 95% by volume or less, more preferably 90% by volume or less, further preferably 85% by volume or less. When the amount of the cyclic carbonate having no fluorine atom is in the above range, the non-aqueous electrolytic solution has a viscosity in an appropriate range and is suppressed in a lowering of the ionic conductivity, making it easy to achieve a non-aqueous electrolyte secondary battery having load characteristics in an advantageous range.

<Linear Carbonate>

With respect to the linear carbonate, linear carbonates having 3 to 7 carbon atoms are preferred, and dialkyl carbonates having 3 to 7 carbon atoms are more preferred.

Specific examples of linear carbonates include dimethyl carbonate, diethyl carbonate, di-n-propyl carbonate, diisopropyl carbonate, n-propyl-isopropyl carbonate, ethylmethyl carbonate, methyl-n-propyl carbonate, n-butylmethyl carbonate, isobutylmethyl carbonate, t-butylmethyl carbonate, ethyl-n-propyl carbonate, n-butylethyl carbonate, isobutylethyl carbonate, and t-butylethyl carbonate.

Of these, preferred are dimethyl carbonate, diethyl carbonate, di-n-propyl carbonate, diisopropyl carbonate, n-propyl-isopropyl carbonate, ethylmethyl carbonate, and methyl-n-propyl carbonate, and especially preferred are dimethyl carbonate, diethyl carbonate, and ethylmethyl carbonate.

Further, a linear carbonate having a fluorine atom (hereinafter, frequently referred to as "fluorinated linear carbonate") can be preferably used.

With respect to the number of fluorine atoms of the fluorinated linear carbonate, there is no particular limitation as long as it is 1 or more, but the number of fluorine atoms is generally 6 or less, preferably 4 or less. When the fluorinated linear carbonate has a plurality of fluorine atoms, the fluorine atoms may be bonded to the same carbon, or may be bonded to different carbons.

Examples of fluorinated linear carbonates include fluorinated dimethyl carbonates and derivatives thereof, fluorinated ethylmethyl carbonates and derivatives thereof, and fluorinated diethyl carbonates and derivatives thereof.

Examples of fluorinated dimethyl carbonates and derivatives thereof include fluoromethylmethyl carbonate, difluoromethylmethyl carbonate, trifluoromethylmethyl carbonate, bis(fluoromethyl) carbonate, bis(difluoro)methyl carbonate, and bis(trifluoromethyl) carbonate.

Examples of fluorinated ethylmethyl carbonates and derivatives thereof include 2-fluoroethylmethyl carbonate, ethylfluoromethyl carbonate, 2,2-difluoroethylmethyl carbonate, 2-fluoroethylfluoromethyl carbonate, ethyldifluoromethyl carbonate, 2,2,2-trifluoroethylmethyl carbonate, 2,2-difluoroethylfluoromethyl carbonate, 2-fluoroethyldifluoromethyl carbonate, and ethyltrifluoromethyl carbonate.

Examples of fluorinated diethyl carbonates and derivatives thereof include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, and bis(2,2,2-trifluoroethyl) carbonate.

The linear carbonates may be used individually, or two or more types of the linear carbonates may be used in an arbitrary combination and in an arbitrary ratio.

The amount of the linear carbonate incorporated, based on the volume of the non-aqueous solvent (100% by volume), is preferably 5% by volume or more, more preferably 10% by volume or more, further preferably 15% by volume or more. When the lower limit of the amount is set as shown above, the non-aqueous electrolytic solution has a viscosity in an appropriate range and is suppressed in a lowering of the ionic conductivity, making it easy to achieve a non-aqueous electrolyte secondary battery having large-current discharge characteristics in an advantageous range. Further, the amount of the linear carbonate incorporated, based on the volume of the non-aqueous solvent (100% by volume), is preferably 90% by volume or less, more preferably 85% by volume or less, especially preferably 80% by volume or less. When the upper limit of the amount is set as shown above, a lowering of the electrical conductivity caused due to a lowering of the permittivity of the non-aqueous electrolytic solution is avoided, making it easy to achieve a non-aqueous electrolyte secondary battery having large-current discharge characteristics in an advantageous range.

<Cyclic Carboxylate>

With respect to the cyclic carboxylate, those having 3 to 12 carbon atoms are preferred.

Specific examples of cyclic carboxylates include gamma-butyrolactone, gamma-valerolactone, gamma-caprolactone, and epsilon-caprolactone. Of these, gamma-butyrolactone is preferred from the viewpoint of the improvement of the battery characteristics due to the improvement of the degree of dissociation of lithium ions.

The cyclic carboxylates may be used individually, or two or more types of the cyclic carboxylates may be used in an arbitrary combination and in an arbitrary ratio.

The amount of the cyclic carboxylate incorporated, generally, based on the volume of the non-aqueous solvent (100% by volume), is preferably 5% by volume or more, more preferably 10% by volume or more. When the amount of the cyclic carboxylate is in the above range, the non-aqueous electrolytic solution is improved in electrical conductivity, making it easy to achieve a non-aqueous electrolyte secondary battery having improved large-current discharge characteristics. Further, the amount of the cyclic carboxylate incorporated is preferably 50% by volume or less, more preferably 40% by volume or less. When the upper limit of the amount is set as shown above, the non-aqueous electrolytic solution has a viscosity in an appropriate range and is prevented from lowering in the electrical conductivity to suppress an increase of the negative electrode resistance, making it easy to achieve a non-aqueous electrolyte secondary battery having large-current discharge characteristics in an advantageous range.

<Ether-Based Compound>

Linear ethers having 3 to 10 carbon atoms and cyclic ethers having 3 to 6 carbon atoms, in which a portion of the hydrogen atoms thereof may be substituted with fluorine, are preferable for the ether-based compound.

Examples of linear ethers having 3 to 10 carbon atoms include:

diethyl ether, di(2-fluoroethyl)ether, di(2,2-difluoroethyl)ether, di(2,2,2-trifluoroethyl)ether, ethyl(2-fluoroethyl)ether, ethyl(2,2,2-trifluoroethyl)ether, ethyl(1,1,2,2-tetrafluoroethyl)ether, (2-fluoroethyl)(2,2,2-trifluoroethyl)ether, (2-fluoroethyl)(1,1,2,2-tetrafluoroethyl)ether, (2,2,2-trifluoroethyl)(1,1,2,2-tetrafluoroethyl)ether, ethyl-n-propyl ether, ethyl(3-fluoro-n-propyl)ether, ethyl(3,3,3-trifluoro-n-propyl)ether, ethyl(2,2,3,3-tetrafluoro-n-propyl)ether, ethyl(2,2,3,3,3-pentafluoro-n-propyl)ether, 2-fluoroethyl-n-propyl ether, (2-fluoroethyl)(3-fluoro-n-propyl)ether, (2-fluoroethyl)(3,3,3-trifluoro-n-propyl)ether, (2-fluoroethyl)(2,2,3,3-pentafluoro-n-propyl)ether, 2,2,2-trifluoroethyl-n-propyl ether, (2,2,2-trifluoroethyl)(3-fluoro-n-propyl)ether, (2,2,2-trifluoroethyl)(3,3,3-trifluoro-n-propyl)ether, (2,2,2-trifluoroethyl)(2,2,3,3-tetrafluoro-n-propyl)ether, (2,2,2-trifluoroethyl)(2,2,3,3,3-pentafluoro-n-propyl)ether, 1,1,2,2-tetrafluoroethyl-n-propyl ether, (1,1,2,2-tetrafluoroethyl)(3-fluoro-n-propyl)ether, (1,1,2,2-tetrafluoroethyl)(3,3,3-trifluoro-n-propyl)ether, (1,1,2,2-tetrafluoroethyl)(2,2,3,3-tetrafluoro-n-propyl)ether, (1,1,2,2-tetrafluoroethyl)(2,2,3,3,3-pentafluoro-n-propyl)ether, di-n-propyl ether, (n-propyl)(3-fluoro-n-propyl)ether, (n-propyl)(3,3,3-trifluoro-n-propyl)ether, (n-propyl)(2,2,3,3-tetrafluoro-n-propyl)ether, (n-propyl)(2,2,3,3,3-pentafluoro-n-propyl)ether, di(3-fluoro-n-propyl)ether, (3-fluoro-n-propyl)(3,3,3-trifluoro-n-propyl)ether, (3-fluoro-n-propyl)(2,2,3,3-tetrafluoro-n-propyl)ether, (3-fluoro-n-propyl)(2,2,3,3,3-pentafluoro-n-propyl)ether, di(3,3,3-trifluoro-n-propyl)ether, (3,3,3-trifluoro-n-propyl)(2,2,3,3-tetrafluoro-n-propyl)ether, (3,3,3-trifluoro-n-propyl)(2,2,3,3,3-pentafluoro-n-propyl)ether, di(2,2,3,3-tetrafluoro-n-propyl)ether, (2,2,3,3-tetrafluoro-n-propyl)(2,2,3,3,3-pentafluoro-n-propyl)ether, di(2,2,3,3,3-pentafluoro-n-propyl)ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane, di(2,2,2-trifluoroethoxy)methane, (2,2,2-trifluoroethoxy)(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol n-propyl ether, ethylene glycol di-n-butyl ether and diethylene glycol dimethyl ether.

Examples of cyclic ethers having 3 to 6 carbon atoms include tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane and hydrogenated compounds thereof.

Among the aforementioned examples of ether-based compounds, dimethoxymethane, diethoxymethane, ethoxymethoxymethane, ethylene glycol n-propyl ether, ethylene glycol di-n-butyl ether and diethylene glycol dimethyl ether have a high solvation capacity for lithium ions and are preferable in terms of improving ionic dissociation, while dimethoxyethane, diethoxymethane and ethoxymethoxymethane are particularly preferable due to their low viscosity and high ionic conductivity.

One type of ether-based compound may be used alone or two or more types may be used in an arbitrary combination and ratio.

Normally, the incorporated amount of the ether-based compound is preferably 5% by volume or more, more preferably 10% by volume or more and even more preferably 15% by volume or more, and preferably 70% by volume or less, more preferably 60% by volume or less and even more preferably 50% by volume or less based on 100% by volume of non-aqueous solvent.

If within these ranges, the effect of improving ionic conductivity attributable to improvement of lithium ion dissociation and decreased viscosity of the ether-based compound is easily ensured, and in the case the negative electrode active material contains a urea-based material, a situation in which the ether-based compound is co-inserted together with lithium ions resulting in a decrease in capacity is easily avoided.

<Sulfone-Based Compound>

A cyclic sulfone having 3 to 6 carbon atoms and a linear sulfone having 2 to 6 carbon atoms are preferable for the sulfone-based compound. The number of sulfonyl groups in a molecule thereof is preferably 1 or 2.

Examples of cyclic sulfones having 3 to 6 carbon atoms include:

monosulfone compounds in the form of trimethylenesulfone, tetramethylenesulfone and hexamethylenesulfone, and disulfone compounds in the form of trimethylenedisulfone, tetramethylenedisulfone and hexamethylenedisulfone.

Among these, from the viewpoints of dielectric constant and viscosity, tetramethylenesulfone, tetramethylenedisulfone, hexamethylenesulfone and hexamethylenedisulfone are more preferable and tetramethylenesulfone (sulfolane) is particularly preferable.

Sulfolane and/or sulfolane derivatives (which may be subsequently referred to as "sulfolanes", including sulfolane) are preferable. Sulfolane derivatives in which one or more of the hydrogen atoms bound to a carbon atom that composes the sulfolane ring is substituted with a fluorine atom or alkyl group are preferable as sulfolane derivatives.

Among these, sulfolanes such as 2-methyl sulfolane, 3-methyl sulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methyl sulfolane, 2-fluoro-2-methyl sulfolane, 3-fluoro-3-methyl sulfolane, 4-fluoro-2-methyl sulfolane, 5-fluoro-3-methyl sulfolane, 5-fluoro-2-methyl sulfolane, 2-fluoromethyl sulfolane, 3-fluoromethyl sulfolane, 2-difluoromethyl sulfolane, 3-difluorosulfolane, 2-trifluorosulfolane, 3-trifluorosulfolane, 2-fluoro-3-(trifluoromethyl)sulfolane, 3-fluoro-3-(trifluoromethyl)sulfolane, 4-fluoro-3-(trifluoromethyl)sulfolane or 5-fluoro-3-(trifluoromethyl)sulfolane are preferable from the viewpoints of high ionic conductivity and high input-output characteristics.

In addition, examples of linear sulfones having 2 to 6 carbon atoms include:

dimethyl sulfone, ethyl methyl sulfone, diethyl sulfone, n-propyl methyl sulfone, n-propyl ethyl sulfone, di-n-propyl sulfone, isopropyl methyl sulfone, isopropyl ethyl sulfone, diisopropyl sulfone, n-butylmethyl sulfone, n-butylethyl sulfone, t-butylmethyl sulfone, t-butylethyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, perfluoroethyl methyl sulfone, ethyl trifluoroethyl sulfone, ethyl pentafluoroethyl sulfone, di(trifluoroethyl)sulfone, perfluorodiethyl sulfone, fluoromethyl-n-propyl sulfone, difluoromethyl-n-propyl sulfone, trifluoromethyl-n-propyl sulfone, fluoromethyl isopropyl sulfone, difluoromethyl isopropyl sulfone, trifluoromethyl isopropyl sulfone, trifluoroethyl-n-propyl sulfone, trifluoroethyl isopropyl sulfone, pentafluoroethyl-n-propyl sulfone, pentafluoroethyl isopropyl sulfone, trifluoroethyl-n-butyl sulfone, trifluoroethyl-t-butyl sulfone, pentafluoroethyl-n-butyl sulfone and pentafluoroethyl-t-butyl sulfone.

Among these, sulfones such as dimethyl sulfone, ethyl methyl sulfone, diethyl sulfone, n-propyl methyl sulfone, isopropyl methyl sulfone, n-butyl methyl sulfone, t-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl methyl sulfone, ethyl difluoromethyl sulfone, ethyl trifluoromethyl sulfone, ethyl trifluoroethyl sulfone, ethyl pentafluoroethyl sulfone, trifluoromethyl-n-propyl sulfone, trifluoromethyl isopropyl sulfone, trifluoroethyl-n-butyl sulfone trifluoroethyl-t-butyl sulfone, trifluoromethyl-n-butyl sulfone or trifluoromethyl t-butyl sulfone are preferable from the viewpoints of high ionic conductivity and high input-output characteristics.

One type of sulfone-based compound may be used alone or two or more types may be used in a suitable combination and ratio.

Normally, the incorporated amount of the sulfone-based compound is preferably 0.3% by volume or more, more preferably 1% by volume or more and even more preferably 5% by volume or more, and preferably 40% by volume or less, more preferably 35% by volume or less and even more preferably 30% by volume or less based on 100% by volume of nonaqueous solvent.

If within these ranges, the effect of improving durability of cycling characteristics or storage characteristics and the like is easily obtained, viscosity of the nonaqueous electrolyte can be made to be within a suitable range thereby avoiding a decrease in electric conductivity, and a situation in which there is a decrease in charge-discharge capacity retention rate in the case of having charged and discharged a nonaqueous electrolyte secondary battery at a high current density is easily avoided.

<Case of Using Cyclic Carbonate Having Fluorine Atom as Nonaqueous Solvent>

The cyclic carbonate having a fluorine atom can be used in a nonaqueous electrolyte as an assistant used in combination with a compound represented by general formula (A) as indicated in section 1-1-3, and can also be used as a nonaqueous solvent.

In the case of using the cyclic carbonate having a fluorine atom as a nonaqueous solvent in Present Invention 1, one type of previously exemplified nonaqueous solvent may be used in combination with the cyclic carbonate having a fluorine atom or two or more types may be used in combination with the cyclic carbonate having a fluorine atom as a nonaqueous solvent other than the cyclic carbonate having a fluorine atom.

For example, one example of a preferable combination of nonaqueous solvents includes a combination consisting of a cyclic carbonate having a fluorine atom and a linear carbonate. Among these, the total amount of cyclic carbonate having a fluorine atom and linear carbonate in the nonaqueous solvent is preferably 60% by volume or more, more preferably 80% by volume or more and even more preferably 90% by volume or more, and the ratio of cyclic carbonate having a fluorine atom to the total amount of the cyclic carbonate having a fluorine atom and the linear carbonate is 3% by volume or more, preferably 5% by volume or more, more preferably 10% by volume or more and even more preferably 15% by volume or more, and normally 60% by volume or less, preferably 50% by volume or less, more preferably 40% by volume or less, even more preferably 35% by volume or less, particularly preferably 30% by volume or less and most preferably 20% by volume or less.

The use of these combinations of nonaqueous solvents results in a favorable balance between cycling characteristics and high-temperature storage characteristics (and particularly, residual capacity after high-temperature storage and high-load discharge capacity) of a battery produced using these combinations of nonaqueous solvents.

For example, specific examples of preferable combinations of cyclic carbonates having a fluorine atom and linear carbonates include:

monofluoroethylene carbonate and dimethyl carbonate, monofluoroethylene carbonate and diethyl carbonate, monofluoroethylene carbonate and ethyl methyl carbonate, monofluoroethylene carbonate, dimethyl carbonate and diethyl carbonate, monofluoroethylene carbonate, dimethyl carbonate and ethyl methyl carbonate, monofluoroethylene carbonate, diethyl carbonate and ethyl methyl carbonate, and monofluoroethylene carbonate, dimethyl carbonate, diethyl carbonate and ethyl methyl carbonate.

Among combinations of cyclic carbonates having a fluorine atom and linear carbonates, combinations containing a symmetrical linear carbonate for the linear carbonate are more preferable, and in particular, combinations containing monofluoroethylene carbonate, a symmetrical linear carbonate and an asymmetrical linear carbonate, in the manner of monofluoroethylene carbonate, dimethyl carbonate and ethyl methyl carbonate, monofluoroethylene carbonate, diethyl carbonate and ethyl methyl carbonate or monofluoroethylene carbonate, dimethyl carbonate, diethyl carbonate and ethyl methyl carbonate, are preferable from the viewpoint of a favorable balance between cycling characteristics and large-current discharge characteristics. Among these, the symmetrical linear carbonate is preferably dimethyl carbonate and the alkyl group of the linear carbonate preferably has 1 to 2 carbon atoms.

Combinations in which a cyclic carbonate not having a fluorine atom is further added to these combinations of cyclic carbonates having a fluorine atom and linear carbonates are also examples of preferable combinations. Among these, the total amount of cyclic carbonate having a fluorine atom and cyclic carbonate not having a fluorine atom in the nonaqueous solvent is preferably 10% by volume or more, more preferably 15% by volume or more and even more preferably 20% by volume or more, and the ratio of the cyclic carbonate having a fluorine atom to the total amount of cyclic carbonate having a fluorine atom and cyclic carbonate not having a fluorine atom is 1% by volume or more, preferably 3% by volume or more, more preferably 5% by volume or more, even more preferably 10% by volume or more and particularly preferably 20% by volume or more, and preferably 95% by volume or less, more preferably 85% by volume or less, even more preferably 75% by volume or less, and particularly preferably 60% by volume or less.

If a cyclic carbonate not having a fluorine atom is contained within this concentration range, electric conductivity of the electrolyte can be maintained while forming a stable protective coating on the negative electrode.

Specific preferable examples of cyclic carbonates having a fluorine atom, cyclic carbonates not having a fluorine atom and linear carbonates include:

monofluoroethylene carbonate, ethylene carbonate and dimethyl carbonate, monofluoroethylene carbonate, ethylene carbonate and diethyl carbonate, monofluoroethylene carbonate, ethylene carbonate and ethyl methyl carbonate, monofluoroethylene carbonate, ethylene carbonate, dimethyl carbonate and diethyl carbonate, monofluoroethylene carbonate, ethylene carbonate, dimethyl carbonate and ethyl methyl carbonate, monofluoroethylene carbonate, ethylene carbonate, diethyl carbonate and ethyl methyl carbonate, monofluoroethylene carbonate, ethylene carbonate, dimethyl carbonate, diethyl carbonate and ethyl methyl carbonate, monofluoroethylene carbonate, propylene carbonate and dimethyl carbonate, monofluoroethylene carbonate, propylene carbonate and diethyl carbonate, monofluoroethylene carbonate, propylene carbonate and ethyl methyl carbonate, monofluoroethylene carbonate, propylene carbonate, dimethyl carbonate and diethyl carbonate, monofluoroethylene carbonate, propylene carbonate, dimethyl carbonate and ethyl methyl carbonate, monofluoroethylene carbonate, propylene carbonate, diethyl carbonate and ethyl methyl carbonate, monofluoroethylene carbonate, propylene carbonate, dimethyl carbonate, diethyl carbonate and ethyl methyl carbonate, monofluoroethylene carbonate, ethylene carbonate, propylene carbonate and dimethyl carbonate, monofluoroethylene carbonate, ethylene carbonate, propylene carbonate and diethyl carbonate, monofluoroethylene carbonate, ethylene carbonate, propylene carbonate and methyl ethyl carbonate, monofluoroethylene carbonate, ethylene carbonate, propylene carbonate, dimethyl carbonate and diethyl carbonate, monofluoroethylene carbonate, ethylene carbonate, propylene carbonate, dimethyl carbonate and ethyl methyl carbonate, monofluoroethylene carbonate, ethylene carbonate, propylene carbonate, diethyl carbonate and ethyl methyl carbonate, and monofluoroethylene carbonate, ethylene carbonate, propylene carbonate, dimethyl carbonate, diethyl carbonate and ethyl methyl carbonate.

Among these combinations of cyclic carbonates having a fluorine atom, cyclic carbonates not having a fluorine atom and linear carbonates, those containing an asymmetrical alkyl carbonate for the linear carbonate are more preferable, and in particular, combinations containing monofluoroethylene carbonate and an asymmetrical linear carbonate, in the manner of:

monofluoroethylene carbonate, ethylene carbonate and ethyl methyl carbonate, monofluoroethylene carbonate, propylene carbonate and ethyl methyl carbonate, monofluoroethylene carbonate, ethylene carbonate, dimethyl carbonate and ethyl methyl carbonate, monofluoroethylene carbonate, propylene carbonate, dimethyl carbonate and ethyl methyl carbonate, monofluoroethylene carbonate, ethylene carbonate, propylene carbonate, dimethyl carbonate and ethyl methyl carbonate, monofluoroethylene carbonate, ethylene carbonate, diethylcarbonate and ethyl methyl carbonate, monofluoroethylene carbonate, propylene carbonate, diethyl carbonate and ethyl methyl carbonate, monofluoroethylene carbonate, ethylene carbonate, propylene carbonate, diethyl carbonate and ethyl methyl carbonate, monofluoroethylene carbonate, ethylene carbonate, dimethyl carbonate, diethyl carbonate and ethyl methyl carbonate, monofluoroethylene carbonate, propylene carbonate, dimethyl carbonate, diethyl carbonate and ethyl methyl carbonate, or monofluoroethylene carbonate, ethylene carbonate, propylene carbonate, dimethyl carbonate, diethyl carbonate and ethyl methyl carbonate, are preferable from the viewpoints of a favorable balance between cycling characteristics and large-current discharge characteristics. Among these, combinations in which the asymmetrical carbonate is ethyl methyl carbonate are preferable, and the alkyl group of the linear carbonate preferably has 1 to 2 carbon atoms.

In the case of containing ethyl methyl carbonate in the nonaqueous solvent, if the ethyl methyl carbonate is contained within a range such that the ratio of ethyl methyl carbonate in the entire nonaqueous solvent is preferably 10% by volume or more, more preferably 20% by volume or more, even more preferably 25% by volume or more and particularly preferably 30% by volume or more, and preferably 95% by volume or less, more preferably 90% by volume or less, even more preferably 85% by volume or less and particularly preferably 80% by volume or less, load characteristics of the battery may be improved.

In the aforementioned combinations consisting mainly of cyclic carbonates having a fluorine atom and linear carbonates, other solvents other than the aforementioned cyclic carbonates not having a fluorine atom, such as cyclic carboxylic acid esters, linear carboxylic acid esters, cyclic ethers, linear ethers, sulfur-containing organic solvents, phosphorous-containing organic solvents or fluorine-containing aromatic solvents, may also be mixed therein.

<Case of Using Cyclic Carbonate Having Fluorine Atom as Assistant>

In the case of using a cyclic carbonate having a fluorine atom as an assistant in Present Invention 1, one type of the previously exemplified aqueous solvent may be used or two or more types may be used in arbitrary combination and ratio as a nonaqueous solvent other than the cyclic carbonate having a fluorine atom.

One example of a preferable combination of nonaqueous solvents is a combination consisting mainly of a cyclic carbonate not having a fluorine atom and a linear carbonate.

In particular, the total amount of cyclic carbonate not having a fluorine atom and linear carbonate in the nonaqueous solvent is preferably 70% by volume or more, more preferably 80% by volume or more and even more preferably 90% by volume or more, and the ratio of the cyclic carbonate not having a fluorine atom to the total amount of cyclic carbonate and linear carbonate is preferably 5% by volume or more, more preferably 10% by volume or more and even more preferably 15% by volume or more, and preferably 50% by volume or less, more preferably 35% by volume or less, even more preferably 30% by volume or less and particularly preferably 25% by volume or less.

The use of these combinations of nonaqueous solvents results in a favorable balance between cycling characteristics and high-temperature storage characteristics (and particularly, residual capacity after high-temperature storage and high-load discharge capacity).

Specific examples of preferable combinations of cyclic carbonates not having a fluorine atom and linear carbonates include:

ethylene carbonate and dimethyl carbonate, ethylene carbonate and diethyl carbonate, ethylene carbonate and ethyl methyl carbonate, ethylene carbonate, dimethyl carbonate and diethyl carbonate, ethylene carbonate, dimethyl carbonate and ethyl methyl carbonate, ethylene carbonate, diethyl carbonate and ethyl methyl carbonate, ethylene carbonate, dimethyl carbonate, diethyl carbonate and ethyl methyl carbonate, propylene carbonate and ethyl methyl carbonate, propylene carbonate, ethyl methyl carbonate and diethyl carbonate, and propylene carbonate, ethyl methyl carbonate and dimethyl carbonate.

Among combinations of cyclic carbonates not having a fluorine group and linear carbonates, those containing an asymmetrical linear alkyl carbonate for the linear carbonate are more preferable, and combinations consisting of ethylene carbonate and ethyl methyl carbonate, propylene carbonate and ethyl methyl carbonate, ethylene carbonate, ethyl methyl carbonate and dimethyl carbonate, ethylene carbonate, ethyl methyl carbonate and diethyl carbonate, propylene carbonate, ethyl methyl carbonate and dimethyl carbonate, and propylene carbonate, ethyl methyl carbonate and diethyl carbonate are particularly preferable due to their favorable balance between cycling characteristics and large-current discharge characteristics.

Among these, those in which the asymmetrical linear carbonate is ethyl methyl carbonate are preferable, and the alkyl group of the linear carbonate preferably has 1 to 2 carbon atoms.

In the case of containing dimethyl carbonate in the aqueous solvent, if the dimethyl carbonate is contained within a range such that the ratio of dimethyl carbonate in the entire nonaqueous medium is preferably 10% by volume or more, more preferably 20% by volume or more, even more preferably 25% by volume or more and particularly preferably 30% by volume more, and preferably 90% by volume or less, more preferably 80% by volume or less, even more preferably 75% by volume or less and particularly preferably 70% by volume or less, load characteristics of the battery may be improved.

In particular, by containing dimethyl carbonate and ethyl methyl carbonate and making the content ratio of dimethyl carbonate to be greater than the content ratio of ethyl methyl carbonate, battery characteristics after high-temperature storage may be improved while being able to maintain electric conductivity of the electrolyte, thereby making this preferable.

The volume ratio of dimethyl carbonate to ethyl methyl carbonate in the entire nonaqueous medium (dimethyl carbonate/ethyl methyl carbonate) is preferably 1.1 or more, more preferably 1.5 or more and even more preferably 2.5 or more from the viewpoints of improving electric conductivity of the electrolyte and improving battery characteristics after storage. The aforementioned volume ratio (dimethyl carbonate/ethyl methyl carbonate) is preferably 40 or less, more preferably 20 or less, even more preferably 10 or less and particularly preferably 8 or less from the viewpoint of improving battery characteristics.

Other solvents such as a cyclic carboxylic acid ester, linear carboxylic acid ester, cyclic ether, linear ether, sulfur-containing organic solvent, phosphorous-containing organic solvent or fluorine-containing aromatic solvent may also be mixed into the aforementioned combination consisting mainly of cyclic carbonate not having a fluorine atom and linear carbonate.

Furthermore, in the present description, although the volume of the nonaqueous solvent refers to the value measured at 25° C., the value obtained by measuring at the melting point is used for nonaqueous solvents that are a solid at 25° C. in the manner of ethylene carbonate.

1-4. Assistant

In the nonaqueous electrolyte secondary battery of Present Example 1, a suitable assistant may be used corresponding to the objective in addition to the compound represented by general formula (A), the cyclic carbonate having a carbon-carbon unsaturated bond and the cyclic carbonate having a fluorine atom. Examples of assistants include the nitrile compound, isocyanate compound, difluorophosphate, fluorosulfonate, acid anhydride compound, cyclic sulfonic acid ester compound, fluorinated unsaturated cyclic carbonate, compound having a triple bond and other assistants listed below.

1-4-1. Nitrile Compound

There are no particular limitations on the type of nitrile compound provided it is a compound having a nitrile group in a molecule thereof.

Specific examples of the nitrile compound include:

compounds having a single nitrile group such as acetonitrile, propionitrile, butyronitrile, isobutyronitrile, valeronitrile, isovaleronitrile, lauronitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, 1,2,3-propanetricarbonitrile, 1,3,5-pentanetricarbonitrile or pentafluoropropionitrile;

compounds having two nitrile groups such as malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methyl succinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-isobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)difluoronitrile, 3,3'-(ethylenedioxy)dipropionitrile or 3,9-bis(2-cyanoethyl)-2,4,8,10-tetraoxaspiro[5,5]undecane; and, compounds having three cyano groups such as cyclohexanetricarbonitrile, tris(cyanoethyl)amine, tris(cyanoethoxy)

propane, tricyanoethylene, pentanetricarbonitrile, propanetricarbonitrile or heptanetricarbonitrile.

Among these, lauronitrile, crotononitrile, succinonitrile, glutaronitrile, adiponitrile, pimelonitrile, suberonitrile, azelanitrile, sebaconitrile, undecanedinitrile, fumaronitrile and 3,9-bis(2-cyanoethyl)-2,4,8,10-tetraoxaspiro[5,5]undecane are preferable from the viewpoint of improving storage characteristics. In addition, dinitrile compounds such as succinonitrile, glutaronitrile, adiponitrile, pimelonitrile, suberonitrile, azelanitrile, sebaconitrile, undecanedinitrile, dodecanenitrile, fumaronitrile or 3,9-bis(2-cyanoethyl)-2,4,8,10-tetraoxaspiro[5,5]undecane are particularly preferable. Linear dinitrile compounds having 4 or more carbon atoms are more preferable.

One type of nitrile compound may be used alone or two or more types may be used in an arbitrary combination and ratio. There are no particular limitations on the incorporated amount of nitrile compound in the entire nonaqueous electrolyte of Present Invention 1, and although any nitrile compound may be used provided it does not significantly impair the effects of Present Invention 1, the nitrile compound is contained in the nonaqueous electrolyte of Present Invention 1 at a concentration of normally 0.001% by weight or more, preferably 0.01% by weight or more and more preferably 0.1% by weight or more, and normally 10% by weight or less, preferably 5% by weight or less, more preferably 3% by weight or less, even more preferably 2% by weight or less and most preferably 1% by weight or less. Effects such as output characteristics, load characteristics, cycling characteristics or high-temperature storage characteristics are further improved in the case of satisfying the aforementioned range.

1-4-2. Isocyanate Compound

There are no particular limitations on the type of isocyanate compound provided it is a compound having an isocyanate group in a molecule thereof.

Specific examples of isocyanate compounds include:

hydrocarbon-based monoisocyanates such as methyl isocyanate, ethyl isocyanate, propyl isocyanate, isopropyl isocyanate, butyl isocyanate, tertiary-butyl isocyanate, pentyl isocyanate, hexyl isocyanate, cyclohexyl isocyanate, phenyl isocyanate or fluorophenyl isocyanate;

monoisocyanate compounds having a carbon-carbon unsaturated bond such as vinyl isocyanate, allyl isocyanate, ethynyl isocyanate or propynyl isocyanate;

hydrocarbon-based diisocyanates such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolulylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicylohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]butane-2,5-diylbis(methylisocyanate), bicyclo[2.2.1]heptane-2,6-diylbis(methylisocyanate), isophorone diisocyanate, carbonyl diisocyanate, 1,4-diisocyanatobutane-1,4-dione, 1,5-diisocyanatopentane-1,5-dione, 2,2,4-trimethylhexamethylene diisocyanate or 2,4,4-trimethylhexamethylene diisocyanate; and, diisocyanatosulfone, (ortho-, meta- and para-)toluenesulfonyl isocyanate, benzenesulfonyl isocyanate, fluorosulfonyl isocyanate, phenoxysulfonyl isocyanate, pentafluorophenoxysulfonyl isocyanate and methoxysulfonyl isocyanate.

Among these, monoisocyanate compounds having a carbon-carbon unsaturated bond such as vinyl isocyanate, allyl isocyanate, ethynyl isocyanate or propynyl isocyanate;

hydrocarbon-based diisocyanate compounds such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate, 2,2,4-trimethylhexamethylene diisocyanate or 2,4,4-trimethylhexamethylene diisocyanate; and, diisocyanatosulfone, (ortho-, meta- and para-)toluenesulfonyl isocyanate, benzenesulfonyl isocyanate, fluorosulfonyl isocyanate, phenoxysulfonyl isocyanate, pentafluorophenoxysulfonyl isocyanate and methoxysulfonyl isocyanate are preferable from the viewpoint of improving cycling characteristics and storage characteristics.

Allyl isocyanate, hexamethylene diisocyanate, 1,3-bis(isocyanatomethyl)cyclohexane, diisocyanatosulfone, (ortho-, meta- and para-)toluenesulfonyl isocyanate are more preferable, hexamethylene diisocyanate, 1,3-bis(isocyanatomethyl)cyclohexane, ortho-, meta- and para-)toluenesulfonyl isocyanate are particularly preferable, and hexamethylene diisocyanate and 1,3-bis(isocyanatomethyl)cyclohexane are most preferable.

In addition, isocyanate compounds having a branched chain are preferable as isocyanate compounds.

In addition, the isocyanate compound used in Present Invention 1 may also be a trimer compound derived from a compound having at least two isocyanate groups in a molecule thereof or an aliphatic polyisocyanate obtained by adding a polyvalent alcohol thereto. Examples thereof include biurets, isocyanurates, adducts and bifunctional type modified polyisocyanates represented by the following general formulas (1-2-1) to (1-2-4) (in the following general formulas (1-2-1) to (1-2-4), R and R' respectively and independently represent an arbitrary hydrocarbon group).

[Chemical Formula 9]

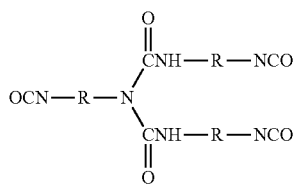

(1-2-1)

-continued

[Chemical Formula 10]

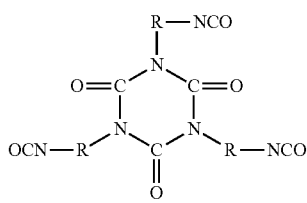

(1-2-2)

[Chemical Formula 11]

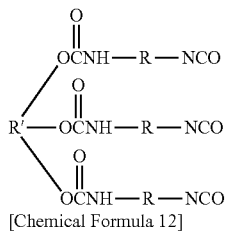

(1-2-3)

[Chemical Formula 12]

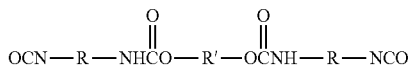

(1-2-4)

The compound having at least two isocyanate groups in a molecule thereof used in Present Invention 1 also contains a so-called blocked isocyanate obtained by blocking with a blocking agent to enhance storage stability. Examples of blocking agents include alcohols, phenols, organic amines, oximes and lactams, and specific examples thereof include n-butanol, phenol, tributylamine, diethylethanolamine, methyl ethyl ketoxime and ε-caprolactam.

A metal catalyst in the manner of dibutyltin dilaurate or an amine-based catalyst in the manner of 1,8-diazabicylo[5.4.0]undec-7-ene is preferably used in combination therewith for the purpose of obtaining higher effects by promoting the reaction based on the compound having at least two isocyanate groups in a molecule thereof.

Moreover, one type of compound having an isocyanate group may be used alone or two or more types may be used in an arbitrary combination and ratio.

Although there are no particular limitations on the incorporated amount of the compound having an isocyanate group based on the total amount of nonaqueous electrolyte of Present Invention 1, and may be an arbitrary amount provided the effects of Present Invention 1 are not significantly impaired, the compound having an isocyanate group is contained at a concentration based on the total amount of nonaqueous electrolyte of Present Invention 1 of normally 0.001% by weight or more, preferably 0.01% by weight or more and more preferably 0.1% by weight or more, and normally 10% by weight or less, preferably 5% by weight or less, more preferably 3% by weight or less, even more preferably 2% by weight or less, particularly preferably 1% by weight or less, and most preferably 0.5% by weight or less.

In the case of having satisfied the aforementioned range, effects such as output characteristics, load characteristics, cycling characteristics and high-temperature storage characteristics are further improved.

1-4-3. Difluorophosphate

There are no particular limitations on the counter cation of the difluorophosphate, and examples thereof include lithium, sodium, potassium, rubidium, cesium, magnesium, calcium, barium and ammonium represented by $NR^{13}R^{14}R^{15}R^{16}$ (wherein, $R^{13}$ to $R^{16}$ respectively and independently represent a hydrogen atom or organic group having 1 to 12 carbon atoms).

There are no particular limitations on the organic groups having 1 to 12 carbon atoms represented by $R^{13}$ to $R^{16}$ of the aforementioned ammonium, and examples thereof include alkyl groups optionally substituted with a halogen atom, cycloalkyl groups optionally substituted with a halogen atom or alkyl group, aryl groups optionally substituted with a halogen atom or alkyl group, and nitrogen atom-containing heterocyclic groups optionally substituted with a substituent. Among these, $R^{13}$ to $R^{16}$ preferably respectively and independently represent a hydrogen atom, alkyl group, cycloalkyl group or nitrogen atom-containing heterocyclic group.

Specific examples of the difluorophosphate include: lithium difluorophosphate, sodium difluorophosphate and potassium difluorophosphate, with lithium difluorophosphate being preferable.

One type of difluorophosphate may be used alone or two or more types may be used in an arbitrary combination and ratio. In addition, there are no particular limitations on the incorporated amount of difluorophosphate, and may be any arbitrary amount provided the effects of Present Invention 1 are not significantly impaired.

The incorporated amount of difluorophosphate based on 100% by weight of the nonaqueous electrolyte is such that the difluorophosphate is contained at a concentration of normally 0.001% by weight or more, preferably 0.01% by weight or more and more preferably 0.1% by weight or more, and normally 10% by weight or less, preferably 5% by weight or less, more preferably 3% by weight or less, even more preferably 2% by weight or less and most preferably 1% by weight or less.

If within this range, the nonaqueous electrolyte secondary battery easily demonstrates an adequate effect of improving cycling characteristics while easily avoiding situations in the manner of decreased high-temperature storage characteristics, increased generation of gas and decreased discharge capacity retention rate.

1-4-4. Fluorosulfonate

There are no particular limitations on the counter cation of the fluorosulfonate, and examples thereof include lithium, sodium, potassium, rubidium, cesium, magnesium, calcium, barium and ammonium represented by $NR^{13}R^{14}R^{15}R^{16}$ (wherein, $R^{13}$ to $R^{16}$ respectively and independently represent a hydrogen atom or organic group having 1 to 12 carbon atoms).

There are no particular limitations on the organic groups having 1 to 12 carbon atoms represented by $R^{13}$ to $R^{16}$ of the aforementioned ammonium, and examples thereof include alkyl groups optionally substituted with a halogen atom, cycloalkyl groups optionally substituted with a halogen atom or alkyl group, aryl groups optionally substituted with a halogen atom or alkyl group, and nitrogen atom-containing heterocyclic groups optionally substituted with a substituent. Among these, $R^{13}$ to $R^{16}$ preferably respectively and independently represent a hydrogen atom, alkyl group, cycloalkyl group or nitrogen atom-containing heterocyclic group.

Specific examples of the fluorosulfonate include: lithium fluorosulfonate, sodium fluorosulfonate, potassium fluorosulfonate, rubidium fluorosulfonate and cesium fluorosulfonate, with lithium fluorosulfonate being preferable.

One type of fluorosulfonate may be used alone or two or more types may be used in an arbitrary combination and ratio. In addition, there are no particular limitations on the incorporated amount of fluorosulfonate, and may be any arbitrary amount provided the effects of Present Invention 1 are not significantly impaired.

The incorporated amount of fluorosulfonate based on 100% by weight of the nonaqueous electrolyte is such that the fluorosulfonate is contained at a concentration of normally 0.001% by weight or more, preferably 0.01% by weight or more and more preferably 0.1% by weight or more, and normally 10% by weight or less, preferably 5% by weight or less, more preferably 3% by weight or less, even more preferably 2% by weight or less and most preferably 1% by weight or less.

If within this range, the nonaqueous electrolyte secondary battery easily demonstrates an adequate effect of improving cycling characteristics while easily avoiding situations in the manner of decreased high-temperature storage characteristics, increased generation of gas and decreased discharge capacity retention rate.

1-4-5. Acid Anhydride Compound

There are no particular limitations on the acid anhydride compound, and examples thereof include carboxylic acid anhydrides, sulfuric acid anhydrides, nitric acid anhydrides, sulfonic acid anhydrides, phosphoric acid anhydrides and phosphorous acid anhydrides as well as cyclic acid anhydrides and linear acid anhydrides, and there are also no particular limitations on the structure thereof provided the compound is an acid anhydride compound.

Specific examples of acid anhydride compounds include:

malonic anhydride, succinic anhydride, glutaric anhydride, adipic anhydride, maleic anhydride, citraconic anhydride, 2,3-dimethylmaleic anhydride, glutaconic anhydride, itaconic anhydride, phthalic anhydride, phenylmaleic anhydride, 2,3-diphenylmaleic anhydride, cyclohexane-1,2-dicarboxylic anhydride, 4-cyclohexane-1,2-dicarboxylic anhydride, 3,4,5,6-tetrahydrophthalic anhydride, 4,4'-oxydiphthalic anhydride, 5-norbornene-2,3-dicarboxlic anhydride, methyl-5-norbornene-2,3-dicarboxylic anhydride, phenylsuccinic anhydride, 2-phenylglutaric anhydride, allylsuccinic anhydride, 2-buten-11-ylsuccinic anhydride, (2-methyl-2-propenyl)succinic anhydride, tetrafluorosuccinic anhydride, diacetyl tartaric anhydride, bicyclo[2.2.2]oct-7-ene-2,3,5,6-tetracarboxylic dianhydride, 5-(2,5-dioxotetrahydrofuryl)-3-methyl-3-cyclohexene-1,2-dicarboxyilc anhydride, methacrylic anhydride, acrylic anhydride, crotonic anhydride, methanesulfonic anhydride, trifluoromethanesulfonic anhydride, nonafluorobutanesulfonic anhydride and acetic anhydride.

Among these, succinic anhydride, maleic anhydride, citraconic anhydride, phenylmaleic anhydride, bicyclo[2.2.2]oct-7-ene-2,3,5,6-tetracarboxylic anhydride, 5-(2,5-dioxotetrafuryl)-3-methyl-3-cyclohexene-1,2-dicarboxylic anhydride, allylsuccinic anhydride, acetic anhydride, methacrylic anhydride, acrylic anhydride and methanesulfonic anhydride are particularly preferable.

One type of acid anhydride compound may be used alone or two or more types may be used in an arbitrary combination and ratio.

There are no particular limitations on the incorporated amount of acid anhydride compound based on the total amount of the nonaqueous electrolyte of Present Invention 1 and may be any arbitrary amount provided the effects of Present Invention 1 are not significantly impaired, and the acid anhydride compound is contained at a concentration of normally 0.001% by weight or more, preferably 0.01% by weight or more and more preferably 0.1% by weight or more, and normally 10% by weight or less, preferably 5% by weight or less, more preferably 3% by weight or less, even more preferably 2% by weight or less, particularly preferably 1% by weight or less and most preferably 0.5% by weight or less.

In the case of having satisfied the aforementioned range, effects such as output characteristics, load characteristics, cycling characteristics and high-temperature storage characteristics are further improved.

1-4-6. Cyclic Sulfonic Acid Ester Compound

There are no particular limitations on the type of cyclic sulfonic acid ester compound.

Specific examples of cyclic sulfonic acid ester compounds include:

sultone compounds such as 1,3-propanesultone, 1-fluoro-1,3-propanesultone, 2-fluoro-1,3-propanesultone, 3-fluoro-1,3-propanesultone, 1-methyl-1,3-propanesultone, 2-methyl-1,3-propanesultone, 3-methyl-1,3-propanesultone, 1-propene-1,3-sultone, 2-propene-1,3-sultone, 1-fluoro-1-propene-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butanesultone, 1-fluoro-1,4-butanesultone, 2-fluoro-1,4-butanesultone, 3-fluoro-1,4-butanesultone, 4-fluoro-1,4-butanesultone, 1-methyl-1,4-butanesultone, 2-methyl-1,4-butanesultone, 3-methyl-1,4-butanesultone, 4-methyl-1,4-butanesultone, 1-butene-1,4-sultone, 2-butene-1,4-sultone, 3-butene-1,4-sultone, 1-fluoro-1-butene-1,4-sultone, 2-fluoro-1-butene-1,4-sultone, 3-fluoro-1-butene-1,4-sultone, 4-fluoro-1-butene-1,4-sultone, 1-fluoro-2-butene-1,4-sultone, 2-fluoro-2-butene-1,4-sultone, 3-fluoro-2-butene-1,4-sultone, 4-fluoro-2-butene-1,4-sultone, 1-fluoro-3-butene-1,4-sultone, 2-fluoro-3-butene-1,4-sultone, 3-fluoro-3-butene-1,4-sultone, 4-fluoro-3-butene-1,4-sultone, 1-methyl-1-butene-1,4-sultone, 2-methyl-1-butene-1,4-sultone, 3-methyl-1-butene-1,4-sultone, 4-methyl-1-butene-1,4-sultone, 1-methyl-2-butene-1,4-sultone, 2-methyl-2-butene-1,4-sultone, 3-methyl-2-butene-1,4-sultone, 4-methyl-2-butene-1,4-sultone, 1-methyl-3-butene-1,4-sultone, 2-methyl-3-butene-1,4-sultone, 3-methyl-3-butene-1,4-sultone, 4-methyl-3-butene-1,4-sultone, 1,5-pentanesultone, 1-fluoro-1,5-pentanesultone, 2-fluoro-1,5-pentanesultone, 3-fluoro-1,5-pentanesultone, 4-fluoro-1,5-pentanesultone, 5-fluoro-1,5-pentanesultone, 1-methyl-1,5-pentanesultone, 2-methyl-1,5-pentanesultone, 3-methyl-1,5-pentanesultone, 4-methyl-1,5-pentanesultone, 5-methyl-1,5-pentanesultone, 1-pentene-1,5-sultone, 2-pentene-1,5-sultone, 3-pentene-1,5-sultone, 4-pentene-1,5-sultone, 1-fluoro-1-pentene-1,5-sultone, 2-fluoro-1-pentene-1,5-sultone, 3-fluoro-1-pentene-1,5-sultone, 4-fluoro-1-pentene-1,5-sultone, 5-fluoro-1-pentene-1,5-sultone, 1-fluoro-2-pentene-1,5-sultone, 2-fluoro-2-pentene-1,5-sultone, 3-fluoro-2-pentene-1,5-sultone, 4-fluoro-2-pentene-1,5-sultone, 5-fluoro-2-pentene-1,5-sultone, 1-fluoro-3-pentene-1,5-sultone, 2-fluoro-3-pentene-1,5-sultone, 3-fluoro-3-pentene-1,5-sultone, 4-fluoro-3-pentene-1,5-sultone, 5-fluoro-3-pentene-1,5-sultone, 1-fluoro-4-pentene-1,5-sultone, 2-fluoro-4-pentene-1,5-sultone, 3-fluoro-4-pentene-1,5-sultone, 4-fluoro-4-pentene-1,5-sultone, 5-fluoro-4-pentene-1,5-sultone, 1-methyl-1-pentene-1,5-sultone, 2-methyl-1-pentene-1,5-sultone, 3-methyl-1-pentene-1,5-sultone, 4-methyl-1-pentene-1,5-sultone, 5-methyl- 1-pentene-1,5-sultone, 1-methyl-2-pentene-1,5-sultone, 2-methyl-2-pentene-1,5-sultone, 3-methyl-2-pentene-1,5-sultone, 4-methyl-2-pentene-1,5-sultone, 5-methyl-2-pentene-1,5-sultone, 1-methyl-3-pentene-1,5-sultone, 2-methyl-3-pentene-1,5-sultone, 3-methyl-3-pentene-1,5-sultone, 4-methyl-3-pentene-1,5-sultone, 5-methyl-3-pentene-1,5-sultone, 1-methyl-4-pentene-1,5-sultone, 2-methyl-4-pentene-1,5-sultone, 3-methyl-4-pentene-1,5-sultone, 4-methyl-4-pentene-1,5-sultone or 1-methyl-4-pentene-1,5-sultone;

sulfate compounds such as methylene sulfate, ethylene sulfate or propylene sulfate;

sulfonate compounds such as methylene methanedisulfonate or ethylene methanedisulfonate;

nitrogen-containing compounds such as 1,2,3-oxathiazolidine-2,2-dioxide, 3-methyl-1,2,3-oxathiazolidine-2,2-dioxide, 3H-1,2,3-oxathiazole-2,2-dioxide, 5H-1,2,3-oxathiazole-2,2-dioxide, 1,2,4-oxathiazolidine-2,2-dioxide, 4-methyl-1,2,4-oxathiazolidine-2,2-dioxide, 3H-1,2,4-oxathiazole-2,2-dioxide, 5H-1,2,4-oxathiazole-2,2-dioxide, 1,2,5-oxathiazolidine-2,2-dioxide, 5-methyl-1,2,5-oxathiazolidine-2,2-dioxide, 3H-1,2,5-oxathiazole-2,2-dioxide, 5H-1,2,5-oxathiazole-2,2-dioxide, 1,2,3-oxathiazinane-2,2-dioxide, 3-methyl-1,2,3-oxadithazinane-2,2-dioxide, 5,6-dihydro-1,2,3-oxathiazine-2,2-dioxide, 1,2,4-oxathiazinane-2,2-dioxide, 4-methyl-1,2,4-oxadithazinane-2,2-dioxide, 5,6-dihydro-1,2,4-oxathiazine-2,2-dioxide, 3,6-dihydro-1,2,4-oxathiazine-2,2-dioxide, 3,4-dihydro-1,2,4-oxathiazine-2,2-dioxide, 1,2,5-oxathiazinane-2,2-dioxide, 5-methyl-1,2,5-oxathiazinane-2,2-dioxide, 5,6-dihydro-1,2,5-oxathiazine-2,2-dioxide, 3,6-dihydro-1,2,5-oxathiazine-2,2-dioxide, 3,4-dihydro-1,2,5-oxathiazine-2,2-dioxide, 1,2,6-oxathiazinane-2,2-dioxide, 6-methyl-1,2,6-oxathiazinane-2,2-dioxide, 5,6-dihydro-1,2,6-oxathiazine-2,2-dioxide, 3,4-dihydro-1,2,6-oxathiazine-2,2-dioxide or 5,6-dihydro-1,2,6-oxathiazine-2,2-dioxide; and, phosphorous-containing compounds such as 1,2,3-oxathiaphospholane-2,2-dioxide, 3-methyl-1,2,3-oxathiaphospholane-2,2-dioxide, 3-methyl-1,2,3-oxathiaphospholane-2,2,3-trioxide, 3-methoxy-1,2,3-oxathiaphospholane-2,2,3-trioxide, 1,2,4-oxathiaphospholane-2,2-dioxide, 4-methyl-1,2,4-oxathiaphospholane-2,2-dioxide, 2,4-1,2,4-oxathiaphospholane-2,2,4-trioxide, 4-methoxy-1,2,4-oxathiaphospholane-2,2,4-trioxide, 1,2,5-oxathiaphospholane-2,2-dioxide, 5-methyl-1,2,4-oxathiaphospholane-2,2,5-trioxide, 5-methoxy-1,2,4-oxathiaphospholane-2,2,5-trioxide, 1,2,3-oxathiaphosphinane-2,2-dioxide, 3-methyl-1,2,3-oxathiaphosphinane-2,2-dioxide, 3-methyl-1,2,3-oxathiaphosphinane-2,2,3-trioxide, 3-methoxy-1,2,3-oxathiaphosphinane-2,2,3-trioxide, 1,2,4-oxathiaphosphinane-2,2-dioxide, 4-methyl-1,2,4-oxathiaphosphinane-2,2-dioxide, 4-methyl-1,2,4-oxathiaphosphinane-2,2,3-trioxide, 4-methyl-1,5,2,4-dioxathiaphosphinane-2,4-dioxide, 4-methoxy-1,5,2,4-dioxathiaphosphinane-2,4-dioxide, 3-methoxy-1,2,4-oxathiahosphinane-2,2,3-trioxide, 1,2,5-oxathiaphosphinane-2,2-dioxide, 5-methyl-1,2,5-oxathiaphosphinane-2,2-dioxide, 5-methyl-1,2,5-oxathiaphosphinane-2,2,3-trioxide, 5-methoxy-1,2,5-oxathiaphosphinane-2,2,3-trioxide, 1,2,6-oxathiaphosphinane-2,2-dioxide, 6-methyl-1,2,6-oxathiaphosphinane-2,2-dioxide, 6-methyl-1,2,6-oxathiaphosphinane-2,2,3-trioxide or 6-methoxy-1,2,6-oxathiaphosphinane-2,2,3-trioxide.

Among these, 1,3-propanesultone, 1-fluoro-1,3-propanesultone, 2-fluoro-1,3-propanesultone, 3-fluoro-1,3-propanesultone, 1-propene-1,3-sultone, 1-fluoro-1-propene-1,3-sultone, 2-fluoro-1-propene-1,3-sultone, 3-fluoro-1-propene-1,3-sultone, 1,4-butanesultone, methylene methanedisulfonate and ethylene methanedisulfonate are preferable from the viewpoint of improved storage characteristics, while 1,3-propanesultone, 1-fluoro-1,3-propanesultone, 2-fluoro-1,3-propanesultone, 3-fluoro-1,3-propanesultone and 1-propene-1,3-sultone are more preferable.

One type of cyclic sulfonic acid ester compound may be used alone or two or more types may be used in an arbitrary combination and ratio. There are no particular limitations on the incorporated amount of the cyclic sulfonic acid ester compound based on the total amount of nonaqueous electrolyte of Present Example 1 and may be any arbitrary amount provided the effects of Present Invention 1 are not significantly impaired, and the amount based on 100% by weight of the nonaqueous electrolyte is normally 0.001% by weight or more, preferably 0.01% by weight or more and more preferably 0.1% by weight or more, and normally 10% by weight or less, preferably 5% by weight or less, more preferably 3% by weight or less, particularly preferably 2% by weight or less and most preferably 1% by weight or less. In the case of having satisfied the aforementioned range, effects such as output characteristics, load characteristics, cycling characteristics or high-temperature storage characteristics are further improved.

1-4-7. Fluorinated Unsaturated Cyclic Carbonate

A cyclic carbonate having an unsaturated bond and a fluorine atom (to also be described as a "fluorinated unsaturated cyclic carbonate") is also preferably used as a fluorinated cyclic carbonate. There are no particular limitations on the number of fluorine atoms of the fluorinated unsaturated cyclic carbonate provided the number thereof is 1 or more. Among these, the number of fluorine atoms is normally 6 or less, preferably 4 or less and most preferably 1 or 2.

Examples of the fluorinated unsaturated cyclic carbonate include fluorinated vinylidene carbonate derivatives and fluorinated ethylene carbonate derivatives substituted with a substituent having an aromatic group or carbon-carbon double bond.

Examples of fluorinated vinylidene carbonate derivatives include 4-fluorovinylene carbonate, 4-fluoro-5-methyl vinylene carbonate, 4-fluoro-5-phenyl vinylene carbonate, 4-allyl-5-fluorovinylene carbonate and 4-fluoro-5-vinyl vinylene carbonate.

Examples of fluorinated ethylene carbonate derivatives substituted with a substituent having an aromatic ring or carbon-carbon double bond include:

4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, 4,5-difluoro-4,5-diallyl ethylene carbonate, 4-fluoro-4-phenyl ethylene carbonate, 4-fluoro-5-phenyl ethylene carbonate, 4,4-difluoro-5-phenyl ethylene carbonate and 4,5-difluoro-4-phenyl ethylene carbonate.

Among these, preferable examples of fluorinated unsaturated cyclic carbonates include:

4-fluorovinylene carbonate, 4-fluoro-5-methyl vinylene carbonate, 4-fluoro-5-vinyl vinylene carbonate, 4-allyl-5-fluorovinylene carbonate, 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate and 4,5-difluoro-4,5-diallyl ethylene carbonate. These are used more preferably since they form a stable interface protective coating.

There are no particular limitations on the molecular weight of the fluorinated unsaturated cyclic carbonate, and may be any arbitrary molecular weight provided the effects of Present Invention 1 are not significantly impaired. The molecular weight is preferably 50 to 250. If within this range, it becomes easy to ensure solubility of the fluorinated unsaturated cyclic carbonate in the nonaqueous electrolyte, and the effects of Present Invention 1 are easily demonstrated.

There are no particular limitations on the method used to produce the fluorinated unsaturated cyclic carbonate, and can be produced by arbitrarily selecting a known method. The molecular weight is more preferably 100 or more and more preferably 200 or less.

One type of fluorinated unsaturated cyclic carbonate may be used alone or two or more types may be used in an arbitrary combination and ratio. In addition, there are no particular limitations on the incorporated amount of the fluorinated unsaturated cyclic carbonate and may be any arbitrary amount provided the effects of Present Invention 1 are not significantly impaired.

Normally, the incorporated amount of the fluorinated unsaturated cyclic carbonate based on 100% by weight of the nonaqueous electrolyte is preferably 0.01% by weight or more, more preferably 0.1% by weight or more and even more preferably 0.5% by weight or more, and preferably 10% by weight or less, more preferably 5% by weight or less, eve more preferably 3% by weight or less and particularly preferably 2% by weight or less.

If within this range, the nonaqueous electrolyte secondary battery easily demonstrates an adequate effect of improving cycling characteristics while easily avoiding situations in the manner of decreased high-temperature storage characteristics, increased generation of gas and decreased discharge capacity retention rate.

1-4-8. Compound Having Triple Bond

There are no particular limitations on the compound having a triple bond provided it has at least one triple bond in a molecule thereof.

Specific examples of compounds having a triple bond include:

hydrocarbon compounds such as 1-pentyne, 2-pentyne, 1-hexyne, 2-hexyne, 3-hexyne, 1-heptyne, 2-heptyne, 3-heptyne, 1-octyne, 2-octyne, 3-octyne, 4-octyne, 1-nonyne, 2-nonyne, 3-nonyne, 4-nonyne, 1-dodecyne, 2-dodecyne, 3-dodecyne, 4-dodecyne, 5-dodecyne, phenylacetylene, 1-phenyl-1-propyne, 1-phenyl-2-propyne, 1-phenyl-1-butyne, 4-phenyl-1-butyne, 4-phenyl-1-butyne, 1-phenyl-1-pentyne, 5-phenyl-1-pentyne, 1-phenyl-1-hexyne, 6-phenyl-1-hexyne, diphenylacetylene, 4-ethynyltoluene or dicyclohexylacetylene;

monocarbonates such as 2-propynyl methyl carbonate, 2-propynyl ethyl carbonate, 2-propynyl propyl carbonate, 2-propynyl butyl carbonate, 2-propynyl phenyl carbonate, 2-propynyl cyclohexyl carbonate, di-2-propynyl carbonate, 1-methyl-2-propynyl methyl carbonate, 1,1-dimethyl-2-propynyl methyl carbonate, 2-butynyl methyl carbonate, 3-butynyl methyl carbonate, 2-pentynyl methyl carbonate, 3-pentynyl methyl carbonate or 4-pentyny methyl carbonate;

dicarbonates such as 2-butyne-1,4-diol dimethyl dicarbonate, 2-butyne-1,4-diol diethyl dicarbonate, 2-butyne-1,4-diol dipropyl dicarbonate, 2-butyne-1,4-diol dibutyl dicarbonate, 2-butyne-1,4-diol diphenyl dicarbonate or 2-butyne-1,4-diol dicyclohexyl dicarbonate;

monocarboxylic acid esters such as 2-propynyl acetate, 2-propynyl propionate, 2-propynyl butyrate, 2-propynyl benzoate, 2-propynyl cyclohexyl carbonate, 1,1-dimethyl-2-propynyl acetate, 1,1-dimethyl-2-propynyl propionate, 1,1-dimethyl-2-propynyl butyrate, 1,1-dimethyl-2-propynyl benzoate, 1,1-dimethyl-2-propynyl cyclohexyl carbonate, 2-butynyl acetate, 3-butynyl acetate, 2-pentynyl acetate, 3-pentynyl acetate, 4-pentynyl acetate, methyl acrylate, ethyl acrylate, propyl acrylate, vinyl acrylate, 2-propenyl acrylate, 2-butenyl acrylate, 3-butenyl acrylate, methyl methacrylate, ethyl methacrylate, propyl methacrylate, vinyl methacrylate, 2-propenyl methacrylate, 2-butenyl methacrylate, 3-butenyl methacrylate, methyl 2-propynoate, ethyl 2-propynoate, propyl 2-propynoate, vinyl 2-propynoate, 2-propenyl 2-propynoate, 2-butenyl 2-propynoate, 3-butenyl 2-propynoate, methyl 2-butynoate, ethyl 2-butynoate, propyl 2-butynoate, vinyl 2-butynoate, 2-propenyl 2-butynoate, 2-butenyl 2-butynoate, 3-butenyl 2-butynoate, methyl 3-butynoate, ethyl 3-butynoate, propyl 3-butynoate, vinyl 3-butynoate, 2-propenyl 3-butynoate, 2-butenyl 3-butynoate, 3-butenyl 3-butynoate, methyl 2-pentynoate, ethyl 2-pentynoate, propyl 2-pentynoate, vinyl 2-pentynoate, 2-propenyl 2-pentynoate, 2-butyenyl 2-pentynoate, 3-butenyl 2-pentynoate, methyl 3-pentynoate, ethyl 3-pentynoate, propyl 3-pentynoate, vinyl 3-pentynoate, 2-propenyl 3-pentynoate, 2-butenyl 3-pentynoate, 3-butenyl 3-pentynoate, methyl 4-pentynoate, ethyl 4-pentynoate, propyl 4-pentynoate, vinyl 4-pentynoate, 2-propenyl 4-pentynoate, 2-butenyl 4-pentynoate or 3-butenyl 4-pentynoate;

dicarboxylic acid esters such as 2-butyne-1,4-diol diacetate, 2-butyne-1,4-diol dipropionate, 2-butyne-1,4-diol dibutyrate, 2-butyene-1,4-diol dibenzoate or 2-butyne-1,4-diol dicyclohexane carboxylate;

oxalic acid diesters such as 2-propynyl methyl oxalate, 2-propynyl ethyl oxalate, 2-propnyl propyl oxalate, 2-propnyl vinyl oxalate, 2-propnyl allyl oxalate, di-2-propynyl oxalate, 2-butynyl methyl oxalate, 2-butynyl ethyl oxalate, 2-butynyl propyl oxalate, 2-butynyl vinyl oxalate, 2-butynyl allyl oxalate, di-2-butynyl oxalate, 3-butynyl methyl oxalate, 3-butynyl ethyl oxalate, 3-butynyl propyl oxalate, 3-butynyl vinyl oxalate, 3-butynyl allyl oxalate or di-3-butynyl oxalate;

phosphine oxides such as methyl(2-propynyl)(vinyl)phosphine oxide, divinyl(2-propynyl)phosphine oxide, di(2-propynyl)(vinyl)phosphine oxide, di(2-propenyl)(2-propynyl)phosphine oxide, di(2-propynyl)(2-propenyl)phosphine oxide, di(3-butenyl)(2-propynyl)phosphine oxide or di(2-propynyl)(3-butenyl)phosphine oxide;

phosphinic acid esters such as 2-propynyl methyl(2-propenyl)phosphinate, 2-propynyl 2-butenyl(methyl)phosphinate, 2-propynyl di(2-propenyl)phosphinate, 2-propynyl di(3-butenyl)phosphinate, 1,1-dimethyl-2-propynyl methyl(2-propenyl)phosphinate, 1,1-dimethyl-2-propynyl 2-butenyl(methyl)phosphinate, 1,1-dimethyl-2-propynyl di(2-propenyl)phosphinate, 1,1-dimethyl-2-propynyl di(3-butenyl)phosphinate, 2-propenyl methyl(2-propynyl)phosphinate, 3-butenyl methyl(2-propynyl)phosphinate, 2-propenyl di(2-propynyl)phosphinate, 3-butenyl di(2-propynyl)phosphinate, 2-propenyl 2-propynyl(2-propenyl)phosphinate or 3-butenyl 2-propynyl(2-propenyl)phosphinate;

phosphonic acid esters such as 2-propynyl methyl 2-propenyl phosphonate, methyl (2-propynyl) 2-butenyl phosphonate, (2-propynyl) (2-propenyl) 2-propenyl phosphonate, (3-butenyl) (2-propynyl) 3-butenyl phosphonate, (1,1-dimethyl-2-propynyl) (methyl) 2-propenyl phosphonate, (1,1-dimethyl-2-propynyl) (methyl) 2-butenyl phosphonate, (1,1-dimethyl-2-propynyl) (2-propenyl) 2-propenyl phosphonate, (3-butenyl) (1,1-dimethyl-2-propynyl) 3-butenyl phosphonate, (2-propynyl) (2-propenyl) methyl phosphonate, (3-butenyl) (2-propynyl) methyl phosphonate, (1,1-dimethyl-2-propynyl) (2-propenyl) methyl phosphonate, (3-butenyl) (1,1-dimethyl-2-propynyl) methyl phosphonate, (2-propynyl) (2-propenyl) ethyl phosphonate, (3-butenyl) (2-propynyl) ethyl phosphonate, (1,1-dimethyl-2-propynyl) (2-propenyl) ethyl phosphonate or (3-butenyl) (1,1-dimethyl-2-propynyl) ethyl phosphonate; and, phosphoric acid esters such as (methyl) (2-propenyl) (2-propynyl) phosphate, (ethyl) (2-propenyl) (2-propynyl) phosphate, (2-butenyl) (methyl) (2-propynyl) phosphate, (2-butenyl) (ethyl) (2-propynyl) phosphate, (1,1-dimethyl-2-propynyl) (ethyl) (2-propenyl) phosphate, 2-(butenyl) (1,1-dimethyl-2-propynyl) (methyl) phosphate or (2-butenyl) (ethyl) (1,1-dimethyl-2-propynyl) phosphate.

Among these, compounds having an alkynyloxy group are preferable since they form a more stable negative electrode coating in electrolyte.

Moreover, compounds such as:
2-propynyl methyl carbonate, di-2-propynyl carbonate, 2-butynyl-1,4-diol dimethyl carbonate, 2-propynyl acetate, 2-butynyl-1,4-diol diacetate, methyl 2-propynyl oxalate or di-2-propynyl oxalate
are particularly preferable from the viewpoint of improving storage characteristics.

One type of the aforementioned compounds having a triple bond may be used alone or two or more types may be used in an arbitrary combination and ratio. Although there are no particular limitations on the incorporated amount of the compound having a triple bond based on the total amount of the nonaqueous electrolyte of Present Invention 1, and may be any arbitrary amount provided the effects of Present Invention 1 are not significantly impaired, the compound having a triple bond is contained at a concentration of normally 0.01% by weight or more, preferably 0.05% by weight or more and more preferably 0.1% by weight or more, and normally 5% by weight or less, preferably 3% by weight or less and more preferably 1% by weight or less. In the case of having satisfied the aforementioned range, effects such as output characteristics, load characteristics, cycling characteristics or high-temperature storage characteristics are further improved.

1-4-9. Other Assistants

Known assistants other than the aforementioned assistants can be used as other assistants. Examples of other assistants include:

carbonates such as erythritan carbonate, spiro-bis-dimethylene carbonate or methoxyethyl methyl carbonate;

spiro compounds such as 2,4,8,10-tetraoxaspiro-[5.5] undecane or 3,9-divinyl-2,4,8,10-tetraoxaspiro-[5.5] undecane;

sulfur-containing compounds such as ethylene sulfide, methyl fluorosulfonate, ethyl fluorosulfonate, methyl methanesulfonate, ethyl methanesulfonate, busulfan, sulfolene, diphenyl sulfone, N,N-dimethyl methanesulfonamide, N,N-diethyl methanesulfonamide, methyl vinyl sulfonate, ethyl vinyl sulfonate, allyl vinyl sulfonate, propargyl vinyl sulfonate, methyl allyl sulfonate, ethyl allyl sulfonate, allyl allyl sulfonate, propargyl allyl sulfonate or 1,2-bis(vinylsulfonyloxy)ethane;

nitrogen-containing compounds such as 1-methyl-2-pyrrolidinone, 1-methyl-2-piperidone, 3-methyl-2-oxazolidinone, 1,3-dimethyl-2-imidazolidinone or N-methylsuccinimide;

phosphorous-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, methyl dimethylphosphonate, ethyl diethylphosphonate, trimethylphosphine oxide or triethylphosphine oxide;

hydrocarbon compounds such as heptane, octane, nonane, decane or cycloheptane; and, fluorine-containing aromatic compounds such as fluorobenzene, difluorobenzene, hexafluorobenzene or benzotrifluoride.

One type of these compounds may be used alone or two or more types may be used in combination. Addition of these assistants makes it possible to improve capacity retention characteristics and cycling characteristics after high-temperature storage.

There are no particular limitations on the incorporated amount of other assistants and may be any arbitrary amount provided the effects of Present Invention 1 are not significantly impaired. The incorporated amount of other assistants based on 100% by weight of the nonaqueous electrolyte is preferably 0.01% by weight or more and 5% by weight or less. If within this range, the effects of the other assistants are easily demonstrated and situations such as decreased high-load discharge characteristics or other battery characteristics are easily avoided.

The incorporated amount of other assistants is more preferably 0.1% by weight or more and more preferably 0.2% by weight or more, and more preferably 3% by weight or less and even more preferably 1% by weight or less.

The previously described nonaqueous electrolyte includes that which is present within the nonaqueous electrolyte secondary battery described in Present Invention 1.

More specifically, the case of a nonaqueous electrolyte in a nonaqueous electrolyte secondary battery, obtained by separately synthesizing the constituents of a nonaqueous electrolyte such as a lithium salt, solvent and assistant, preparing a nonaqueous electrolyte from these substantially isolated constituents, and injecting into a battery assembled separately according to the method described below, the case of obtaining the same composition as the nonaqueous electrolyte of Present Invention 1 by separately placing the constituents of the nonaqueous electrolyte of Present Invention 1 in a battery and then mixing within the battery, and the case of obtaining the same nonaqueous electrolyte of Present Invention 1 by generating compounds that compose the nonaqueous electrolyte of Present Invention 1 within the nonaqueous electrolyte secondary battery are also included.

2. Battery Composition

The nonaqueous electrolyte secondary battery of Present Invention 1 is preferable for use as an electrolyte for a nonaqueous electrolyte secondary battery in the form of a secondary battery such as a lithium secondary battery. The following provides an explanation of a nonaqueous electrolyte secondary battery that uses the nonaqueous electrolyte of Present Invention 1.

The nonaqueous electrolyte secondary battery of Present Invention 1 can adopt a known structure, and is typically provided with a negative electrode and positive electrode capable of occluding and releasing ions (such as lithium ions) and the aforementioned nonaqueous electrolyte of Present Invention 1.

2-1. Negative Electrode

The following provides a description of the negative electrode active material used in the negative electrode. There are no particular limitations on the negative electrode active material provided it is capable of occluding and releasing lithium ions. Specific examples thereof include metal particles capable of alloying with Li, carbonaceous materials (including graphite particles), alloy-based materials and lithium-containing metal complex oxide materials. One type of these materials may be used alone or two or more types may be used in an arbitrary combination and ratio.

<Negative Electrode Active Material>

Examples of materials that are contained or may be contained as a negative electrode active materials include metal particles capable of alloying with Li, carbonaceous materials, alloy-based materials and lithium-containing metal complex oxide materials.

Examples of carbonaceous materials include (1) natural graphite, (2) artificial graphite, (3) amorphous carbon, (4) carbon-coated graphite, (5) graphite-coated graphite, and (6) resin-coated graphite.

(1) Examples of natural graphite include scale-like graphite, flake graphite, amorphous graphite and/or graphite particles obtained by subjecting the raw material to treatment such as spheroidization or densification treatment. Among these, spherical or oval graphite that has been subjected to spheroidization treatment is particularly preferable from the viewpoints of facilitating filling and charge-discharge rate characteristics.

Examples of devices that can be used for spheroidization treatment include devices that repeatedly subject particles to a mechanical action such as compression, including interaction with the particles consisting mainly of impact force, friction or shearing force.

More specifically, the device is preferably that which carries out spheroidization treatment by having a rotor installed with a large number of blades inside a casing, and imparting mechanical action such as impact compression, friction or shearing force to a carbon material introduced therein by rotating the rotor at high speed. In addition, the device preferably has a mechanism that repeatedly imparts mechanical action by circulating the carbon material.

For example, in the case of carrying out spheroidization treatment using a device as described above, the peripheral velocity of the rotating rotor is preferably 30 m/sec to 100 m/sec, more preferably 40 m/sec to 100 m/sec and even more preferably 50 m/sec to 100 m/sec. In addition, although treatment can be carried out simply by passing the carbonaceous material through the device, it is preferably treated by circulating or retaining in the device for 30 seconds or more, and more preferably treated by circulating or retaining in the device for 1 minute or more.

(2) Examples of artificial graphite include that produced by graphitizing an organic compound such as coal tar pitch, coal-based heavy oil, atmospheric residue, petroleum-based heavy oil, aromatic hydrocarbon, nitrogen-containing cyclic compound, sulfur-containing cyclic compound, polyphenylene, polyvinyl chloride, polyvinyl alcohol, polyacrylonitrile, polyvinyl butyral, natural polymers, polyphenylene sulfide, polyphenylene oxide, furfuryl alcohol resin, phenolformaldehyde resin or imide resin at a temperature of normally 2500° C. to 3200° C. followed by crushing and/or classifying as necessary. At this time, silicon-containing compounds or boron-containing compounds and the like can also be used as graphitization catalysts. In addition, another example of artificial graphite is that obtained by graphitizing mesocarbon microbeads isolated during the course of pitch heat treatment. Moreover, examples of artificial graphite also include granulated particles composed of primary particles. For example, graphite particles, in which a plurality of flat particles are aggregated or bound so that the planes in which they are oriented are not parallel, may be obtained by mixing a graphitizable carbonaceous material powder such as mesocarbon microbeads or coke, a graphitizable binder such as tar or pitch, and a graphitization catalyst followed by graphitizing and then crushing as necessary.

(3) Examples of amorphous carbon include amorphous carbon particles, subjected to at least one round of heat treatment within a temperature range at which graphitization does not occur (range of 400° C. to 2200° C.) using a graphitizable carbon precursor such as tar or pitch for the raw material, and amorphous carbon particles subjected to heat treatment using a non-graphitizable carbon precursor such as resin for the raw material.

(4) Examples of carbon-coated graphite include a carbon-graphite composite, in which nuclear graphite is coated with amorphous carbon, obtained by mixing natural graphite and/or artificial graphite and an organic compound such as tar, pitch or resin in the form of a carbon precursor followed by subjecting to one or more rounds of heat treatment at 400° C. to 2300° C. and using the natural graphite and/or artificial graphite for the nuclear graphite. The form of the composite may be such that all or a portion of the surface is coated, or a plurality of primary particles are compounded by using carbon originating in the aforementioned carbon precursor as binder. In addition, a carbon-graphite composite can also be obtained by reacting a hydrocarbon-based gas, such as benzene, toluene, methane, propane or aromatic volatile matter, with the natural graphite and/or artificial graphite at a high temperature to deposit carbon on the graphite surface (CVD).

(5) Examples of graphite-coated graphite include graphite-coated graphite, in which nuclear graphite is coated with a graphitization product, obtained by mixing natural graphite and/or artificial graphite with a carbon precursor of a graphitizable organic compound such as tar, pitch or resin followed by heat-treating for one or more rounds within a temperature range of about 2400° C. to 3200° C. and using the resulting natural graphite and/or artificial graphite for the nuclear graphite.

(6) Examples of resin-coated graphite include resin-coated graphite, in which nuclear graphite is coated with resin and the like, obtained by mixing natural graphite and/or artificial graphite with a resin and the like followed by drying at a temperature of lower than 400° C. and using the resulting natural graphite and/or artificial graphite for the nuclear graphite.

In addition, one type of the carbonaceous materials of (1) to (6) may be used alone or two or more types may be used in an arbitrary combination and ratio.

Examples of the organic compound such as tar, pitch or resin used in (2) to (5) above include graphitizable organic compounds selected from the group consisting of coal-based heavy oil, direct current-recovered heavy oil, cracked petroleum heavy oil, aromatic hydrocarbons, N-containing cyclic compounds, S-containing cyclic compounds, polyphenylene, organically synthesized polymers, natural polymers, thermoplastic resin and thermosetting resin. In addition, raw material organic compounds may also be dissolved in a low molecular weight organic solvent to adjust viscosity during mixing.

In addition, natural graphite subjected to spheroidization treatment is preferable for the natural graphite and/or artificial graphite serving as the raw material of the nuclear graphite.

The alloy-based material used as a negative electrode active material may be any compound such a single metal or alloy that forms a lithium alloy, or an oxide, carbide, nitride, silicide, sulfide or phosphide thereof, provided it is able to occlude and release lithium ions, and there are no particular limitations thereon. A material containing a group 13 or group 14 metal or metalloid element (namely, with the exception of carbon) is preferable for the single metal or alloy that forms a lithium alloy, while an alloy or compound that contains metallic aluminum, silicon or tin, or atoms thereof, is more preferable. One type of these compounds may be used alone or two or more types may be used in an arbitrary combination and ratio.

<Properties of Carbonaceous Material>

In the case of using a carbonaceous material for the negative electrode active material, the carbonaceous material preferably has the properties indicated below.

(X-Ray Parameters)

The d value (interlayer distance) of the lattice plane (d002 plane) of the carbonaceous material as determined by X-ray diffraction according to the gakushin method is normally 0.335 nm to 0.0360 nm, preferably 0.350 nm or less and even more preferably 0.345 nm or less. In addition, crystallite size (Lc) of the carbonaceous material as determined by X-ray diffraction according to the gakushin method is preferably 1.0 nm or more and even more preferably 1.5 nm or more.

(Volume-Based Mean Particle Diameter)

Volume-based mean particle diameter of the carbonaceous material is the mean particle diameter based on volume as determined by the laser diffraction-scattering method, and is normally 1 μm or more, preferably 3 μm or more, more preferably 5 m or more and particularly preferably 7 μm or more, and normally 100 μm or less, preferably 50 μm or less, more preferably 40 μm or less, even more preferably 30 μm or less and particularly preferably 25 μm or less.

If volume-based mean particle diameter is below the aforementioned range, irreversible capacity may increase leading to loss of initial battery capacity. In addition, if the aforementioned range is exceeded, the coated surface may easily become uneven when producing an electrode by coating, which is undesirable in terms of the battery fabrication process.

Volume-based mean particle diameter is measured using a laser diffraction-scanning type of particle size distribution analyzer (such as the Model LA-700 manufactured by Horiba Ltd.) by dispersing the carbon powder in an aqueous solution (about 10 mL) containing 0.2% by weight of a surfactant in the form of polyoxyethylene (20) sorbitan monolaurate. The median diameter determined according to this measurement method is defined as the volume-based mean particle diameter of the carbonaceous material.

(Raman R Value)

The Raman R value of the carbonaceous material refers to the value obtained by measuring using laser Raman spectroscopy, and is normally 0.01 or more, preferably 0.03 or more and more preferably 0.1 or more, and normally 1.5 or less, preferably 1.2 or less, more preferably 1.0 or less and particularly preferably 0.5 or less.

If the Raman R value is below the aforementioned range, crystallinity of the particle surfaces becomes excessively high, leading to a possible reduction in the number of sites where Li is able to enter between layers accompanying charging and discharging. Namely, this may result in a decrease in charge acceptance. In addition, in the case of having increased the density of the negative electrode by pressing after having coated the current collector, crystals may easily become oriented in the direction parallel to the electrode plate, leading to a possible decrease in load characteristics.

On the other hand, if the aforementioned range is exceeded, crystallinity of the particle surfaces may decrease leading to an increase in reactivity with the nonaqueous electrolyte, decreased efficiency and an increase in generation of gas.

Raman spectrum is measured using a Raman spectrometer (such as the Raman Spectrometer manufactured by Jasco Corp.) by filling a sample by allowing to spontaneously drop into a measuring cell and rotating the cell within a plane perpendicular to laser light while irradiating the sample surface within the cell with light from an argon ion laser (or light from a semiconductor laser). Intensity IA of a peak PA in the vicinity of 1580 cm$^{-1}$ and intensity IB of a peak PB in the vicinity of 1360 cm$^{-1}$ are measured using the resulting Raman spectrum followed by calculating the intensity ratio R thereof (R=IA/IB). The Raman R value calculated in this measurement is defined as the Raman R value of the carbonaceous material.

In addition, the conditions for measuring the aforementioned Raman R value are as indicated below.

Laser wavelength: Ar ion laser: 514.5 nm (semiconductor laser: 532 nm)

Measuring range: 1100 cm$^{-1}$ to 1730 cm$^{-1}$

Raman R value: Background processing

Smoothing processing: Simple average, 5-point convolution (BET Specific Surface Area)

The BET specific surface area of the carbonaceous material is the value of specific surface area as measured using the BET method, and is normally 0.1 m$^2$·g$^{-1}$ or more, preferably 0.7 m$^2$·g$^{-1}$ or more, more preferably 1.0 m$^2$·g$^{-1}$ or more and particularly preferably 1.5 m$^2$·g$^{-1}$ or more, and normally 100 m$^2$·g$^{-1}$ or less, preferably 25 m$^2$·g$^{-1}$ or less, more preferably 15 m$^2$·g$^{-1}$ or less and particularly preferably 10 m$^2$·g$^{-1}$ or less.

If the value of BET specific surface area is below this range, lithium acceptance easily becomes poor during charging in the case of using as a negative electrode material, lithium easily precipitates on the electrode surface, and there is the possibility of a decrease in stability. On the other hand, if this range is exceeded, reactivity with the nonaqueous electrolyte may increase when using as a negative electrode material, gas is generated easily, and it may be difficult to obtain a preferable battery.

Specific surface area according to the BET method is measured using a surface area meter (such as the fully automated surface area measuring system manufactured by Ohkura Riken Co., Ltd.) according to single-point BET nitrogen adsorption using the dynamic flow method by pre-drying a sample for 15 minutes at 350°C in the presence of flowing nitrogen followed by using a nitrogen-helium mixed gas in which the value of the relative pressure of nitrogen to atmospheric pressure is accurately adjusted to 0.3.

(Degree of Circularity)

In the case of having measured degree of circularity for the degree of sphericity of the carbonaceous material, the value thereof is preferably within the range indicated below. Furthermore, degree of circularity is defined as "degree of circularity=(circumference of equivalent circle having the same area as particle projected shape)/(actual circumference of projected particle shape)", and the shape becomes a theoretically perfect sphere when the degree of circularity is 1.

The degree of circularity of the particles of a carbonaceous material having a particle diameter within the range of 3 μm to 40 μm is preferably as close to 1 as possible and preferably 0.1 or more, and in particular, preferably 0.5 or more, more preferably 0.8 or more, even more preferably 0.85 or more, and particularly preferably 0.9 or more. High current density charge-discharge characteristics improve the greater the degree of circularity. Thus, if the degree of circularity is below the aforementioned range, ease of filling the negative electrode active material may decrease, resistance between particles may increase, and short-term high current density charge-discharge characteristics may decrease.

Degree of circularity is measured using a flow-type particle image analyzer (such as the FIPA Analyzer manufactured by Sysmex Corp.). 0.2 g of sample are suspended in a 0.2% by weight aqueous solution (about 50 mL) of a surfactant in the form of polyoxyethylene (20) sorbitan monolaurate followed by irradiating with ultrasonic waves at a frequency of 28 kHz for 1 minute at an output of 60 W, specifying the detection range to be 0.6 μm to 400 μm, and measuring particles having a particle diameter within the range of 3 μm to 40 μm.

Although there are no particular limitations on the method used to improve the degree of circularity, formation of spherical particles by spheroidization treatment is preferable since the shapes of the gaps between particles become uniform when forming into an electrode body. Examples of spheroidization treatment include a method consisting of making the shape of the particles mechanically approach a spherical shape by applying shearing force and compressive force, and a method consisting of mechanical and physical treatment by which a plurality of particles are granulated with a binder or by utilizing adhesion of the particles per se.

(Tap Density)

The tap density of the carbonaceous material is normally 0.1 g·cm$^{-3}$ or more, preferably 0.5 g·cm$^{-3}$ or more, more preferably 0.7 g·cm$^{-3}$ or more and particularly preferably 1 g·cm$^{-3}$ or more, and preferably 2 g·cm$^{-3}$ or less, more preferably 1.8 g·cm$^{-3}$ or less and particularly preferably 1.6 g·cm$^{-3}$ or less. If tap density is below the aforementioned range, it may become difficult to increase packing density in the case of using as a negative electrode and may prevent the obtaining of a high-capacity battery. In addition, if the aforementioned range is exceeded, gaps between particles in the electrode become excessively small, it may become difficult to ensure electrical conductivity between particles, and it may be difficult to obtain preferable battery characteristics.

Tap density is measured by passing the carbonaceous material through a sieve having a mesh size of 300 μm and allowing the sample to drop into a 20 cm$^3$ tapping cell to fill the sample to the upper edge of the cell, followed by using a powder density measuring instrument (such as the Tap Denser manufactured by Seishin Enterprise Co., Ltd.) and tapping for 100 cycles at a stroke length of 10 mm to calculate tap density from the volume at that time and the sample weight.

(Orientation Ratio)

The orientation ratio of the carbonaceous material is normally 0.005 or more, preferably 0.01 or more and more preferably 0.015 or more, and normally 0.67 or less. If the orientation ratio is below the aforementioned range, high-density charge-discharge characteristics may decrease. Furthermore, the upper limit of the aforementioned range is the theoretical upper limit value of the orientation ratio of the carbonaceous material.

Orientation ratio is measured by X-ray diffraction after having subjected the sample to high-pressure molding. A compact obtained by filling 0.47 g of sample into a molding machine having a diameter of 17 mm and compressing at 58.8 MN·m$^{-2}$ is placed in a measurement sample holder using clay so as to be in the same plane as the plane of the holder followed by measuring X-ray diffraction. The ratio represented by the ratio of the diffraction peak intensity in the (110) plane/diffraction peak intensity in the (004) plane is then calculated from the resulting peak intensities of the diffraction in the (110) plane and diffraction in the (104) plane of the carbon.

X-ray diffraction measurement conditions are as indicated below. Furthermore, "2θ" refers to the diffraction angle.

Target: Cu (Kα line) graphite monochromator

Slits:
  Divergence slit: 0.5 degrees
  Receiving slit: 0.15 mm
  Scattering slit: 0.5 degrees Measuring range and step angle/measuring time:
  (110) plane: 75 degrees≤2θ≤80 degrees, 1 degree/60 seconds
  (004) plane: 52 degrees≤2θ≤57 degrees, 1 degree/60 seconds (Aspect Ratio (Powder))

The aspect ratio of the carbonaceous material is normally 1 to 10, preferably 8 or less and more preferably 5 or less. If the aspect ratio exceeds the aforementioned range, streaking may occur when forming an electrode plate, a uniformly coated surface may be unable to be obtained, and high current density charge-discharge characteristics may decrease. Furthermore, the lower limit of the aforementioned range is the theoretical lower limit value of the aspect ratio of the carbonaceous material.

Aspect ratio is measured by magnifying and observing particles of the carbonaceous material with a scanning electron microscope. Fifty graphite particles fixed to the end surface of a piece of metal having a thickness of 50 μm or less are arbitrarily selected followed by rotating and tilting the stage on which the sample is fixed for each of the particles, measuring diameter A as the maximum length of the carbonaceous material particles when observed three-dimensionally and diameter B as the shortest diameter that intersects therewith at a right angle, and calculating the average value of A/B.

(Coverage Factor)

The negative electrode active material may be coated with a carbonaceous material or graphite material. Among these, the negative electrode active material is preferably coated with an amorphous carbonaceous material from the viewpoint of acceptance of lithium ions, and the coverage factor thereof is normally 0.5% to 30%, preferably 1% to 25% and more preferably 2% to 20%. If the content ratio thereof is excessively high, the amorphous carbon component of the negative electrode active material becomes excessively high and reversible capacity when incorporated in a battery tends to decrease. If the content ratio is excessively low, in addition to the amorphous carbon component being unevenly coated on the graphite particles serving as nuclei, robust granulation does not occur and particle diameter tends to be excessively small when crushing after firing.

Furthermore, the content ratio (coverage factor) of carbide derived from organic compounds of the ultimately obtained negative electrode active material can be calculated according to the following equation from the amount of negative electrode active material, amount of organic compounds and actual carbon ratio as measured according to the micro method in compliance with JIS K 2270.

Coverage factor of carbide derived from organic compounds (%)=(weight of organic compounds×actual carbon ratio×100)/{weight of negative electrode active material+(weight of organic compound×actual carbon ratio)}

(Internal Porosity)

The internal porosity of the negative electrode active material is normally 1% or more, preferably 3% or more, more preferably 5% or more and even more preferably 7% or more. In addition, internal porosity is normally 50% or less, preferably 40% or less, more preferably 30% or less and even more preferably 20% or less. If this porosity is excessively low, the amount of liquid within the particles decreases, which tends to exacerbate charge-discharge characteristics, while if internal porosity is excessively high, gaps between particles when having formed into an electrode decrease, which tends to result in inadequate diffusion of electrolyte. In addition, substances that buffer expansion and contraction of metal particles capable of alloying with Li, such as amorphous carbon, graphite materials or resin, may fill the gaps or be present therein.

<Metal Particles Capable of Alloying with Li>

Examples of methods used to confirm that metal particles are capable of alloying with Li include identification of the metal particle phase by X-ray diffraction, observation and elemental analysis of particle structure with an electron microscope, and elemental analysis by X-ray fluorescence analysis.

Although conventionally known metal particles can be used for the metal particles capable of alloying with Li, the metal particles are preferably those of a metal or compound thereof selected from the group consisting of Fe, Co, Sb, Bi, Pb, Ni, Ag, Si, Sn, Al, Zr, Cr, P, S, V, Mn, As, Nb, Mo, Cu, Zn, Ge, In, Ti and W from the viewpoints of capacity and cycle life. In addition, an alloy composed of two or more types of metal may be used, and the metal particles may be alloy particles formed from two or more types of metal elements. Among these, a metal or metal compound thereof selected from the group consisting of Si, Sn, As, Sb, Al, Zn and W is preferable.

Examples of metal compounds include metal oxides, metal nitrides and metal carbides. In addition, an alloy composed of two or more types of metals may also be used.

Si or Si metal compounds are preferable among those metal particles capable of alloying with Li. The Si metal compound is preferably Si metal oxide. Si or Si metal compounds are preferable from the viewpoint of increasing capacity. In the present description, Si or Si metal compounds are collectively referred to as Si compounds. Specific examples of Si compounds include $SiO_x$, $SiN_x$, $SiC_x$ and $SiZ_xO_y$ (wherein Z represents C or N). The Si compound is preferably a Si metal oxide, and Si metal oxides are represented by the general formula $SiO_x$. Although $SiO_x$ represented by this general formula is obtained by using silicon dioxide ($SiO_2$) and metal silicon (Si) as raw materials, the value of x is normally such that $0 \leq x < 2$. $SiO_x$ has a larger theoretical capacity in comparison with graphite, and amorphous Si or nanosized Si crystals allow the obtaining of high capacity since they facilitate the migration of lithium ions and other alkali ions.

More specifically, Si metal oxides are represented by $SiO_x$, and x is such that $0 \leq x < 2$, more preferably 0.2 to 1.8, even more preferably 0.4 to 1.6, particularly preferably 0.6 to 1.4, and more particularly preferably 0. If within this range, in addition to enabling high capacity, irreversible capacity can be reduced due to bonding between Li and oxygen.

Mean Particle Diameter (d50) of Metal Particles Capable of Alloying with Li

The mean particle diameter (d50) of metal particles capable of alloying with Li is normally 0.01 μm or more, preferably 0.05 μm or more, more preferably 0.1 μm or more and even more preferably 0.3 μm or more, and normally 10 μm or less, preferably 9 μm or less and more preferably 8 μm or less. If mean particle diameter (d50) is within the aforementioned range, volume expansion accompanying charging and discharging is reduced and favorable cycling characteristics can be obtained while maintaining charge-discharge capacity.

Mean particle diameter (d50) is determined by measuring particle size distribution by laser diffraction-scattering.

BET Specific Surface Area of Metal Particles Capable of Alloying with Li

The specific surface area of metal particles capable of alloying with Li as determined by the BET method is normally 0.5 $m^2/g$ to 60 $m^2/g$ and preferably 1 $m^2/g$ to 40 $m^2/g$. If the specific surface area of metal particles capable of alloying with Li as determined by the BET method is within the aforementioned range, charge-discharge efficiency and discharge capacity of the battery are high, lithium migrates rapidly during high-speed charging and discharging, and rate characteristics are superior, thereby making this preferable.

Oxygen Content of Metal Particles Capable of Alloying with Li

Although there are no particular limitations thereon, the oxygen content of metal particles capable of alloying with Li is normally 0.01% by weight to 8% by weight and preferably 0.05% by weight to 5% by weight. Although the manner in which oxygen is distributed within the particles may be such that oxygen is present near the surface, present within the particles or uniformly present throughout the particles, it is preferably present near the surface in particular. If the oxygen content of metal particles capable of alloying with Li is within the aforementioned range, volume expansion accompanying charging and discharging is inhibited and cycling characteristics are superior due to strong bonding between Si and O, thereby making this preferable.

<Negative Electrode Active Material Containing Metal Particles Capable of Alloying with Li and Graphite Particles>

The negative electrode active material containing metal particles capable of alloying with Li and graphite particles as referred to in Present Invention 1 may be a mixture in which metal particles capable of alloying with Li and graphite particles are mixed in the state of mutually independent particles, or may be a mixture in which metal particles capable of alloying with Li are present on the surface or within graphite particles. In the present description, although there are no particular limitations on composites (also referred to as composite particles) provided they are particles containing metal particles capable of alloying with Li and a carbonaceous material, they are preferably particles obtained by integrating metal particles capable of alloying with Li and the carbonaceous material by physical and/or chemical bonding. In a more preferable mode thereof, the metal particles capable of alloying with Li and the carbonaceous material are in a state in which each individual component is dispersed within the particles to a degree that they are present at least on the surfaces of the composite particles or inside the bulk thereof, and has a form such that carbonaceous material is present in order to integrate the components by physical and/or chemical bonding. Moreover, a specific preferable mode is a composite of a negative electrode active material at least composed of metal particles capable of alloying with Li and graphite particles, wherein the metal particles capable of alloying with Li are present in gaps in a curved, folded structure within particles in which graphite particles, and preferably natural graphite particles, have a curved, folded structure. In addition, the gaps may also be voids, and a substance such as amorphous carbon, graphite material or resin that buffers expansion and contraction of the metal particles capable of alloying with Li may also be present in the gaps.

*Content Ratio of Metal Particles Capable of Alloying with Li

The content ratio of metal particles capable of alloying with Li to the total amount of metal particles capable of alloying with Li and graphite particles is normally 0.1% by weight or more, preferably 1% by weight or more, more preferably 2% by weight or more, even more preferably 3% by weight or more and particularly preferably 5% by weight or more. In addition, the content ratio is normally 99% by weight or less, preferably 50% by weight or less, more preferably 40% by weight or less, even more preferably 30% by weight or less, still more preferably 25% by weight or less, even more preferably 20% by weight or less, particularly preferably 15% by weight or less and most preferably 10% by weight or less. If within this range, adequate capacity can be obtained, thereby making this preferable.

An alloy-based material negative electrode can be produced using any known method. More specifically, although examples of methods used to produce the negative electrode include a method consisting of adding a binder or electrically conductive material and the like to the aforementioned negative electrode active material and subjecting to roll forming to obtain a sheet electrode, and a method consisting of obtaining a pellet electrode by compression molding, normally a method is used that consists of forming a thin film layer containing the aforementioned negative electrode active material (negative electrode active material layer) on a current collector for a negative electrode (to also be referred to as a "negative electrode current collector") by a method such as coating, deposition, sputtering or plating. In this case, the negative electrode active material layer is formed on the negative electrode current collector by adding a binder, thickener, electrically conductive material or solvent and the like to the aforementioned negative electrode active material to form a slurry followed by coating the slurry onto the negative electrode current collector, drying and pressing to increase density.

Examples of materials of the negative electrode current collector include copper, copper alloy, nickel, nickel alloy and stainless steel. Among these, copper foil is preferable from the viewpoints of facilitating processing into a thin film and cost.

The thickness of the negative electrode current collector is normally 1 µm or more and preferably 5 µm or more, and normally 100 µm or less and preferably 50 µm or less. If the negative electrode current collector is excessively thick, there may be an excessive decrease in overall battery capacity, and conversely, if it is excessively thin, handling may be difficult.

Furthermore, the surface of the negative electrode current collector is preferably preliminarily subjected to roughening treatment in order to improve the binding effect with the negative electrode active material layer formed on the surface. Examples of methods used to roughen the surface include mechanically, electrolytically or chemically polishing the surface of the current collector by subjecting to blasting treatment, rolling with a rough surface roller, or polishing with an abrasive cloth or polishing paper having abrasive particles affixed thereto, grindstone, emery wheel or wire brush equipped with copper wires and the like.

In addition, a perforated type of negative electrode current collector in the manner of expanded metal mesh or punched metal can also be used in order to reduce the weight of the negative electrode current collector and improve energy density per unit weight of the battery. The weight of this type of negative electrode current collector can be altered as desired by changing the aperture ratio thereof. In addition, in the case of having formed a negative electrode active material layer on both sides of this type of negative electrode current collector, the negative electrode active material layer becomes even more resistant to separation due to the rivet effect of passing through the holes. However, since the contact area between the negative electrode active material layer and negative electrode current collector decreases in the case the aperture ratio is excessively high, there may conversely be a decrease in adhesive strength.

The slurry used to form the negative electrode active material layer is normally produced by adding a binder or thickener and the like to a negative electrode material. Furthermore, a "negative electrode material" as referred to in the present description indicates a material obtained by combining a negative electrode active material and an electrically conductive material.

The content of negative electrode active material in the negative electrode material is normally 70% by weight or more and particularly preferably 75% by weight or more, and normally 97% by weight or less and particularly preferably 95% by weight or less. If the content of negative electrode active material is excessively low, the capacity of a secondary battery using the resulting negative electrode tends to be insufficient, while if the content is excessively high, it tends to become difficult to ensure adequate electrical conductivity as a negative electrode due to the relatively insufficient content of electrically conductive material. Furthermore, in the case of combining the use of two or more negative electrode active materials, the total amount of the negative electrode active materials is to satisfy the aforementioned range.

Examples of electrically conductive materials used in the negative electrode include metal materials such as copper or nickel and carbon materials such as graphite or carbon black. One type of these materials may be used alone or two or more types may be used in an arbitrary combination and ratio. The use of a carbon material for the electrically conductive material is particularly preferable since the carbon material also acts as an active material. The content of electrically conductive material in the negative electrode material is normally 3% by weight or more and particularly preferably 5% by weight or more, and normally 30% by weight or less and particularly preferably 25% by weight or less. If the content of electrically conductive material is excessively low, electrical conductivity tends to be insufficient, while if the content is excessively high, battery capacity and strength tend to decrease due to the relative insufficient content of negative electrode active material and the like. Furthermore, in the case of combining the use of two or more electrically conductive materials, the total amount of the electrically conductive materials satisfies the aforementioned range.

Any arbitrary binder can be used for the binder used in the negative electrode provided it is a safe material with respect to the solvent and electrolyte used during electrode production. Examples thereof include polyvinylidene fluoride, polytetrafluoroethylene, polyethylene, polypropylene, styrene-butadiene rubber, isoprene rubber, butadiene rubber, ethylene-acrylic acid copolymer and ethylene-methacrylic acid copolymer. One type of these binders may be used alone or two or more types may be used in an arbitrary combination and ratio. The content of binder based on 100 parts by weight of the negative electrode material is normally 0.5 parts by weight or more and particularly preferably 1 part by weight or more, and normally 10 parts by weight or less and particularly preferably 8 parts by weight or less. If the content of binder is excessively low, the strength of the resulting negative electrode tends to be inadequate, while if the content is excessively high, battery capacity and electrical conductivity tend to be insufficient due to the content of negative electrode active material and the like being relatively insufficient. Furthermore, in the case of using two or more types of binders in combination, the total amount of binder is to satisfy the aforementioned range.

Examples of thickeners used in the negative electrode include carboxymethyl cellulose, methyl cellulose, hydroxymethyl cellulose, ethyl cellulose, polyvinyl alcohol, oxidized starch, phosphorylated starch and casein. One type of these thickeners may be used alone or two or more types may be used in an arbitrary combination and ratio. Although a thickener is only used as necessary, in the case of the use thereof, normally the content of thickener used in the negative electrode active material layer is preferably within the range of 0.5% by weight to 5% by weight.

The slurry for forming the negative electrode active material layer is prepared by mixing an electrically conductive material, binder and thickener as necessary into the aforementioned negative electrode active material and using an aqueous solvent or organic solvent as a dispersion medium. Although water is normally used for the aqueous solvent, an organic solvent such as ethanol or other alcohol or N-methylpyrrolidone or other cyclic amine can also be used in combination therewith within a range of 30% by weight or less relative to the water. In addition, examples of organic solvents normally include cyclic amines such as N-methylpyrrolidone, linear amines such as N,N-dimethylformamide or N,N-dimethylacetoamide, aromatic hydrocarbons such as anisole, toluene or xylene, and alcohols such as butanol or cyclohexanol, and among these, cyclic amines such as N-methylpyrrolidone and linear amines such as N,N-dimethylformamide or N,N-dimethylacetoamide are preferable. Furthermore, one type of these organic solvents may be used alone or two or more types may be used in an arbitrary combination and ratio.

After having coated the resulting slurry onto the aforementioned negative electrode current collector and drying, a negative electrode active material is formed by pressing. There are no particular limitations on the coating method, and a known method per se can be used. There are also no particular limitations on the drying method, and a known method such as air drying, heat drying or vacuum drying can be used.

<Negative Electrode Composition and Production Method>

A known method can be used to produce the negative electrode provided the effects of Present Invention 1 are not significantly impaired. For example, a binder, solvent, and as necessary, a thickener, electrically conductive material and filler and the like, can be added to a negative electrode active material to form a slurry followed by coating this onto a current collector, drying and pressing to form a negative electrode.

In addition, in the case of using an alloy-based material, a thin film layer (negative electrode active material layer) containing the aforementioned negative electrode active material can be formed by a method such as deposition, sputtering or plating.

(Electrode Density)

Although there are no particular limitations on the electrode structure when forming a negative electrode active material into an electrode, the density of the negative electrode active material present on the current collector is preferably 1 g·cm$^{-3}$ or more, more preferably 1.2 g·cm$^{-3}$ or more and particularly preferably 1.3 g·cm$^{-3}$ or more, and preferably 2.2 g·cm$^{-3}$ or less, more preferably 2.1 g·cm$^{-3}$ or less, even more preferably 2.0 g·cm$^{-3}$ or less and particularly preferably 1.9 g·cm$^{-3}$ or less. If the density of the negative electrode active material layer present on the current collector exceeds the aforementioned range, the negative electrode active material particles are destroyed which may lead to an increase in initial irreversible capacity and exacerbation of high current density charge-discharge characteristics caused by decreased permeability of the nonaqueous electrolyte into the vicinity of the current collector/negative electrode active material interface. In addition, if the density is below the aforementioned range, electrical conductivity between the current collector and negative electrode active material may decrease, battery resistance may increase, and capacity per unit volume may decrease.

2-2. Positive Electrode

<Positive Electrode Active Material>

The following provides a description of the positive electrode active material (lithium transition metal-based compound) used in the positive electrode.

<Lithium Transition Metal-Based Compound>

The lithium transition metal-based compound refers to a compound having a structure that is capable of desorbing and inserting Li ions, and examples thereof include sulfides, phosphate compounds and lithium transition metal complex oxides. Examples of sulfides include compounds having a two-dimensional layered structure such as $TiS_2$ or $MoS_2$, and Chevrel compounds having a rigid, three-dimensional framework structure represented by the general formula $Me_xMo_6S_8$ (wherein, Me represents various types of transition metals including Pb, Ag and Cu). Examples of phosphate compounds include those classified as having an olivine structure that are typically represented by $LiMePO_4$ (wherein, Me represents at least one type of transition metal), specific examples of which include $LiFePO_4$, $LiCoPO_4$, $LiNiPO_4$ and $LiMnPO_4$. Examples of lithium transition metal complex oxides include those classified as having a spinel structure capable of three-dimensional diffusion of lithium ions and those having a layered structure capable of two-dimensional diffusion of lithium ions. Lithium transition metal complex oxides having a spinel structure are typically represented by $LiMe_2O_4$ (wherein, Me represents at least one type of transition metal), specific examples of which include $LiMn_2O_4$, $LiCoMnO_4$, $LiNi_{0.5}Mn_{1.5}O_4$ and $LiCoVO_4$. Lithium transition metal complex oxides having a layered structure are typically represented by $LiMeO_2$ (wherein, Me represents at least one type of transition metal), specific examples of which include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$ and $LiMnO_2$.

<Composition>

In addition, examples of lithium-containing transition metal-based compounds include lithium transition metal-based compounds represented by the following compositional formula (F) or (G).

1) Case of Lithium Transition Metal-Based Compound represented by the following compositional formula (F)

$$Li_{1+x}MO_2 \tag{F}$$

Here, x is normally 0 to 0.5. M represents elements composed of Ni and Mn or Ni, Mn and Co, and the molar ratio of Mn/Ni is normally 0.1 to 5. The molar ratio of Ni/M is normally 0 to 0.5. The molar ratio of Co/M is normally 0 to 0.5. Furthermore, the Li-enriching component represented by x may be substituted for a transition metal site M.

Furthermore, in the aforementioned compositional formula (F), although the atomic ratio of the amount of oxygen is indicated as 2 for the sake of convenience, it may also have a certain degree of non-stoichiometry. In addition, x in the aforementioned compositional formula is a component that is charged in the production stage of the lithium transition metal-based compound. Normally, batteries available on the market undergo aging following assembly. Consequently, the amount of Li of the positive electrode may be lacking accompanying charging and discharging. In that case, in terms of compositional analysis, x in the case of having discharged the battery to 3 V is measured at −0.65 to 1.

In addition, a lithium transition metal-based compound that has been fired by undergoing high-temperature firing in an oxygen-containing gas atmosphere in order to enhance crystallinity of the positive electrode active material demonstrates superior battery characteristics.

Moreover, a lithium transition metal-based compound represented by compositional formula (F) may form a solid solution with $Li_2MO_3$ referred to as a 213 layer as indicated in the following general formula (F').

$$\alpha Li_2Mo_3 \cdot (1-\alpha)LiM'O_2 \tag{F'}$$

In this general formula, α represents a number such that 0<α<1.

M is at least one type of metal element having an average oxidation number of 4+, and specific examples thereof include at least one type of metal element selected from the group consisting of Mn, Zr, Ti, Ru, Re and Pt.

M' is at least one type of metal element having an average oxidation number of 3+, is preferably at least one type of metal element selected from the group consisting of V, Mn, Fe, Co and Ni, and is more preferably at least one type of metal element selected from the group consisting of Mn, Co and Ni.

2) Case of Lithium Transition Metal-Based Compound Represented by the Following Compositional Formula (G)

$$Li[Li_aM_bMn_{2-b-a}]O_4+ \tag{G}$$

Here, M is an element composed of at least one type of transition metal selected from the group consisting of Ni, Cr, Fe, Co, Cu, Zr, Al and Mg.

The value of b is normally 0.4 to 0.6.

If the value of b is within this range, energy density per unit weight in the lithium transition metal-based compound is high.

In addition, the value of a is normally 0 to 0.3. In addition, a in the aforementioned compositional formula represents a component that is charged in the production stage of the lithium transition metal-based compound. Normally, batteries available on the market undergo aging following assembly. Consequently, the amount of Li of the positive electrode may be lacking accompanying charging and discharging. In that case, in terms of compositional analysis, a in the case of having discharged the battery to 3 V is measured at −0.65 to 1.

If the value of α is within this range, favorable load characteristics are obtained without a significant loss of energy density per unit weight in the lithium transition metal-based compound.

Moreover, the value of δ is normally within the range of −0.5 to 0.5.

If the value of δ is within this range, stability of the crystal structure is high and a battery having an electrode fabricated using this lithium transition metal-based compound demonstrates favorable cycling characteristics and high-temperature storage characteristics.

The following provides a more detailed explanation of the chemical significance of the lithium composition in the composition of the lithium transition metal-based compound in the form of a lithium-nickel-manganese-based complex oxide.

In order to determine a and b in the aforementioned compositional formula of the lithium transition metal-based compound, each transition metal and lithium are analyzed by inductively coupled plasma atomic emission spectroscopy (ICP-AES) followed by calculating the values of a and b by determining the ratio of Li/Ni/Mn.

From a structural viewpoint, the lithium as defined by a is thought to be substituted into the same transition metal sites. Here, according to the lithium defined by a, the average valence of M and manganese is greater than a valence of 3.5 based on the principle of charge neutrality.

In addition, the aforementioned lithium transition metal-based compound may also be substituted with fluorine, and such a compound is indicated as $LiMn_2O_{4-x}F_{2x}$.

<Blending>

Specific examples of the lithium transition metal-based compound having the composition described above include $Li_{1+x}Ni_{0.5}Mn_{0.5}O_2$, $Li_{1+x}Ni_{0.85}Co_{0.10}Al_{0.05}O_2$, $Li_{1+x}Ni_{0.33}Mn_{0.33}Co_{0.33}O_2$, $Li_{1+x}Ni_{0.45}Mn_{0.45}Co_{0.1}O_2$, $Li_{1+x}Mn_{1.8}Al_{0.2}O_4$ and $Li_{1+x}Mn_{1.5}Ni_{0.5}O_4$. One type of these lithium transition metal-based compounds may be used alone or two or more types may be used by blending.

<Introduction of Foreign Elements>

In addition, the lithium transition metal-based compound may be introduced with a foreign element. The foreign element is selected from among one or more types of any of B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, I, As, Ge, P, Pb, Sb, Si and Sn. These foreign elements may be incorporated in the crystal structure of the lithium transition metal-based compound, or may be unevenly distributed as simple metals or compounds thereof on the particle surface or crystal grain boundaries without being incorporated into the crystal structure of the lithium transition metal-based compound.

[Positive Electrode for Lithium Secondary Battery]

The positive electrode for a lithium secondary battery is obtained by forming a positive electrode active material layer, which contains the aforementioned lithium transition metal-based compound as the positive electrode material of a lithium secondary battery and a binder, on a current collector.

The positive electrode active material layer is normally produced by dry-mixing a positive electrode material, binder, and as necessary, an electrically conductive material, thickener and the like, forming into a sheet and press-bonding onto a positive electrode current collector, or by dissolving or dispersing these materials in a liquid medium to form a slurry followed by coating onto a positive electrode current collector and drying.

A metal material such as aluminum, stainless steel, plated nickel, titanium or tantalum, or a carbon material such as carbon cloth or carbon paper, is normally used for the material of the positive electrode current collector. In addition, examples of the form thereof include a metal foil, metal cylinder, metal coil, metal plate, metal thin film, expanded metal mesh, punched metal or metal foam in the case of a metal material, and a carbon plate, carbon thin film or carbon cylinder in the case of a carbon material. Furthermore, a thin film may be suitably formed into the form of a mesh.

Although the thickness of a thin film is arbitrary in the case of using a thin film for the positive electrode current collector, normally it is preferably 1 μm to 100 mm. If the thin film is thinner than the aforementioned range, there is the possibility of having insufficient strength for use as a current collector, while on the other hand, if the thin film is thicker than the aforementioned range, there is the possibility of handling ease being impaired.

There are no particular limitations on the binder used to produce the positive electrode active material layer, and in the case of a coating method, the binder is only required to be a material that is stable with respect to the liquid medium used when producing the positive electrode, specific examples of which include resin-based polymers such as polyethylene, polypropylene, polyethylene terephthalate, polymethyl methacrylate, aromatic polyamide, cellulose or nitrocellulose, rubbery polymers such as styrene-butadiene rubber (SBR), acrylonitrile-butadiene rubber (NBR), fluororubber, isoprene rubber, butadiene rubber or ethylene-propylene rubber, thermoplastic elastomer-like polymers such as styrene-butadiene-styrene block copolymer and hydrogenated forms thereof, ethylene-propylene-diene tertiary polymer (EPDM), styrene-ethylene-butadiene-ethylene copolymer or styrene-isoprene-styrene block copolymer and hydrogenated forms thereof, soft resin-like polymers such as syndiotactic 1,2-polybutadiene, polyvinyl acetate, ethylene-vinyl acetate copolymer or propylene-α-olefin copolymer, fluorine-based polymers such as polyvinylidene fluoride, polytetrafluoroethylene, fluorinated polyvinylidene fluoride or polytetrafluoroethylene-ethylene copolymer, and polymer compositions having ionic conductivity of alkaline metal ions (and particularly lithium ions). Furthermore, one type of these substances may be used alone or two or more types may be used in an arbitrary combination and ratio.

The proportion of binder in the positive electrode active material layer is normally 0.1% by weight to 80% by weight. If the proportion of binder is excessively low, the positive electrode active material is unable to be adequately retained and mechanical strength of the positive electrode is inadequate, thereby resulting in the possibility of exacerbation of battery performance in terms of cycling characteristics and the like, while on the other hand, if the proportion of binder is excessively high, there is the possibility of this leading to a decrease in battery capacity and electrical conductivity.

The positive electrode active material layer normally contains an electrically conductive material in order to enhance electrical conductivity. There are no particular limitations on the type thereof, and specific examples thereof include metal materials such as copper or nickel and carbon materials such as amorphous carbon in the form of graphite such as natural graphite or artificial graphite, carbon black such as acetylene black and needle coke. Furthermore, one type of these substances may be used alone or two or more types may be used in an arbitrary combination and ratio. The proportion of electrically conductive material in the positive electrode active material layer is normally 0.01% by weight to 50% by weight. If the proportion of electrically conductive material is excessively low, electrical conductivity may be inadequate, while conversely, if the proportion thereof is excessively high, battery capacity may decrease.

There are no particular limitations on the type of liquid medium used to form the slurry provided it is a solvent that is able to dissolve or disperse the positive electrode material in the form of the lithium transition metal-based compound powder, binder, and as necessary, the electrically conductive material and thickener, and an aqueous solvent or organic solvent may be used. Examples of aqueous solvents include water and alcohols, while examples of organic solvents include N-methylpyrrolidone (NMP), dimethylformamide, dimethylacetoamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphoramide, dimethylsulfoxide, benzene, xylene, quinoline, pyridine, methyl naphthalene and hexane. In the case of using an aqueous solvent in particular, a dispersant is added together with a thickener followed by forming a slurry by using latex rubber such as SBR. Furthermore, one type of these solvents may be used alone or two or more types may be used in an arbitrary combination and ratio.

The content ratio of the lithium transition metal-based compound powder used as a positive electrode material in the positive electrode active material layer is normally 10% by weight to 99.9% by weight. If the proportion of lithium transition metal-based compound powder in the positive electrode active material layer is excessively high, the strength of the positive electrode tends to be inadequate, while if the proportion thereof is excessively low, capacity may be inadequate.

In addition, the thickness of the positive electrode active material layer is normally about 10 μm to 200 km.

Current density after pressing the positive electrode is normally 2.2 $g/cm^3$ to 4.2 $g/cm^3$.

Furthermore, a positive electrode active material layer obtained by coating and drying is preferably consolidated with a roller press and the like in order to increase packing density of the positive electrode active material.

The positive electrode for a lithium secondary battery can be produced in this manner.

2-3. Separator

Generally, a separator is interposed between a positive electrode and a negative electrode in order to prevent a short circuit. In this case, the nonaqueous electrolytic solution of the present invention 1 is generally used with this separator being impregnated in the electrolytic solution.

The material and shape of the separator are not particularly limited and known ones can be arbitrarily adopted as long as the effects of the present invention 1 are not significantly impaired. Among others, a resin, a glass fiber, an inorganic material or the like which is made from a material stable to the nonaqueous electrolytic solution of the present invention 1 is used, and an object having a form of a porous sheet or a nonwoven fabric or the like which has excellent liquid retentivity is preferably used.

As the material of the resin and the glass fiber separators, for example, polyolefin such as polyethylene and polypropylene, aromatic polyamide, polytetrafluoroethylene, polyethersulfone, glass filter or the like can be used. Particularly preferred are a glass filter and a polyolefin, and further preferred is polyolefin. One of these materials may be used alone, or two or more of them may be used in any combination and in any ratio.

Although the thickness of the separator is arbitrary, it is generally 1 µm or more, preferably 5 µm or more, and further preferably 10 µm or more, and it is generally 50 µm or less, preferably 40 µm or less, and further preferably 30 µm or less. If the separator is thinner than the above-mentioned range, insulation properties and mechanical strength may be decreased. In addition, if the thickness is larger than the above-mentioned range, not only the battery performance such as rate characteristics may be deteriorated, but also the energy density of the nonaqueous electrolytic solution secondary battery as a whole may be decreased.

Further, when a porous object such as a porous sheet or a nonwoven fabric is used as a separator, the porosity of the separator is arbitrary, but it is generally 20% or more, preferably 35% or more, and more preferably 45% or more, and furthermore, generally 90% or less, preferably 85% or less, and more preferably 75% or less. If the porosity is smaller than the above-mentioned range, the film resistance is increased and the rate characteristics tend to be deteriorated. And, if the porosity is larger than the above-mentioned range, the mechanical strength of the separator is decreased and the insulation tends to be decreased.

In addition, the average pore diameter of the separator is also arbitrary, and it is generally 0.5 µm or less and preferably 0.2 µm or less, and furthermore, generally 0.05 µm or more. If the average pore diameter exceeds the above-mentioned range, a short circuit tends to be caused. And, if the average pore diameter is below the above-mentioned range, the film resistance is increased and the rate characteristics may be decreased.

On the other hand, for the inorganic material, oxide such as alumina or silicon dioxide, nitride such as aluminium nitride or silicon nitride, or sulfate such as barium sulfate and calcium sulfate is used, and one in particle shape or fiber shape is used.

As the form, one having a thin film shape such as a nonwoven fabric, a woven fabric and a microporous film is used. For the thin film shape, one having a pore diameter of 0.01 to 1 µm and a thickness of 5 to 50 µm is preferably used. In addition to the above-mentioned independent thin film shape, a separator obtained by forming a composite porous layer containing the inorganic particle described above on the surface layer of the positive electrode and/or the negative electrode using a binder made of a resin can be used. For example, such separator is obtained by forming a porous layer on both surfaces of a positive electrode using alumina particles having a 90% particle diameter of less than 1 µm and fluororesin which is a binder.

The characteristics of the separator in a nonaqueous electrolytic solution secondary battery can be grasped by the Gurley value. The Gurley value indicates the difficulty of allowing air to pass through in the film thickness direction and is represented by the number of seconds needed to allow 100 ml of air to pass through the film, so the smaller the numerical value is, the easier the air passes through, and the larger the numerical value is, the more difficult the air passes through. That is, it means that the smaller the numerical value is, the better the communication property in the film thickness direction is, and the larger the numerical value is, the poorer the communication property in the film thickness direction is. The communication property is a degree of connection of the pores in the film thickness direction. If the Gurley value of the separator of the present invention 1 is low, it can be used for various purposes. For example, in a case where the separator is used for a nonaqueous lithium secondary battery, the low Gurley value is preferable because it means easy movement of lithium ions and therefore the battery performance is excellent. A Gurley value of a separator is arbitrary, but is preferably 10 to 1000 sec/100 ml, more preferably 15 to 800 sec/100 ml, and further preferably 20 to 500 sec/100 ml. When the Gurley value is 1000 sec/100 ml or less, the electric resistance is substantially low, which is preferable for a separator.

2-4. Battery Design

<Electrode Group>

The electrode group may be one having either of a laminate structure in which the separator described above is interposed between the positive electrode plate and the negative electrode plate described above and a structure in which the positive electrode plate and the negative electrode plate described above are spirally wound with the separator interposed therebetween. The ratio of the volume of the electrode group to the volume inside the battery (hereinafter referred to as an electrode group occupancy rate) is generally 40% or more and preferably 50% or more, and further, generally 90% or less and preferably 80% or less.

When the electrode group occupancy rate is below the above-mentioned range, the battery capacity is decreased. In addition, when the rate exceeds the above-mentioned range, the void space is small and the battery reaches a high temperature, which cause the expansion of the members and the increased vapor pressure of the liquid component of the electrolyte, so that the internal pressure is raised, various properties as a battery such as the charge/discharge repetitive performance or high temperature storage are decreased, and furthermore, a gas discharge valve which releases the internal pressure to the outside may be operated.

<Exterior Case>

A material of an exterior case is not particularly limited as long as it is a material that is stable to the nonaqueous electrolytic solution to be used. Specifically, metals such as a nickel-plated steel plate, stainless steel, aluminum or an aluminum alloy and magnesium alloy, or a laminate film of resin and aluminum foil is used. From the viewpoint of weight reduction, a metal such as aluminum or aluminum alloy, or a laminate film is preferably used.

The exterior case made with metals includes one having a hermetically sealed structure obtained by welding metals together by laser welding, resistance welding, or ultrasonic welding, or one having a caulked structure obtained by using a resin gasket between the above-mentioned metals. The exterior case made with the above-mentioned laminate film includes one having a hermetically sealed structure obtained by thermally fusing resin layers together. In order to improve the sealing property, a resin different from the resin used for a laminate film may be interposed between the above-mentioned resin layers. In particular, in a case where the resin layer is thermally fused through the collector terminal to form a sealed structure, since it is a joint of a metal and a resin, a resin having a polar group or a modified resin in which a polar group is introduced is preferably used as the intervening resin.

<Protection Element>

A PTC (Positive Temperature Coefficient) thermistor which increases resistance when heat is produced abnormally or excessive current flows, a thermal fuse, a valve which cuts off the current flowing in the circuit due to the rapid rise of the internal pressure of the battery and the internal temperature during abnormal heat generation (a current cutoff valve), or the like can be used as a protection element. It is preferable to select the protective element described above which does not operate under normal use of a high current, and it is more preferable to make a design which does not cause abnormal heat generation or thermal runaway without any protective element.

(Exterior Body)

The nonaqueous electrolytic solution secondary battery of the present invention 1 is generally constructed by housing the nonaqueous electrolytic solution, the negative electrode, the positive electrode, the separator and the like as described above in an exterior body (exterior case). There is no limitation on this exterior body, and any known one can be arbitrarily adopted as long as the effects of the present invention 1 are not significantly impaired.

A material of the exterior case is not particularly limited as long as it is a material that is stable to the nonaqueous electrolytic solution to be used. Specifically, metals such as a nickel-plated steel plate, stainless steel, aluminum or aluminum alloy, magnesium alloy, nickel, and titanium, or a laminate film of resin and aluminum foil is used. From the viewpoint of weight reduction, a metal such as aluminum or aluminum alloy, or a laminate film is preferably used.

The exterior case made with above-mentioned metals includes one having a hermetically sealed structure obtained by welding metals together by laser welding, resistance welding, or ultrasonic welding, or one having a caulked structure obtained by using a resin gasket between the above-mentioned metals. The exterior case made with the above-mentioned laminate film includes one having a hermetically sealed structure obtained by thermally fusing resin layers together. In order to improve the sealing property, a resin different from the resin used for a laminate film may be interposed between the above-mentioned resin layers. In particular, in a case where the resin layer is thermally fused through the collector terminal to form a sealed structure, since it is a joint of a metal and a resin, a resin having a polar group or a modified resin in which a polar group is introduced is preferably used as the intervening resin.

In addition, the shape of the exterior case is also arbitrary, and it may be any of a cylindrical shape, a square shape, a laminate shape, a coin shape, a large size, and the like, for example.

EXAMPLES

The present invention 1 is explained more specifically below with reference to Examples and Comparative Examples, but the present invention 1 is not limited to these Examples.

Abbreviations of the compounds used in the examples are shown below.

[Chemical Formula 13]

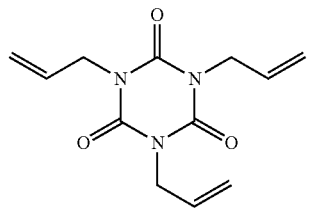

Compound 1-1

Triallyl isocyanurate

[Chemical Formula 14]

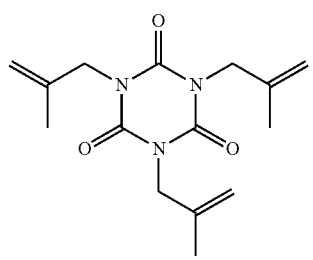

Compound 1-2

Trimethallyl isocyanurate

[Chemical Formula 15]

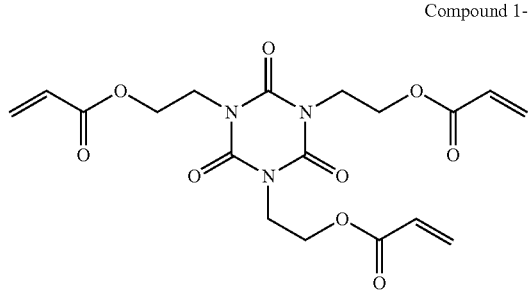

Compound 1-3

Tris(2-acryloyloxyethyl)isocyanurate

[Chemical Formula 16]

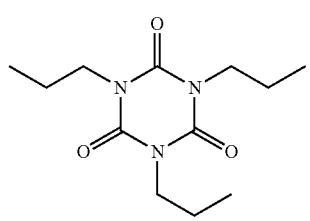

Compound 1-4

Tripropyl isocyanurate

Examples 1-1-1 to 1-1-5 and Comparative Examples 1-1-1 to 1-1-3

[Production of Positive Electrode]

85% by mass of lithium-nickel-cobalt-manganese composite oxide (NMC) as a positive-electrode active material, 10% by mass of acetylene black as a conductive material and 5% by mass of polyvinylidene fluoride (PVdF) as a binder were mixed in a N-methylpyrrolidone solvent with a disperser to form a slurry. This was uniformly applied on both sides of an aluminum foil having a thickness of 21 μm, and the foil was dried and subsequently pressed to make a positive electrode.

[Production of Negative Electrode]

50 g of Si fine particles having an average particle diameter of 0.2 μm was dispersed in 2000 g of scaly graphite having an average particle diameter of 35 μm, and the dispersion was put into a hybridization system (manufactured by Nara Machinery Co., Ltd.) and treated by being circulated or stayed in the device at a rotor speed of 7000 rpm for 180 seconds to obtain a complex of Si and graphite particles. The obtained composite was mixed with coal tar pitch as an organic compound which becomes a carbonaceous material so that the coverage after firing was 7.5%, and the resultant mixture was kneaded and dispersed by a biaxial kneader. The obtained dispersion was introduced into a firing furnace and fired at 1000° C. for 3 hours under a nitrogen atmosphere. The resultant fired product was further pulverized with a hammer mill, and subsequently sieving (45 μm) was carried out to produce a negative-electrode active material. The silicon element content, average particle diameter d50, tap density and specific surface area which were measured by the above-described measurement method were 2.0% by mass, 20 m, 1.0 g/cm$^3$, and 7.2 m$^2$/g, respectively.

To the negative-electrode active material were added an aqueous dispersion of carboxymethylcellulose sodium (the concentration of carboxymethylcellulose sodium: 1% by mass) and an aqueous dispersion of styrene-butadiene rubber (the concentration of styrene-butadiene rubber: 50% by mass) as a thickening agent and a binder, respectively, and the mixture was mixed with a disperser to form a slurry. This slurry was uniformly applied on one side of a copper foil having a thickness of 10 m, and the foil was dried and subsequently pressed to obtain a negative electrode. In addition, the dried negative electrode was produced so as to have a mass ratio of a negative electrode active material: carboxymethylcellulose sodium:styrene-butadiene rubber=97.5:1.5:1.

[Preparation of Nonaqueous Electrolytic Solution]

To a solution made by dissolving sufficiently dried LiPF6 at 1 mol/L (as a concentration in the nonaqueous electrolytic solution) in a mixture of ethylene carbonate (EC) and diethyl carbonate (DEC) (volume capacity ratio 3:7) under a dry argon atmosphere (this is referred to as a reference electrolytic solution 1) were further added vinylene carbonate (VC) and fluoroethylene carbonate (MFEC) at 2.0% by mass each (this is referred to as a reference electrolytic solution 2). Compounds 1-1 to 1-4 were added at the ratios shown in Table 1-1 below to the whole reference electrolytic solution 2 in Examples 1-1-1 to 1-1-4 and Comparative Examples 1-1-1 and 1-1-2 and to the whole reference electrolytic solution 1 in Example 1-1-5 and Comparative Example 1-1-3, to prepare a nonaqueous electrolytic solution. However, Comparative Example 1-1-1 and Comparative Example 1-1-3 are the reference electrolytic solution 2 and the reference electrolytic solution 1 themselves, respectively.

[Manufacture of Nonaqueous Electrolytic Solution Secondary Battery (Laminate Type)]

The above-described positive electrode, negative electrode, and polyolefin separator were laminated in the order of the negative electrode, the separator, and the positive electrode. The battery element thus obtained was wrapped with an aluminum laminate film, the above-described nonaqueous electrolytic solution was injected, and vacuum sealing was carried out, to produce a sheet-like nonaqueous electrolytic solution secondary battery.

<Evaluation of Nonaqueous Electrolytic Solution Secondary Battery>

[High Temperature Cycle Test]

In a thermostatic chamber at 25° C., a nonaqueous electrolytic solution secondary battery of a laminate type cell was charged at a constant current-constant voltage to 4.0 V with a current corresponding to 0.05 C. After that, the battery was discharged to 2.5 V at 0.05 C. Subsequently, the battery was CC-CV charged to 4.0 V at 0.2 C and then discharged to 2.5 V at 0.2 C to stabilize the non-aqueous electrolytic solution secondary battery. After that, the battery was CC-CV charged to 4.2 V at 0.2 C and then discharged to 2.5 V at 0.2 C to perform initial conditioning.

The cell after the initial conditioning was subjected to 100 cycles with one cycle consisting of CCCV charging at 0.5 C to 4.2 V in a thermostatic chamber at 45° C. and then discharging to 2.5 V with a constant current of 0.5 C (High temperature cycle test). The capacity at the 100th cycle was taken as a "capacity after 100 cycles". Also, the thickness of the battery after the initial conditioning was measured and then the high temperature cycle test was carried out (100 cycles). After that, the change in the thickness of the battery was measured in the same manner as after the initial conditioning, and the change in the electrode thickness of the battery due to the cycle charge and discharge was taken as a "battery swelling".

In Table 1-1 below, the capacity after 100 cycles and the battery swelling are shown, which were compared to the values of Comparative example 1-1-1 and Comparative Example 1-1-3 as standards in Examples 1-1-1 to 1-1-4 and Example 1-1-5, respectively.

TABLE 1-1

| | Electrolytic solution | Additive agent I | Additive amount (wt %) | Additive agent II | Additive amount (wt %) | Additive agent III | Additive amount (wt %) | Capacity after 100 cycles (%) | Battery swelling (%) |
|---|---|---|---|---|---|---|---|---|---|
| Example 1-1-1 | 1M LiPF$_6$ EC/DEC = 3/7 | VC | 2.0 | MFEC | 2.0 | Compound 1-1 | 0.5 | 108 | 83 |
| Example 1-1-2 | | VC | 2.0 | MFEC | 2.0 | | 1.0 | 111 | 89 |
| Example 1-1-3 | | VC | 2.0 | MFEC | 2.0 | Compound 1-3 | 0.5 | 106 | 88 |
| Example 1-1-4 | | VC | 2.0 | MFEC | 2.0 | Compound 1-2 | 0.5 | 103 | 86 |
| Comp. Ex. 1-1-1 | | VC | 2.0 | MFEC | 2.0 | — | — | 100 | 100 |
| Comp. Ex. 1-1-2 | | VC | 2.0 | MFEC | 2.0 | Compound 1-4 | 0.5 | 101 | 95 |
| Comp. Ex. 1-1-5 | | — | — | — | — | Compound 1-1 | 0.5 | 156 | 81 |

TABLE 1-1-continued

|  | Electrolytic solution | Additive agent I | Additive amount (wt %) | Additive agent II | Additive amount (wt %) | Additive agent III | Additive amount (wt %) | Capacity after 100 cycles (%) | Battery swelling (%) |
|---|---|---|---|---|---|---|---|---|---|
| Comp. Ex. 1-1-3 |  | — | — | — | — | — | — | 100 | 100 |

As shown in Table 1-1, in comparison to the value 100 of the capacity after 100 cycles of the nonaqueous electrolytic solution secondary batteries in which any compound having a specific structure was not added to the nonaqueous electrolytic solution (Comparative Examples 1-1-1 and 1-1-3), all of the numerical values of the capacity after 100 cycles of the nonaqueous electrolytic solution secondary batteries of Examples 1-1-1 to 1-1-5 exceeded the values of the Comparative Examples. In addition, in comparison to 100% of the battery swelling of the nonaqueous electrolytic solution secondary batteries in which any compound having a specific structure was not added to the nonaqueous electrolytic solution (Comparative Examples 1-1-1 and 1-1-3), all of the numerical values of the battery swelling of the nonaqueous electrolytic solution secondary batteries of Examples 1-1-1 to 1-1-5 were lower than the values of Comparative Examples. It can be seen from Table 1-1 that a nonaqueous electrolytic solution secondary battery comprising a positive electrode, a negative electrode including a negative electrode active material containing metal particles capable of alloying with Li and graphite particles, and a nonaqueous electrolytic solution to which a compound having a structure represented by the formula (A) has been added improves the cycle characteristics and the battery swelling.

Examples 1-2-1 to 1-2-2 and Comparative Example 1-2-1

[Production of Positive Electrode]

A positive electrode was produced in the same manner as in Example 1-1.

[Production of Negative Electrode]

In addition to the negative electrode active material produced in Example 1-1, negative electrode active materials 1-1 to 1-3 having various Si contents shown in Table 1-2 were produced in the same manner. The negative electrode active material 1-1 is the active material itself used in Example 1-1. The Si content is the mass concentration (% by mass) of the Si fine particles with respect to the total of Si fine particles and graphite particles (100% by mass).

TABLE 1-2

|  | Si content wt % | Average particle diameter (d50) μm | Tap density g/cm$^3$ | Specific surface area m$^2$/g |
|---|---|---|---|---|
| Negative electrode active material 1-1 | 2.0 | 20 | 1.0 | 7.2 |
| Negative electrode active material 1-2 | 12.0 | 17 | 1.1 | 6.3 |
| Negative electrode active material 1-3 | 17.0 | 20 | 1.1 | 8.1 |

To the negative-electrode active material were added an aqueous dispersion of carboxymethylcellulose sodium (the concentration of carboxymethylcellulose sodium: 1% by mass) and an aqueous dispersion of styrene-butadiene rubber (the concentration of styrene-butadiene rubber: 50% by mass) as a thickening agent and a binder, respectively, and the mixture was mixed with a disperser to form a slurry. This slurry was uniformly applied on one side of a copper foil having a thickness of 10 μm, and the foil was dried and subsequently pressed to obtain a negative electrode. In addition, the dried negative electrode was produced so as to have a mass ratio of a negative electrode active material: carboxymethylcellulose sodium:styrene-butadiene rubber=97.5:1.5:1.

[Preparation of Nonaqueous Electrolytic Solution]

The reference electrolytic solution 2 used in Example 1-1 was used. in Examples 1-2-1 to 1-2-2 and Comparative Example 1-2-1, Compound 1-1 was added at the ratio shown in Table 1-3 below to the whole reference electrolytic solution 2 to prepare nonaqueous electrolytic solutions. However, Comparative Example 1-2-1 is the reference electrolytic solution 2 itself.

[Manufacture of Nonaqueous Electrolytic Solution Secondary Battery (Laminate Type)]

The above-described positive electrode, negative electrode, and polyolefin separator were laminated in the order of the negative electrode, the separator, and the positive electrode. The battery element thus obtained was wrapped with an aluminum laminate film, the above-described non-aqueous electrolytic solution was injected, and vacuum sealing was carried out, to produce a sheet-like nonaqueous electrolytic solution secondary battery.

<Evaluation of Nonaqueous Electrolytic Solution Secondary Battery>

[High Temperature Storage Test]

In a thermostatic chamber at 25° C., a nonaqueous electrolytic solution secondary battery of a laminate type cell was charged at a constant current-constant voltage to 4.0 V with a current corresponding to 0.05 C. After that, the battery was discharged to 2.5 V at 0.05 C. Subsequently, the battery was CC-CV charged to 4.0 V at 0.2 C, then discharged to 2.5 V at 0.2 C, CC-CV charged to 4.2 V at 0.2 C, and then discharged to 2.5 V at 0.2 C to stabilize the non-aqueous electrolytic solution secondary battery. After that, the battery was CC-CV charged at 0.2 C to 4.3 V and then discharged to 2.5 V at 0.2 C to perform initial conditioning.

The cell after the initial conditioning was again CC-CV charged to 4.3 V at 0.2 C and stored at high temperature under the conditions of 60° C. and 168 hours. The battery was sufficiently cooled and subsequently immersed in an ethanol bath to measure the volume. The amount of generated gas was determined from the volume change before and after the storage test, and this was taken as a "storage gas amount". In addition, the battery was discharged to 2.5 V at 25° C. at 0.2 C, and the capacity after the evaluation of high-temperature storage characteristics was determined, and this was taken as a "0.2 C capacity after storage". Subsequently, the battery was CC-CV charged at 0.2 C to 4.3 V and then discharged to 2.5 V at 0.2 C·1.0 C, and the obtained ratio of 0.2 C·1.0 C capacity (1.0 C/0.2 C) was taken as a "1.0 C/0.2 C load after storage".

Table 1-3 below shows numerical values of the storage gas amount, 0.2 C capacity after storage, and 1.0 C/0.2 C load after storage of each battery having the negative electrode active material of the predetermined Si content in Examples 1-2-1 to 1-2-2, which were determined with respect to the storage gas amount, 0.2 C capacity after storage, and 1.0 C/0.2 C load after storage of the nonaqueous electrolytic solution secondary battery with the reference electrolytic solution 2 itself of Comparative Example 1-2-1 which were set at 100.

TABLE 1-3

|  | Electrolytic solution | Additive agent | Additive amount (wt %) | Storage gas amount (%) | | | 0.2 C capacity after storage (%) | | | 1.0 C/0.2 C load after storage (%) | | |
| --- | --- | --- | --- | --- | --- | --- | --- | --- | --- | --- | --- | --- |
|  |  |  |  | Type of negative electrode active material | | | | | | | | |
|  |  |  |  | 1-1 | 1-2 | 1-3 | 1-1 | 1-2 | 1-3 | 1-1 | 1-2 | 1-3 |
| Example 1-2-1 | 1M LiPF$_6$ EC/DEC = 3/7 + 2.0% VC + 2.0% MFEC | Compound 1-1 | 0.5 | 41 | 54 | 63 | 102 | 101 | 101 | 98.9 | — | — |
| Example 1-2-2 |  |  | 1.0 | — | 37 | 42 | — | 102 | 101 | — | — | — |
| Comp. Ex. 1-1-1 |  | — | — | 100 | 100 | 100 | 100 | 100 | 100 | 100 | 100 | 100 |

Comparative Examples 1-3-1 to 1-3-3

[Production of Positive Electrode]

A positive electrode was produced in the same manner as in Example 1-1.

[Production of Negative Electrode]

A negative electrode in which the mass concentration of Si fine particles is 0% by mass with respect to the total of Si fine particles and graphite particles (100% by mass).

To the negative-electrode active material (natural graphite) were added an aqueous dispersion of carboxymethylcellulose sodium (the concentration of carboxymethylcellulose sodium: 1% by mass) and an aqueous dispersion of styrene-butadiene rubber (the concentration of styrene-butadiene rubber: 50% by mass) as a thickening agent and a binder, respectively, and the mixture was mixed with a disperser to form a slurry. This slurry was uniformly applied on one side of a copper foil having a thickness of 10 µm, and the foil was dried and subsequently pressed to obtain a negative electrode. In addition, the dried negative electrode was produced so as to have a mass ratio of a negative electrode active material:carboxymethylcellulose sodium: styrene-butadiene rubber=97.5:1.5:1.

A negative electrode in which the mass concentration of Si fine particles is 100% by mass with respect to the total of Si fine particles and graphite particles (100% by mass).

As a negative electrode active material, a silicon powder and a graphite powder (conductive material) were mixed with a binder, an N-methylpyrrolidone solution was added to the mixture, and the mixture was mixed with a disperser to form a slurry. The slurry obtained was uniformly applied on a copper foil having a thickness of 20 µm as a negative electrode current collector to form a negative electrode, and the negative electrode was cut out so that the active material has a width of 30 mm and a length of 40 mm. In addition, this negative electrode was used after drying under reduced pressure at 60° C. for 12 hours.

[Preparation of Nonaqueous Electrolytic Solution]

The reference electrolytic solution 2 used in Example 1-1 was used. In Comparative Examples 1-3-1 to 1-3-3, Compound 1-1 was added at the ratio shown in Table 1-4 below to the whole reference electrolytic solution 2, to prepare an electrolytic solution. However, Comparative Example 1-3-3 is the reference electrolytic solution 2 itself.

[Manufacture of Nonaqueous Electrolytic Solution Secondary Battery (Laminate Type)]

The above-described positive electrode, negative electrode, and polyolefin separator were laminated in the order of the negative electrode, the separator, and the positive electrode. The battery element thus obtained was wrapped with an aluminum laminate film, the above-described nonaqueous electrolytic solution was injected, and vacuum sealing was carried out, to produce a sheet-like nonaqueous electrolytic solution secondary battery.

<Evaluation of Nonaqueous Electrolytic Solution Secondary Battery>

[High Temperature Storage Test]

In a thermostatic chamber at 25° C., a nonaqueous electrolytic solution secondary battery of a laminate type cell was charged at a constant current-constant voltage to 4.0 V with a current corresponding to 0.05 C. After that, the battery was discharged to 2.5 V at 0.05 C. Subsequently, the battery was CC-CV charged to 4.0 V at 0.2 C, then discharged to 2.5 V at 0.2 C, CC-CV charged to 4.2 V at 0.2 C, and then discharged to 2.5 V at 0.2 C to stabilize the non-aqueous electrolytic solution secondary battery. After that, the battery was CC-CV charged at 0.2 C to 4.3 V and then discharged to 2.5 V at 0.2 C to perform initial conditioning.

The cell after the initial conditioning was again CC-CV charged to 4.3 V at 0.2 C and stored at high temperature under the conditions of 60° C. and 168 hours. The battery was sufficiently cooled and subsequently immersed in an ethanol bath to measure the volume. The amount of generated gas was determined from the volume change before and after the storage test, and this was taken as a "storage gas amount". In addition, the battery was discharged to 2.5 V at 25° C. at 0.2 C, and the capacity after the evaluation of high-temperature storage characteristics was determined, and this was taken as a "0.2 C capacity after storage". Subsequently, the battery was CC-CV charged at 0.2 C to 4.3 V and then discharged to 2.5 V at 0.2 C·1.0 C, and the obtained ratio of 0.2 C·1.0 C capacity (1.0 C/0.2 C) was taken as a "1.0 C/0.2 C load after storage".

Table 1-4 below shows numerical values of the storage gas amount, 0.2 C capacity after storage, and 1.0 C/0.2 C load after storage of each battery having the negative electrode active material of the predetermined Si content in Comparative Examples 1-3-1 to 1-3-2, which were determined with respect to the storage gas amount, 0.2 C capacity after storage, and 1.0 C/0.2 C load after storage of the nonaqueous electrolytic solution secondary battery with the reference electrolytic solution 2 itself of Comparative Example 1-3-3 which were set at 100.

negative electrode was produced so as to have a mass ratio of a negative electrode active material:carboxymethylcellulose sodium:styrenebutadiene rubber=97.5:1.5:1.
[Preparation of Nonaqueous Electrolytic Solution]
The reference electrolytic solution 2 used in Example 1-1 was used. In Examples 1-4-1 to 1-4-3, Compounds 1-1 to

TABLE 1-4

| | Electrolytic solution | Additive agent | Additive amount (wt %) | Storage gas amount (%) Si content (wt %) | | 0.2 C capacity after storage (%) Si content (wt %) | | 1.0 C/0.2 C load after storage (%) Si content (wt %) | |
|---|---|---|---|---|---|---|---|---|---|
| | | | | 0.0 | 100.0 | 0.0 | 100.0 | 0.0 | 100.0 |
| Comp. Ex. 1-3-1 | 1M LiPF$_6$ EC/DEC = 3/7 + 2.0% VC + 2.0% MFEC | Compound 1-1 | 0.5 | 76 | 76 | 102 | 99 | 103 | 103 |
| Comp. Ex. 1-3-2 | | | 1.0 | 56 | 76 | 95 | 98 | — | — |
| Comp. Ex. 1-3-3 | | — | — | 100 | 100 | 100 | 100 | 100 | 100 |

As shown in Table 1-3, in comparison to each value 100 of the storage gas amount, 0.2 C capacity after storage and 1.0 C/0.2 C load after storage of the nonaqueous electrolytic solution secondary battery in which any compound having a specific structure was not added to the nonaqueous electrolytic solution (Comparative Example 1-2-1), all of the numeral values of the storage gas amount, 0.2 C capacity after storage and 1.0 C/0.2 C load after storage of the nonaqueous electrolytic solution secondary battery of Example 1-2-1 were improved. It can be seen from Table 1-3 that a nonaqueous electrolytic solution secondary battery comprising a positive electrode, a negative electrode including a negative-electrode active material containing metal particles capable of alloying with Li and graphite particles, and a nonaqueous electrolytic solution to which a compound having a structure represented by the formula (A) has been added improves output characteristics, load characteristics, and high temperature storage characteristics. In particular, because the improved effect is higher compared to the case of using a negative electrode in which the mass concentration of Si fine particles is 0, 100% by mass with respect to the total of Si fine particles and graphite particles shown in Table 1-4 (100% by mass), it is considered that a synergistic effect by using a negative electrode active material with a combination of Si fine particles and graphite particles has been generated.

Examples 1-4-1 to 1-4-3 and Comparative Example 1-4-1

[Production of Positive Electrode]
A positive electrode was produced in the same manner as in Example 1-1.
[Production of Negative Electrode]
To the negative-electrode active material (graphite:SiO=95:5, 90:10; mass ratio) were added an aqueous dispersion of carboxymethylcellulose sodium (the concentration of carboxymethylcellulose sodium: 1% by mass) and an aqueous dispersion of styrene-butadiene rubber (the concentration of styrene-butadiene rubber: 50% by mass) as a thickening agent and a binder, respectively, and the mixture was mixed with a disperser to form a slurry. This slurry was uniformly applied on one side of a copper foil having a thickness of 10 μm, and the foil was dried and subsequently pressed to obtain a negative electrode. In addition, the dried 1-3 were added at the ratio shown in Table 1-5 below to the whole reference electrolytic solution 2 to prepare nonaqueous electrolytic solutions. Comparative Example 1-4-1 is the reference electrolytic solution 2 itself.
[Manufacture of Nonaqueous Electrolytic Solution Secondary Battery (Laminate Type)]
The above-described positive electrode, negative electrode, and polyolefin separator were laminated in the order of the negative electrode, the separator, and the positive electrode. The battery element thus obtained was wrapped with an aluminum laminate film, and the above-described nonaqueous electrolytic solution was injected, and vacuum sealing was carried out, to produce a sheet-like nonaqueous electrolytic solution secondary battery.
<Evaluation of Nonaqueous Electrolytic Solution Secondary Battery>
[High Temperature Cycle Test]
In a thermostatic chamber at 25° C., a nonaqueous electrolytic solution secondary battery of a laminate type cell was charged at a constant current-constant voltage to 4.0 V with a current corresponding to 0.05 C. After that, the battery was discharged to 2.5 V at 0.05 C. Subsequently, the battery was CC-CV charged to 4.0 V at 0.2 C, then discharged to 2.5 V at 0.2 C, CC-CV charged to 4.2 V at 0.2 C, and then discharged to 2.5 V at 0.2 C to stabilize the non-aqueous electrolytic solution secondary battery. After that, the battery was CC-CV charged at 0.2 C to 4.3 V and then discharged to 2.5 V at 0.2 C to perform initial conditioning.

The thickness of the battery after the initial conditioning was measured, and subsequently the cell was subjected to 100 cycles with one cycle consisting of CCCV charging at 0.5 C to 4.2 V in a thermostatic chamber at 45° C. and then discharging to 2.5 V with a constant current of 0.5 C. After that, the change in the thickness of the battery was measured in the same manner as after the initial conditioning, and the change in the electrode thickness of the battery due to the cycle charge and discharge was taken as a "battery swelling".

Table 1-5 below shows numerical values of the battery swelling after the high temperature cycle of each battery having the negative electrode active material of the predetermined SiO content in Examples 1-4-1 to 1-4-3 which were determined with respect to the battery swelling at the high temperature cycle of the nonaqueous electrolytic solution secondary battery with the reference electrolytic solution 2 itself of Comparative Example 1-4-1 which were set at 100.

TABLE 1-5

|  | Electrolytic solution | Additive Agent | Additive amount (wt %) | Battery swelling (%) SiO content (wt %) | |
|---|---|---|---|---|---|
|  |  |  |  | 5.0 | 10.0 |
| Example 1-4-1 | 1M LiPF$_6$ | Compound 1-1 | 0.5 | 77 | 84 |
| Example 1-4-2 | EC/DEC = 3/7 + | Compound 1-2 | 0.5 | 89 | 89 |
| Example 1-4-3 | 2.0% VC + | Compound 1-3 | 0.5 | 91 | — |
| Comp. Ex. 1-4-1 | 2.0% MFEC | — | — | 100 | 100 |

Comparative Examples 1-5-1 to 1-5-3

[Production of Positive Electrode]

A positive electrode was produced in the same manner as in Example 1-1.

[Production of Negative Electrode]

A negative electrode was produced in the same manner as Comparative Example 1-3 by using the negative electrode active material used in Comparative Example 1-3 in which the mass concentration of Si fine particles is 0% by mass with respect to the total of Si fine particles and graphite particles (100% by mass).

[Preparation of Nonaqueous Electrolytic Solution]

The reference electrolytic solution 2 used in Example 1-1 was used. In Comparative Examples 1-5-1 to 1-5-2, Compound 1-1 was added at the ratio shown in Table 1-6 below to the whole reference electrolytic solution 2 to prepare a nonaqueous electrolytic solution. However, Comparative Example 1-5-3 is the reference electrolytic solution 2 itself.

[Manufacture of Nonaqueous Electrolytic Solution Secondary Battery (Laminate Type)]

The above-described positive electrode, negative electrode, and polyolefin separator were laminated in the order of the negative electrode, the separator, and the positive electrode. The battery element thus obtained was wrapped with an aluminum laminate film, and the above-described nonaqueous electrolytic solution was injected, and vacuum sealing was carried out, to produce a sheet-like nonaqueous electrolytic solution secondary battery.

<Evaluation of Nonaqueous Electrolytic Solution Secondary Battery>

[High Temperature Cycle Test]

In a thermostatic chamber at 25° C., a nonaqueous electrolytic solution secondary battery of a laminate type cell was charged at a constant current-constant voltage to 4.0 V with a current corresponding to 0.05 C. After that, the battery was discharged to 2.5 V at 0.05 C. Subsequently, the battery was CC-CV charged to 4.0 V at 0.2 C and then discharged to 2.5 V at 0.2 C to stabilize the nonaqueous electrolytic solution secondary battery. After that, the battery was CC-CV charged at 0.2 C to 4.2 V and then discharged to 2.5 V at 0.2 C to perform initial conditioning.

The cell after the initial conditioning was subjected to 100 cycles with one cycle consisting of CCCV charging at 0.5 C to 4.2 V in a thermostatic chamber at 45° C. and then discharging to 2.5 V with a constant current of 0.5 C. The capacity at the 100th cycle was taken as a "capacity after 100 cycles". Also, the thickness of the battery after the initial conditioning was measured and then the high temperature cycle test was carried out (100 cycles). After that, the change in the thickness of the battery was measured in the same manner as after the initial conditioning, and the change in the electrode thickness of the battery due to the cycle was taken as a "battery swelling". In Table 1-6 below, the capacity after 100 cycles and battery swelling are shown, which were compared to the values of Comparative Example 1-5-3 as standards.

TABLE 1-6

|  | Electrolytic solution | Additive agent | Additive amount (wt %) | Capacity after 100 cycles (%) Si content (WT %) 0.0 | Battery swelling (%) |
|---|---|---|---|---|---|
| Comp. Ex. 1-5-1 | 1M LiPF$_6$ | Compound 1-1 | 0.5 | 101 | 97 |
| Comp. Ex. 1-5-2 | EC/DEC = 3/7 + |  | 1.0 | 100 | 127 |
| Comp. Ex. 1-5-3 | 2.0% VC + 2.0% MFEC | — | — | 100 | 100 |

As shown in Table 1-5, in comparison to value 100 of the battery swelling of the nonaqueous electrolytic solution secondary battery in which Compound 1-1 having a specific structure was not added to the nonaqueous electrolytic solution (Comparative Example 1-4-1), the numeral values of the battery swelling of the nonaqueous electrolytic solution secondary batteries of Examples 1-4-1 to 1-4-3 were improved. It can be seen from Table 1-5 that a nonaqueous electrolytic solution secondary battery comprising a positive electrode, a negative electrode including a negative electrode active material containing metal particles capable of alloying with Li and graphite particles, and a nonaqueous electrolytic solution to which a compound having a structure represented by the formula (A) has been added improves the battery swelling. In particular, because the improved effect is higher compared to the case of using a negative electrode in which the mass concentration of Si fine particles is 0% by mass with respect to the total of Si fine particles and graphite particles shown in Table 1-6 (100% by mass), it is considered that a synergistic effect by using a negative electrode active material with a combination of Si fine particles and graphite particles has been generated.

INDUSTRIAL APPLICABILITY

According to the nonaqueous electrolytic solution of the present invention 1, capacity deterioration and cycle characteristics of the nonaqueous electrolytic solution secondary battery at high temperature storage can be improved. Therefore, the nonaqueous electrolytic solution can be preferably used in any fields of electronic devices and the like in which a nonaqueous electrolytic solution secondary battery is used.

Use of the nonaqueous electrolytic solution and the nonaqueous electrolytic solution secondary battery of the present invention 1 is not particularly limited, and they can be used for various known uses. Specific examples of use thereof can include a laptop computer, an electronic book player, a mobile phone, a portable fax, a portable copier, a portable printer, a portable audio player, a compact video camera, a liquid crystal television, a handy cleaner, a transceiver, an electronic organizer, an electronic calculator, a memory card, a portable tape recorder, a radio, a backup power supply, an automobile, a motorcycle, a motorbike, a bicycle, lighting equipment, a toy, a game machine, a clock, a power tool, a strobe, a camera, and the like.

The explanation of the present invention 1 is ended here, and next, the explanation of the present invention 2 is given.

TECHNICAL FIELD

The present invention 2 relates to a nonaqueous electrolytic solution and a nonaqueous electrolytic solution secondary battery with the same.

BACKGROUND ART

Since a lithium nonaqueous electrolytic solution secondary battery using a lithium-containing transition metal oxide as a positive electrode and a nonaqueous solvent as an electrolytic solution can realize a high energy density, it is applied for a wide variety of use, from a small power source for a mobile phone, a laptop computer or the like to a large-scale power source for an automobile, a railway and a road leveling. However, recent demands for high performance of nonaqueous electrolytic solution secondary batteries are increasing more and more, and improvement of various characteristics is strongly demanded.

For a lithium nonaqueous electrolytic solution secondary battery, a nonaqueous electrolytic solution which contains a nonaqueous solvent of cyclic carbonates such as ethylene carbonate and propylene carbonate, chain carbonates such as dimethyl carbonate, diethyl carbonate and ethyl methyl carbonate, cyclic carboxylic acid esters such as γ-butyrolactone and γ-valerolactone, chain carboxylic acid esters such as methyl acetate, ethyl acetate, and methyl propionate, and a solute such as $LiPF_6$, $LiBF_4$, $LiAsF_6$, $LiClO_4$, $LiCF_3SO_3$, and $LiN(CF_3SO_2)_2$, is used.

In a nonaqueous electrolytic solution secondary battery with such nonaqueous electrolytic solution, the reactivity varies depending on the composition of the nonaqueous electrolytic solution, so that the battery characteristics will be greatly changed by the nonaqueous electrolytic solution. In order to improve battery characteristics of nonaqueous electrolytic solution secondary batteries such as load characteristics, cycle characteristics, and storage characteristics or enhance safety of batteries during overcharge, various studies on nonaqueous solvents and electrolytes have been made.

Patent Document 2-1 discloses a technique for suppressing self-discharge of a nonaqueous electrolytic battery having lithium-containing cobalt dioxide as a positive electrode active material at high temperature storage, by using an electrolytic solution to which tricarboimide is added.

Patent Document 2-2 discloses a technique for suppressing reductive decomposition of a solvent by using a nonaqueous electrolytic solution containing an isocyanuric acid derivative, thereby obtaining a battery excellent in load characteristics even after high temperature storage.

Patent Document 2-3 disclose a technique for achieving both safety of a battery and battery cycle characteristics represented by the flame retardancy of an electrolytic solution, by using a nonaqueous electrolytic solution containing a phosphite ester and a compound having two or more polymerizable functional groups in the molecule at the same time.

PRIOR ART DOCUMENTS

Patent Documents

[Patent Document 2-1] JP H07-192757 A
[Patent Document 2-2] JP 2000-348705 A
[Patent Document 2-3] JP 2010-282906 A

SUMMARY OF THE PRESENT INVENTION 2

Problem to be Solved by the Present Invention 2

However, recent demands for improvement in characteristics of nonaqueous electrolytic solution secondary batteries are increasing more and more, the batteries are required to have various performances at a high level, but the demands has not been achieved yet. In particular, there was a problem that it is difficult to achieve both high temperature lifetime and suppression of deterioration of large current capacity after high temperature standing.

According to the study of the inventors of the present invention 2, a problem was found that the internal resistance of a nonaqueous electrolytic solution secondary battery without a specific positive electrode was remarkably increased and the large current capacity after high temperature standing was remarkably impaired when a nonaqueous electrolytic solution containing an isocyanuric acid derivative is used as described above.

Means for Solving the Problem

The present invention 2 has been made in view of the above-described problem. That is, it is an object of the present invention to provide a nonaqueous electrolytic solution secondary battery which is excellent in high temperature lifetime without impairing the large current capacity after high temperature standing.

As a result of intensive studies, the inventors of the present invention 2 have found that a nonaqueous electrolytic solution secondary battery with a specific positive electrode can solve the above-described problem by containing a specific compound in an electrolytic solution, thereby leading to completion of the present invention 2.

The gist of the present invention 2 is as follows.

[1]

A nonaqueous electrolytic solution for use in a nonaqueous electrolytic solution secondary battery comprising a positive electrode containing a transition metal oxide capable of occluding and releasing metal ions, the transition metal oxide containing at least Ni and Co and having 50 mol % or more of Ni and Co in the transition metal, a negative electrode capable of occluding and releasing metal ions, and a nonaqueous electrolytic solution containing a nonaqueous solvent and an electrolyte dissolved in the nonaqueous solvent, wherein the nonaqueous electrolytic solution contains a compound having a structure represented by the following general formula (1):

[Chemical formula 17]

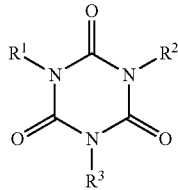
(1)

wherein R1 to R3 may be the same as or different from each other and are an organic group having 1 to 20 carbon atoms which may have a substituent, provided that at least one of R1 to R3 has a carbon-carbon unsaturated bond or a cyano group.

[2]

The nonaqueous electrolytic solution according to [1], wherein in the general formula (1), $R^1$ to $R^3$ may be the same as or different from each other and are an organic group having 1 to 10 carbon atoms which may have a substituent.

[3]

The nonaqueous electrolytic solution according to [1] or [2], wherein in the general formula (1), at least one of $R^1$ to $R^3$ is an organic group having a carbon-carbon unsaturated bond.

[4]

The nonaqueous electrolytic solution according to any one of [1] to [3], wherein in the general formula (1), the organic group having a carbon-carbon unsaturated bond is a group selected from the group consisting of an allyl group and a metallyl group.

[5]

The nonaqueous electrolytic solution according to any one of [1] to [4], wherein the nonaqueous electrolytic solution contains the compound having the structure represented by the general formula (1) in an amount of 0.01% by mass or more and 10.0% by mass or less with respect to the total amount of the nonaqueous electrolytic solution.

[6]

The nonaqueous electrolytic solution according to any one of [1] to [5], wherein the nonaqueous electrolytic solution contains at least one compound selected from the group consisting of a cyclic carbonate having a fluorine atom, a cyclic carbonate having a carbon-carbon unsaturated bond, a difluorophosphate, a fluorosulfate, a compound having an isocyanate group, a compound having a cyano group, a cyclic sulfonic acid ester, and a dicarboxylic acid complex salt.

[7]

The nonaqueous electrolytic solution according to any one of [1] to [6], which the nonaqueous electrolytic solution contains a cyclic carbonate and a chain carbonate as the nonaqueous solvent and contains at least two types of chain carbonates as the chain carbonate.

[8]

The nonaqueous electrolytic solution according to any one of [1] to [7], wherein the transition metal oxide containing the at least Ni and Co and having 50 mol % or more of Ni and Co in the transition metal is represented by the following composition formula (2):

$$Li_{a1}Ni_{b1}Co_{c1}M_{d1}O_2 \quad (2)$$

wherein in the formula (2), the numerical values of $0.9 \le a1 \le 1.1$, $0.3 \le b1 \le 0.9$, $0.1 \le c1 \le 0.5$, and $0.0 \le d1 \le 0.5$ are indicated, and $0.5 \le b1+c1$ and $b1+c1+d1=1$ are satisfied, and M represents at least one element selected from the group consisting of Mn, Al, Mg, Zr, Fe, Ti and Er.

[9]

The nonaqueous electrolytic solution according to any one of [1] to [7], wherein the transition metal oxide containing the at least Ni and Co and having 50 mol % or more of Ni and Co in the transition metal is represented by the following composition formula (3):

$$Li_{a2}Ni_{b2}Co_{c2}M_{d2}O_2 \quad (3)$$

wherein in the formula (3), the numerical values of $0.9 \le a2 \le 1.1$, $0.3 \le b2 \le 0.9$, $0.1 \le c2 \le 0.5$, and $0.0 \le d2 \le 0.5$ are indicated, $C2 \le b2$ and $0.6 \le b2+c2$ and $b2+c2+d2=1$ are satisfied, and M represents at least one element selected from the group consisting of Mn, Al, Mg, Zr, Fe, Ti and Er.

[10]

A nonaqueous electrolytic solution secondary battery, comprising:

a positive electrode containing a transition metal oxide capable of occluding and releasing metal ions, the transition metal oxide containing at least Ni and Co and having 50 mol % or more of Ni and Co in the transition metal;

a negative electrode capable of occluding and releasing metal ions; and a nonaqueous electrolytic solution containing a nonaqueous solvent and an electrolyte dissolved in the nonaqueous solvent, wherein the nonaqueous electrolytic solution is the nonaqueous electrolytic solution according to any one of [1] to [9].

Effect of the Present Invention 2

According to the nonaqueous electrolytic solution of the present invention 2, a battery excellent in high temperature lifetime can be provided without impairing the large current capacity after high temperature standing.

MODE FOR CARRYING OUT THE PRESENT INVENTION 2

The following explains an embodiment of the present invention 2 in detail, but the explanation of the constituent features described below is an example (a representative example) of the embodiment of the present invention 2, and the present invention 2 is not limited to their specific contents, and can be carried out with various modifications within the scope of its gist.

[1. Nonaqueous Electrolytic Solution]

The nonaqueous electrolytic solution of the present invention 2 is a nonaqueous electrolytic solution comprising a nonaqueous solvent and an electrolyte dissolved in the nonaqueous solvent, wherein the nonaqueous electrolytic solution contains a compound having a structure represented by the following general formula (1) (which may be referred to as "a specific compound" hereinafter).

[Chemical Formula 18]

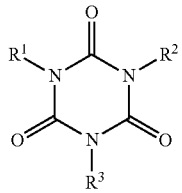

(1)

Wherein in the formula (1), $R^1$ to $R^3$ may be the same as or different from each other and are an organic group having 1 to 20 carbon atoms which may have a substituent, provided that at least one of $R^1$ to $R^3$ has a carbon-carbon unsaturated bond or a cyano group.

<1-1. Electrolyte>

The electrolyte used for the nonaqueous electrolytic solution of the present invention 2 is not particularly limited and can be arbitrarily adopted depending on the intended nonaqueous electrolytic solution secondary battery. As the electrolyte, it is preferable to use a lithium salt.

Specific examples of the electrolyte include, for example, inorganic lithium salts such as $LiClO_4$, $LiAsF_6$, $LiPF_6$, $LiBF_4$, and $LiAlF_4$; fluorine-containing organolithium salts such as $LiCF_3SO_3$, $LiN(FSO_2)_2$, $LiN(CF_3SO_2)_2$, $LiN(C_2F_5SO_2)_2$, $LiN(CF_3SO_2)(C_2F_5SO_2)$, $LiN(CF_3SO_2)(C_3F_7SO_2)$, $LiN(CF_3SO_2)(FSO_2)$, lithium cyclic 1,2-ethanedisulfonyl imide, lithium cyclic 1,3-propane disulfonyl imide, lithium cyclic 1,2-perfluoroethanedisulfonylimide, lithium cyclic 1,3-perfluoropropane disulfonyl imide, lithium cyclic 1,4-perfluorobutane disulfonyl imide, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_3(CF_3)$, $LiBF_3(C_2F_5)$, $LiBF_2(CF_3)_2$, $LiBF_2(C_2F_5)_2$, $LiBF_2(CF_3SO_2)_2$, and $LiBF_2(C_2F_5SO_2)_2$; and sodium salts or potassium salts such as $KPF_6$, $NaPF_6$, $NaBF_4$, and $CF_3SO_3Na$.

Among them, $LiPF_6$, $LiBF_4$, $LiCF_3SO_3$, $LiN(FSO_2)_2$, $LiN(CF_3SO_2)_2$, $LiN(C_2F_5SO_2)_2$, lithium cyclic 1,2-perfluoroethane disulfonyl imide are preferable, $LiPF_6$, $LiBF_4$, $LiCF_3SO_3$, $LiN(FSO_2)_2$, $LiN(CF_3SO_2)_2$, $LiN(CF_3SO_2)(FSO_2)$ are more preferable, and $LiPF_6$, $LiBF_4$, or $LiN(CF_3SO_2)_2$ is particularly preferable.

These electrolytes may be used singly or in any combination of two or more of them and in any ratio. In particular, a combination use of two types of inorganic lithium salts, or a combination use of an inorganic lithium salt and a fluorine-containing organolithium salt is preferable because gas generation during continuous charging or deterioration after high temperature storage is effectively suppressed. Particularly, a combination use of $LiPF_6$ and $LiBF_4$, or a combination use of an inorganic lithium salt such as $LiPF_6$ and $LiBF_4$ and a fluorine-containing organolithium salt such as $LiN(FSO_2)_2$, $LiN(CF_3SO_2)_2$, $LiN(CF_3SO_2)(FSO_2)$ and $LiN(C_2F_5SO_2)_2$ is preferable.

In a case of the combination use of $LiPF_6$ and $LiBF_4$, the ratio of $LiBF_4$ to the whole electrolyte is preferably 0.001% by mass or more and 20% by mass or less. Within this range, the increase of the resistance of the nonaqueous electrolytic solution can be suppressed due to the low degree of dissociation of $LiBF_4$.

On the other hand, in a case of the combination use of an inorganic lithium salt such as $LiPF_6$ and $LiBF_4$ and a fluorine-containing organolithium salt such as $LiCF_3SO_3$, $LiN(CF_3SO_2)_2$, and $LiN(C_2F_5SO_2)_2$, the ratio of the inorganic lithium salt to the whole electrolyte is preferably 70% by mass or more and 99.9% by mass or less. Within this range, the ratio of the fluorine-containing organolithium salt generally having a larger molecular weight than that of the inorganic lithium salt becomes too high, so that the ratio of the nonaqueous solvent to the whole nonaqueous electrolytic solution is decreased, and the increase of the resistance of the nonaqueous electrolytic solution can be thus suppressed.

The concentration of the electrolyte such as the lithium salt in the final composition of the nonaqueous electrolytic solution of the present invention 2 is arbitrary as long as it does not significantly impair the effect of the present invention 2, but it is preferably 0.5 mol/L or more and 3 mol/L or less. When the concentration of the electrolyte is the lower limit or more, sufficient ionic conductivity of the nonaqueous electrolytic solution is easily obtained, and when the concentration of the electrolyte is the upper limit or less, excessive increase in viscosity can be avoided, so that it is easy to ensure the good ionic conductivity and the performance of the nonaqueous electrolytic solution secondary battery with the nonaqueous electrolytic solution of the present invention 2. The concentration range of the electrolyte such as the lithium salt is more preferably 0.6 mol/L or more and further preferably 0.8 mol/L or more, and, further, more preferably 2 mol/L or less and further preferably 1.5 mol/L or less.

In particular, when the nonaqueous solvent of the nonaqueous electrolytic solution includes mainly a carbonate compound such as alkylene carbonate and dialkyl carbonate, $LiPF_6$ may be used alone, but the combination use with $LiBF_4$ is preferred because capacity deterioration due to continuous charging is suppressed. In a case of the combination used thereof, the amount of $LiBF_4$ used with respect to one mole of $LiPF_6$ is preferably 0.005 mol or more and 0.4 mol or less. If it is this upper limit or less, deterioration of battery characteristics after high temperature storage is easily avoided, and if it is the lower limit or more, gas generation and capacity deterioration during continuous charging are easily avoided. The amount of $LiBF_4$ to be used is preferably 0.01 mol or more and particularly preferably 0.05 mol or more, and preferably 0.2 mol or less, with respect to 1 mol of $LiPF_6$.

<1-2. Nonaqueous Solvent>

The nonaqueous solvent contained in the nonaqueous electrolytic solution of the present invention 2 is not particularly limited as long as it is a solvent which does not adversely affect battery characteristics when it is incorporated in a battery, but one or more of the following nonaqueous solvents are preferred.

Examples of the nonaqueous solvents include chain carbonates and cyclic carbonates, chain carboxylic acid esters and cyclic carboxylic acid esters, chain ethers and cyclic ethers, phosphorus-containing organic solvents, sulfur-containing organic solvents and boron-containing organic solvents.

The type of the chain carbonate is not particularly limited and includes, for example, dialkyl carbonate, and particularly, the number of carbon atoms of each constituent alkyl group is preferably 1 to 5, more preferably 1 to 4, and particularly preferably 1 to 3. Specific examples thereof include dimethyl carbonate, ethyl methyl carbonate, diethyl carbonate, methyl-n-propyl carbonate, ethyl-n-propyl carbonate, and di-n-propyl carbonate.

Among them, dimethyl carbonate, ethyl methyl carbonate, and diethyl carbonate are preferable from the viewpoint of industrial availability and various good characteristics in nonaqueous electrolytic solution secondary batteries.

Also, chain carbonates having a fluorine atom (hereinafter referred to as "fluorinated chain carbonate" in some cases) can be preferably used. The number of fluorine atoms included in the fluorinated chain carbonate is not particularly limited as long as it is 1 or more, but it is generally 6 or less, preferably 4 or less, and more preferably 3 or less. When the fluorinated chain carbonate has a plurality of fluorine atoms, they may be bonded to the same carbon together or may be bonded to different carbons. Examples of the fluorinated chain carbonates include fluorinated dimethyl carbonate, fluorinated ethyl methyl carbonate, and fluorinated diethyl carbonate.

Examples of the fluorinated dimethyl carbonate include the same ones as those mentioned as the examples of fluorinated dimethyl carbonate and derivatives thereof in the present invention 1.

Examples of the fluorinated ethyl methyl carbonate include the same ones as those mentioned as the examples of fluorinated ethyl methyl carbonate and derivatives thereof in the present invention 1.

Examples of the fluorinated diethyl carbonate include the same ones as those mentioned as the examples of fluorinated diethyl carbonate and derivatives thereof in the present invention 1.

Incidentally, the fluorinated chain carbonate exhibits an effective function not only as a solvent but also as an additive described in the following 1-4. There is no clear boundary in the blending amount of fluorinated chain carbonate used as a solvent and an additive, and it is possible to follow the blending amount just as described.

The type of the cyclic carbonate is not particularly limited and includes, for example, alkylene carbonate, and particularly, the number of carbon atoms of the constituent alkylene group is preferably 2 to 6 and particularly preferably 2 to 4. Specific examples thereof include ethylene carbonate, propylene carbonate, and butylene carbonate (2-ethylethylene carbonate, cis and trans 2,3-dimethylethylene carbonate).

Among them, ethylene carbonate or propylene carbonate is preferable, and ethylene carbonate is particularly preferable because resistance of the nonaqueous electrolytic solution secondary battery can be reduced due to high dielectric constant.

Also, cyclic carbonates having a fluorine atom (hereinafter abbreviated as "fluorinated cyclic carbonate" in some cases) can be preferably used.

Examples of the fluorinated cyclic carbonate include a cyclic carbonate having a fluorinated alkylene group having 2 to 6 carbon atoms, which is for example fluorinated ethylene carbonate and derivatives thereof. Examples of the fluorinated ethylene carbonate and derivatives thereof include a fluoride of ethylene carbonate or ethylene carbonate substituted with an alkyl group (for example, an alkyl group having 1 to 4 carbon atoms), and among others, a fluoride of ethylene carbonate having 1 to 8 fluorine atoms is preferable.

Specific examples thereof include the same ones as those mentioned as specific examples of the cyclic carbonate having a fluorine atom in the present invention 1.

Among them, at least one selected from the group consisting of monofluoroethylene carbonate, 4,4-difluoroethylene carbonate, 4,5-difluoroethylene carbonate and 4,5-difluoro-4,5-dimethylethylene carbonate is more preferable. 4,5-Difluoroethylene carbonate is preferably in a trans form rather than a cis form. This is because high ionic conductivity is given and a favorable interface protective film is formed.

Incidentally, the fluorinated cyclic carbonate exhibits an effective function not only as a solvent but also as an additive described in the following 1-4. There is no clear boundary in the blending amount of fluorinated cyclic carbonate used as a solvent and an additive, and it is possible to follow the blending amount just as described.

The type of chain carboxylic acid ester is also not particularly limited, and examples thereof include methyl acetate, ethyl acetate, n-propyl acetate, i-propyl acetate, n-butyl acetate, i-butyl acetate, t-butyl acetate, methyl propionate, ethyl propionate, n-propyl propionate, i-propyl propionate, n-butyl propionate, i-butyl propionate, t-butyl propionate, methyl butyrate, and ethyl butyrate.

Among them, methyl acetate, ethyl acetate, methyl propionate, ethyl propionate, methyl butyrate, and ethyl butyrate are preferred from the viewpoint of industrial availability and various good characteristics in non-aqueous electrolytic solution secondary batteries.

Further, the cyclic carboxylic acid ester is not particularly limited, and examples thereof include γ-butyrolactone, γ-valerolactone, and δ-valerolactone.

Among them, γ-butyrolactone is preferred from the viewpoint of industrial availability and various good characteristics in non-aqueous electrolytic solution secondary batteries.

The type of chain ether is also not particularly limited, and examples thereof include dimethoxymethane, dimethoxyethane, diethoxymethane, diethoxyethane, ethoxymethoxymethane, and ethoxymethoxyethane.

Among them, dimethoxyethane and diethoxyethane are preferred from the viewpoint of industrial availability and various good characteristics in nonaqueous electrolytic solution secondary batteries.

The cyclic ether is also not particularly limited, and examples thereof include tetrahydrofuran, 2-methyltetrahydrofuran, and tetrahydropyran.

The phosphorus-containing organic solvent is also not particularly limited, and examples thereof include trimethyl phosphate, triethyl phosphate, triphenyl phosphate, tris(2,2,2-trifluoroethyl)phosphate, trimethyl phosphite, triethyl phosphite, triphenyl phosphite, trimethylphosphine oxide, triethylphosphine oxide, and triphenylphosphine oxide.

The type of the sulfur-containing organic solvent is also not particularly limited, and examples thereof include ethylene sulfite, 1,3-propane sultone, 1,4-butane sultone, methyl methanesulfonate, ethyl methanesulfonate, busulfan, sulfolane, sulfolene, dimethyl sulfone, ethyl methyl sulfone, diphenyl sulfone, methyl phenyl sulfone, dibutyl disulfide, dicyclohexyl disulfide, tetramethylthiuram monosulfide, N,N-dimethylmethanesulfonamide, and N,N-diethylmethanesulfonamide.

The boron-containing organic solvent is also not particularly limited, and examples thereof include boroxine such as 2,4,6-trimethylboroxine and 2,4,6-triethylboroxine.

In particular, the chain carbonate and the cyclic carbonate, or the chain carboxylic acid ester and the cyclic carboxylic acid ester are preferred from the viewpoint of various good characteristics in the nonaqueous electrolytic solution non-aqueous electrolytic solution secondary batteries, and among them, ethylene carbonate, propylene carbonate, dimethyl carbonate, ethyl methyl carbonate, diethyl carbonate, 2,2,2-trifluoroethyl methyl carbonate, bis(2,2,2-trifluoroethyl)carbonate, methyl acetate, ethyl acetate, methyl propionate, ethyl propionate, methyl butyrate, ethyl butyrate and γ-butyrolactone are more preferred, and ethylene carbonate, propylene carbonate, dimethyl carbonate, ethyl methyl carbonate, diethyl carbonate, 2,2,2-trifluoroethyl methyl carbonate, methyl acetate, ethyl acetate, methyl propionate, ethyl propionate, and methyl butyrate are more preferred.

One of these nonaqueous solvents may be used alone, or two or more of them may be used in combination, but a combination use of two or more of them is preferable. For example, it is preferable to use a combination of a high dielectric constant solvent of a cyclic carbonate and a low viscosity solvent such as chain carbonates and chain esters.

One preferable combination of nonaqueous solvents is a combination of mostly cyclic carbonates and chain carbonates. In particular, the total of the cyclic carbonates and the chain carbonates in the whole nonaqueous solvent is preferably 80% by volume or more, more preferably 85% by volume or more, and particularly preferably 90% by volume or more, and the volume of the cyclic carbonates to the total of the cyclic carbonates and the chain carbonates is preferably 5% by volume or more, more preferably 10% by volume or more, further preferably 15% by volume or more, and particularly preferably 20% by volume or more, and preferably 70% by volume or less, more preferably 50% by volume or less, further preferably 40% by volume or less, and particularly preferably 35% by volume or less. A battery produced by using a combination of these nonaqueous solvents is preferable because the balance between the cycle characteristics and the high-temperature storage characteristics (in particular, the residual capacity and the high load discharge capacity after high temperature storage) is improved.

Examples of preferred combinations of cyclic carbonates and chain carbonates include a combination of ethylene carbonates and chain carbonates such as combinations of: ethylene carbonate and dimethyl carbonate; ethylene carbonate and diethyl carbonate; ethylene carbonate and ethyl methyl carbonate; ethylene carbonate, dimethyl carbonate and diethyl carbonate; ethylene carbonate, dimethyl carbonate and ethyl methyl carbonate; ethylene carbonate, diethyl carbonate and ethyl methyl carbonate; and ethylene carbonate, dimethyl carbonate, diethyl carbonate and ethyl methyl carbonate.

Among those combinations of cyclic carbonates and chain carbonates, those including two or more chain carbonates are particularly preferred. This is because the freezing point is decreased and the use as an electrolytic solution is possible even at an extremely low temperature. Examples thereof include a combination of ethylene carbonate and two or more chain carbonates such as combinations of: ethylene carbonate, dimethyl carbonate and diethyl carbonate; ethylene carbonate, dimethyl carbonate and ethyl methyl carbonate; ethylene carbonate, diethyl carbonate and ethyl methyl carbonate; and ethylene carbonate, dimethyl carbonate, diethyl carbonate and ethyl methyl carbonate.

A combination in which propylene carbonate is further added to such combination of ethylene carbonate and chain carbonates are also preferable. In the case of containing propylene carbonate, the volume ratio of ethylene carbonate and propylene carbonate is preferably from 99:1 to 40:60, more preferably from 95:5 to 45:55, and particularly preferably from 85:15 to 50:50. Further, it is preferable that the amount of propylene carbonate in the whole nonaqueous solvent is set at 0.1% by volume or more and 10% by volume or less because the characteristics of the combination of ethylene carbonate and chain carbonates is maintained and further excellent discharge load characteristics can be obtained. The amount of propylene carbonate in the whole nonaqueous solvent is more preferably 1% by volume and particularly preferably 2% by volume or more, and more preferably 8% by volume or less and particularly preferably 5% by volume or less.

Of the combinations described above, those including an asymmetric chain carbonate as the chain carbonate are more preferable. To attain a good balance between cycle characteristics and discharge load characteristics, in particular, the combination preferably includes ethylene carbonate, dimethyl carbonate and ethyl methyl carbonate, or includes ethylene carbonate, diethyl carbonate and ethyl methyl carbonate, or includes ethylene carbonate, dimethyl carbonate, diethyl carbonate and ethyl methyl carbonate, or further includes propylene carbonate. In particular, the asymmetric chain carbonate is preferably ethyl methyl carbonate, and the alkyl groups constituting the dialkyl carbonate are preferably of 1 to 2 carbon atoms.

Another preferred example of the nonaqueous solvents is one including a chain carboxylate ester. From the point of view of the enhancement of discharge load characteristics of batteries, a particularly preferred solvent is one including the above mixture of a cyclic carbonate and chain carbonates, and a chain carboxylate ester. In this case, it is particularly preferable that the chain carboxylate ester be methyl acetate, ethyl acetate, methyl propionate, ethyl propionate, methyl butyrate or ethyl butyrate. The volume of the chain carboxylate ester relative to the nonaqueous solvent is preferably not less than 5 vol %, more preferably not less than 8 vol %, and particularly preferably not less than 10 vol %, and is preferably not more than 50 vol %, more preferably not more than 35 vol %, particularly preferably not more than 30 vol %, and highly preferably not more than 25 vol %.

<1-3. Compounds Having Structure Represented by General Formula (1)>

In a nonaqueous electrolyte secondary battery which includes a positive electrode including a transition metal oxide capable of storing and releasing metal ions wherein the oxide contains at least Ni and Co and not less than 50 mol % of the transition metals is represented by Ni and Co, a negative electrode capable of storing and releasing metal ions, and a nonaqueous electrolytic solution containing a nonaqueous solvent and an electrolyte dissolved in the nonaqueous solvent, Invention 2 involves a specific compound in the nonaqueous electrolytic solution and thereby makes it possible to enhance the high-temperature life of the nonaqueous electrolyte secondary battery while maintaining the large-current capacity after the battery has been left at a high temperature. The mechanism and principle of this enhancement are not fully understood, but the present inventors assume them to be as described below. However, Invention 2 is not limited to the following mechanism and principle.

The specific compound probably contributes to enhancing the battery characteristics by the following two processes:

(1) The compound interacts with the transition metals in the positive electrode active material to provide a protective effect on the positive electrode.

(2) The compound is reduced on the charged negative electrode, and the reduction product grows into a film, which protects the negative electrode.

These processes will be described in detail below.

(1) Interaction with Transition Metals in Positive Electrode Active Material to Provide Protective Effect on Positive Electrode In the specific compound, the N atoms in the molecule have an unshared electron pair and act as Lewis base. By interacting with the transition metal elements having a vacant orbital, the specific compound is probably concentrated on the positive electrode surface (in particular, at the reactive sites in which the transition metal is exposed as a result of oxygen vacancies or the like). Further, the specific compound contains, in its molecular structure, a carbon-carbon unsaturated bond or a cyano group that is an electron-rich and active structure. Thus, the molecules of the specific compound are probably caused to react together by initiation reaction such as oxidation by the positive electrode to form, on the surface of the positive electrode, a film-like structure which contributes to the protection of the positive electrode.

The energy levels of the vacant orbitals of the transition metals are closely related to the composition of the transition metal oxide. As specified in Invention 2, the transition metal oxide contains at least Ni and Co, and not less than 50 mol % of the transition metals is represented by Ni and Co. Probably by virtue of this configuration, the oxide favorably interacts with the unshared electron pairs of the N atoms in the specific compound. Further, because the three N atoms in the isocyanuric skeleton of the specific compound are arranged on an equilateral triangle, three unshared electron pairs can interact with one transition metal element at the same time. This is probably another reason why the specific compound can interact with the positive electrode favorably.

(2) Reduction on Charged Negative Electrode, and Growth of Reduction Product into Film Protecting Negative Electrode The specific compound contains, in its molecular structure, a carbon-carbon unsaturated bond or a cyano group that is a multiple bond susceptible to electrochemical reduction. Probably because of this, the specific compound reacts on the negative electrode to form a crosslinked film which contributes to the protection of the negative electrode. This film is an insulator and thus prevents the side reaction in which the electrolytic solution is decomposed. At the same time, the film is a conductor for metal ions such as lithium ions; therefore, the film does not inhibit the electrode reaction and allows the characteristics of the nonaqueous electrolyte secondary battery to be enhanced. The specific compound is characterized in that it contains a large number of polarized structures and it favorably interacts with metal ions such as lithium ions and hardly serves as a resistance component.

It is also assumed that the specific compound, during the reaction on the negative electrode, generates radical anions as nucleophilic species, which react with specific additives described later in a concerted manner.

The nonaqueous electrolytic solution of Invention 2 contains the specific compound as an essential component. The specific compound is a compound represented by the general formula (1). In the nonaqueous electrolytic solution of Invention 2, the specific compounds may be used singly, or two or more may be used in any combination.

[Chemical formula 19]

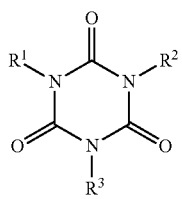

(1)

In the general formula (1), R1 to R3 may be the same as or different from one another and are each an optionally substituted organic group having 1 to 20 carbon atoms. At least one of R1 to R3 has a carbon-carbon unsaturated bond or a cyano group. Preferably, R1 to R3 in the formula (1) may be the same as or different from one another and are each an optionally substituted organic group having 1 to 10 carbon atoms. More preferably, at least one of R1 to R3 in the formula (1) is an organic group having a carbon-carbon unsaturated bond.

Here, the organic group is a functional group composed of atoms selected from the group consisting of carbon atoms, hydrogen atoms, nitrogen atoms, oxygen atoms, silicon atoms, sulfur atoms and halogen atoms.

Specific examples of the optionally substituted organic groups include alkyl groups having 1 to 20 carbon atoms, alkenyl groups, alkynyl groups, aryl groups, cyano groups, acrylic groups, methacrylic groups, vinylsulfonyl groups and vinylsulfo groups.

Examples of the substituents include halogen atoms and alkylene groups. The alkylene groups may contain an unsaturated bond or the like. Of the halogen atoms, fluorine atoms are preferable.

Specific examples of the optionally substituted alkyl groups include linear or branched alkyl groups such as methyl group, ethyl group, n-propyl group, i-propyl group, n-butyl group, sec-butyl group and tert-butyl group, and cycloalkyl groups such as cyclopropyl group, cyclopentyl group and cyclohexyl group.

Specific examples of the optionally substituted alkenyl groups include vinyl group, allyl group, methallyl group and 1-propenyl group. Specific examples of the optionally substituted alkynyl groups include ethynyl group, propargyl group and 1-propynyl group. Specific examples of the optionally substituted aryl groups include phenyl group, tolyl group, benzyl group and phenethyl group.

Of these, preferred groups are, among others, optionally substituted alkyl groups, alkenyl groups, alkynyl groups, acrylic groups, methacrylic groups, aryl groups, cyano groups, vinylsulfonyl groups and vinylsulfo groups.

More preferred groups are, among others, optionally substituted alkyl groups, alkenyl groups, alkynyl groups, acrylic groups, methacrylic groups and cyano groups.

Particularly preferred groups are, among others, optionally substituted alkyl groups, alkenyl groups, acrylic groups, methacrylic groups and cyano groups.

Some of the most preferred groups are optionally substituted alkyl groups, allyl groups and methallyl groups. In particular, allyl groups or methallyl groups which are unsubstituted organic groups having a carbon-carbon unsaturated bond are preferable. Allyl groups are preferable from the point of view of film-forming ability.

The compounds used in Invention 2 have a structure represented by the general formula (1). Specific examples thereof include those compounds of the following structures.

[Chemical Formula 20-1]

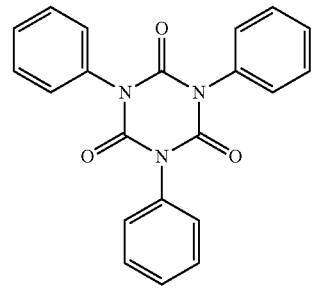

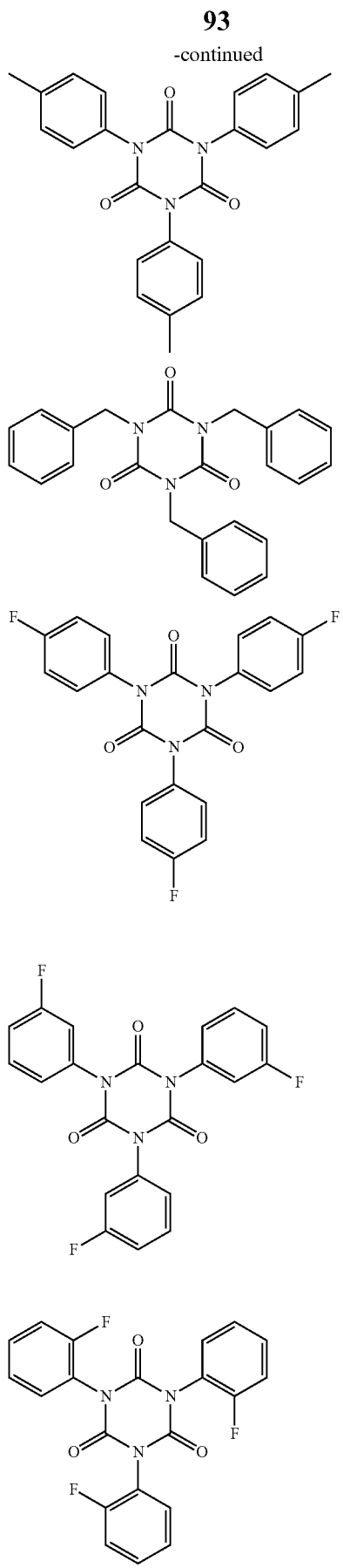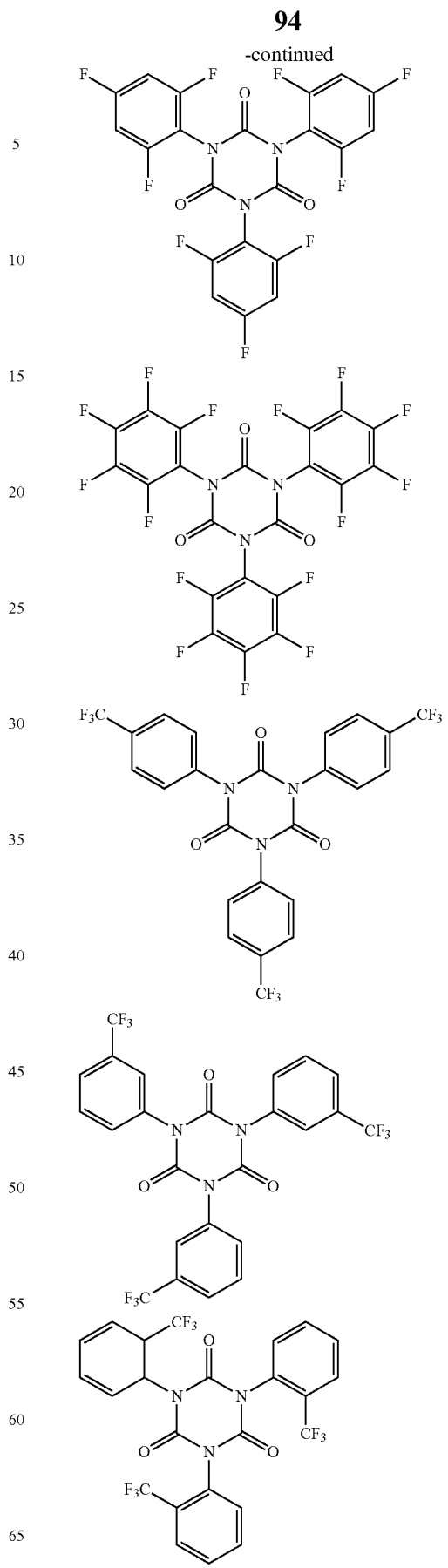

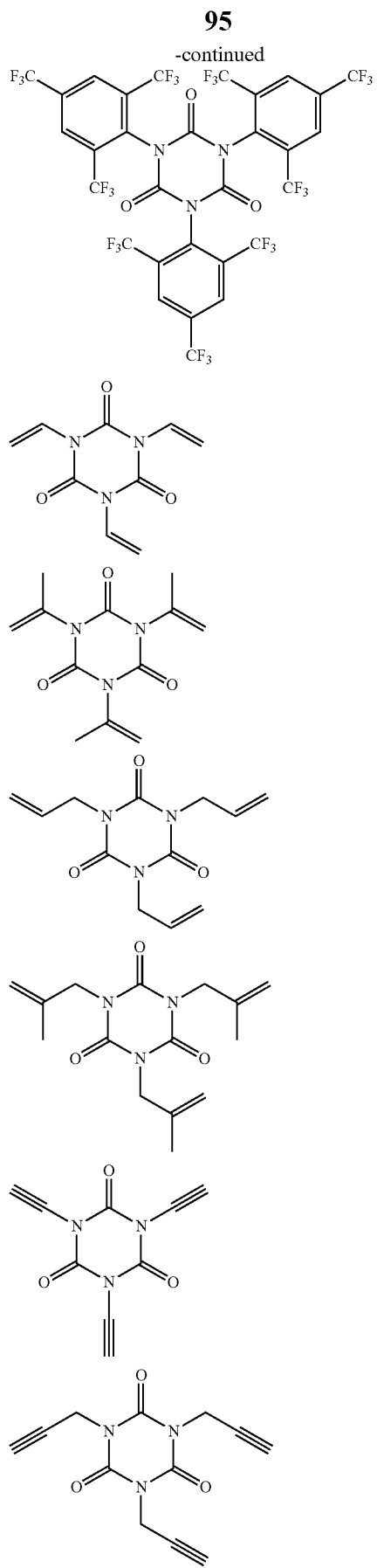
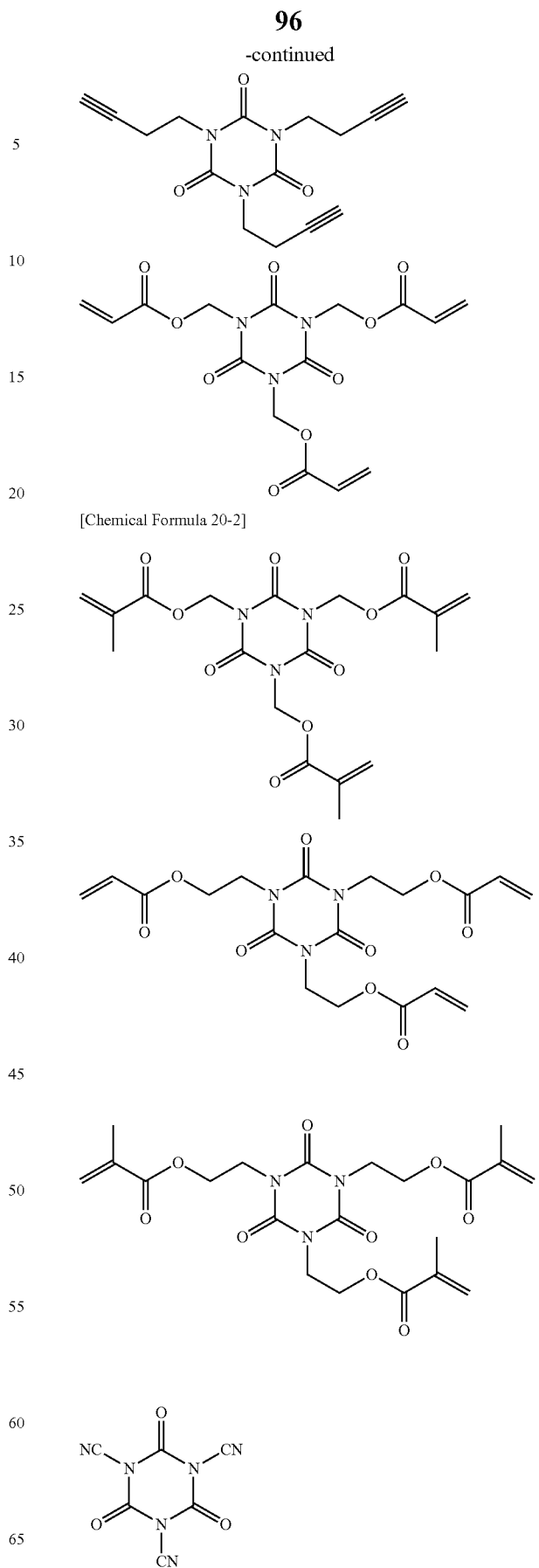

97
-continued
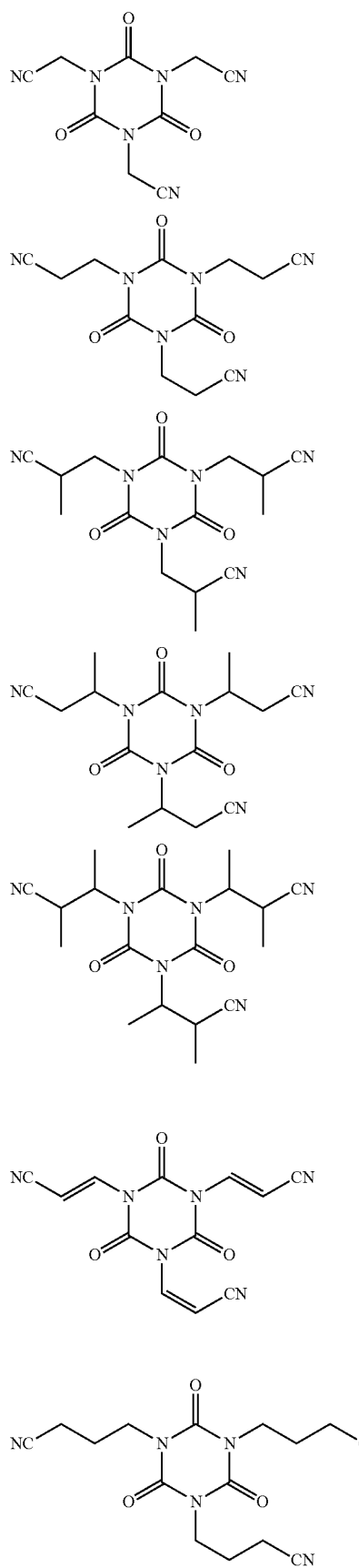
98
-continued
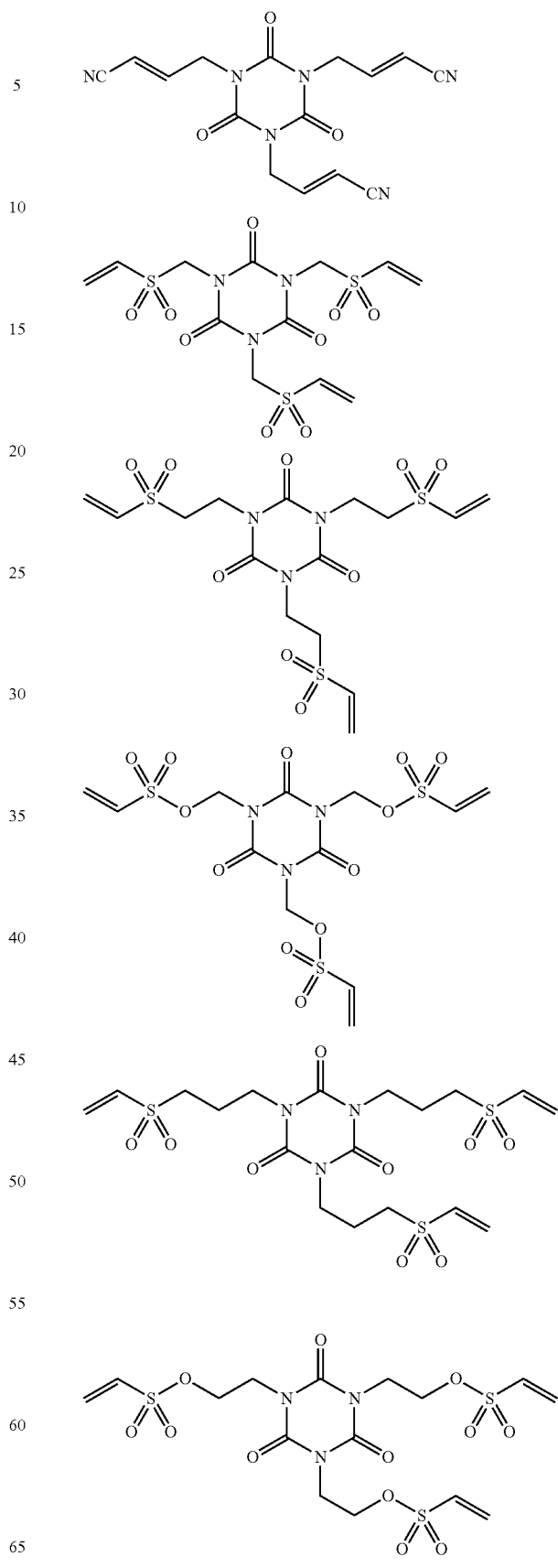

-continued
[Chemical Formula 20-3]
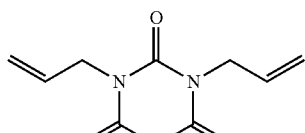
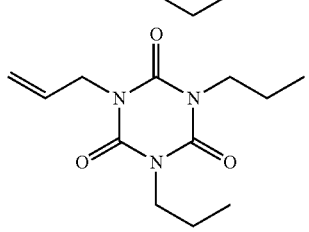
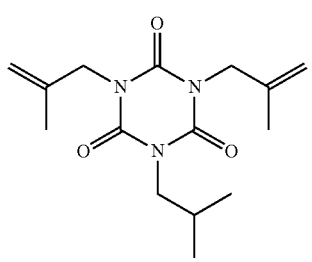
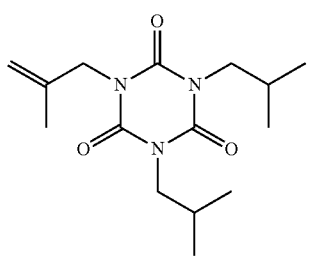
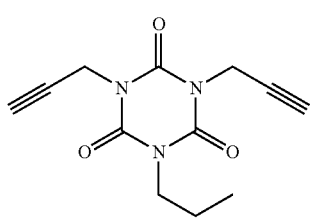
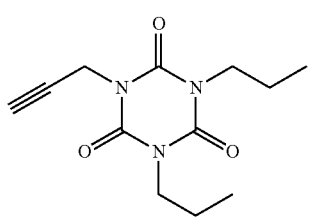
Preferred compounds are, among others, those compounds having the following structures.
[Chemical Formula 21-1]
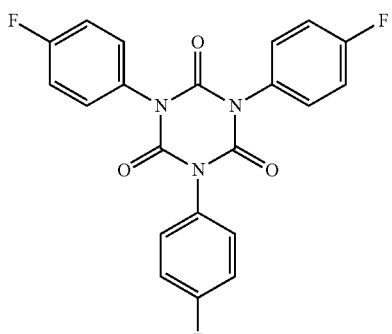
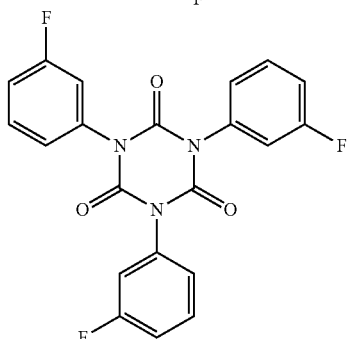
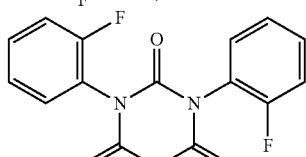
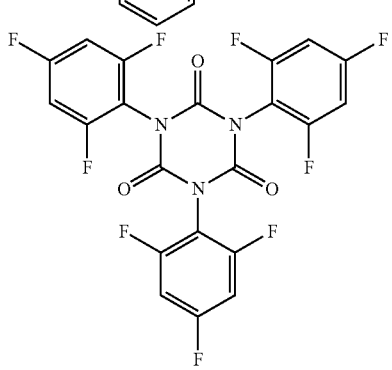
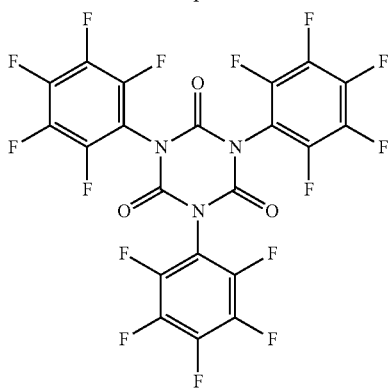

101
-continued
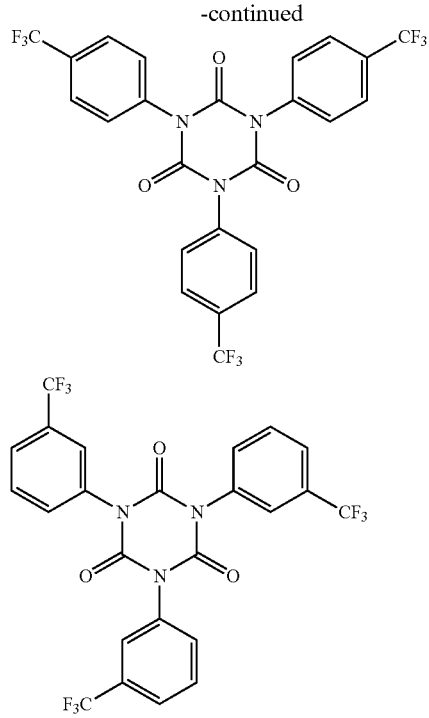
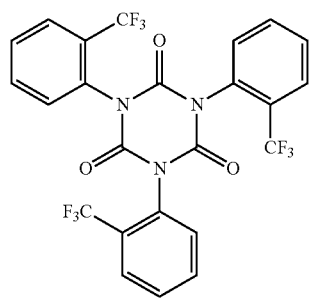
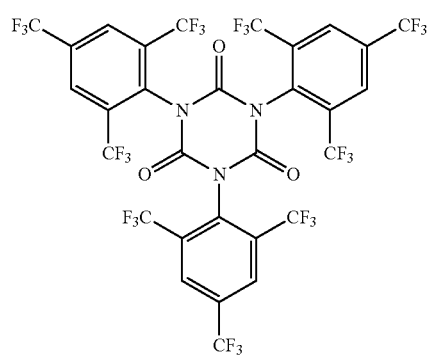
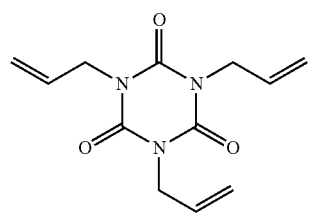
102
-continued
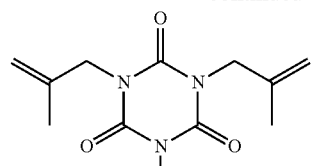
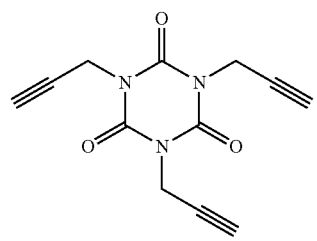
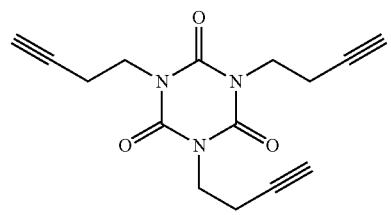
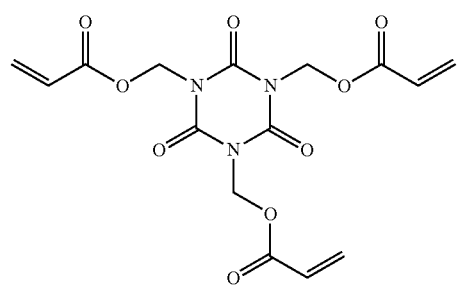
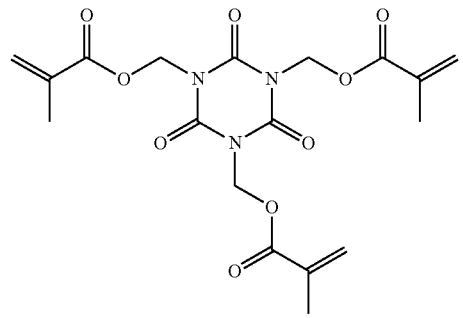
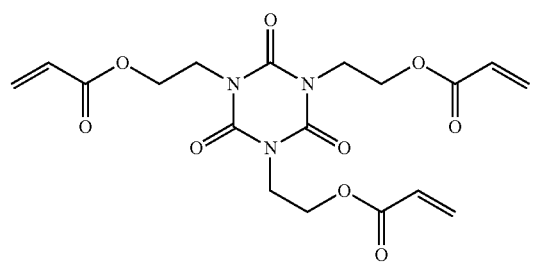

[Chemical Formula 21-2]
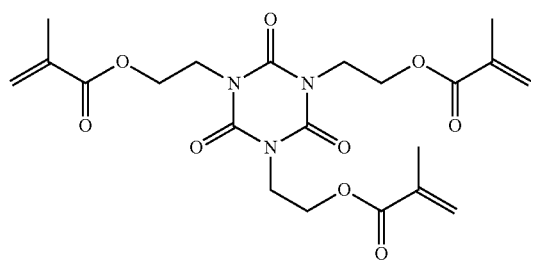
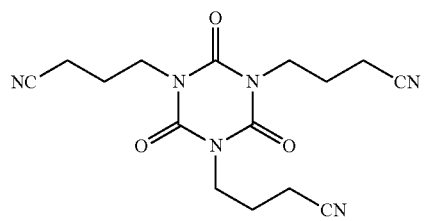

-continued
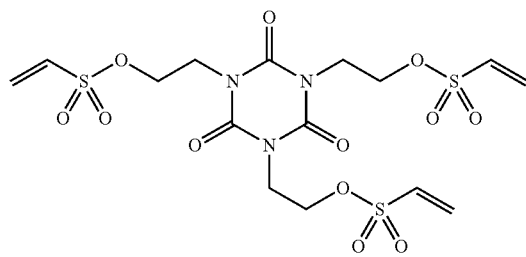
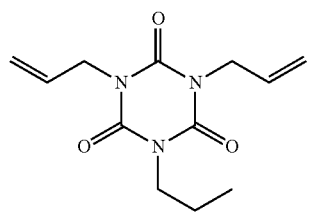
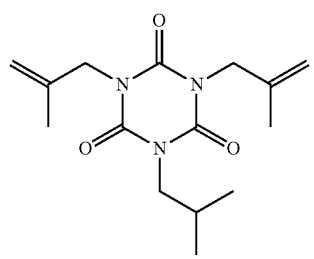
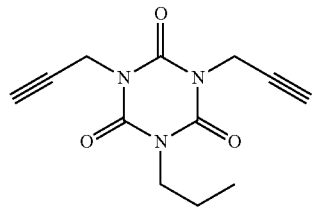
More preferred compounds are, among others, those compounds having the following structures.
[Chemical Formula 22]
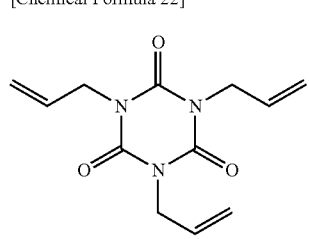
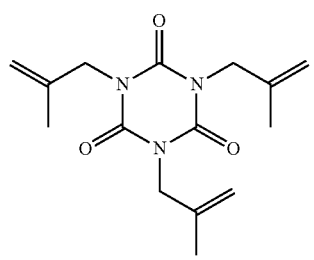
-continued
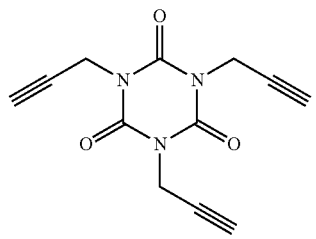
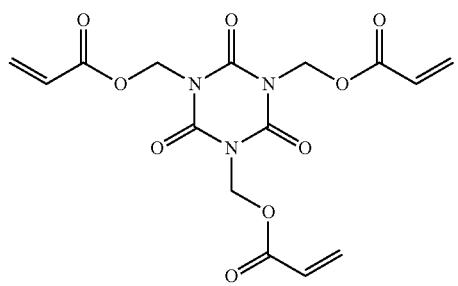
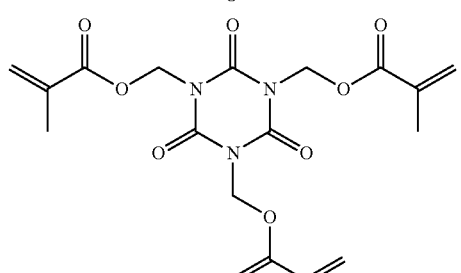
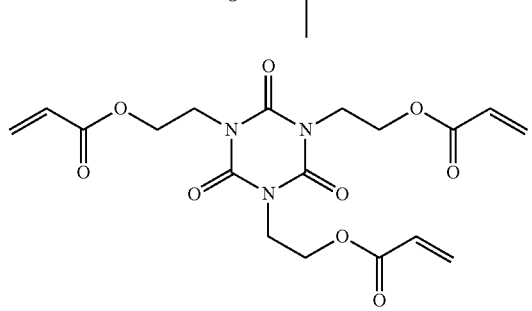
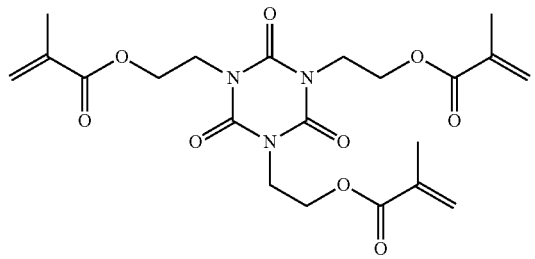
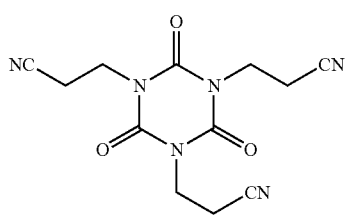

107
-continued
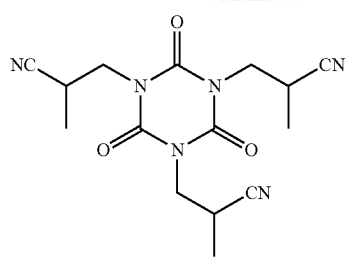
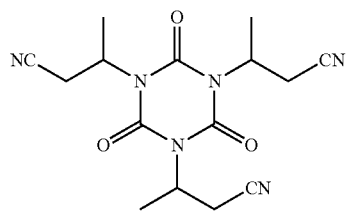
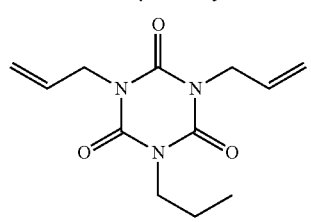
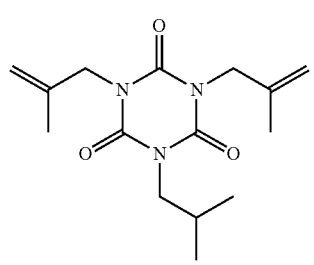
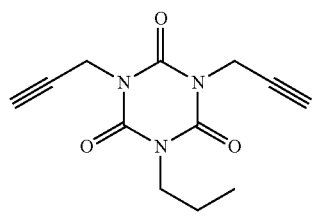
Particularly preferred compounds are, among others, those compounds having the following structures.
[Chemical Formula 23]
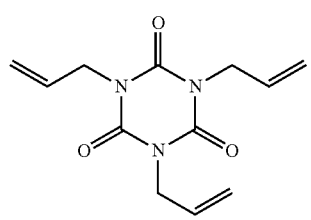
108
-continued
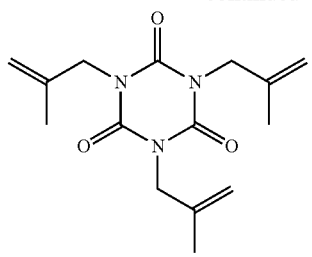
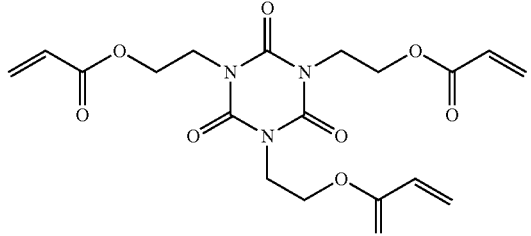
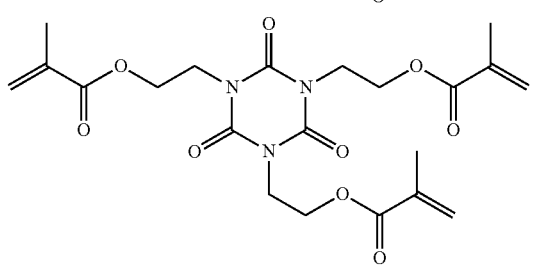
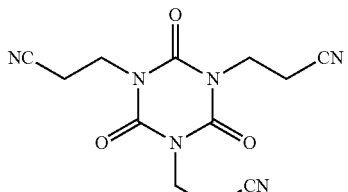
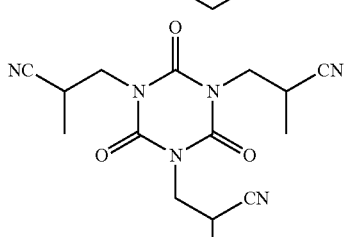
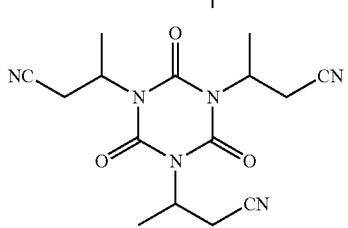
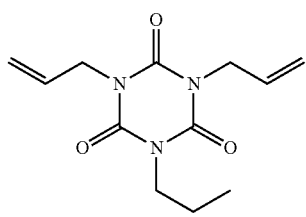

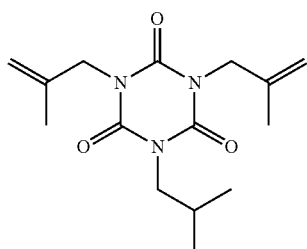

Some of the most preferred compounds are those compounds having the following structures.

[Chemical formula 24]

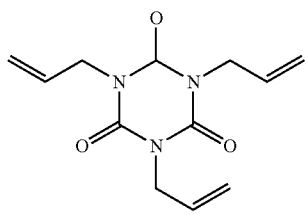

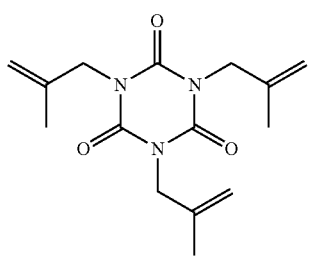

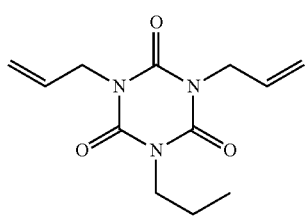

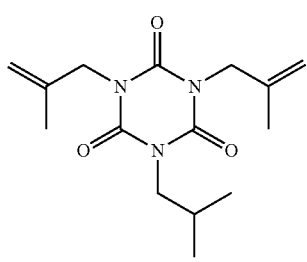

Of these most preferred compounds, the following compound is preferable from the point of view of film-forming ability.

[Chemical Formula 25]

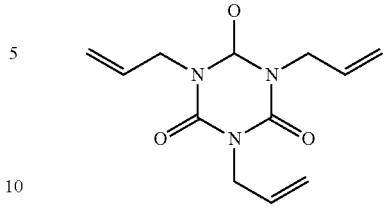

The specific compounds may be produced by any methods without limitation. Known methods may be selected appropriately.

The total proportion of the specific compound(s) in the nonaqueous electrolytic solution is preferably not less than 0.01 mass %, and more preferably not less than 0.1 mass %, and is preferably not more than 10 mass %, more preferably not more than 4.5 mass %, still more preferably not more than 3 mass %, even more preferably not more than 2 mass %, particularly preferably not more than 1.8 mass %, and most preferably not more than 1.6 mass %. If the concentration of the specific compounds is excessively high, too much reduction products will be formed and the surface of the negative electrode will be covered excessively with the result that the electrode reaction will be inhibited. Further, the cost of the nonaqueous electrolytic solution is increased. The above concentration ensures that an action at the electrode interface will occur more favorably and the battery characteristics can be optimized.

When a nonaqueous electrolyte secondary battery manufactured using a nonaqueous electrolytic solution which includes the specific compound is disassembled and the nonaqueous electrolytic solution is recovered, it is frequently the case that the content of the compound in the electrolytic solution has been significantly decreased from the initial. Thus, the scope of Invention 2 includes any nonaqueous electrolytic solutions that contain the specific compound after being withdrawn from batteries, no matter how trace the amount being detected. Further, when a nonaqueous electrolyte secondary battery manufactured using a nonaqueous electrolytic solution which includes the specific compound is disassembled and the nonaqueous electrolytic solution is recovered, it is frequently the case that the specific compound is scarcely found in the nonaqueous electrolytic solution but is detected on members constituting the nonaqueous electrolyte secondary battery, specifically, on a positive electrode, a negative electrode or a separator. Thus, the total amount of the specific compound detected on the positive electrode, the negative electrode and the separator may be assumed to have come from the nonaqueous electrolytic solution. It is preferable that the specific compound be present in a content falling in the aforementioned range based on this assumption.

<1-4. Additives>

The nonaqueous electrolytic solution of Invention 2 may contain various additives while ensuring that the advantageous effects of Invention 2 will not be impaired significantly. The additives may be any known additives. The additives may be used singly, or two or more may be used in any combination and in any ratio.

Examples of the additives include overcharge inhibitors, and auxiliaries for improving the capacity retention after storage at high temperatures and cycle characteristics. In particular, it is preferable that the solution include, as an auxiliary for improving the capacity retention after high-temperature storage and for suppressing an increase in resistance, at least one compound (hereinafter, sometimes written as the "specific additive(s)") selected from the group consisting of cyclic carbonates having a fluorine atom, cyclic carbonates having a carbon-carbon unsaturated bond, difluorophosphate salts, fluorosulfate salts, compounds having an isocyanate group, compounds having a cyano group, cyclic sulfonate esters and dicarboxylic acid complex salts. Hereinbelow, the additives will be described with respect to the specific additives and other additives.

<1-4-1. Specific Additives>

The specific additives will react with the specific compounds reduced on the negative electrode and form a film-like structure helpful for the electrode reaction in a concerted manner. The present inventors assume that the mechanism and principle of this reaction will be as described below. However, the mechanism and principle are not limited thereto. The following illustrate possible reaction mechanisms between the nucleophilic species Nu- formed on the negative electrode surface by the reduction of the specific compound and each of (i) a dicarboxylic acid complex salt, (ii) a cyclic carbonate having a fluorine atom, (iii) a cyclic carbonate having a carbon-carbon unsaturated bond, (iv) a difluorophosphate salt, (v) a fluorosulfate salt, (vi) a compound having an isocyanate group, (vii) a compound having a cyano group, and (viii) a cyclic sulfonate ester.

[Chemical Formula 26]

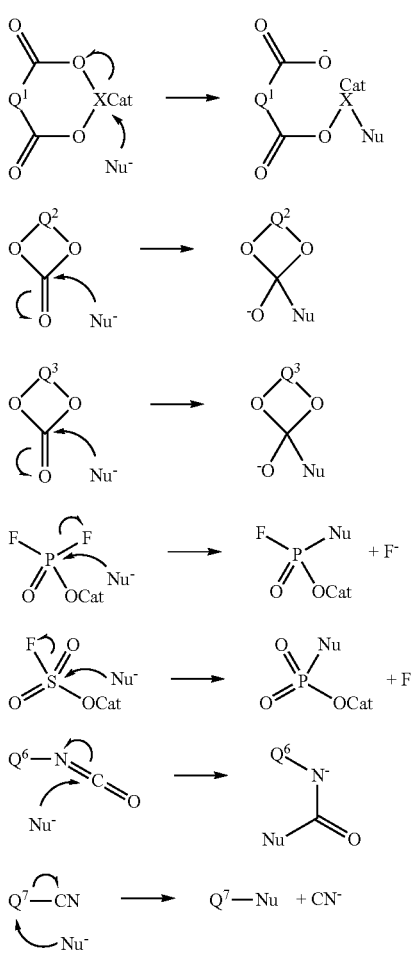

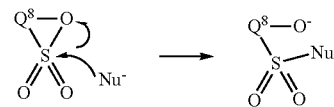

(In the reaction formulae, Cat is a cation constituting the salt, Q1 is a single bond or a divalent organic group, X is a divalent organic group containing a complex central element, Q2 is a divalent organic group containing a fluorine group, Q3 is a divalent organic group containing a carbon-carbon unsaturated bond, Q6 and Q7 are monovalent organic groups, and Q8 is a divalent organic group.)

As illustrated in the reaction formulae, the specific additives each include a nucleophilic attack acceptor site. It is probable that starting from the reactions illustrated, the specific compound and the specific additive form a film-like structure in a concerted manner which favorably supports the electrode reaction.

The molecular weight of the specific additives is not particularly limited as long as the advantageous effects of Invention 2 are not significantly impaired. Those additives having a molecular weight of 50 to 250 are preferable. This molecular weight ensures that the specific additive will exhibit good solubility in the nonaqueous electrolytic solution and will exert its effect sufficiently.

The specific additives may be produced by any methods without limitation. Known methods may be selected appropriately. Commercial additives may be used.

The nonaqueous electrolytic solution of Invention 2 may contain a single specific additive, or may contain two or more specific additives in any combination and in any ratio.

<1-4-1-1. Dicarboxylic Acid Complex Salts>

Of the specific additives, the dicarboxylic acid complex salts are not particularly limited. Any dicarboxylic acid complex salts may be used.

Examples of the dicarboxylic acid complex salts include those dicarboxylic acid complex salts in which the complex central element is boron, and those dicarboxylic acid complex salts in which the complex central element is phosphorus.

Specific examples of the dicarboxylic acid complex salts in which the complex central element is boron include lithium bis(oxalato)borate, lithium difluoro(oxalato)borate, lithium bis(malonato)borate, lithium difluoro(malonato)borate, lithium bis(methylmalonato)borate, lithium difluoro (methylmalonato)borate, lithium bis(dimethylmalonato)borate and lithium difluoro(dimethylmalonato)borate.

Specific examples of the dicarboxylic acid complex salts in which the complex central element is phosphorus include lithium tris(oxalato)phosphate, lithium difluorobis(oxalato)phosphate, lithium tetrafluoro(oxalato)phosphate, lithium tris(malonato)phosphate, lithium difluorobis(malonato)phosphate, lithium tetrafluoro(malonato)phosphate, lithium tris(methylmalonato)phosphate, lithium difluorobis(methylmalonato)phosphate, lithium tetrafluoro(methylmalonato)phosphate, lithium tris(dimethylmalonato)phosphate, lithium difluorobis(dimethylmalonato)phosphate and lithium tetrafluoro(dimethylmalonato)phosphate.

Of these, lithium bis(oxalato)borate, lithium difluoro(oxalato)borate, lithium tris(oxalato)phosphate, lithium difluorobis(oxalato)phosphate and lithium tetrafluoro(oxalato)phosphate are used more preferably because they are easily available and can contribute to the formation of a stable film-like structure.

The content of the dicarboxylic acid complex salt is not particularly limited and may be selected appropriately as long as the advantageous effects of Invention 2 are not significantly impaired. The content is preferably not less than 0.001 mass % and not more than 2.5 mass % relative to the nonaqueous electrolytic solution of Invention 2.

This lower limit of the content of the dicarboxylic acid complex salt ensures that the cycle characteristics of the nonaqueous electrolyte secondary batteries can be enhanced sufficiently. The upper limit ensures that an increase in the costs for the manufacturing of the nonaqueous electrolyte secondary batteries can be avoided and also makes it possible to avoid an expansion of the nonaqueous electrolyte secondary batteries due to gas generation. The content of the dicarboxylic acid complex salt is more preferably not less than 0.01 mass %, still more preferably not less than 0.1 mass %, and particularly preferably not less than 0.2 mass %, and is more preferably not more than 2.0 mass %, still more preferably not more than 1.5 mass %, and particularly preferably not more than 1.2 mass %.

<1-4-1-2. Cyclic Carbonates Having Fluorine Atom>

Of the specific additives, the cyclic carbonates having a fluorine atom (hereinafter, sometimes written as "F-containing carbonates") are not particularly limited as long as they contain a fluorine atom. Any F-containing carbonates may be used.

The number of fluorine atoms present in the F-containing carbonate is not particularly limited as long as there is 1 or more fluorine atoms. It is particularly preferable that the carbonate have 2 or less fluorine atoms.

Examples of the F-containing carbonates include fluoroethylene carbonate and derivatives thereof.

Specific examples of the fluoroethylene carbonate and its derivatives include those mentioned as examples of the cyclic carbonates having a fluorine atom in Invention 1.

Of the F-containing carbonates, fluoroethylene carbonate, 4-(fluoromethyl)-ethylene carbonate, 4,4-difluoroethylene carbonate and 4,5-difluoroethylene carbonate are preferable. In particular, fluoroethylene carbonate is used most preferably because it can contribute to the formation of a stable film-like structure.

The content of the F-containing carbonate is not particularly limited and may be selected appropriately as long as the advantageous effects of Invention 2 are not significantly impaired. The content is preferably not less than 0.001 mass % and not more than 10.0 mass % relative to the nonaqueous electrolytic solution of Invention 2.

This lower limit of the content of the F-containing carbonate ensures that the cycle characteristics of the nonaqueous electrolyte secondary batteries can be enhanced sufficiently. The upper limit ensures that an increase in the costs for the manufacturing of the nonaqueous electrolyte secondary batteries can be avoided. The content of the F-containing carbonate is more preferably not less than 0.01 mass %, still more preferably not less than 0.1 mass %, and particularly preferably not less than 0.2 mass %, and is more preferably not more than 8.0 mass %, and particularly preferably not more than 6.0 mass %.

Incidentally, the F-containing carbonate serves not only as the additive but also effectively as the nonaqueous solvent described in 1-2 hereinabove. When the F-containing carbonate is used as both the additive and the solvent, there is no clear border that divides the amount thereof into the respective uses, and the amount described may be understood as such.

<1-4-1-3. Cyclic Carbonates Having Carbon-Carbon Unsaturated Bond>

Of the specific additives, the cyclic carbonates having a carbon-carbon unsaturated bond (hereinafter, sometimes written as "unsaturated carbonates") are not particularly limited as long as the carbonates have a carbon-carbon unsaturated bond such as a carbon-carbon double bond or a carbon-carbon triple bond. Any such unsaturated carbonates may be used.

Examples of the unsaturated carbonates include vinylene carbonates, and ethylene carbonates substituted with a substituent having a carbon-carbon unsaturated bond.

Specific examples of the vinylene carbonates include vinylene carbonate, methylvinylene carbonate and 4,5-dimethylvinylene carbonate.

Specific examples of the ethylene carbonates substituted with a substituent having a carbon-carbon unsaturated bond include vinylethylene carbonate, 4,5-divinylethylene carbonate, ethynylethylene carbonate and propargylethylene carbonate.

Of these, vinylene carbonate, vinylethylene carbonate and ethynylethylene carbonate are preferable. In particular, vinylene carbonate is used more preferably because it can contribute to the formation of a stable film-like structure.

The content of the unsaturated carbonate is not particularly limited and may be selected appropriately as long as the advantageous effects of Invention 2 are not significantly impaired. The content is preferably not less than 0.001 mass % and not more than 5.0 mass % relative to the nonaqueous electrolytic solution of Invention 2.

This lower limit of the content of the unsaturated carbonate ensures that the cycle characteristics of the nonaqueous electrolyte secondary batteries can be enhanced sufficiently. The upper limit ensures that an initial increase in the resistance of the nonaqueous electrolyte secondary batteries can be avoided. The content of the unsaturated carbonate is more preferably not less than 0.01 mass %, still more preferably not less than 0.1 mass %, and particularly preferably not less than 0.2 mass %, and is more preferably not more than 4.0 mass %, still more preferably not more than 3.0 mass %, and particularly preferably not more than 2.0 mass %.

<1-4-1-4. Difluorophosphate Salts>

Of the specific additives, the difluorophosphate salts are not particularly limited as long as the salts have a difluorophosphate anion as a constituent. Any such difluorophosphate salts may be used.

Examples of the difluorophosphate salts include lithium difluorophosphate salt, sodium difluorophosphate salt, potassium difluorophosphate salt and ammonium difluorophosphate salt.

Of these, lithium difluorophosphate salt is preferable and is used more suitably because it can contribute to the formation of a stable film-like structure.

The content of the difluorophosphate salt is not particularly limited and may be selected appropriately as long as the advantageous effects of Invention 2 are not significantly impaired. The content is preferably not less than 0.001 mass % and not more than 2.0 mass % relative to the nonaqueous electrolytic solution of Invention 2.

This lower limit of the content of the difluorophosphate salt ensures that the cycle characteristics of the nonaqueous electrolyte secondary batteries can be enhanced sufficiently. The upper limit ensures that an increase in the costs for the manufacturing of the nonaqueous electrolyte secondary batteries can be avoided. The content of the difluorophosphate salt is more preferably not less than 0.01 mass %, still more preferably not less than 0.1 mass %, and particularly preferably not less than 0.2 mass %, and is more preferably not more than 1.5 mass %, still more preferably not more than 1.2 mass %, and particularly preferably not more than 1.1 mass %.

<1-4-1-5. Fluorosulfate Salts>

Of the specific additives, the fluorosulfate salts are not particularly limited as long as the salts have a fluorosulfate anion as a constituent. Any such fluorosulfate salts may be used.

Examples of the fluorosulfate salts include lithium fluorosulfate salt, sodium fluorosulfate salt, potassium fluorosulfate salt and ammonium fluorosulfate salt.

Of these, lithium fluorosulfate salt is preferable and is used more suitably because it can contribute to the formation of a stable film-like structure.

The content of the fluorosulfate salt is not particularly limited and may be selected appropriately as long as the advantageous effects of Invention 2 are not significantly impaired. The content is preferably not less than 0.001 mass % and not more than 4.0 mass % relative to the nonaqueous electrolytic solution of Invention 2.

This lower limit of the content of the fluorosulfate salt ensures that the cycle characteristics of the nonaqueous electrolyte secondary batteries can be enhanced sufficiently. The upper limit ensures that an increase in the costs for the manufacturing of the nonaqueous electrolyte secondary batteries can be avoided and also makes it possible to avoid a decrease in performance due to the corrosion of aluminum frequently used in positive electrode current collectors and metallic cans frequently used for exterior cases. The content of the fluorosulfate salt is more preferably not less than 0.01 mass %, still more preferably not less than 0.1 mass %, and particularly preferably not less than 0.2 mass %, and is more preferably not more than 3.0 mass %, still more preferably not more than 2.5 mass %, and particularly preferably not more than 2.0 mass %.

<1-4-1-6. Compounds Having Isocyanate Group>

Of the specific additives, the compounds having an isocyanate group (hereinafter, sometimes written as "isocyanates") are not particularly limited. Any isocyanates may be used.

Examples of the isocyanates include monoisocyanates, diisocyanates and triisocyanates.

Specific examples of the monoisocyanates include isocyanatomethane, isocyanatoethane, 1-isocyanatopropane, 1-isocyanatobutane, 1-isocyanatopentane, 1-isocyanatohexane, 1-isocyanatoheptane, 1-isocyanatooctane, 1-isocyanatononane, 1-isocyanatodecane, isocyanatocyclohexane, methoxycarbonyl isocyanate, ethoxycarbonyl isocyanate, propoxycarbonyl isocyanate, butoxycarbonyl isocyanate, methoxysulfonyl isocyanate, ethoxysulfonyl isocyanate, propoxysulfonyl isocyanate, butoxysulfonyl isocyanate and fluorosulfonyl isocyanate.

Specific examples of the diisocyanates include 1,4-diisocyanatobutane, 1,5-diisocyanatopentane, 1,6-diisocyanatohexane, 1,7-diisocyanatoheptane, 1,8-diisocyanatooctane, 1,9-diisocyanatononane, 1,10-diisocyanatodecane, 1,3-diisocyanatopropene, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, isophorone diisocyanate, bicyclo[2.2.1]heptane-2,5-diylbis (methyl=isocyanate), bicyclo[2.2.1]heptane-2,6-diylbis (methyl=isocyanate), 2,4,4-trimethylhexamethylene diisocyanate and 2,2,4-trimethylhexamethylene diisocyanate.

Specific examples of the triisocyanates include 1,6,11-triisocyanatoundecane, 4-isocyanatomethyl-1,8-octamethylene diisocyanate, 1,3,5-triisocyanatomethylbenzene, 1,3,5-tris(6-isocyanatohex-1-yl)-1,3,5-triazine-2,4,6(1H,3H,5H)-trione and 4-(isocyanatomethyl) octamethylene=diisocyanate.

Of these, 1,6-diisocyanatohexane, 1,3-bis(isocyanatomethyl)cyclohexane, 1,3,5-tris(6-isocyanatohex-1-yl)-1,3,5-triazine-2,4,6(1H,3H,5H)-trione, 2,4,4-trimethylhexamethylene diisocyanate and 2,2,4-trimethylhexamethylene diisocyanate are preferable and are used more suitably because they are easily available in industry and the costs for the production of the electrolytic solution can be saved, and also because, from a technical viewpoint, they can contribute to the formation of a stable film-like structure.

The content of the isocyanate is not particularly limited and may be selected appropriately as long as the advantageous effects of Invention 2 are not significantly impaired. The content is preferably not less than 0.001 mass % and not more than 1.0 mass % relative to the nonaqueous electrolytic solution of Invention 2.

This lower limit of the content of the isocyanate ensures that the cycle characteristics of the nonaqueous electrolyte secondary batteries can be enhanced sufficiently. The upper limit ensures that an initial increase in the resistance of the nonaqueous electrolyte secondary batteries can be avoided. The content of the isocyanate is more preferably not less than 0.01 mass %, more preferably not less than 0.1 mass %, and particularly preferably not less than 0.2 mass %, and is more preferably not more than 0.8 mass %, still more preferably not more than 0.7 mass %, and particularly preferably not more than 0.6 mass %.

<1-4-1-7. Compounds Having Cyano Group>

Of the specific additives, the compounds having a cyano group (hereinafter sometimes written as "nitriles") are not particularly limited. Any nitriles may be used.

Examples of the nitriles include mononitriles and dinitriles.

Specific examples of the mononitriles include those nitrile compounds described in Invention 1 as having one nitrile group.

Specific examples of the dinitriles include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile and 3,3'-(ethylenedithio)dipropionitrile.

Of these, dinitriles such as malononitrile, succinonitrile, glutaronitrile, adiponitrile, pimelonitrile, suberonitrile, azelanitrile, sebaconitrile, undecanedinitrile and dodecanedinitrile are used more suitably because they can contribute to the formation of a stable film-like structure.

The content of the nitrile is not particularly limited and may be selected appropriately as long as the advantageous effects of Invention 2 are not significantly impaired. The content is preferably not less than 0.001 mass % and not more than 5.0 mass % relative to the nonaqueous electrolytic solution of Invention 2.

This lower limit of the content of the nitrile ensures that the cycle characteristics of the nonaqueous electrolyte secondary batteries can be enhanced sufficiently. The upper limit ensures that an initial increase in the resistance of the nonaqueous electrolyte secondary batteries can be avoided and also makes it possible to prevent a decrease in rate characteristics. The content of the nitrile is more preferably not less than 0.01 mass %, still more preferably not less than 0.1 mass %, and particularly preferably not less than 0.2 mass %, and is more preferably not more than 4.0 mass %, still more preferably not more than 3.0 mass %, and particularly preferably not more than 2.5 mass %.

<1-4-1-8. Cyclic Sulfonate Esters>

Of the specific additives, the cyclic sulfonate esters are not particularly limited. Any cyclic sulfonate esters may be used.

Examples of the cyclic sulfonate esters include saturated cyclic sulfonate esters, unsaturated cyclic sulfonate esters, saturated cyclic disulfonate esters and unsaturated cyclic disulfonate esters.

Specific examples of the saturated cyclic sulfonate esters include 1,3-propanesultone, 1-fluoro-1,3-propanesultone, 2-fluoro-1,3-propanesultone, 3-fluoro-1,3-propanesultone 1-methyl-1,3-propanesultone, 2-methyl-1,3-propanesultone, 3-methyl-1,3-propanesultone, 1,4-butanesultone, 1-fluoro-1,4-butanesultone, 2-fluoro-1,4-butanesultone, 3-fluoro-1,4-butanesultone, 4-fluoro-1,4-butanesultone, 1-methyl-1,4-butanesultone, 2-methyl-1,4-butanesultone, 3-methyl-1,4-butanesultone and 4-methyl-1,4-butanesultone.

Specific examples of the unsaturated cyclic sulfonate esters include 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1-butene-1,4-sultone, 2-butene-1,4-sultone, 3-butene-1,4-sultone, 1-fluoro-1-butene-1,4-sultone, 2-fluoro-1-butene-1,4-sultone, 3-fluoro-1-butene-1,4-sultone, 4-fluoro-1-butene-1,4-sultone, 1-fluoro-2-butene-1,4-sultone, 2-fluoro-2-butene-1,4-sultone, 3-fluoro-2-butene-1,4-sultone, 4-fluoro-2-butene-1,4-sultone, 1-fluoro-3-butene-1,4-sultone, 2-fluoro-3-butene-1,4-sultone, 3-fluoro-3-butene-1,4-sultone, 4-fluoro-3-butene-1,4-sultone, 1-methyl-1-butene-1,4-sultone, 2-methyl-1-butene-1,4-sultone, 3-methyl-1-butene-1,4-sultone, 4-methyl-1-butene-1,4-sultone, 1-methyl-2-butene-1,4-sultone, 2-methyl-2-butene-1,4-sultone, 3-methyl-2-butene-1,4-sultone, 4-methyl-2-butene-1,4-sultone, 1-methyl-3-butene-1,4-sultone, 2-methyl-3-butene-1,4-sultone, 3-methyl-3-butene-1,4-sultone and 4-methyl-3-butene-1,4-sultone.

Of these, 1,3-propanesultone, 1-fluoro-1,3-propanesultone, 2-fluoro-1,3-propanesultone, 3-fluoro-1,3-propanesultone and 1-propene-1,3-sultone are more suitably used because they are easily available and can contribute to the formation of a stable film-like structure.

The content of the cyclic sulfonate ester is not particularly limited and may be selected appropriately as long as the advantageous effects of Invention 2 are not significantly impaired. The content is preferably not less than 0.001 mass % and not more than 3.0 mass % relative to the nonaqueous electrolytic solution of Invention 2.

This lower limit of the content of the cyclic sulfonate ester ensures that the cycle characteristics of the nonaqueous electrolyte secondary batteries can be enhanced sufficiently. The upper limit ensures that an increase in the costs for the manufacturing of the nonaqueous electrolyte secondary batteries can be avoided. The content of the cyclic sulfonate ester is more preferably not less than 0.01 mass %, still more preferably not less than 0.1 mass %, and particularly preferably not less than 0.2 mass %, and is more preferably not more than 2.5 mass %, still more preferably not more than 2.0 mass %, and particularly preferably not more than 1.8 mass %.

<1-4-2. Other Additives>

Examples of the additives other than the specific additives include overcharge inhibitors, and auxiliaries for improving the capacity retention after storage at high temperatures and cycle characteristics.

<1-4-2-1. Overcharge Inhibitors>

Specific examples of the overcharge inhibitors include aromatic compounds, specifically, toluene derivatives such as toluene and xylene; unsubstituted or alkyl-substituted biphenyl derivatives such as biphenyl, 2-methylbiphenyl, 3-methylbiphenyl and 4-methylbiphenyl; unsubstituted or alkyl-substituted terphenyl derivatives such as o-terphenyl, m-terphenyl and p-terphenyl; partially hydrogenated products of unsubstituted or alkyl-substituted terphenyl derivatives; cycloalkylbenzene derivatives such as cyclopentylbenzene and cyclohexylbenzene; alkylbenzene derivatives having a tertiary carbon directly bonded to the benzene ring, such as cumene, 1,3-diisopropylbenzene and 1,4-diisopropylbenzene; alkylbenzene derivatives having a quaternary carbon directly bonded to the benzene ring, such as t-butylbenzene, t-amylbenzene and t-hexylbenzene; and aromatic compounds having an oxygen atom, such as diphenyl ether and dibenzofuran.

Specific examples of the overcharge inhibitors further include partially fluorinated products of the above aromatic compounds, such as fluorobenzene, fluorotoluene, benzotrifluoride, 2-fluorobiphenyl, o-cyclohexylfluorobenzene and p-cyclohexylfluorobenzene; and fluorine-containing anisole compounds such as 2,4-difluoroanisole, 2,5-difluoroanisole and 1,6-difluoroanisole.

The overcharge inhibitors may be used singly, or two or more may be used in any combination. The inhibitors used in combination may belong to the same category of compounds described above or to different categories of compounds described above.

When the overcharge inhibitor is used, the amount of the overcharge inhibitor may be selected appropriately as long as the advantageous effects of Invention 2 are not significantly impaired. The amount is preferably not less than 0.001 mass % and not more than 10 mass % relative to the whole nonaqueous electrolytic solution.

The addition of the overcharge inhibitor to the nonaqueous electrolytic solution of Invention 2 without significantly impairing the advantageous effects of Invention 2 is preferable because the safety of the nonaqueous electrolyte secondary batteries is enhanced even if the batteries are overcharged due to a malfunction of overcharge protection circuits for such reasons as incorrect usage or abnormalities in battery chargers.

<1-4-2-2. Auxiliaries>

Specific examples of the auxiliaries for improving the capacity retention after high-temperature storage and cycle characteristics include:

anhydrides of dicarboxylic acids such as succinic acid, maleic acid and phthalic acid; carbonate compounds other than unsaturated bond-containing carbonates, such as erythritan carbonate and spiro-bis-dimethylene carbonate; sulfur-containing compounds, specifically, cyclic sulfites such as ethylene sulfite; chain sulfonate esters such as methyl methanesulfonate and busulfan; cyclic sulfones such as sulfolane and sulfolene; chain sulfones such as dimethylsulfone, diphenylsulfone and methylphenylsulfone; sulfides such as dibutyl disulfide, dicyclohexyl disulfide and tetramethylthiuram monosulfide; and sulfonamides such as N,N-dimethylmethanesulfonamide and N,N-diethylmethanesulfonamide; nitrogen-containing compounds such as 1-methyl-2-pyrrolidinone, 1-methyl-2-piperidone, 3-methyl-2-oxazolidinone and 1,3-dimethyl-2-imidazolidinone; hydrocarbon compounds such as heptane, octane and cycloheptane; and fluorine-containing aromatic compounds such as fluorobenzene, difluorobenzene and benzotrifluoride.

The auxiliaries may be used singly, or two or more may be used in any combination and in any ratio.

When the auxiliary is used, the content thereof in the nonaqueous electrolytic solution of Invention 2 may be selected appropriately as long as the advantageous effects of Invention 2 are not significantly impaired. The content is preferably not less than 0.001 mass % and not more than 10 mass % relative to the whole nonaqueous electrolytic solution.

<1-5. Methods for Producing Nonaqueous Electrolytic Solutions>

The nonaqueous electrolytic solution of Invention 2 may be prepared by dissolving the electrolyte, the specific compound and optionally the aforementioned "additives" and "auxiliaries" into the nonaqueous solvent described hereinabove.

In the preparation of the nonaqueous electrolytic solution, the raw materials for the nonaqueous electrolytic solution, namely, the materials including the electrolyte such as lithium salt, the specific compound, the nonaqueous solvent, the additives and the auxiliaries are preferably dehydrated beforehand. The degree of dehydration is usually to not more than 50 ppm, and preferably to not more than 30 ppm.

Removing water from the nonaqueous electrolytic solution reduces the probabilities of undesired reactions such as the electrolysis of water, the reaction of water with lithium metal, and the hydrolysis of the lithium salt. The dehydration methods are not particularly limited. When, for example, the object to be dehydrated is a liquid such as the nonaqueous solvent, a desiccant such as molecular sieves may be used. When the object to be dehydrated is a solid such as the electrolyte, drying may be performed by performing heating at a temperature below the decomposition temperature.

[2. Nonaqueous Electrolyte Secondary Batteries]

The nonaqueous electrolyte secondary battery of Invention 2 includes a negative electrode and a positive electrode capable of storing and releasing metal ions, and the nonaqueous electrolytic solution of Invention 2 described above.

<2-1. Battery Configurations>

Except the positive electrode described later and the nonaqueous electrolytic solution described hereinabove, the configuration of the nonaqueous electrolyte secondary battery of Invention 2 is the same as that of a conventional nonaqueous electrolyte secondary battery. The battery usually has a structure in which the positive and negative electrodes are stacked via a porous membrane (a separator) impregnated with the nonaqueous electrolytic solution of Invention 2, and the unit is accommodated in a case (an exterior package). Thus, the shapes of the nonaqueous electrolyte secondary batteries of Invention 2 are not particularly limited and may be any of cylindrical forms, prismatic forms, laminates, coins and large shapes.

<2-2. Nonaqueous Electrolytic Solutions>

The nonaqueous electrolytic solution is the nonaqueous electrolytic solution of Invention 2 described above. The nonaqueous electrolytic solution of Invention 2 may be used as a mixture with other nonaqueous electrolytic solution without departing from the scope of Invention 2.

<2-3. Negative Electrodes>

The negative electrode active material used in the negative electrode is not particularly limited as long as it can electrochemically store and release metal ions. Specific examples include carbonaceous materials, metal compound materials and lithium-containing metal composite oxide materials. These materials may be used singly, or two or more may be used in any combination.

<2-3-1. Carbonaceous Materials>

The carbonaceous materials used as the negative electrode active materials are not particularly limited, but those selected from (1) to (4) below are preferable because a good balance is obtained between initial irreversible capacity and high-current density charge/discharge characteristics.

(1) Natural graphites.

(2) Carbonaceous materials obtained by heat treating artificial carbonaceous substances and artificial graphitic substances one or more times at 400 to 3200° C.

(3) Carbonaceous materials that form a negative electrode active material layer which is composed of at least two kinds of carbonaceous substances having different crystallinities and/or which has an interface formed by such different crystalline carbonaceous substances.

(4) Carbonaceous materials that form a negative electrode active material layer which is composed of at least two kinds of carbonaceous substances having different orientations and/or which has an interface formed by such carbonaceous substances having different orientations.

The carbonaceous materials (1) to (4) may be used singly, or two or more may be used in any combination and in any ratio.

Specific examples of the artificial carbonaceous substances and the artificial graphitic substances used in (2) above include pyrolysates of organic substances such as natural graphites, coal cokes, petroleum cokes, coal pitches, petroleum pitches, oxidation products of these pitches, needle cokes, pitch cokes, carbon materials obtained by the partial graphitization of these cokes, furnace blacks, acetylene blacks and pitch-based carbon fibers, carbonizable organic substances, carbides of such substances, and carbide solutions obtained by dissolving carbonizable organic substances into low-molecular organic solvents such as benzene, toluene, xylene, quinoline and n-hexane.

The carbonaceous materials desirably satisfy any one or more of the following items (1) to (8) at the same time.

(1) X-Ray Parameters

The d value (the interlayer distance) between lattice planes (002 planes) and the crystallite size (Lc) obtained by X-ray diffractometry according to GAKUSHIN method with respect to the carbonaceous material are the same as the X-ray parameters (the d value and the crystallite size) of the carbonaceous material described in Invention 1. The crystallite size (Lc) is most preferably not less than 2 nm.

(2) Volume-Based Average Particle Diameter

The volume-based average particle diameter of the carbonaceous material is the same as the volume-based average particle diameter of the carbonaceous material described in Invention 1.

When the volume-based average particle diameter is in the aforementioned range, an excessive increase in irreversible capacity is avoided so that an initial capacity loss tends to be prevented. Further, the average particle diameter in the aforementioned range is desirable in terms of battery manufacturing steps because the electrode-forming liquid can be easily applied uniformly.

The volume-based average particle diameter may be measured by the same method as the volume-based average particle diameter described with respect to the carbonaceous material in Invention 1.

(3) Raman R Value and Raman Half Width

The Raman R value of the carbonaceous material is the same as the Raman R value of the carbonaceous material described in Invention 1.

When the Raman R value is in the aforementioned range, the particle surface has appropriate crystallinity and provides sufficient interlayer sites for the intercalation and deintercalation of Li during charging and discharging, thus ensuring that charge acceptability will not be decreased. Further, when the carbonaceous material is applied onto a current collector and is pressed to increase the density of the negative electrode, a decrease in load characteristics tends to be prevented. Furthermore, a decrease in efficiency or an increase in gas production tends to be avoided.

The Raman half width at near 1580 $cm^{-1}$ of the carbonaceous material is, although not particularly limited to, 10 $cm^{-1}$ or more, and preferably 15 $cm^{-1}$ or more, and is usually 100 $cm^{-1}$ or less, preferably 80 $cm^{-1}$ or less, more preferably 60 $cm^{-1}$ or less, and particularly preferably 40 $cm^{-1}$ or less.

When the Raman half width is in the above range, the particle surface has appropriate crystallinity and provides sufficient interlayer sites for the intercalation and deintercalation of Li during charging and discharging, thus ensuring that charge acceptability will not be decreased. Further, when the carbonaceous material is applied onto a current collector and is pressed to increase the density of the negative electrode, a decrease in load characteristics tends to be prevented. Furthermore, a decrease in efficiency or an increase in gas production tends to be avoided.

A Raman spectrum may be measured by the same method as the method for measuring a Raman spectrum of the carbonaceous material described in Invention 1. The half width of a peak PA near 1580 $cm^1$ in the Raman spectrum obtained by the measurement is defined as the Raman half width of the carbonaceous material.

The Raman measurement conditions are as follows:
Argon ion laser wavelength: 514.5 nm
Laser power on sample: 15 to 25 mW
Resolution: 10 to 20 $cm^{-1}$
Measurement range: 1100 $cm^{-1}$ to 1730 $cm^{-1}$
Raman R value and Raman half width analysis: background processing
Smoothing processing: simple averaging, convolution 5 points (4) BET Specific Surface Area The BET specific surface area of the carbonaceous material is the same as the BET specific surface area of the carbonaceous material described in Invention 1.

When the BET specific surface area is in the aforementioned range, the carbonaceous material used as the negative electrode material ensures good acceptability for cations such as lithium during charging and makes it difficult for the cations such as lithium to be precipitated on the electrode surface, thus avoiding a decrease in stability. Further, the reactivity with respect to the nonaqueous electrolytic solution is reduced and consequently the battery will function favorably with small gas generation.

The specific surface area may be measured by the BET method in the same manner as described with respect to the carbonaceous material in Invention 1.

(5) Circularity

The circularity as a degree of sphericity of the carbonaceous material is the same as the circularity of the carbonaceous material explained in Present invention 1.

Measurement of the circularity of the carbonaceous material is carried out in the same manner as in the measurement of the circularity explained with regard to the carbonaceous material in Present invention 1.

A method for improving the circularity is the same as in the method for improving the circularity of the carbonaceous material explained in Present invention 1.

(6) Tap Density

The tap density of the carbonaceous material is the same as the tap density of the carbonaceous material explained in Present invention 1.

If the tap density is within the above-mentioned range, when it is used as a negative electrode, a packing density can be sufficiently ensured whereby a battery with high capacity can be obtained. Further, the gaps between the particles in the electrode do not become too small, conductivity between the particles is secured, and preferred battery characteristics are easily obtained.

Measurement of the tap density is carried out in the same manner as in the measurement of the tap density explained with regard to the carbonaceous material in Present invention 1.

(7) Orientation Ratio

The orientation ratio of the carbonaceous material is the same as in the orientation ratio of the carbonaceous material explained in Present invention 1.

Measurement of the orientation ratio of the carbonaceous material is carried out in the same manner as in the measurement method of the orientation ratio explained with regard to the carbonaceous material in Present invention 1.

The measurement conditions of the X-ray diffraction are the same as in the measurement conditions of the X-ray diffraction for obtaining the orientation ratio of the carbonaceous material explained in Present invention 1.

(8) Aspect Ratio (Powder)

The aspect ratio of the carbonaceous material is the same as in the aspect ratio of the carbonaceous material explained in Present invention 1.

Measurement of the aspect ratio of the carbonaceous material is carried out in the same manner as in the measurement of the aspect ratio explained with regard to the carbonaceous material in Present invention 1.

<2-3-2. Metal Compound-Based Material>

The metal compound-based material to be used as a negative electrode active material is not particularly limited as long as it can store and discharge lithium, a simple metal or an alloy forming the lithium alloy, or a compound such as an oxide, a carbide, a nitride, a silicide, a sulfide, a phosphide, etc., thereof. Such a metallic compound may be mentioned a compound containing a metal such as Ag, Al, Ba, Bi, Cu, Ga, Ge, In, Ni, P, Pb, Sb, Si, Sn, Sr, Zn, etc. Among these, it is preferably a simple metal or an alloy forming the lithium alloy, more preferably a material containing a metal of Group 13 or Group 14 of the periodic table or a metalloid element (i.e., carbon is excluded), further preferably a simple metal of silicon (Si), tin (Sn) or lead (Pb) (in the following, these three kinds of elements are sometimes called as "SSP metal elements") or an alloy containing these atoms, or a compound of these metals (SSP metal elements). The most preferred is silicon. These may be used either one kind alone, or may be used in combination of two or more kinds with optional combination and ratio.

Examples of the negative electrode active materials having at least one atom selected from the SSP metal elements may be mentioned a metal simple substance of any of one kind of the SSP metal elements, an alloy comprising two or more kinds of the SSP metal elements, an alloy comprising one kind or two or more kinds of the SSP metal elements and one kind or two or more kinds of the other metal elements, and a compound containing one kind or two or more kinds of the SSP metal elements, or, a complex compound of an oxide, a carbide, a nitride, a silicide, a sulfide, a phosphide, etc., of the compound, and the like. By using these metal simple substances, alloys or metallic compounds as the negative electrode active material, it is possible to make the battery high capacity.

In addition, a compound in which these complex compounds are intricately bonded to a metal simple substance, an alloy or several kinds of elements such as a non-metal element, etc., may be mentioned as examples. More specifically, for example, in silicon or tin, an alloy of these elements and a metal which does not work as a negative electrode may be used. In addition, for example, in tin, a complex compound containing 5 to 6 kinds of elements comprising a combination of tin, a metal which works as a negative electrode other than silicon, further a metal which does not work as a negative electrode, and a non-metal element may be also used.

Among these negative electrode active materials, in the aspect that a capacity per a unit mass is large when a battery is produced, a metal simple substance of any one kind of the SSP metal elements, an alloy comprising two or more kinds of the SSP metal elements, and an oxide, a carbide, a nitride, etc., of the SSP metal elements are preferred, in particular, a metal simple substance, an alloy, an oxide, a carbide, a nitride, etc., of silicon and/or tin are preferred, and a metal simple substance of silicon, an alloy, an oxide, a carbide, etc., thereof are most preferred in the view point of a capacity per a unit mass and burden on the environment.

In addition, while it is inferior in a capacity per a unit mass to those of using a metal simple substance or an alloy, the following compound containing silicon and/or tin is preferred since it is excellent in cycle characteristics.

"Oxide(s) of silicon and/or tin" having an elemental ratio of silicon and/or tin and oxygen of generally 0.5 or more, preferably 0.7 or more, further preferably 0.9 or more, and generally 1.5 or less, preferably 1.3 or less, further preferably 1.1 or less.

"Nitride(s) of silicon and/or tin" having an elemental ratio of silicon and/or tin and nitrogen of generally 0.5 or more, preferably 0.7 or more, further preferably 0.9 or more, and generally 1.5 or less, preferably 1.3 or less, further preferably 1.1 or less.

"Carbide(s) of silicon and/or tin" having an elemental ratio of silicon and/or tin and carbon of generally 0.5 or more, preferably 0.7 or more, further preferably 0.9 or more, and generally 1.5 or less, preferably 1.3 or less, further preferably 1.1 or less.

The above-mentioned negative electrode active material may be used either one kind alone, or may be used two or more kinds with an optional combination and a ratio in combination.

<2-3-3. Lithium-Containing Metal Composite Oxide Material>

The lithium-containing metal composite oxide material to be used as a negative electrode active material is not particularly limited as long as it can store and discharge lithium, preferably a lithium-containing composite metal oxide material containing titanium, and particularly preferably a composite oxide of lithium and titanium (hereinafter sometimes abbreviated to as "lithium-titanium composite oxide".). That is, it is particularly preferred when a lithium-titanium composite oxide having a spinel structure is used by adding to a negative electrode active material for a lithium ion nonaqueous electrolyte secondary battery, since an output resistance is markedly reduced.

In addition, it is also preferred that lithium or titanium of the lithium-titanium composite oxide is replaced by other metal element(s), for example, at least one element selected from the group consisting of Na, K, Co, Al, Fe, Ti, Mg, Cr, Ga, Cu, Zn and Nb.

The above-mentioned metal oxide as the negative electrode active material is a lithium-titanium composite oxide represented by the following general formula (5), and in the general formula (5), it is preferred that $0.7 \leq x \leq 1.5$, $1.5 \leq y \leq 2.3$ and $0 \leq z \leq 1.6$ since the structure of the lithium ion at the time of dope and dedope is stable.

$$Li_xTi_yM_zO_4 \qquad (5)$$

(in the general formula (5), M represents at least one element selected from the group consisting of Na, K, Co, Al, Fe, Ti, Mg, Cr, Ga, Cu, Zn and Nb.)

Among the composition represented by the above-mentioned general formula (5), the structures in which (a) $1.2 \leq x \leq 1.4$, $1.5 \leq y \leq 1.7$, $z=0$
(b) $0.9 \leq x \leq 1.1$, $1.9 \leq y \leq 2.1$, $z=0$
(c) $0.7 \leq x \leq 0.9$, $2.1 \leq y \leq 2.3$, $z=0$ are particularly preferred since balance in battery characteristics is good.

A particularly preferred representative composition of the above-mentioned compound is $Li_{4/3}Ti_{5/3}O_4$ in (a), $Li_1Ti_2O_4$ in (b), and $Li_{4/5}Ti_{11/5}O_4$ in (c). Also, with regard to the structure of $z \neq 0$, for example, $Li_{4/3}Ti_{4/3}Al_{1/3}O_4$ is mentioned as a preferred material.

The lithium-titanium composite oxide as the negative electrode active material in Present invention 2 is preferably a material, in addition to the above-mentioned requirements, further satisfying at least one item among the physical properties and characteristics such as a shape, etc., shown in the following [1] to [8], and particularly preferably satisfying a plural number of items simultaneously.

[1] BET Specific Surface Area

The BET specific surface area of the lithium-titanium composite oxide to be used as the negative electrode active material has a value of the specific surface area measured by the BET method of preferably 0.5 $m^2 \cdot g^{-1}$ or more, more preferably 0.7 $m^2 \cdot g^{-1}$ or more, further preferably 1.0 $m^2 \cdot g^{-1}$ or more, and particularly preferably 1.5 $m^2 \cdot g^{-1}$ or more, and preferably 200 $m^2 \cdot g^{-1}$ or less, more preferably 100 $m^2 \cdot g^{-1}$ or less, further preferably 50 $m^2 \cdot g^{-1}$ or less, and particularly preferably 25 $m^2 \cdot g^{-1}$ or less.

The BET specific surface area is within the above-mentioned range, a reaction area contacting with the nonaqueous electrolyte when it is used as the negative electrode material is difficultly reduced, and increase in an output resistance is prevented. Further, increase in crystals of a metal oxide containing titanium at the surface or the portion of the edge surface is suppressed, and strain of the crystals based thereon is difficultly generated, so that a preferred battery can be easily obtained.

Measurement of the specific surface area of the lithium-titanium composite oxide by the BET method is carried out by using a surface meter (a full automatic surface area measuring device manufactured by Ohkura Riken Co., Ltd.), the sample is predried under the flow of nitrogen at 350° C. for 15 minutes, and then, by using a nitrogen-helium mixed gas in which a value of a relative pressure of the nitrogen to the atmospheric pressure has been accurately adjusted to 0.3, it is carried out by the nitrogen adsorption single point BET method using the flowing gas method. The specific surface area obtained by the measurement is defined to be the BET specific surface area of the lithium-titanium composite oxide.

[2] Volume-Based Average Particle Size

The volume-based average particle size (when the primary particles are agglomerated to form a secondary particle, it is a secondary particle diameter) of the lithium-titanium composite oxide is defined by a volume-based average particle size (median diameter) obtained by the laser diffraction scattering method.

The volume-based average particle size of the lithium-titanium composite oxide is preferably 0.1 μm or more, more preferably 0.5 μm or more, further preferably 0.7 μm or more, and preferably 50 μm or less, more preferably 40 μm or less, further preferably 30 μm or less, and particularly preferably 25 μm or less.

Measurement of the volume-based average particle size of the lithium-titanium composite oxide is more specifically carried out by dispersing the lithium-titanium composite oxide powder in 0.2% by mass of an aqueous polyoxyethylene (20) sorbitan monolaurate solution (10 mL) as a surfactant, and by using a laser diffraction scattering type particle size distribution meter (LA-700 manufactured by HORIBA, LTD.). The median diameter obtained by the measurement is defined to be the volume-based average particle size of the lithium-titanium composite oxide.

When the volume average particle size of the lithium-titanium composite oxide is within the above-mentioned range, an amount of the binder can be suppressed at the time of producing the negative electrode, and lowering in the electrode capacity can be easily prevented as a result. Further, when the negative electrode plate is to be formed, uniform coating surface can be easily obtained, which is desired in view of the battery producing process.

[3] Average Primary Particle Size

When the primary particles are agglomerated to form a secondary particle, the average primary particle size of the lithium-titanium composite oxide is preferably 0.01 μm or more, more preferably 0.05 μm or more, further preferably 0.1 μm or more, and particularly preferably 0.2 μm or more, and preferably 2 μm or less, more preferably 1.6 m or less, further preferably 1.3 μm or less, and particularly preferably 1 μm or less. If the volume-based average primary particle size is within the above-mentioned range, spherical secondary particles can be easily formed, and the specific surface area can be easily secured so that lowering in the battery performances such as output characteristics can be readily prevented.

The primary particle size of the lithium-titanium composite oxide is measured by observation using the scanning electron microscope (SEM). More specifically, in a photograph with a magnification in which the particles can be confirmed, for example, with a magnification of 10,000 to 100,000-fold, it can be obtained by measuring the longest value of the intercept by the right and left boundary line of the primary particle to the straight line in the horizontal direction with regard to the optional fifty primary particles, and calculating the average value thereof.

[4] Shape

The shape of the particles of the lithium-titanium composite oxide may be any of massive, polyhedral, spherical, oval spherical, platy, acicular, columnar, etc., which has conventionally been used, and among these, the primary particles are aggregated to form a secondary particle, and the shape of the secondary particle is spherical or oval spherical is preferred.

In general, accompanied by charge/discharge of the electrochemical element, the active material in the electrode is expanded and contracted, so that deterioration such as breakage of the active material due to the stress or snaps of the conductive path, etc., is likely caused. Therefore, when a material in which the primary particles are agglomerated to form a secondary particle is employed than the active material comprising single particles of the primary particles alone, the stress by expansion and contraction is alleviated, whereby deterioration can be prevented.

In addition, spherical or oval spherical particles are preferably employed than the axis orientation particles such as platy, etc., since orientation at the time of forming the electrode is a little, so that expansion and contraction of the electrode at the time of charging/discharging is a little, and these are easily mixed uniformly with the conductive material at the time of producing the electrode.

[5] Tap Density

The tap density of the lithium-titanium composite oxide is preferably 0.05 g·cm$^{-3}$, more preferably 0.1 g·cm$^{-3}$ or more, further preferably 0.2 g·cm$^{-3}$ or more, and particularly preferably 0.4 g·cm$^{-3}$ or more, and preferably 2.8 g·cm$^{-3}$ or less, further preferably 2.4 g·cm$^{-3}$ or less, and particularly preferably 2 g·cm$^{-3}$ or less. If the tap density of the lithium-titanium composite oxide is within the above-mentioned range, when it is used as the negative electrode, sufficient packing density can be secured, contact area between the particles can be secured, whereby resistance between the particles is difficultly increased, and increase in output resistance can be easily prevented. Further, spaces between the particles in the electrode are suitable, so that a flow path of the nonaqueous electrolyte can be secured, whereby increase in output resistance can be easily prevented.

For the measurement of the tap density of the lithium-titanium composite oxide, the sample is dropped to 20 cm$^3$ of a tapping cell through a sieve having an opening of 300 μm to fill the sample up to the upper end surface of the cell, then, 1,000 times of tapping with a stroke length of 10 mm are carried out by using a powder density measurement device (for example, Tapdenser manufactured by SEISHIN ENTERPRISE Co., Ltd.), and the density is calculated from the volume at that time and the mass of the sample. The tap density calculated by the measurement is defined to be a tap density of the lithium-titanium composite oxide.

[6] Circularity

When the circularity is measured as the degree of the sphericity of the lithium-titanium composite oxide, it is preferred that it falls within the following range. Incidentally, the circularity is defined by "circularity=(the girth of a corresponding circle having the same area as the projected shape of the particle)/(the actual girth of the projected shape of the particle)", and when the circularity is 1, it becomes theoretical true sphere.

The circularity of the lithium-titanium composite oxide is desirably as close as 1. It is preferably 0.10 or more, more preferably 0.80 or more, further preferably 0.85 or more, and particularly preferably 0.90 or more. The charge and discharge characteristics of high current density are generally improved as the circularity is larger. Accordingly, the circularity is within the above-mentioned range, increase in resistance between the particles can be prevented without lowering the filling property of the negative electrode active material, and lowering in charge and discharge characteristics of high current density with a short period of time can be prevented.

Measurement of the circularity of the lithium-titanium composite oxide is carried out by using a flow type particle image analyzer (FPIA manufactured by Sysmex Corporation). More specifically, about 0.2 g of the sample is dispersed in 0.2% by mass aqueous solution (about 50 mL) of polyoxyethylene (20) sorbitan monolaurate which is a surfactant, irradiated with an ultrasonic wave of 28 kHz with an output of 60 W for 1 minute, then, by designating a detection range to 0.6 to 400 µm, the particles having a particle size in the range of 3 to 40 µm are measured. The circularity obtained by the measurement is defined to be a circularity of the lithium-titanium composite oxide in Present invention 2.

[7] Aspect Ratio

The aspect ratio of the lithium-titanium composite oxide is preferably 1 or more, and preferably 5 or less, more preferably 4 or less, further preferably 3 or less, and particularly preferably 2 or less. If the aspect ratio is within the above-mentioned range, streak pulling during the electrode plate formation is difficultly generated, uniform coating surface can be easily obtained so that lowering in charge and discharge characteristics of high current density with a short period of time can be prevented. Incidentally, the lower limit of the above-mentioned range is a theoretical lower limit of the aspect ratio of the lithium-titanium composite oxide.

Measurement of the aspect ratio of the lithium-titanium composite oxide is carried out by subjecting to magnification observation of the particles of the lithium-titanium composite oxide using a scanning electron microscope. Fifty lithium-titanium composite oxide particles fixed at an edge surface of a metal having a thickness of 50 µm or less are optionally selected, a diameter A which becomes the longest of the particle when the stage to which the samples had been fixed is rotated and inclined, and three-dimensionally observed, and a diameter B which becomes the shortest intersecting perpendicularly thereto are measured with regard to the respective particles, and an average value of A/B is obtained. The aspect ratio (A/B) obtained by the measurement is defined to be an aspect ratio of the lithium-titanium composite oxide.

[8] Production Method of Lithium-Titanium Composite Oxide

The producing method of the lithium-titanium composite oxide is not particularly limited as long as it does not exceed the range of the summary of Present invention 2, and some methods may be mentioned and a general method as a producing method of the inorganic compound is used.

For example, there may be mentioned a method in which a titanium starting material such as titanium oxide, etc., if necessary, the starting material of the other elements and the Li source of LiOH, $Li_2CO_3$, $LiNO_3$ are uniformly mixed, and sintered at high temperature to obtain an active material.

In particular, various methods can be considered for forming a spherical or oval spherical active material. As one example, there may be mentioned a method in which the titanium starting material such as titanium oxide, etc., and if necessary, the starting material of the other elements are dissolved or dispersed by pulverization in a solvent such as water, etc., a pH is then adjusted while stirring and a spherical precursor is formed and recovered, and after drying the same, if necessary, the Li source of LiOH, $Li_2CO_3$, $LiNO_3$, etc., is added thereto and the mixture is sintered at high temperature to obtain an active material.

Also, as the other example, there may be mentioned a method in which the titanium starting material such as titanium oxide, etc., and if necessary, the starting material of the other elements are dissolved or dispersed by pulverization in a solvent such as water, etc., the mixture is dried and molded by a spray dryer, etc., to make a spherical or oval spherical precursor, and the Li source of LiOH, $Li_2CO_3$, $LiNO_3$, etc., is added thereto and the mixture is sintered at high temperature to obtain an active material.

As the further different method, there may be mentioned a method in which the titanium starting material such as titanium oxide, etc., the Li source of LiOH, $Li_2CO_3$, $LiNO_3$, etc., and if necessary, the starting material of the other elements are dissolved or dispersed by pulverization in a solvent such as water, etc., the mixture is dried and molded by a spray dryer, etc., to make a spherical or oval spherical precursor, and the mixture is sintered at high temperature to obtain an active material.

In addition, in these procedures, it is also possible to present an element(s) other than the Ti, for example, Al, Mn, Ti, V, Cr, Mn, Fe, Co, Li, Ni, Cu, Zn, Mg, Ga, Zr, C, Si, Sn and/or Ag in contact with a metal oxide structure containing titanium and/or an oxide containing titanium. By containing these elements, it is possible to control an operation voltage and a capacity of the battery.

<2-3-4. Constitution, Physical Properties and Production Method of Negative Electrode>

With regard to the negative electrode containing the above-mentioned negative electrode active material and the method for producing the electrode, the current collector and the nonaqueous electrolyte secondary battery, it is desired to satisfy any one of items or a plural number of items simultaneously shown in the following (i) to (vi).

(i) Production of Negative Electrode

The production method of the negative electrode may be used any of the conventionally known methods as long as it does not remarkably limit the effects of Present invention 2. For example, a binder, a solvent, and if necessary, a thickening agent, a conductive material, a filler, etc., are added to the negative electrode active material to make a slurry, and it is coated onto a current collector and dried, and then, pressed to form an electrode.

(ii) Current Collector

The current collector which is to retain the negative electrode active material may be optionally used the conventionally known materials. The current collector of the negative electrode may be mentioned, for example, a metal material such as aluminum, copper, nickel, stainless steel, nickel-plated steel, etc., and in the points of easiness in processing and the cost, copper is particularly preferred.

Also, the shape of the current collector may be mentioned, when the current collector is a metal material, for example, a metal foil, a metal column, a metal coil, a metal plate, a metal thin film, an expanded metal, a punched metal, a foaming metal, etc. Among these, preferably a metal thin film, more preferably a copper foil, further preferably a rolled copper foil by the rolling method, and an electrolytic copper foil by the electrolytic method, each of which may be used as the current collector.

(iii) Ratio of Thicknesses of Current Collector and Negative Electrode Active Material Layer The ratio of the thicknesses of the current collector and the negative electrode active material layer is not particularly limited, and the value of "(the thickness of the negative electrode active material layer of one surface immediately before the liquid injection process of the nonaqueous electrolyte)/(the thickness of the current collector)" is preferably 150 or less, more preferably 20 or less, particularly preferably 10 or less, and preferably 0.1 or more, more preferably 0.4 or more, and particularly preferably 1 or more.

If the ratio of the thickness of the current collector and the negative electrode active material layer is in excess of the above-mentioned range, the current collector sometimes generates heat due to Joule heat at the time of high current density charging/discharging. Also, if it is lower than the above-mentioned range, the volume ratio of the current collector to the negative electrode active material is increased, so that the capacity of the battery sometimes lowered.

(iv) Electrode Density

The electrode structure when the negative electrode active material is used for producing an electrode is not particularly limited, and the density of the negative electrode active material existing on the current collector is preferably 1 g·cm$^{-3}$ or more, more preferably 1.2 g cm$^{-3}$ or more, further preferably 1.3 g·cm$^{-3}$ or more, and preferably 4 g·cm$^{-3}$ or less, more preferably 3 g·cm$^{-3}$ or less, further preferably 2.5 g·cm$^{-3}$ or less, and particularly preferably 1.7 g·cm$^{-3}$ or less. If the density of the negative electrode active material existing on the current collector is within the above-mentioned range, the negative electrode active material particles are difficultly broken, whereby increase in the initial irreversible capacity or decrease in the charge and discharge characteristics of high current density due to lowering in permeability of the nonaqueous electrolyte to the circumference of the interface of the current collector/negative electrode active material can be easily prevented. Further, conductivity between the negative electrode active materials can be secured, and the capacity per a unit volume can be obtained without increasing the battery resistance.

(v) Binder, Solvent, Etc.

The slurry for forming the negative electrode active material layer is generally prepared by adding the binder (the binding agent), the thickening agent, etc., to a solvent based on the negative electrode active material.

The binder for binding the negative electrode active material is not particularly limited as long as it is a material stable to the nonaqueous electrolyte or the solvent to be used for producing the electrode.

Specific examples thereof may be mentioned a resin-based polymer such as polyethylene, polypropylene, polyethylene terephthalate, polymethyl methacrylate, aromatic polyamide, cellulose, nitrocellulose, etc.; a rubbery polymer such as SBR (styrene-butadiene rubber), isoprene rubber, butadiene rubber, fluorine rubber, NBR (acrylonitrile-butadiene rubber), ethylene-propylene rubber, etc.; styrene-butadiene-styrene block copolymer or a hydrogenated product thereof; a thermoplastic elastomer-based polymer such as EPDM (ethylene-propylene-diene terpolymer), styrene-ethylene-butadiene-styrene copolymer, styrene-isoprene-styrene block copolymer or a hydrogenated product thereof, etc.; a soft resin-based polymer such as syndiotactic-1,2-polybutadiene, polyvinyl acetate, ethylene-vinyl acetate copolymer, propylene-α-olefin copolymer, etc.; a fluorine-based polymer such as polyvinylidene fluoride, polytetrafluoroethylene, fluorinated polyvinylidene fluoride, polytetrafluoroethylene-ethylene copolymer, etc.; a polymer composition having ion conductivity of an alkali metal ion (particularly a lithium ion), etc. These may be used one kind alone, or two or more kinds in combination with optional combination and ratio.

The solvent for forming the slurry is not particularly limited in its kind as long as it is a solvent capable of dissolving or dispersing the negative electrode active material, the binder, and the thickening agent and the conductive material to be used depending on necessity, and either of an aqueous solvent or an organic-based solvent may be used.

Examples of the aqueous solvent may be mentioned water, an alcohol, etc., and examples of the organic-based solvent may be mentioned N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetamide, hexamethylphosphoramide, dimethylsulfoxide, benzene, xylene, quinoline, pyridine, methylnaphthalene, hexane, etc.

In particular, when the aqueous solvent is to be used, it is preferred that a dispersant, etc., is contained in combination with the thickening agent, and a slurry is prepared by using a latex such as SBR, etc.

These solvents may be used one kind alone, or two or more kinds in combination with optional combination and ratio.

A ratio of the binder based on the negative electrode active material is preferably 0.1% by mass or more, more preferably 0.5% by mass or more, further preferably 0.6% by mass or more, and is preferably 20% by mass or less, more preferably 15% by mass or less, further preferably 10% by mass or less, and particularly preferably 8% by mass or less. If the ratio of the binder based on the negative electrode active material is within the above-mentioned range, a ratio of the binder which does not contribute to the battery capacity is not many so that lowering in the battery capacity is difficultly caused. Further, lowering in strength of the negative electrode is also difficultly caused.

In particular, when a rubbery polymer represented by SBR is contained as a main component, a ratio of the binder based on the negative electrode active material is preferably 0.1% by mass or more, more preferably 0.5% by mass or more, further preferably 0.6% by mass or more, and preferably 5% by mass or less, more preferably 3% by mass or less, and further preferably 2% by mass or less.

Also, when a fluorine-based polymer represented by polyvinylidene fluoride is contained as a main component, a ratio of the binder based on the negative electrode active material is preferably 1% by mass or more, more preferably 2% by mass or more, further preferably 3% by mass or more, and preferably 15% by mass or less, more preferably 10% by mass or less, and further preferably 8% by mass or less.

The thickening agent is, in general, used for adjusting a viscosity of the slurry. The thickening agent is not particularly limited, and more specifically mentioned carboxymethyl cellulose, methyl cellulose, hydroxymethyl cellulose, ethyl cellulose, polyvinyl alcohol, oxidized starch, phosphorized starch, casein and a salt thereof, etc. These may be used one kind alone, or two or more kinds in combination with optional combination and ratio.

When the thickening agent is to be used, a ratio of the thickening agent based on the negative electrode active material is generally 0.1% by mass or more, preferably 0.5% by mass or more, and more preferably 0.6% by mass or more. Also, it is generally 5% by mass or less, preferably 3% by mass or less, and more preferably 2% by mass or less. If the ratio of the thickening agent based on the negative electrode active material is within the above-mentioned range, coating property becomes good. Further, a ratio of the negative electrode active material occupied in the negative electrode active material layer is suitable, so that the problem of lowering the battery capacity or the problem of increasing the resistance between the negative electrode active materials is difficultly caused.

(vi) Area of Negative Electrode Plate

The area of the negative electrode plate is not particularly limited, and is preferably so designed that it is made slightly larger than that of the opposing positive electrode plate, whereby the positive electrode plate is not protruded outside from the negative electrode plate. In addition, in the viewpoint of suppressing deterioration by the cycle life in which charge/discharge have been repeated or by high temperature storage, it is preferred that the area is made as close as that of the positive electrode since characteristics are improved by heightening a ratio of the electrode which works more uniformly and effectively. In particular, when it is used at a large current, the design of the area of the negative electrode plate is important.

<2-4. Positive Electrode>

In the following, the positive electrode to be used in the nonaqueous electrolyte secondary battery of Present invention 2 is explained.

<2-4-1. Positive Electrode Active Material>

In the following, the positive electrode active material to be used in the positive electrode is explained.

(1) Composition

The positive electrode active material is not particularly limited as long as it is a transition metal oxide containing at least Ni and Co and 50 mol % or more of the transition metal of which is Ni and Co, and is capable of electrochemically storing and discharging a metal ion, and it is preferably, for example, capable of electrochemically storing and discharging a lithium ion, and is a transition metal oxide containing lithium and at least Ni and Co and 50 mol % or more of the transition metal of which is Ni and Co. This is because Ni and Co are materials the oxidation-reduction potentials of which are suitable for using as the positive electrode materials of the secondary battery, and are adequate for the use of high capacity.

As the transition metal component of the lithium transition metal oxide, Ni and Co are contained as the essential elements, and as the other metals, Mn, V, Ti, Cr, Fe, Cu, Al, Mg, Zr, Er, etc., are mentioned and Mn, Ti, Fe, Al, Mg, Zr, etc., are preferred. Specific examples of the lithium transition metal oxide may be mentioned, for example, $LiNi_{0.85}Co_{0.10}Al_{0.05}O_2$, $LiNi_{0.80}Co_{0.15}Al_{0.05}O_2$, $LiNi_{0.33}Co_{0.33}Mn_{0.33}O_2$, $Li_{1.05}Ni_{0.33}Mn_{0.33}Co_{0.33}O_2$, $LiNi_{0.5}Co_{0.2}Mn_{0.3}O_2$, $Li_{1.05}Ni_{0.50}Mn_{0.29}Co_{0.21}O_2$, etc.

Among these, the transition metal oxide is preferably the compound represented by the following compositional formula (2).

(in the formula (2), these show the numerical values of $0.9 \le a1 \le 1.1$, $0.3 \le b1 \le 0.9$, $0.1 \le c1 \le 0.5$ and $0.0 \le d1 \le 0.5$, and satisfy $0.5 \le b1+c1$ and $b1+c1+d1=1$. M represents at least one element selected from the group consisting of Mn, Al, Mg, Zr, Fe, Ti and Er.)

In the compositional formula (2), it is preferred that it shows the numerical value of $0.1 \le d1 \le 0.5$.

This is because if the compositional ratio of Ni or Co and the compositional ratio of the other metal kinds are the predetermined range, the transition metal is difficultly dissolved from the positive electrode, and even when it is dissolved, Ni or Co has a little bad effect in the non-aqueous secondary battery.

Among these, the transition metal oxide is more preferably the compound represented by the following compositional formula (3).

(in the formula (3), these show the numerical values of $0.9 \le a2 \le 1.1$, $0.3 \le b2 \le 0.9$, $0.1 \le c2 \le 0.5$ and $0.0 \le d2 \le 0.5$, and satisfy $c2 \le b2$ and $0.6 \le b2+c2$ and $b2+c2+d2=1$. M represents at least one element selected from the group consisting of Mn, Al, Mg, Zr, Fe, Ti and Er.)

In the compositional formula (3), it is preferred that it shows the numerical value of $0.1 \le d2 \le 0.5$.

This is because if Ni and Co are main components, and the compositional ratio of Ni is the same or larger than the compositional ratio of Co, it is stable when it is used as the non-aqueous secondary battery positive electrode, and it is possible to take out high capacity.

Among these, the transition metal oxide is further preferably the compound represented by the following compositional formula (4).

(in the formula (4), these show the numerical values of $0.9 \le a3 \le 1.1$, $0.35 \le b3 \le 0.9$, $0.1 \le c3 \le 0.5$ and $0.0 \le d3 \le 0.5$, and satisfy $c3 \le b3$ and $0.6 \le b3+c3$ and $b3+c3+d3=1$. M represents at least one element selected from the group consisting of Mn, Al, Mg, Zr, Fe, Ti and Er.)

In the compositional formula (4), it is preferred that it shows the numerical value of $0.1 \le d3 \le 0.5$.

Among these, the transition metal oxide is particularly preferably the compound represented by the following compositional formula (6).

(in the formula (6), these show the numerical values of $0.9 \le a4 \le 1.1$, $0.45 \le b4 \le 0.9$, $0.1 \le c4 \le 0.5$ and $0.0 \le d4 \le 0.5$, and satisfy $c4 < 2+b4$ and $0.6 \le b4+c4$ and $b4+c4+d4=1$. M represents at least one element selected from the group consisting of Mn, Al, Mg, Zr, Fe, Ti and Er.)

In the compositional formula (6), it is preferred that it shows the numerical value of $0.1 \le d4 \le 0.5$.

This is because by being the above-mentioned composition, when it is used as a non-aqueous secondary battery positive electrode, in particular, it is possible to take out a high capacity.

In addition, among the above-mentioned positive electrode active materials, two or more kinds may be used in admixture. Similarly, at least one kind or more of the above-mentioned positive electrode active materials and the other positive electrode active material(s) may be used in admixture. Examples of the other positive electrode active materials may be mentioned a transition metal oxide which is not mentioned above, a transition metal phosphate compound, a transition metal silicate compound and a transition metal borate compound.

Among these, lithium manganese composite oxide having a spinel structure or lithium-containing transition metal phosphate compound having an olivine structure is preferred. More specifically, $LiMn_2O_4$, $LiMn_{1.8}Al_{0.2}O_4$, $LiMn_{1.5}Ni_{0.5}O_4$, etc., may be mentioned as the lithium manganese composite oxide having a spinel structure. This is because these are the most stable in the structure among these, difficultly release oxygen at the time of nonaqueous electrolyte secondary battery abnormality, and excellent in safety.

Also, the transition metal of the lithium-containing transition metal phosphate compound is preferably V, Ti, Cr, Mn, Fe, Co, Ni, Cu, etc., and specific examples may be mentioned, for example, iron phosphates such as $LiFePO_4$, $Li_3Fe_2(PO_4)_3$, $LiFeP_2O_7$, etc., cobalt phosphates such as $LiCoPO_4$, etc., manganese phosphates such as $LiMnPO_4$, etc., and those in which a part of the transition metal atom which becomes the main part of these lithium transition metal phosphate compounds is replaced with the other metals such as Al, Ti, V, Cr, Mn, Fe, Co, Li, Ni, Cu, Zn, Mg, Ga, Zr, Si, Nb, Mo, Sn, W, etc., and so on.

Among these, the lithium iron phosphate compound is preferred, since iron is an extremely inexpensive metal with abundant amounts of resources, and has less toxicity. That is, among the above-mentioned specific examples, $LiFePO_4$ can be mentioned as the more preferred specific example.

(2) Surface Coating

It may use a material in which a substance (hereinafter optionally referred to as "the surface-attached substance") of a composition different from the substance constituting the positive electrode active material which becomes a main material is attached onto the surface of the above-mentioned positive electrode active material. Examples of the surface-attached substance may be mentioned an oxide such as aluminum oxide, silicon oxide, titanium oxide, zirconium oxide, magnesium oxide, calcium oxide, boron oxide, antimony oxide, bismuth oxide, etc., a sulfate such as lithium sulfate, sodium sulfate, potassium sulfate, magnesium sulfate, calcium sulfate, aluminum sulfate, etc., a carbonate such as lithium carbonate, calcium carbonate, magnesium carbonate, etc., carbon, etc.

These surface-attached substances can be attached onto the surface of the positive electrode active material by the methods, for example, a method in which it is dissolved in a solvent or dispersed therein, and added and impregnated into the positive electrode active material, and then, drying, a method in which a surface-attached substance precursor is dissolved in a solvent or dispersed therein, and added and impregnated into the positive electrode active material, and then, reacted by heating, etc., a method in which it is added to the positive electrode active material precursor and sintering the same simultaneously, etc. Incidentally, when carbon is to be attached, it may be employed a method in which the carbonaceous material is, for example, attached mechanically later in the form of activated charcoal, etc.

A mass of the surface-attached substance attached onto the surface of the positive electrode active material is, based on the mass of the positive electrode active material, preferably 0.1 ppm or more, more preferably 1 ppm or more, further preferably 10 ppm or more. Also, it is preferably 20% or less, more preferably 10% or less, further preferably 5% or less.

According to the surface-attached substance, oxidation reaction of the nonaqueous electrolyte on the surface of the positive electrode active material can be suppressed, whereby battery life can be improved. Also, the attached amount is within the above-mentioned range, the effect can be sufficiently developed, and resistance is difficultly increased without inhibiting insertion and release of the lithium ion.

(3) Shape

As the shape of the positive electrode active material particle, massive, polyhedral, spherical, oval spherical, platy, acicular, columnar, etc., which has conventionally been used are used. In addition, the primary particles are agglomerated to form a secondary particle, and the shape of the secondary particle may be spherical or oval spherical.

(4) Tap Density

The tap density of the positive electrode active material is preferably 0.5 g·cm$^{-3}$ or more, more preferably 1.0 g·cm$^{-3}$ or more, and further preferably 1.5 g·cm$^{-3}$ or more. Also, it is preferably 4.0 g·cm$^{-3}$ or less, and more preferably 3.7 g·cm$^{-3}$ or less.

By using metallic composite oxide powder having high tap density, a positive electrode active material layer having a high density can be formed. If the tap density of the positive electrode active material is within the above-mentioned range, an amount of the dispersant necessary for forming the positive electrode active material layer becomes suitable, so that the amounts of the conductive material and the binder are also suitable amounts, whereby the effect to the battery capacity is a little without limiting the filling rate of the positive electrode active material to the positive electrode active material layer.

Measurement of the tap density of the positive electrode active material is carried out by dropping the sample to 20 cm$^3$ of a tapping cell passing through a sieve having an opening of 300 μm to fill the cell volume, and then, subjecting to 1,000 times of tapping with a stroke length of 10 mm by using a powder density measurement device (for example, Tapdenser manufactured by SEISHIN ENTERPRISE Co., Ltd.), and calculating the density from the volume at that time and the mass of the sample. The tap density calculated by the measurement is defined to be a tap density of the positive electrode active material in Present invention 2.

(5) Median Diameter d50

The median diameter d50 (when the primary particles are agglomerated to form a secondary particle, it is a secondary particle diameter) of the particle of the positive electrode active material can be measured by using a laser diffraction/scattering type particle size measuring device.

The median diameter d50 is preferably 0.1 μm or more, more preferably 0.5 μm or more, further preferably 1 μm or more, particularly preferably 3 μm or more, and is preferably 30 μm or less, more preferably 20 μm or less, further preferably 16 μm or less, and particularly preferably 15 μm or less. If the median diameter d50 is within the above-mentioned range, a high bulk density product can be easily obtained, and further, a less time is taken for diffusion of the lithium in the particle, so that the battery characteristics are difficultly lowered. In addition, production of the positive electrode of the battery, i.e., when the active material, the conductive material or the binder, etc., are made a slurry with a solvent and the slurry is coated in the thin film state, streak pulling, etc., is difficultly generated.

Incidentally, by mixing two more kinds of the positive electrode active materials having different median diameter d50 with an optional ratio, the filling property at the time of producing the positive electrode can be further improved.

Measurement of the median diameter d50 of the positive electrode active material is carried out by using 0.1% by mass aqueous sodium hexametaphosphate solution as a dispersant, and after subjecting to ultrasonic wave dispersion of the dispersion of the positive electrode active material for 5 minutes and setting a measurement refractive index of 1.24, the sample is measured by using a particle size analyzer (for example, LA-920 manufactured by HORIBA, LTD.).

(6) Average Primary Particle Size

When the primary particles are agglomerated to form a secondary particle, the average primary particle size of the positive electrode active material is preferably 0.01 µm or more, more preferably 0.05 µm or more, further preferably 0.08 µm or more, particularly preferably 0.1 µm or more, and is preferably 3 µm or less, more preferably 2 µm or less, further preferably 1 µm or less, and particularly preferably 0.6 µm or less. If it is within the above-mentioned range, spherical secondary particle can be easily formed, powder filling property becomes suitable, and the specific surface area can be sufficiently secured, so that lowering in the battery property such as output characteristics, etc., can be suppressed.

Incidentally, the average primary particle size of the positive electrode active material can be measured by the observation using a scanning electron microscope (SEM). More specifically, in a photograph with a magnification of 10,000-fold, it can be obtained by measuring the longest value of the intercept by the right and left boundary line of the primary particle to the straight line in the horizontal direction with regard to the optional fifty primary particles, and calculating the average value thereof.

(7) BET Specific Surface Area

The BET specific surface area of the positive electrode active material is a value of the specific surface area measured by the BET method of preferably 0.2 $m^2 \cdot g^{-1}$ or more, more preferably 0.3 $m^2 \cdot g^{-1}$ or more, further preferably 0.4 $m^2 \cdot g^{-1}$ or more, and preferably 4.0 $m^2 \cdot g^{-1}$ or less, more preferably 2.5 $m^2 \cdot g^{-1}$ or less, and further preferably 1.5 $m^2 \cdot g^{-1}$ or less. If the value of the BET specific surface area is within the above-mentioned range, lowering in the battery performance is easily prevented. Further, sufficient tap density can be secured, and the coating property at the time of forming the positive electrode active material is good.

Measurement of the BET specific surface area of the positive electrode active material is carried out by using a surface meter (for example, a full automatic surface area measuring device manufactured by Ohkura Riken Co., Ltd.). More specifically, the sample is predried under the flow of nitrogen at 150° C. for 30 minutes, and then, by using a nitrogen-helium mixed gas in which a value of a relative pressure of the nitrogen to the atmospheric pressure has been accurately adjusted to 0.3, it is carried out by the nitrogen adsorption single point BET method using the flowing gas method. The specific surface area obtained by the measurement is defined to be the BET specific surface area of the positive electrode active material in Present invention 2.

(8) Production Method of Positive Electrode Active Material

The production method of the positive electrode active material is not particularly limited as long as it does not exceed the range of the summary of Present invention 2, and some methods may be mentioned and a general method as a producing method of the inorganic compound is used.

In particular, various methods can be considered for forming a spherical or oval spherical active material, for example, as one example, there may be mentioned a method in which the transition metal starting material such as a transition metal nitrate, sulfate, etc., and if necessary, the starting material of the other elements are dissolved or dispersed by pulverization in a solvent such as water, etc., a pH is then adjusted while stirring and a spherical precursor is formed and recovered, and after drying the same, if necessary, the Li source of LiOH, $Li_2CO_3$, $LiNO_3$, etc., is added thereto and the mixture is sintered at high temperature to obtain an active material.

Also, as the other example, there may be mentioned a method in which the transition metal starting material such as a transition metal nitrate, sulfate, hydroxide, oxide, etc., and if necessary, the starting material of the other elements are dissolved or dispersed by pulverization in a solvent such as water, etc., the mixture is dried and molded by a spray dryer, etc., to make a spherical or oval spherical precursor, and the Li source of LiOH, $Li_2CO_3$, $LiNO_3$, etc., is added thereto and the mixture is sintered at high temperature to obtain an active material.

As the further different method, there may be mentioned a method in which the transition metal starting material such as a transition metal nitrate, sulfate, hydroxide, oxide, etc., the Li source of LiOH, $Li_2CO_3$, $LiNO_3$, etc., and if necessary, the starting material of the other elements are dissolved or dispersed by pulverization in a solvent such as water, etc., the mixture is dried and molded by a spray dryer, etc., to make a spherical or oval spherical precursor, and the mixture is sintered at high temperature to obtain an active material.

<2-4-2. Positive Electrode Structure and Production Method>

In the following, constitution of the positive electrode used in Present invention 2 and the production method thereof are explained.

(Production Method of Positive Electrode)

The positive electrode is produced by forming a positive electrode active material layer containing positive electrode active material particles and the binder onto a current collector. The production of the positive electrode using the positive electrode active material may be carried out by any of the conventionally known methods. For example, a material in which the positive electrode active material and the binder, and if necessary, the conductive material and the thickening agent, etc., are mixed in a dry system and made a sheet state is pressure-bonded to the positive electrode current collector, or these materials are dissolved or dispersed in a liquid medium to make a slurry, and the slurry is coated onto the positive electrode current collector and dried to form a positive electrode active material layer onto the current collector whereby the positive electrode can be obtained.

The content of the positive electrode active material in the positive electrode active material layer is preferably 60% by mass or more, more preferably 70% by mass or more, further preferably 80% by mass or more, and is preferably 99.9% by mass or less, and more preferably 99% by mass or less. If the content of the positive electrode active material is within the above-mentioned range, electric capacitance can be sufficiently secured. Further, strength of the positive electrode becomes also sufficient. Incidentally, the positive electrode active material powder in Present invention 2 may be used either one kind alone, or may be used two or more kinds of the different compositions or the different powder properties with an optional combination and a ratio in combination. When two or more kinds of the active materials are used in combination, the above-mentioned lithium and the composite oxide containing manganese are preferably used as the component of the powder. This is because cobalt or nickel is an expensive metal with less quantity of resources, and in a large-sized battery which requires high capacity such as the use for an automobile, etc., a used amount of the active material becomes large, so that it is not preferred in the point of the cost, whereby manganese is desirably used as a main component as the more inexpensive transition metal.

(Conductive Material)

The conductive material may be used those conventionally known conductive materials optionally. Specific examples may be mentioned the same materials as the specific examples of the conductive material of the positive electrode explained in Present invention 1. Incidentally, these may be used either one kind alone, or may be used two or more kinds with an optional combination and a ratio in combination.

The content of the conductive material in the positive electrode active material layer is preferably 0.01% by mass or more, more preferably 0.1% by mass or more, further preferably 1% by mass or more, and is preferably 50% by mass or less, more preferably 30% by mass or less, and further preferably 15% by mass or less. If the content is within the above-mentioned range, conductivity can be sufficiently secured. Further, lowering in battery capacity can be easily prevented.

(Binder)

The binder to be used for producing the positive electrode active material layer is not particularly limited as long as it is a stable material to the solvent to be used at the time of producing the nonaqueous electrolyte or the electrode.

In the case of the coating method, it is not particularly limited as long as it is a material to be dissolved or dispersed to the liquid medium to be used at the time of producing the electrode, and specific examples may be mentioned the same materials as the specific examples of the binder of the positive electrode explained in Present invention 1. Incidentally, these substances may be used either one kind alone, or may be used two or more kinds with an optional combination and a ratio in combination.

The content of the binder in the positive electrode active material layer is preferably 0.1% by mass or more, more preferably 1% by mass or more, further preferably 3% by mass or more, and is preferably 80% by mass or less, more preferably 60% by mass or less, further preferably 40% by mass or less, and particularly preferably 10% by mass or less. If the ratio of the binder is within the above-mentioned range, the positive electrode active material can be sufficiently maintained, and mechanical strength of the positive electrode can be secured, battery property such as cycle characteristics, etc., becomes good. Further, it leads to avoid lowering in battery capacity or conductivity.

(Liquid Medium)

The liquid medium to be used for preparing the slurry for forming the positive electrode active material layer is not particularly limited in its kind as long as it is a solvent capable of dissolving or dispersing the positive electrode active material, the conductive material, the binder, and the thickening agent to be used depending on necessity, and either of the aqueous solvent or the organic-based solvent may be used.

Examples of the aqueous medium may be mentioned, for example, water, a mixed medium of an alcohol and water, etc. Examples of the organic-based medium may be mentioned an aliphatic hydrocarbon such as hexane, etc.; an aromatic hydrocarbon such as benzene, toluene, xylene, methylnaphthalene, etc.; a heterocyclic compound such as quinoline, pyridine, etc.; a ketone such as acetone, methyl ethyl ketone, cyclohexanone, etc.; an ester such as methyl acetate, methyl acrylate, etc.; an amine such as diethylenetriamine, N,N-dimethylaminopropylamine, etc.; an ether such as diethyl ether, tetrahydrofuran (THF), etc.; an amide such as N-methylpyrrolidone (NMP), dimethylformamide, dimethylacetamide, etc.; an aprotic polar solvent such as hexamethylphosphoramide, dimethylsulfoxide, etc. Incidentally, these may be used either one kind alone, or may be used two or more kinds with an optional combination and a ratio in combination.

(Thickening Agent)

When an aqueous medium is used as the liquid medium for forming the slurry, it is preferred to make a slurry by using the thickening agent and a latex such as styrene-butadiene rubber (SBR), etc. The thickening agent is generally used for adjusting a viscosity of the slurry.

The thickening agent is not limited as long as it markedly limit the effects of Present invention 2, and more specifically, there may be mentioned carboxymethyl cellulose, methyl cellulose, hydroxymethyl cellulose, ethyl cellulose, polyvinyl alcohol, oxidized starch, phosphorized starch, casein and a salt thereof, etc. These may be used either one kind alone, or may be used two or more kinds with an optional combination and a ratio in combination.

When the thickening agent is used, the ratio of the thickening agent based on the positive electrode active material is preferably 0.1% by mass or more, more preferably 0.5% by mass or more, further preferably 0.6% by mass or more, and preferably 5% by mass or less, more preferably 3% by mass or less, and further preferably 2% by mass or less. If it is within the above-mentioned range, coating property becomes good, and further the ratio of the active material occupied in the positive electrode active material layer is sufficient, so that the problem that the capacity of the battery is lowered or the problem that resistance between the positive electrode active materials is increased can be easily avoided.

(Consolidation)

The positive electrode active material layer obtained by coating the above-mentioned slurry onto the current collector and drying is preferably subjected to consolidation by a hand press, a roller press, etc., to increase packing density of the positive electrode active material. The density of the positive electrode active material layer is preferably 1 $g \cdot cm^{-3}$ or more, further preferably 1.5 $g \cdot cm^{-3}$ or more, and particularly preferably 2 $g \cdot cm^{-3}$ or more, and is preferably 4 $g \cdot cm^{-3}$ or less, further preferably 3.5 $g \cdot cm^{-3}$ or less, and particularly preferably 3 $g \cdot cm^{-3}$ or less.

If the density of the positive electrode active material layer is within the above-mentioned range, in particular, charge/discharge characteristics at high current density becomes good without lowering permeability of the nonaqueous electrolyte to the interface of the current collector/active material. Further, conductivity between the active materials is difficultly lowered, and battery resistance is difficultly increased.

(Current Collector)

The material of the positive electrode current collector is not particularly limited, and those conventionally known may be optionally used. Specific examples thereof may be mentioned the same materials as the specific examples of the material for the positive electrode current collector of the positive electrode explained in Present invention 1. Among these, the metal material, in particular, aluminum is preferred.

The shape of the current collector is the same as the shape of the positive electrode current collector of the positive electrode explained in Present invention 1. Among such shapes, the metal thin film is preferred.

The thickness of the current collector is optional, and preferably 1 μm or more, more preferably 3 μm or more, further preferably 5 μm or more, and is preferably 1 mm or less, more preferably 100 µm or less, and further preferably 50 µm or less. If the thickness of the current collector is within the above-mentioned range, strength necessary for the current collector can be sufficiently secured. Further, handling property is also good.

The ratio of the thicknesses of the current collector and the positive electrode active material layer is not particularly limited, and (the thickness of the active material layer at one surface immediately before injection of the nonaqueous electrolyte)/(the thickness of the current collector) is preferably 150 or less, more preferably 20 or less, particularly preferably 10 or less, and preferably 0.1 or more, more preferably 0.4 or more, and particularly preferably 1 or more.

If the ratio of the thicknesses of the current collector and the positive electrode active material layer is within the above-mentioned range, at the time of charging/discharging of with high current density, the current collector is difficultly generated heat by the Joule heat at the time of charging/discharging. Further, the volume ratio of the current collector to the positive electrode active material is difficultly increased, and lowering in the battery capacity can be prevented.

(Electrode Area)

In the viewpoints of high output and heightening stability at high temperature, the area of the positive electrode active material layer is preferably made larger relative to the outer surface area of the battery outer case. More specifically, the total sum of the electrode area of the above-mentioned positive electrode based on the outer surface area of the nonaqueous electrolyte secondary battery is preferably made 20-fold or more in an area ratio, further preferably 40-fold or more. The outer surface area of the outer case refers to, in the case of a bottomed square shape, the total area obtained by calculation from the dimensions of the length, width and thickness of the case portion into which the power generation element has been filled excluding the protruding portion of the terminal. In the case of a bottomed cylindrical shape, it is a geometric surface area approximating the case portion into which the power generation element has been filled excluding the protruding portion of the terminal. The total sum of the electrode area of the positive electrode is a geometric surface area of the positive electrode mixture layer opposed to the mixture layer containing the negative electrode active material, and in the structure in which positive electrode mixture layers are formed on both surfaces through a current collector foil, it refers to the total sum of the areas which are calculated the respective surfaces separately.

(Discharge Capacity)

When the nonaqueous electrolyte of Present invention 2 is used, if an electric capacitance (electric capacitance when the battery is discharged from a fully charging state to a discharged state) possessed by the battery element contained in one battery outer package of the nonaqueous electrolyte secondary battery is 1 ampere-hour (Ah) or more, it is preferred since an improved effect of the low temperature discharge characteristics becomes large. Therefore, the positive electrode plate is designed to be, in full charging of the discharge capacity, preferably 3 Ah (ampere hour), more preferably 4 Ah or more, and preferably 100 Ah or less, more preferably 70 Ah or less, particularly preferably 50 Ah or less.

If it is within the above-mentioned range, at the time of taking out a large current, lowering in the voltage by the electrode reaction resistance is not so remarkable, and decrease in the power efficiency can be prevented. Further, temperature distribution due to internal heat generation of the battery at the time of pulse charging and discharging does not become too large, and the phenomenon that durability in the charging and discharging repetition is inferior, and heat dissipation efficiency becomes worse to abrupt heat generation at the time of abnormality such as overcharging and internal short circuit, etc., can be avoided.

(Thickness of Positive Electrode Plate)

The thickness of the positive electrode plate is not particularly limited, and in the viewpoints of high capacity, high output and high rate characteristics, the thickness of the positive electrode active material layer from which the thickness of the current collector is deducted is, to the one surface of the current collector, preferably 10 µm or more, more preferably 20 µm or more, and preferably 200 µm or less, and more preferably 100 µm or less.

<2-5. Separator>

Between the positive electrode and the negative electrode, a separator is generally interposed to prevent from short-circuit. In this case, the nonaqueous electrolyte of Present invention 2 is generally used by impregnating into the separator.

The material or the shape of the separator is not particularly limited, and conventionally known materials or shapes can be optionally used as long as the effects of Present invention 2 are markedly impaired. Among these, a resin, glass fiber, an inorganic material, etc., formed by the material stable to the nonaqueous electrolyte of Present invention 2 are used, and a material in the form of a porous sheet or nonwoven fabric state excellent in liquid holding property is preferably used.

As the material for the resin or glass fiber separator, there may be used, for example, a polyolefin such as polyethylene, polypropylene, etc., an aramid resin, polytetrafluoroethylene, polyether sulfone, glass filter, etc. Among these, it is preferably glass filter, a polyolefin, further preferably a polyolefin. These materials may be used a single kind alone, or may be used in combination of two or more kinds with optional combination and ratio.

The thickness of the above-mentioned separator is the same as the separator explained in Present invention 1.

Further, with regard to the porosity of the separator when a porous material such as a porous sheet and nonwoven fabric, etc., is used as the separator, it is the same as the porosity of the separator when a porous material such as a porous sheet and nonwoven fabric, etc., explained in Present invention 1.

Further, with regard to the average pore size of the separator, it is the same as the average pore size of the separator explained in Present invention 1.

On the other hand, as the material for the inorganic material, the same material used as the material for the inorganic material in the separator explained in Present invention 1 is used.

The shape of the separator is the same as the shape of the separator explained in Present invention 1.

<2-6. Battery Design>

(Electrode Group)

The electrode group may be either of a material with a laminated structure in which the above-mentioned positive electrode plate and the negative electrode plate are interposed through the above-mentioned separator, or a material with a structure in which the above-mentioned positive electrode plate and the negative electrode plate are spirally wound with the above-mentioned separator interposed therebetween. A ratio of a volume of the electrode group occupied in the battery internal volume (Hereinafter referred to as an electrode group occupancy rate) is preferably 40% or more, more preferably 50% or more, and preferably 95% or less, and more preferably 90% or less. When the electrode group occupancy rate is within the above-mentioned range, the battery capacity difficultly becomes small. In addition, a suitable void space can be secured, so that it can avoid to lower various characteristics such as charge/discharge repeating property and high temperature storage, etc., as the battery, which is caused by expansion of a member or increase in the internal pressure due to heightening of a vapor pressure of the liquid components of the electrolyte by being high temperature of the battery, and further avoid the case where a gas discharge valve which releases the internal pressure to the outside operates.

(Current Collection Structure)

The current collection structure is not particularly limited, and for realizing improvement in discharge characteristics by the nonaqueous electrolyte of Present invention 2 more effectively, it is preferred to employ the structure in which resistance at the wiring portion or the junction portion is reduced. When the internal resistance is reduced in this manner, the effect of using the nonaqueous electrolyte of Present invention 2 is particularly well exhibited.

In the case where the electrode group has the above-mentioned laminated structure, it is suitably used a structure in which the metal core portions of the respective electrode layers are bundled and welded to the terminal. When the area of one sheet of the electrode area becomes large, then, the internal resistance is also large, so that it is suitably used to reduce the resistance by providing a plural number of terminals in the electrode. When the electrode group has the above-mentioned wound structure, the internal resistance can be lowered by providing a plural number of lead structures to each of the positive electrode and the negative electrode and bundling them to terminals.

(Protective Element)

With regard to the protective element, it is the same as explained in the protective element in Present invention 1.

(Outer Package)

The nonaqueous electrolyte secondary battery of Present invention 2 is generally constituted by containing the above-mentioned nonaqueous electrolyte, the negative electrode, the positive electrode, the separator, etc., in the outer package (outer case). The outer package is not limited, and conventionally known materials may be optionally employed as long as it does not remarkably impair the effects of Present invention 2.

The material of the outer case is the same as the outer case explained in Present invention 1.

With regard to the outer case using the metals, it is the same as the outer case using the metals explained in Present invention 1.

Also, the shape of the outer case is the same as the shape of the outer case explained in Present invention 1.

EXAMPLES

In the following, Present invention 2 is more specifically explained by referring to Examples and Comparative examples, but Present invention 2 is not limited by these Examples as long as they do not exceed the gist thereof.

An abbreviation of the compounds used in the present Examples is shown below.

[Formula 27]

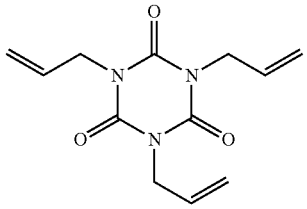

Triallylisocyanurate

Compound 2-1

[Formula 28]

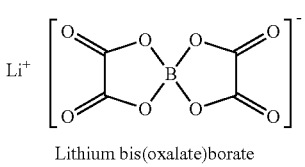

Lithium bis(oxalate)borate

Compound 2-2

Example 2-1-1, Comparative Example 2-1-1

Production of Nonaqueous Electrolyte Secondary Battery

Preparation of Nonaqueous Electrolyte

Example 2-1-1

Under dry argon atmosphere, 1 mol/L (as a concentration in the nonaqueous electrolyte) of sufficiently dried $LiPF_6$ was dissolved in a mixture of ethylene carbonate, dimethyl carbonate and ethyl methyl carbonate (volume ratio; 3:3:4), and further 0.5% by mass (as a concentration in the nonaqueous electrolyte) of sufficiently dried Compound 2-1 was dissolved therein to prepare a nonaqueous electrolyte.

By using the nonaqueous electrolyte, a nonaqueous electrolyte secondary battery was produced by the following method, and the following evaluation was carried out.

Comparative Example 2-1-1

A nonaqueous electrolyte secondary battery was produced in the same manner as in Example 2-1-1 except for not dissolving Compound 2-1, and the following evaluation was carried out.

<Production of Positive Electrode>

In N-methyl-2-pyrrolidone were mixed 90 parts by mass of lithium nickel manganese cobalt composite oxide ($Li_{1.05}Ni_{0.33}Mn_{0.33}Co_{0.33}O_2$) as the positive electrode active material, 7 parts by mass of carbon black as the conductive material, and 3 parts by mass of polyvinylidene fluoride (PVdF) as the binder, and made a slurry, and the slurry was uniformly coated onto an aluminum foil having a thickness of 15 μm and dried, and then, roll press was carried out to make a positive electrode.

<Production of Negative Electrode>

To 97.5 parts by mass of graphite powder were added 150 parts by mass of an aqueous dispersion of sodium carboxymethyl cellulose (a concentration of the sodium carboxymethyl cellulose of 1% by mass) as the thickening agent, and 2 parts by mass of an aqueous dispersion of styrene-butadiene rubber (a concentration of the styrene-butadiene rubber of 50% by mass) as the binder, and the mixture was mixed by the disperser to make a slurry. The obtained slurry was uniformly coated on a copper foil having a thickness of 10 μm and dried, and then, roll press was carried out to make a negative electrode.

<Production of Nonaqueous Electrolyte Secondary Battery>

The above-mentioned positive electrode, negative electrode and separator made of polyolefin were laminated in the order of the negative electrode, the separator and the positive electrode. The thus obtained battery element was wrapped by an aluminum laminate film, and after injecting the above-mentioned nonaqueous electrolyte, it was vacuum sealed to produce a sheet-like nonaqueous electrolyte secondary battery.

[Evaluation of Nonaqueous Electrolyte Secondary Battery]

Initial Charge/Discharge

In a thermostat chamber at 25° C., a sheet-like nonaqueous electrolyte secondary battery was subjected to constant current charging with 0.05C (the current value in which the rated capacity by discharge capacity of 1 hour rate is discharged in 1 hour is made 1C. Hereinafter the same.) for 10 hours, then, the charging was paused for 3 hours, thereafter subjected to constant current charging to 4.1V with 0.2C. Further, after pausing for 3 hours, it was subjected to constant current-constant voltage charging to 4.1V with 0.2C, and then, subjected to constant current discharging to 3.0V with 0.33C. Thereafter, the charge/discharge cycle in which constant current-constant voltage charging to 4.1V with 0.33C, and subsequent constant current discharging to 3.0V with 0.33C was made 1 cycle was carried out 2 cycles.

Further, after constant current-constant voltage charging was carried out to 4.1V with 0.33C, the battery was stored at 60° C. for 12 hours to stabilize the battery. Thereafter, charge/discharge cycle comprising constant current-constant voltage charging to 4.2V with 0.33 C, and subsequent constant current discharging to 3.0V with 0.33C was carried out 2 cycles at 25° C.

60° C. Cycle Test

The battery subjected to the initial charge/discharge was subjected to 500 cycles of charge/discharge at 60° C. in which charging is carried out to 4.2V with the constant current method of 2C, and then, discharging is carried out to 3.0V with the constant current method of 2C. A ratio of 500th cycle discharge capacity based on the first cycle discharge capacity at this time was made "60° C. cycle capacity maintenance rate".

The 60° C. cycle capacity maintenance rate is shown in Table 2-1. That is, the 60° C. cycle capacity maintenance rate described in Table 2-1 means that the larger value is preferred since deterioration in capacity is a little.

TABLE 2-1

| No. | Content of Compound 2-1 in nonaqueous electrolyte (% by mass) | 60° C. cycle capacity maintenance rate (%) |
|---|---|---|
| Example 2-1-1 | 0.5 | 85.4 |
| Comparative example 2-1-1 | 0.0 | 78.3 |

As clearly seen from Table 2-1, in the nonaqueous electrolyte secondary battery using the positive electrode containing at least Ni and Co, and containing a transition metal oxide in which 50 mol % or more of the transition metal is Ni and Co, when a specific compound is contained in the nonaqueous electrolyte, a high temperature cycle capacity maintenance rate is increased.

Example 2-2-1, Comparative Example 2-2-1

Production of Nonaqueous Electrolyte Secondary Battery

Preparation of Nonaqueous Electrolyte

Example 2-2-1

Under dry argon atmosphere, 1 mol/L (as a concentration in the nonaqueous electrolyte) of sufficiently dried $LiPF_6$ was dissolved in a mixture of ethylene carbonate and diethyl carbonate (volume ratio: 3:7), and further 0.3% by mass (as a concentration in the nonaqueous electrolyte) of sufficiently dried Compound 2-1 was dissolved therein to prepare a nonaqueous electrolyte. A nonaqueous electrolyte secondary battery was produced by using the nonaqueous electrolyte according to the following method, and the following evaluation was carried out.

Comparative Example 2-2-1

A nonaqueous electrolyte secondary battery was produced in the same manner as in Example 2-2-1 except for dissolving Compound 2-1, and the following evaluation was carried out.

<Production of Positive Electrode>

In N-methyl-2-pyrrolidone were mixed 67.5 parts by mass of lithium manganate ($Li_{1.1}Mn_{1.9}Al_{0.1}O_4$) as the first positive electrode active material, 22.5 parts by mass of lithium nickel manganese cobalt composite oxide ($Li_{1.05}Ni_{0.33}Mn_{0.33}Co_{0.33}O_2$) as the second positive electrode active material, 5 parts by mass of carbon black as the conductive material and 5 parts by mass of polyvinylidene fluoride (PVdF) as the binder, and made a slurry, and the slurry was uniformly coated onto an aluminum foil having a thickness of 15 μm and dried, and then, roll press was carried out to make a positive electrode.

<Production of Negative Electrode>

To 97.5 parts by mass of graphite powder were added 150 parts by mass of an aqueous dispersion of sodium carboxymethyl cellulose (a concentration of the sodium carboxymethyl cellulose of 1% by mass) as the thickening agent and 2 parts by mass of an aqueous dispersion of styrene-butadiene rubber (a concentration of the styrene-butadiene rubber of 50% by mass) as the binder, and the mixture was mixed by a disperser to make a slurry. The obtained slurry was uniformly coated onto a copper foil having a thickness of 10 μm and dried, and then, roll pressing was carried out to make a negative electrode.

<Production of Nonaqueous Electrolyte Secondary Battery>

The above-mentioned positive electrode, the negative electrode and a separator made of polyolefin were laminated in the order of the negative electrode, the separator and the positive electrode. The thus obtained battery element was wrapped by an aluminum laminate film, and after injecting the above-mentioned nonaqueous electrolyte, it was vacuum sealed to produce a sheet-like nonaqueous electrolyte secondary battery.

[Evaluation of Nonaqueous Electrolyte Secondary Battery]

Initial Charge/Discharge

In a thermostat chamber at 25° C., a sheet-like nonaqueous electrolyte secondary battery was subjected to constant current-constant voltage charging to 4.2V with 0.1C, and then, discharged to 2.7V with 0.1C. Subsequently, it was subjected to constant current-constant voltage charging to 4.2V with 0.33C, and then, discharged to 2.7V with 0.33C.

This was carried out further 2 cycles, i.e., 3 cycles in total to stabilize the nonaqueous electrolyte secondary battery. Thereafter, the battery was subjected to aging by maintaining it at 60° C. for 24 hours.

55° C. Cycle Test

In a thermostat chamber at 55° C., the process in which constant current-constant voltage charging had been carried out to 4.2V with 1C, and discharging had been carried out to 2.7V with the constant current of 1C was made 1 cycle, which was carried out 199 cycles. A ratio of the capacity at the 199 cycles based on the capacity at the first cycle was made "55° C. cycle capacity maintenance rate".

55° C. cycle capacity maintenance rate is shown in the following Table 2-2.

TABLE 2-2

| No. | Content of Compound 2-1 in nonaqueous electrolyte (% by mass) | 55° C. cycle capacity maintenance rate |
|---|---|---|
| Example 2-2-1 | 0.3 | 78.2 |
| Comparative example 2-2-1 | 0.0 | 69.5 |

As clearly seen from Table 2-2, in the nonaqueous electrolyte secondary battery using the positive electrode containing at least Ni and Co, and containing a transition metal oxide in which 50 mol % or more of the transition metal is Ni and Co, when a specific compound is contained in the nonaqueous electrolyte, a high temperature cycle capacity maintenance rate is increased.

Examples 2-3-1 to 2-3-6, Comparative Example 2-3-1

Production of Nonaqueous Electrolyte Secondary Battery

Production of Negative Electrode

To 97.5 parts by mass of graphite powder were added 150 parts by mass of an aqueous dispersion of sodium carboxymethyl cellulose (a concentration of the sodium carboxymethyl cellulose of 1% by mass) as the thickening agent and 2 parts by mass of an aqueous dispersion of styrene-butadiene rubber (a concentration of the styrene-butadiene rubber of 50% by mass) as the binder, and the mixture was mixed by a disperser to make a slurry. The obtained slurry was uniformly coated onto a copper foil having a thickness of 10 μm and dried, and then, roll pressing was carried out to make a negative electrode.

<Production of Nonaqueous Electrolyte Secondary Battery>

The positive electrodes of the respective Examples and Comparative examples mentioned later, the above-mentioned negative electrode and a separator made of polyolefin to which the nonaqueous electrolytes of the respective Examples and Comparative examples mentioned later had previously been impregnated were laminated in the order of the positive electrode, the separator and the negative electrode. The battery element thus obtained was contained in a can body for a 2032 coin type battery, and caulked by a caulking machine to produce a coin type nonaqueous electrolyte secondary battery. The thus obtained nonaqueous electrolyte secondary battery was evaluated as mentioned later.

Example 2-3-1

<Production of Positive Electrode>

In N-methyl-2-pyrrolidone were mixed 90 parts by mass of lithium nickel manganese cobalt composite oxide ($Li_{1.05}Ni_{0.33}Mn_{0.33}Co_{0.33}O_2$, hereinafter sometimes referred to as NMC333) as the positive electrode active material, 7 parts by mass of carbon black as the conductive material, and 3 parts by mass polyvinylidene fluoride (PVdF) as the binder, and made a slurry, and the slurry was uniformly coated onto an aluminum foil having a thickness of 15 μm and dried, and then, roll press was carried out to make a positive electrode.

<Preparation of Nonaqueous Electrolyte>

Under dry argon atmosphere, 1 mol/L (as a concentration in the nonaqueous electrolyte) of sufficiently dried $LiPF_6$ was dissolved in a mixture of ethylene carbonate, dimethyl carbonate and ethyl methyl carbonate (volume ratio; 3:3:4), further, 0.3% by mass (as a concentration in the nonaqueous electrolyte) of sufficiently dried Compound 2-1 was dissolved therein to prepare a nonaqueous electrolyte.

<Evaluation of High Temperature Shelf Property of Nonaqueous Electrolyte Secondary Battery>

Initial Charge/Discharge

In a thermostat chamber at 25° C., a coin type nonaqueous electrolyte secondary battery was subjected to constant current-constant voltage charging to 4.2V with 0.33C, and then, discharged to 2.5V with 0.33C. This was carried out 3 cycles to stabilize the nonaqueous electrolyte secondary battery. Thereafter, the battery was subjected to constant current-constant voltage charging to 4.2V with 0.33C to make it a fully charging state.

60° C. Standing Test

The fully charging state nonaqueous electrolyte secondary battery was left to stand in a thermostat at 60° C. for 6 days.

Measurement of Large Current Resistance

After the nonaqueous electrolyte secondary battery after the 60° C. standing test was subjected to constant current-constant voltage charging to 4.2V with 0.33C, it was discharged to 2.5V with the constant current of 1C, and subjected again to constant current-constant voltage charging to 4.2V with 0.33C, then, discharged to 2.5V with the constant current of 2C. A ratio (%) of the discharge capacity with 2C to the discharge capacity with 1C was made "large current resistance".

Example 2-3-2

A nonaqueous electrolyte secondary battery was produced in the same manner as in Example 2-3-1 except for adding 0.3% by mass of sufficiently dried Compound 2-1, and using a nonaqueous electrolyte into which 0.2% by mass of sufficiently dried compound 2-2 had been dissolved, and evaluation thereof was carried out.

Example 2-3-3

<Production of Positive Electrode>

In N-methyl-2-pyrrolidone were mixed 67.5 parts by mass of lithium manganate ($Li_{1.1}Mn_{1.9}Al_{0.1}O_4$) as the first positive electrode active material, 22.5 parts by mass of lithium nickel manganese cobalt composite oxide (NMC333) as the second positive electrode active material, 5 parts by mass of carbon black as the conductive material, and 5 parts by mass of polyvinylidene fluoride (PVdF) as the binder, and made a slurry, and the slurry was uniformly coated onto an aluminum foil having a thickness of 15 μm and dried, and then, roll press was carried out to make a positive electrode.

<Preparation of Nonaqueous Electrolyte>

Under dry argon atmosphere, 1 mol/L (as a concentration in the nonaqueous electrolyte) of sufficiently dried $LiPF_6$ was dissolved in a mixture of ethylene carbonate, dimethyl carbonate and ethyl methyl carbonate (volume ratio; 3:3:4), further, 0.3% by mass (as a concentration in the nonaqueous electrolyte) of sufficiently dried Compound 2-1 was dissolved therein to prepare a nonaqueous electrolyte.

<Evaluation of High Temperature Shelf Property of Nonaqueous Electrolyte Secondary Battery>

Initial Charge/Discharge

In a thermostat chamber at 25° C., a coin type nonaqueous electrolyte secondary battery was subjected to constant current-constant voltage charging to 4.2V with 0.33C, and then, discharged to 2.5V with 0.33C. This was carried out 3 cycles to stabilize the nonaqueous electrolyte secondary battery. Thereafter, the battery was subjected to constant current-constant voltage charging to 4.2V with 0.33C to make it a fully charging state.

60° C. Standing Test

The fully charging state nonaqueous electrolyte secondary battery was left to stand in a thermostat at 60° C. for 6 days.

Measurement of Large Current Resistance

After the nonaqueous electrolyte secondary battery after the 60° C. standing test was subjected to constant current-constant voltage charging to 4.2V with 0.33C, it was discharged to 2.5V with the constant current of 1C, and subjected again to constant current-constant voltage charging to 4.2V with 0.33C, then, discharged to 2.5V with the constant current of 2C. A ratio (%) of the discharge capacity with 2C to the discharge capacity with 1C was made "large current resistance".

Example 2-3-4

A nonaqueous electrolyte secondary battery was produced in the same manner as in Example 2-3-3 except for adding 0.3% by mass of sufficiently dried Compound 2-1, and using a nonaqueous electrolyte into which 0.2% by mass of sufficiently dried compound 2-2 had been dissolved, and evaluation thereof was carried out.

Example 2-3-5

<Production of Positive Electrode>

In N-methyl-2-pyrrolidone were mixed 90 parts by mass of lithium nickel manganese cobalt composite oxide ($Li_{1.05}Ni_{0.50}Mn_{0.29}Co_{0.21}O_2$, hereinafter sometimes referred to as NMC532) as the positive electrode active material, 7 parts by mass of carbon black as the conductive material, and 3 parts by mass of polyvinylidene fluoride (PVdF) as the binder, and made a slurry, and the slurry was uniformly coated onto an aluminum foil having a thickness of 15 μm and dried, and then, roll press was carried out to make a positive electrode.

<Preparation of Nonaqueous Electrolyte>

Under dry argon atmosphere, 1 mol/L (as a concentration in the nonaqueous electrolyte) of sufficiently dried $LiPF_6$ was dissolved in a mixture of ethylene carbonate, dimethyl carbonate and ethyl methyl carbonate (volume ratio; 3:3:4), further, 0.3% by mass (as a concentration in the nonaqueous electrolyte) of sufficiently dried Compound 2-1 was dissolved therein to prepare a nonaqueous electrolyte.

<Evaluation of High Temperature Shelf Property of Nonaqueous Electrolyte Secondary Battery>

Initial Charge/Discharge

In a thermostat chamber at 25° C., a coin type nonaqueous electrolyte secondary battery was subjected to constant current-constant voltage charging to 4.2V with 0.33C, and then, discharged to 2.5V with 0.33C. This was carried out 3 cycles to stabilize the nonaqueous electrolyte secondary battery. Thereafter, the battery was subjected to constant current-constant voltage charging to 4.2V with 0.33C to make it a fully charging state.

60° C. Standing Test

The fully charging state nonaqueous electrolyte secondary battery was left to stand in a thermostat at 60° C. for 6 days.

Measurement of Large Current Resistance

After the nonaqueous electrolyte secondary battery after the 60° C. standing test was subjected to constant current-constant voltage charging to 4.2V with 0.33C, it was discharged to 2.5V with the constant current of 1C, and subjected again to constant current-constant voltage charging to 4.2V with 0.33C, then, discharged to 2.5V with the constant current of 2C. A ratio (%) of the discharge capacity with 2C to the discharge capacity with 1C was made "large current resistance".

Example 2-3-6

<Production of Positive Electrode>

In N-methyl-2-pyrrolidone were mixed 95 parts by mass of lithium nickel cobalt aluminum composite oxide ($Li_{0.98}Ni_{0.81}Co_{0.15}Al_{0.04}O_2$, hereinafter sometimes referred to as NCA) as the positive electrode active material, 3 parts by mass of carbon black as the conductive material, and 2 parts by mass of polyvinylidene fluoride (PVdF) as the binder, and made a slurry, and the slurry was uniformly coated onto an aluminum foil having a thickness of 15 μm and dried, and then, roll press was carried out to make a positive electrode.

<Preparation of Nonaqueous Electrolyte>

Under dry argon atmosphere, 1 mol/L (as a concentration in the nonaqueous electrolyte) of sufficiently dried LiPF6 was dissolved in a mixture of ethylene carbonate, dimethyl carbonate and ethyl methyl carbonate (volume ratio; 3:3:4), further, 0.3% by mass (as a concentration in the nonaqueous electrolyte) of sufficiently dried Compound 2-1 was dissolved therein to prepare a nonaqueous electrolyte.

<Evaluation of High Temperature Shelf Property of Nonaqueous Electrolyte Secondary Battery>

Initial Charge/Discharge

In a thermostat chamber at 25° C., a coin type nonaqueous electrolyte secondary battery was subjected to constant current-constant voltage charging to 4.2V with 0.33C, and then, discharged to 2.5V with 0.33C. This was carried out 3 cycles to stabilize the nonaqueous electrolyte secondary battery. Thereafter, the battery was subjected to constant current-constant voltage charging to 4.2V with 0.33C to make it a fully charging state.

60° C. Standing Test

The fully charging state nonaqueous electrolyte secondary battery was left to stand in a thermostat at 60° C. for 6 days.

Measurement of Large Current Resistance

After the nonaqueous electrolyte secondary battery after the 60° C. standing test was subjected to constant current-constant voltage charging to 4.2V with 0.33C, it was discharged to 2.5V with the constant current of 1C, and subjected again to constant current-constant voltage charging to 4.2V with 0.33C, then, discharged to 2.5V with the constant current of 2C. A ratio (%) of the discharge capacity with 2C to the discharge capacity with 1C was made "large current resistance".

Comparative Example 2-3-1

<Production of Positive Electrode>

In N-methyl-2-pyrrolidone were mixed 97 parts by mass of lithium cobalt composite oxide ($Li_{1.02}Co_{0.98}Mg_{0.01}Al_{0.01}O_2$, hereinafter sometimes referred to as LCO) as the positive electrode active material, 1.5 parts by mass of carbon black as the conductive material, and 1.5 parts by mass of polyvinylidene fluoride (PVdF) as the binder, and made a slurry, and the slurry was uniformly coated onto an aluminum foil having a thickness of 15 μm and dried, and then, roll press was carried out to make a positive electrode.

<Preparation of Nonaqueous Electrolyte>

Under dry argon atmosphere, 1 mol/L (as a concentration in the nonaqueous electrolyte) of sufficiently dried $LiPF_6$ was dissolved in a mixture of ethylene carbonate, dimethyl carbonate and ethyl methyl carbonate (volume ratio; 3:3:4), further, 0.3% by mass (as a concentration in the nonaqueous electrolyte) of sufficiently dried Compound 2-1 was dissolved therein to prepare a nonaqueous electrolyte.

<Evaluation of High Temperature Shelf Property of Nonaqueous Electrolyte Secondary Battery>

Initial Charge/Discharge

In a thermostat chamber at 25° C., a coin type nonaqueous electrolyte secondary battery was subjected to constant current-constant voltage charging to 4.2V with 0.33C, and then, discharged to 2.5V with 0.33C. This was carried out 3 cycles to stabilize the nonaqueous electrolyte secondary battery. Thereafter, the battery was subjected to constant current-constant voltage charging to 4.2V with 0.33C to make it a fully charging state.

60° C. Standing Test

The fully charging state nonaqueous electrolyte secondary battery was left to stand in a thermostat at 60° C. for 6 days.

Measurement of Large Current Resistance

After the nonaqueous electrolyte secondary battery after the 60° C. standing test was subjected to constant current-constant voltage charging to 4.2V with 0.33C, it was discharged to 2.5V with the constant current of 1C, and subjected again to constant current-constant voltage charging to 4.2V with 0.33C, then, discharged to 2.5V with the constant current of 2C. A ratio (%) of the discharge capacity with 2C to the discharge capacity with 1C was made "large current resistance".

Reference Example 2-3-1

A nonaqueous electrolyte secondary battery was produced in the same manner as in Example 2-3-1 except for not dissolving Compound 2-1 in the nonaqueous electrolyte, and evaluation was carried out.

Reference Example 2-3-2

A nonaqueous electrolyte secondary battery was produced in the same manner as in Example 2-3-3 except for not dissolving Compound 2-1 in the nonaqueous electrolyte, and evaluation was carried out.

Reference Example 2-3-3

A nonaqueous electrolyte secondary battery was produced in the same manner as in Example 2-3-5 except for not dissolving Compound 2-1 in the nonaqueous electrolyte, and evaluation was carried out.

Reference Example 2-3-4

A nonaqueous electrolyte secondary battery was produced in the same manner as in Example 2-3-6 except for not dissolving Compound 2-1 in the nonaqueous electrolyte, and evaluation was carried out.

Reference Example 2-3-5

A nonaqueous electrolyte secondary battery was produced in the same manner as in Comparative example 2-3-1 except for not dissolving Compound 2-1 in the nonaqueous electrolyte, and evaluation was carried out.

In the following Table 2-3, a ratio of large current resistance deteriorated by addition of Compound 2-1 is shown. That is, with regard to Examples 2-3-1 and 2-3-2, deterioration from the large current resistance of Reference example 2-3-1 are shown, with regard to Examples 2-3-3 and 2-3-4, deterioration from the large current resistance of Reference example 2-3-2, with regard to Example 2-3-5, deterioration from the large current resistance of Reference example 2-3-3, with regard to Example 2-3-6, deterioration from the large current resistance of Reference example 2-3-4, and with regard to Comparative example 2-3-1, deterioration from the large current resistance of Reference example 2-3-5.

For example, the value of deterioration of large current resistance of Example 2-3-1 is calculated by
{Value (%) of Reference example 2-3-1}/{Value (%) of Example 2-3-1} and the value is preferably small.

TABLE 2-3

| No. | Content in nonaqueous electrolyte (% by mass) | | Solvent | Positive electrode | Deterioration of large current resistance (%) |
| | Compound 2-1 | Compound 2-2 | | | |
|---|---|---|---|---|---|
| Example 2-3-1 | 0.3 | — | Ternary system | NMC333 | 2.6 |
| Example 2-3-2 | 0.3 | 0.2 | Ternary system | NMC333 | 0.2 |
| Example 2-3-3 | 0.3 | — | Ternary system | LMO + NMC333 | 0.3 |
| Example 2-3-4 | 0.3 | 0.2 | Ternary system | LMO + NMC333 | 0.0 |
| Example 2-3-5 | 0.3 | — | Ternary system | NMC532 | 0.8 |
| Example 2-3-6 | 0.3 | — | Ternary system | NCA | 0.3 |
| Comparative example 2-3-1 | 0.3 | — | Ternary system | LCO | 12.3 |

As clearly seen from Table 2-3, in the nonaqueous electrolyte secondary battery using the positive electrode which contains at least Ni and Co, 50 mol % or more of the transition metal of which is Ni and Co, and contains no transition metal oxide, when the specific compound is contained in the nonaqueous electrolyte, large current resistance is markedly impaired, but in the nonaqueous electrolyte secondary battery using the positive electrode containing the above-mentioned transition metal oxide, even when the specific compound is contained in the nonaqueous electrolyte, large current resistance is scarcely worsened.

UTILIZABILITY IN INDUSTRY

According to the nonaqueous electrolyte of Present invention 2, since it is possible to provide a battery that is compatible with high temperature life and suppression of deterioration of large current capacity after standing at high temperature, the nonaqueous electrolyte can be suitably utilized in all fields such as an electronic equipment, etc., where a nonaqueous electrolyte secondary battery is used. In addition, it can be suitably utilized in the electrolytic capacitor such as lithium ion capacitor, etc., using the nonaqueous electrolyte.

Use of the nonaqueous electrolyte and nonaqueous electrolyte secondary battery of Present invention 2 is not particularly limited, and it is possible to use the conventionally known various kinds of uses. Specific examples of the uses may be mentioned a laptop computer, an electronic book player, a cellular phone, a portable fax, a portable copying machine, a portable printer, a mobile audio player, a small video camera, a liquid crystal television, a handy cleaner, a transceiver, an electronic notebook, an electronic calculator, a memory card, a portable tape recorder, a radio, a backup power supply, an automobile, a bike, a motorized bicycle, a bicycle, a lighting equipment, a toy, a game machine, a watch, an electric power tool, a strobe, a camera, etc.

The invention claimed is:
1. A non-aqueous electrolyte secondary battery, comprising:
a positive electrode being capable of having occluded therein and releasing metal ions;
a negative electrode being capable of having occluded therein and releasing metal ions, and comprising a negative electrode active material containing metal particles capable of forming an alloy together with Li and graphite particles; and
a non-aqueous electrolytic solution comprising a non-aqueous solvent and an electrolyte dissolved in the non-aqueous solvent,
wherein the non-aqueous solvent is at least one selected from the group consisting of a cyclic carbonate having no fluorine atom, a linear carbonate, a cyclic and linear carboxylate, an ether compound, and a sulfone compound;
wherein the non-aqueous electrolytic solution comprises a compound represented by formula (A):

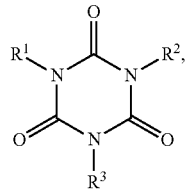

(A)

wherein $R^1$ to $R^3$ are the same or different, and each is an organic group having 1 to 20 carbon atoms, with the proviso that at least one of $R^1$ to $R^3$ is an organic group having a carbon-carbon unsaturated bond,
wherein the metal particles capable of forming an alloy together with Li are Si or a Si metal oxide;
wherein the negative electrode active material containing the metal particles capable of forming an alloy together with Li and the graphite particles is a composite and/or a mixture of a metal and/or a metal compound and the graphite particles; and
wherein the amount of the contained metal particles capable of forming an alloy together with Li is 0.1 to 25% by mass, based on the total mass of the metal particles capable of forming an alloy together with Li and the graphite particles.

2. The non-aqueous electrolyte secondary battery according to claim 1, wherein, in the formula (A), $R^1$ to $R^3$ are the same or different, and each is an organic group having 1 to 10 carbon atoms.

3. The non-aqueous electrolyte secondary battery according to claim 1, wherein the organic group having a carbon-carbon unsaturated bond is an allyl group.

4. The non-aqueous electrolyte secondary battery according to claim 1, wherein the organic group having a carbon-carbon unsaturated bond is a methallyl group.

5. The non-aqueous electrolyte secondary battery according to claim 1, wherein the amount of the added compound represented by the formula (A) is 0.01 to 10.0% by mass, based on the mass of the non-aqueous electrolytic solution.

6. The non-aqueous electrolyte secondary battery according to claim 1, wherein the non-aqueous electrolytic solution further comprises at least one compound selected from a cyclic carbonate having a carbon-carbon unsaturated bond and a cyclic carbonate having a fluorine atom.

7. The non-aqueous electrolyte secondary battery according to claim 1, wherein the metal particles capable of forming an alloy together with Li are Si.

8. The non-aqueous electrolyte secondary battery according to claim 1, wherein the metal particles capable of forming an alloy together with Li are a Si metal oxide.

9. The non-aqueous electrolyte secondary battery according claim 1, wherein the amount of the contained metal particles capable of forming an alloy together with Li is 0.1 to 20% by mass, based on the total mass of the metal particles capable of forming an alloy together with Li and the graphite particles.

10. The non-aqueous electrolyte secondary battery according to claim 1, wherein the amount of the contained metal particles capable of forming an alloy together with Li is 0.1 to 15% by mass, based on the total mass of the metal particles capable of forming an alloy together with Li and the graphite particles.

11. The non-aqueous electrolyte secondary battery according to claim 1, wherein the amount of the contained metal particles capable of forming an alloy together with Li is 0.1 to 10% by mass, based on the total mass of the metal particles capable of forming an alloy together with Li and the graphite particles.

12. The non-aqueous electrolyte secondary battery according to claim 1, wherein the compound represented by formula (A) is a compound having formula (A)(i), (A)(ii), or (A)(iii):

(A)(i)
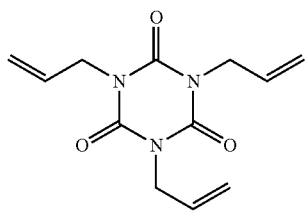
(A)(ii)
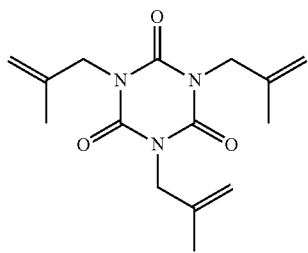
(A)(iii)
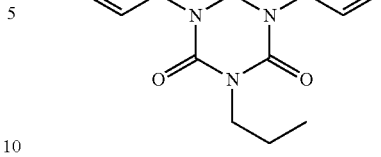
13. The non-aqueous electrolyte secondary battery according to claim 1, wherein the compound of formula (A) is a compound of formula (A)(i):
(A)(i)
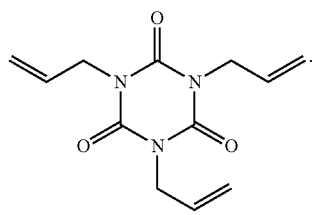
* * * * *